United States Patent [19]

Fukuhara et al.

[11] Patent Number: 5,565,870
[45] Date of Patent: *Oct. 15, 1996

[54] RADAR APPARATUS WITH DETERMINATION OF PRESENCE OF TARGET REFLECTIONS

[75] Inventors: Hiroshige Fukuhara; Hiroyuki Kamishima; Toshiro Muramatsu, all of Kanagawa-ken, Japan

[73] Assignee: Nissan Motor Co., Ltd., Kanagawa-ken, Japan

[ * ] Notice: The term of this patent shall not extend beyond the expiration date of Pat. No. 5,471,215.

[21] Appl. No.: 477,938

[22] Filed: Jun. 7, 1995

Related U.S. Application Data

[63] Continuation-in-part of Ser. No. 254,827, Jun. 6, 1994, Pat. No. 5,471,215.

[30] Foreign Application Priority Data

Jun. 28, 1993 [JP] Japan ................................. 5-156643
Jun. 28, 1994 [JP] Japan ................................. 6-146752

[51] Int. Cl.⁶ ........................................... G01S 13/93
[52] U.S. Cl. ............................. 342/70; 342/71; 342/72
[58] Field of Search ............................. 342/70, 71, 72

[56] References Cited

U.S. PATENT DOCUMENTS 5,471,215 11/1995 Fukuhura et al. ..................... 342/70

Primary Examiner—John B. Sotomayor
Attorney, Agent, or Firm—Lowe, Price, LeBlanc & Becker

[57] ABSTRACT

A low-cost compact radar apparatus measures a distance to a target and the relative speed of the target. The apparatus has a transmitter for transmitting a pulse signal and a receiver for receiving a reflected pulse signal from the target. The received signal is converted into a binary signal, which is sampled by a sampler and is accumulated in a cumulative storage unit. Addresses of the storage unit correspond to an interval between the transmission and reception of the pulse signal. According to the interval, the distance and relative speed of the target are calculated at high speed. The apparatus carries out many accumulation operations, to improve an S/N ratio and speedily detect even a weak reflected signal.

35 Claims, 80 Drawing Sheets

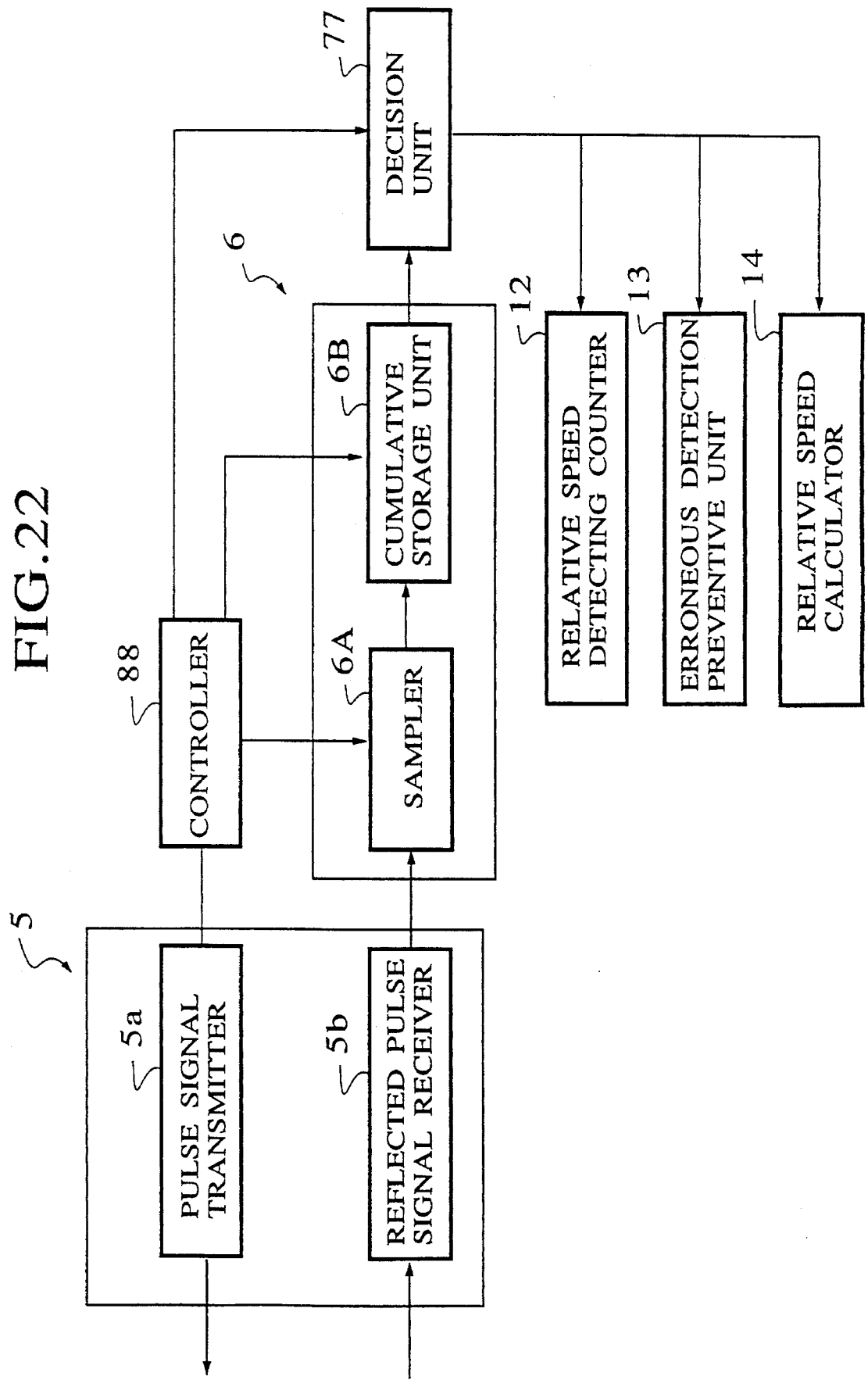

RADAR APPARATUS WITH DETERMINATION OF PRESENCE OF TARGET REFLECTIONS

CROSS REFERENCE TO RELATED APPLICATIONS

This application is a continuation-in part of Ser. No. 08/254,827 now U.S. Pat. No. 5,471,215, filed Jun. 6, 1994 and is entitled Radar Apparatus, which is expressly incorporated by reference herein in its entirety.

BACKGROUND OF THE INVENTION

1. Field of the Invention

The present invention relates to a radar apparatus applicable to, for example, a car collision alarm device. In particular, the present invention relates to a low-cost simple radar apparatus that receives a reflected signal, converts the signal into a binary signal, and carries out a cumulative statistical operation on the binary signal, to realize high sensitivity and distance measuring capacity. More precisely, the present invention firstly relates to a radar apparatus for detecting a weak reflected signal, secondary to a radar apparatus for detecting and removing interference signals caused by a radar apparatus of an opposite automobile, thirdly to a radar apparatus for accurately measuring the relative speed of an opposite automobile even with a wide transmission pulse, and fourthly to a durable, reliable radar apparatus installed on a vehicle, to speedily detect a target.

2. Description of the Related Art

A radar apparatus is applicable to measuring a distance between vehicles and providing a car collision alarm. The radar apparatus emits a radio or laser pulse signal toward a car running ahead, receives a reflected pulse signal from the car ahead, and calculates a distance between the cars according to an interval between the transmission and reception of the pulse signal. The radar apparatus, therefore, has a transmitter for transmitting the radio or laser pulse signal toward the car ahead and a receiver for receiving the reflected pulse signal and converting it into an electric signal. The radar apparatus still has a controller for controlling the timing of emitting the pulse signal, and a time measurement unit connected to the receiver, for measuring the interval between the transmission and reception of the pulse signal.

The transmitter transmits a pulse signal in synchronization with a trigger pulse that is repeatedly provided at intervals of Tr under the control of the controller. When the amplitude of a reflected pulse signal from an external target exceeds a threshold Vth, the receiver provides a detection signal. This kind of conventional radar apparatus has some problems.

The reflected pulse sisal usually includes internal and external noise. Accordingly, the threshold Vth must be relatively high to avoid detection errors due to the noise. The noise is generally random noise having a Gaussian distribution. When the noise has an instantaneous amplitude of n, the probability distribution P(n) thereof is a probability density function demonstrating a Gaussian distribution with an average of zero and a variance of $\sigma^2$ where $\sigma$ is a standard deviation. The probability density function P(n) is expressed as follows:

$$P(n) = \frac{1}{\sqrt{2\pi\sigma^2}} \exp\left(-\frac{n^2}{2\sigma^2}\right) \quad (1)$$

In the expression (1), the $\sigma^2$ is noise equivalent power and the $\sigma$ is the effective value thereof. When this noise is contained in a signal having an amplitude of s, the probability density function P(n−s) thereof is expressed as follows:

$$P(n-s) = \frac{1}{\sqrt{2\pi\sigma^2}} \exp\left\{-\frac{(n-s)^2}{2\sigma^2}\right\} \quad (2)$$

Accordingly, the probability of $(n-s) \geq x$ with $t=(n-s)/\sigma$ is expressed as follows:

$$\phi(x) = \int_{-\infty}^{x} P(t)dt \quad (3)$$

For example, $\phi(1)=0.84134$, $\phi(2)=0.97725$, and $\phi(3)=0.99865$. To correctly detect a reflected signal in the probability of 99.865% from a target at a required distance, the output power of a pulse signal to be transmitted must be determined with a threshold of $3\sigma$, an amplitude higher than the threshold by $3\sigma$, and a peak value six times larger than the effective value $\sigma$ of the noise. This corresponds to an S/N ratio of 15.6 dB. According to a radar equation, the level of a reception signal attenuates in proportion to the fourth power of a distance. Accordingly, a long distance is measurable only with an expensive high-power oscillator. Instead of increasing output power, reception strength may be increased. This requires, however, a wide antenna that increases the shape and weight of a radar head, which will be hardly installed on a vehicle. For the safety of the human body, the output power must be low according to safety criteria. This will hardly realize a required detection level.

Japanese Laid-Open Patent Nos. 1-46034 and 2-2106 disclose a method of improving reception sensitivity to a weak signal. This method is applicable to receiving a cyclic signal such as a loran-C signal. The method converts the signal into a binary signal involving positive and negative values. The binary signal is sampled and accumulated in a RAM for a given period under the control of a microcomputer. According to the contents of the memory, the existence, S/N ratio, and occurrence point of the signal are detected. The accumulation of data greatly improves the detectable S/N ratio of a weak signal. If a long detection time is allowed, this method is effective to a signal such as the loran-C signal having a relatively long period. When this method is applied to receiving a radar signal, some problems arise. Since the reception strength of a radar signal is proportional to the fourth power of a distance, sensitivity must be improved 16 times to double a detection distance. To improve the sensitivity by calculation, the improvement is proportional to the one second power of the number of accumulation operations. Accordingly, the sensitivity will be improved 16 times if the number of accumulation operations is increased by $16^2=256$ times. A period of repetitive transmission of a radar pulse must be as short as possible. Since the conventional method employs the microcomputer to control the RAM to accumulate radar pulses, a time necessary for sampling and accumulating the pulses is determined by the clock and instruction cycle of the microcomputer. This results in limiting the period of repetitive transmission of the radar pulse. Accordingly, it is difficult to greatly increase the number of accumulation operations to improve the sensitivity. When the radar apparatus is applied to a car collision alarm device, it raises other problems. If a like radar apparatus is mounted on an opposite car running toward this side, pulsesignals of the radar apparatuses of that and this cars will interfere with each other to hinder correct distance measurement. Not only the pulsesignal of the opposite car but also engine sparks, ON/OFF operations of a headlight, an air conditioner, and a wiper, fluctuations in a power source voltage, sunlight, and tunnels cause noise. Such internal and external noise will resonate to produce a noise signal that may exceed the threshold. Then, the noise signal will be erroneously detected as a reflected signal from a car that is actually nonexistent.

Japanese Laid-Open Patent No. 3-171380 of this applicant explains that it is necessary to measure not only a distance between cars but also a relative speed between the cars when providing a collision alarm. When measuring the relative speed, the conventional radar apparatus has some problems. The conventional pulse radar is capable of measuring only a distance to a target. Accordingly, to measure a relative speed, the conventional radar must increase accuracy to measure a rate of temporal changes. To increase the accuracy, it is necessary to shorten the width of a pulse transmitted from the radar as well as increasing sampling points. To achieve a measuring accuracy of one meter in a measuring range of 130 meters, 130 sampling points must be prepared. This elongates a time for carrying out accumulation operations. In addition, the width of a pulse to be transmitted must be shortened to several nanoseconds. This complicates a transmitter, increases cost, and deteriorates the performance of the radar.

To secure the durability and reliability of light emitting elements of the transmitter, it is necessary to decrease the duty ratio of pulses. This limits a repetition period of pulses. Namely, if the repetition period is shortened to speedily measure a distance, the durability and reliability of the light emitting elements decrease. On the other hand, if the repetition period is extended, it will take a long time to measure a distance.

SUMMARY OF THE INVENTION

A first object of the present invention is to provide a low-cost, compact, simple radar apparatus for speedily sampling, accumulating, and storing received signals, to detect even a very weak reflected signal at high speed.

A second object of the present invention is to provide a low-cost, compact, simple radar apparatus for speedily sampling, accumulating, and storing received signals, to accumulate more data and improve sensitivity in detecting a reflected signal.

A third object of the present invention is to provide a radar apparatus for transmitting a low-power pulsesignal that is safe to the human body, realizing a long measuring range, reducing an interference with pulses from an opposite radar apparatus, and improving the safety and reliability of detecting a target and measuring a distance to the target.

A fourth object of the present invention is to provide a low-cost, compact, simple radar apparatus for speedily measuring the relative speed of a target, detecting fluctuations in noise levels in advance, and preventing an erroneous detection of reflected signals.

A fifth object of the present invention is to provide a low-cost, compact, simple radar apparatus with a radar head (in particular, light emitting elements) having improved durability and reliability.

In order to accomplish the objects, the present invention provides a radar apparatus having a transmitter for transmitting a signal such as a laser beam signal, an electromagnetic signal, or a sound signal, a receiver for receiving a signal such as a laser beam signal, an electromagnetic signal, or a sound signal reflected by an external target, a sampler for repeatedly sampling the received signal at predetermined intervals, an accumulator for accumulating the sampled data according to the contents thereof, a storage unit for storing the accumulated data, a controller for controlling the transmitter, sampler, accumulator, and storage unit, and a decision unit for reading the data out of the storage unit and determining whether or not the data contain a reflection signal from the target. The controller controls the transmitter to transmit a pulsesignal having a predetermined duration and pulse width. The pulsesignal is reflected by a target and is received by the receiver with a delay time of Td that is proportional to a distance to the target. The sampler is a shift register for sequentially shifting and storing sampled data. The received signal is converted into a binary signal according to positive and negative phases thereof. The accumulator accumulates data transferred from the sampler only when the data are positive. The storage unit has memories M1 to Mn corresponding to n sampling pulses produced in each sampling period and accumulating the sampled data. After the end of an accumulation cycle, the accumulated data are transferred to the decision unit.

The decision unit determines whether or not the data include a reflected pulse from the target and calculates a delay time Td, to measure a distance to the target. The sampling points, i.e., the addresses of the memories M1 to Mn correspond to the delay time Td and distance to the target. According to a shift in the sampled points, i.e., the memories M1 to Mn, of reflected pulses from the target, the relative speed of the target is measured. Accordingly, the relative speed is correctly measurable even if the pulse width of the transmitted signal is wide. The present invention optionally selects a sampling clock frequency to improve the sampling, accumulating, and storing operations. This allows increasing the number of accumulation operations. The larger the number of the accumulation operations, the smaller the standard deviation due to noise, thereby improving the S/N ratio of and sensitivity to a reflected signal.

BRIEF DESCRIPTION OF THE DRAWINGS

FIG. 22 is a block diagram showing a third embodiment;

FIG. 88 is a block diagram showing a 12th embodiment of the present invention;

DETAILED DESCRIPTION OF THE EMBODIMENTS

Figure 1:
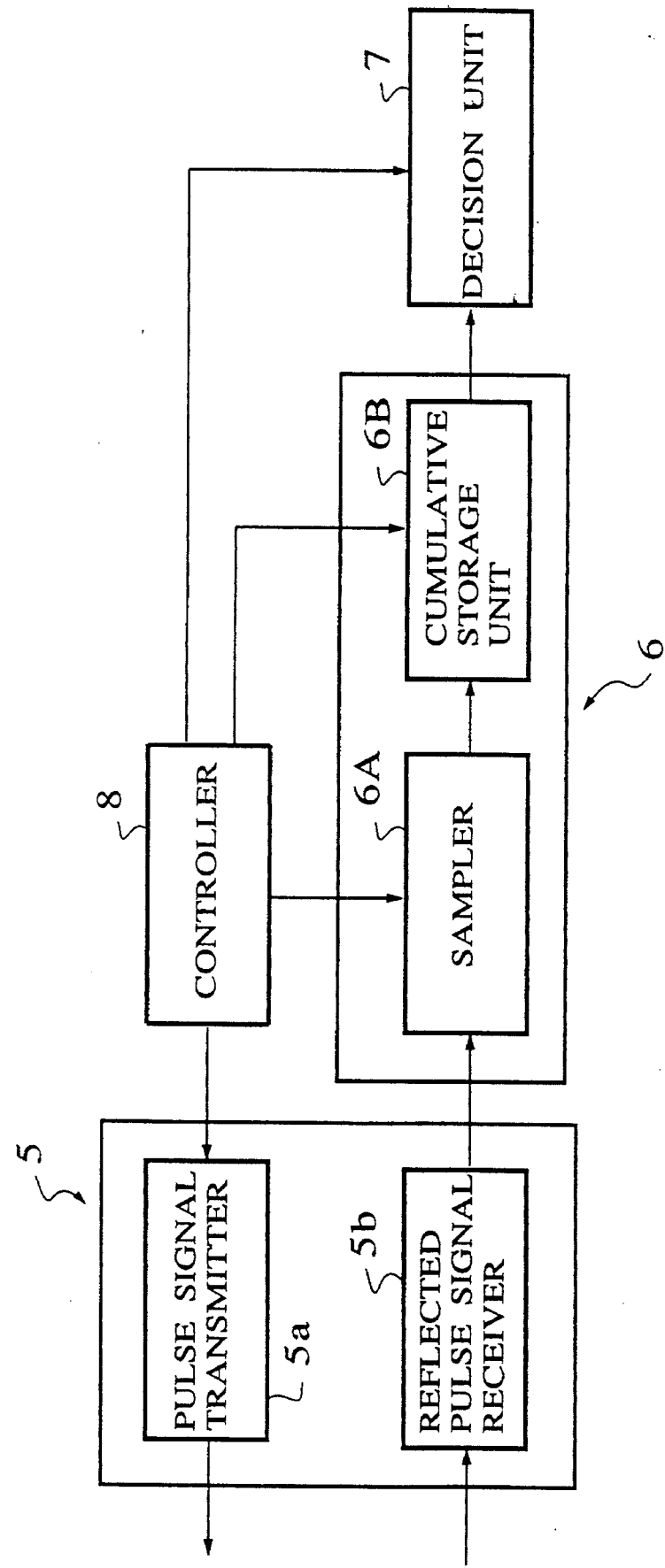
FIG. 1 generally shows a first embodiment of the present invention.

The first to 19th embodiments of the present invention will be explained with reference to the drawings. FIG. 1 generally shows a radar apparatus according to the first embodiment. A radar head 5 has a transmitter 5a for transmitting a pulsesignal which may be an optical signal, an electromagnetic signal, or a sonic wave signal, and a receiver 5b for receiving a reflected pulsesignal. An operational storage unit 6 has a sampler 6A for sampling the reflected pulsesignal and a cumulative storage unit 6B for successively accumulating the sampled data. A decision unit 7 determines whether or not the data stored in the storage unit 6B contain a reflected pulse. A controller 8 controls the radar apparatus as a whole. Namely, the controller 8 controls the transmitter 5a, sampler 6A, cumulative storage unit 6B, and decision unit 7.

Figure 2:
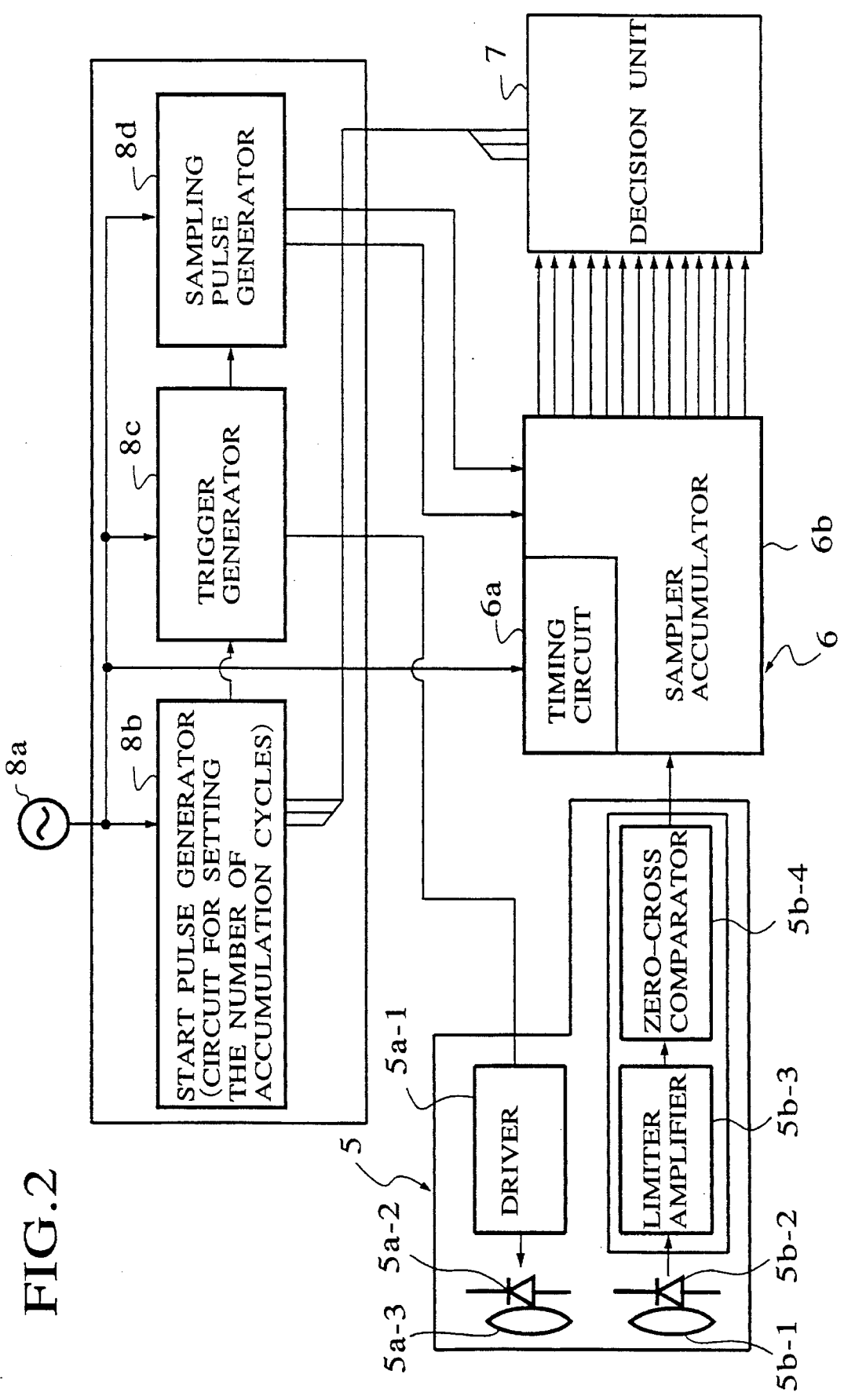
FIG. 2 is a circuit diagram showing an optical radar according to the first embodiment.

FIG. 2 is a circuit diagram showing an optical radar according to the first embodiment. A transmitter 5a for transmitting a pulsesignal has a driver 5a-1 operating in response to a trigger pulse provided by a trigger generator 8c, a light emitting element 5a-2 such as an LED or a laser diode driven by the driver 5a-1, and a lens 5a-3 for condensing a light beam provided by the element 5a-2 toward a target. The laser diode may be a $Ga_{1-x}Al_xAs$ double-heterostructure-semiconductor laser that emits infrared rays, or another semiconductor laser having different wavelengths. A receiver 5b for receiving a reflected pulse signal has a lens 5b-1 for focusing a reflected beam from the target toward a light sensing face of a photosensor 5b-2 such as a photodiode such as an APD and a phototransistor, the photosensor 5b-2 converting the focused light into an electric signal, a limiter amplifier 5b-3 for amplifying the electric signal and converting it into a binary signal (a phase signal or a sign signal) representing binary values such as 1 and 0, and a zero-cross comparator 5b-4 for converting the binary signal into logic levels, for example, 5 V and 0 V. The photosensor 5b-2 may have the same forbidden band Eg as that of the light emitting element 5a-2, to receive light in high sensitivity.

The operative storage unit 6 has a timing circuit 6a for counting the sampling timing of a reflected signal according to a clock signal provided by a clock oscillator 8a, and a sampler accumulator 6b for sampling a zero-cross signal provided by the comparator 5b-4 according to a sampling pulse provided by a sampling pulse generator 8d and accumulating sampled data. The decision circuit 7 has a function of providing a predetermined number of pulses (start pulses) for driving the light emitting element 5a-2 and a function of fetching the data stored in the sampler accumulator 6b and determining whether or not the data contain a reflected pulse from a target. The controller 8 has the start pulse generator 8b for providing a start pulse according to a clock signal provided by the clock oscillator 8a and setting the number of accumulation operations carried out on sampled data, the trigger generator 8c for providing the driver 5a-1 with a trigger pulse according to the clock signal, and the sampling pulse generator 8d for recognizing a start point according to the clock signal as well as sampling start and end points according to instructions from the start pulse generator 8b, to control the operational storage unit 6.

Figure 3:
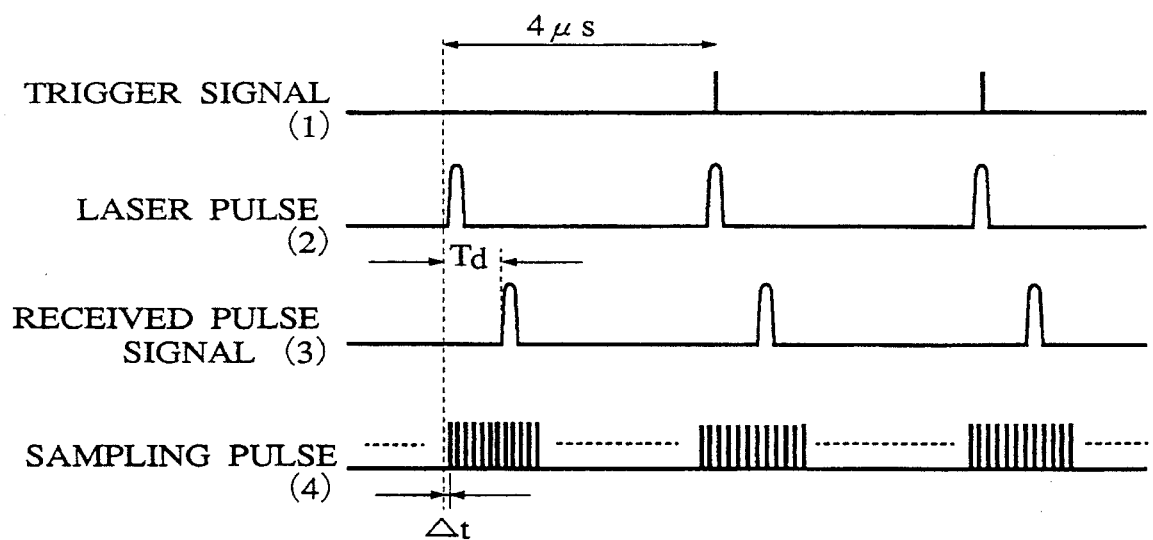
FIG. 3 is a timing chart showing signals employed by the radar of FIG. 2.
Figure 4:
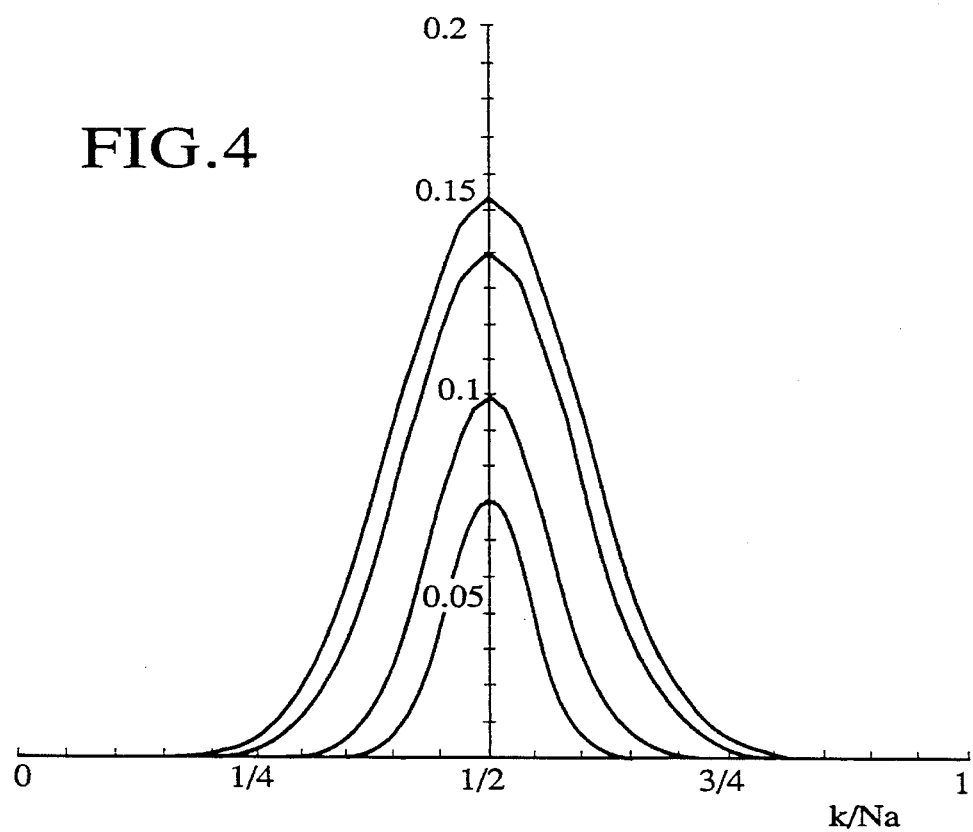
FIG. 4 shows a probability distribution of an accumulated value k indicating the number of "ones" when a received signal is sampled and converted into a binary signal (1 or 0) Na times.

FIG. 3 is a timing chart showing various signals. In this example, the light emitting element 5a-2 is a semiconductor laser diode. A trigger pulse (1) is repeatedly generated by the trigger generator 8c at intervals of, for example, four microseconds. A laser pulsesignal (2) is transmitted toward an external target from the laser diode 5a-2, which is controlled by the trigger generator 8c and driver 5a-1. The laser pulse signal (2) is provided in synchronization with the trigger pulse (1). The laser pulsesignal (2) may be an optical signal, a radio signal, or an ultrasonic signal. A pulse signal (3) is received by the limiter amplifier 5b-3 through the lens 5b-1 and photosensor 5b-2. The received pulsesignal (3) is checked if it is greater than a threshold Vth of, for example, 0 V and is converted into a instantaneous binary signal. The received pulsesignal (3) is behind the transmitted pulsesignal (2) by a delay time Td, which is proportional to a distance to the target. The binary signal is accumulated in the sampler accumulator 6b for an accumulation cycle according to binary values 1 and 0, i.e., positive and negative amplitudes. Sampling pulses (4) are provided by the sampling pulse generator 8d whenever the trigger pulse (1) is provided. The interval of the sampling pulses (4) is Δt, and n pieces of the sampling pulses (4) are provided in response to each trigger pulse (1). The n is, for example, 14 or 128. The instantaneous binary value of the received pulsesignal (3) is sampled for each timing of the individual sampling pulse by the sampler accumulator 6b and is accumulated to the sampling point, respectively. This sampling and accumulation operation is repeated for n=Na laser pulses (2), until the end pulse is provided by the trigger generator 8C. The sampler accumulator 6b has n memories M1 to Mn corresponding to the n sampling pulses, respectively. The memories M1 to Mn are cleared or set to a predetermined value before transmitting the pulsesignal (2). The memory M1 accumulates one when a latch circuit provides one in response to a hold timing signal of one. This accumulation operation is carried out up to the memory Mn corresponding to the sampling pulse n. The accumulation operation is repeated for n=N, (for example, 26, 32, 64, or 128) laser pulses (2). The sampler accumulator 6b repeats the accumulation operation Na times according to an instruction from the start pulse generator 8b and provides the decision unit 7 with accumulated data. According to the accumulated data, the decision unit 7 determines whether or not the data contain a reflected pulse from the target. If the reflected pulse is contained, the decision unit 7 measures a transport period of the reflected pulse according to the address of the memory in which the reflected pulse has been detected and the interval Δt of the sampling pulses. Namely, the transport period Td is calculated as m·Δt when the reflected pulse is detected in the "m"th memory. The determination whether or not there is a reflected pulse is carried out according to data stored in the memories. The larger the number $N_a$ of the accumulation operations, the smaller the standard deviation due to noise. Namely, an S/N ratio is improved $(N_a)^{1/2}$ times, so that a reflected pulse may be easily discriminated from noise. The high-gain limiter amplifier 5b-3 converts random noise into a rectangular signal, and the zero-cross comparator 5b-4 provides "1" if the signal is positive and "0" if it is negative, to thereby provide a binary noise signal whose probability of occurrence of "1" is equal to that of "0." When the binary noise signal is repeatedly sampled and accumulated, the accumulated data show a binomial probability distribution. Namely, independent $N_a$ trials corresponding to $N_a$ sampling operations under the same conditions involve k (equal to an accumulated value k) events of, for example, sampling "1." The probability distribution of k the is expressed as follows:

$$f(k) = {}_{N_a}C_k p^k q^{N_a - k} \quad (4)$$

$$_{N_a}C_k = \frac{N_a!}{N_a!(N_a - k)!} \quad (5)$$

where the p is the probability of "1" occurring in one sampling operation and the q is the probability of "0" occurring in one sampling operation. If there is only noise, p=q=0.5. FIG. 4 shows probability distributions with an accumulated value of k, p=q=0.5, and $N_a$=26, 32, 64, and 128. An abscissa represents the accumulated value k normalized by $N_a$, i.e., $k/N_a$. The range of the $k/N_a$ becomes smaller around ½ as the number of the accumulation operations increases. If a signal contains such noise, an expected accumulated value $\bar{k}$ and a variance V are expressed as follows:

$$\bar{k} = N_a \cdot p \quad (6)$$

$$V = N_a p \cdot q \quad (7)$$

where the p and q are random noise showing Gaussian distributions, and therefore, are obtained as follows according to the expressions (2) and (3):

$$p = \int_0^\infty P(t)dt \quad (8)$$

$$q = 1 - p \quad (9)$$

where $\sigma^2$ is noise power. Accordingly, s/σ is equal to S/N. Namely, p, q, $\bar{k}$, and V are uniquely determined according to S/N. When $\bar{k}$ is normalized by $N_a$, $\bar{k}/N_a$ =p according to the expression (6), so that it becomes constant irrelevant to $N_a$. A standard deviation $V^{1/2}$ is equal to $(N_a pq)^{+e, fra\ 2+ee}$ according to the expression (7), so that, when it is normalized by $N_a$, $(N_a pq)^{1/2}/N_a = (pq/N_a)^{1/2}$. Namely, the standard deviation is reduced to $1/(N_a)^{1/2}$. This means that the larger the number of the accumulation operations, the smaller the standard deviation due to noise, to easily separate noise from a signal.

Figure 5:
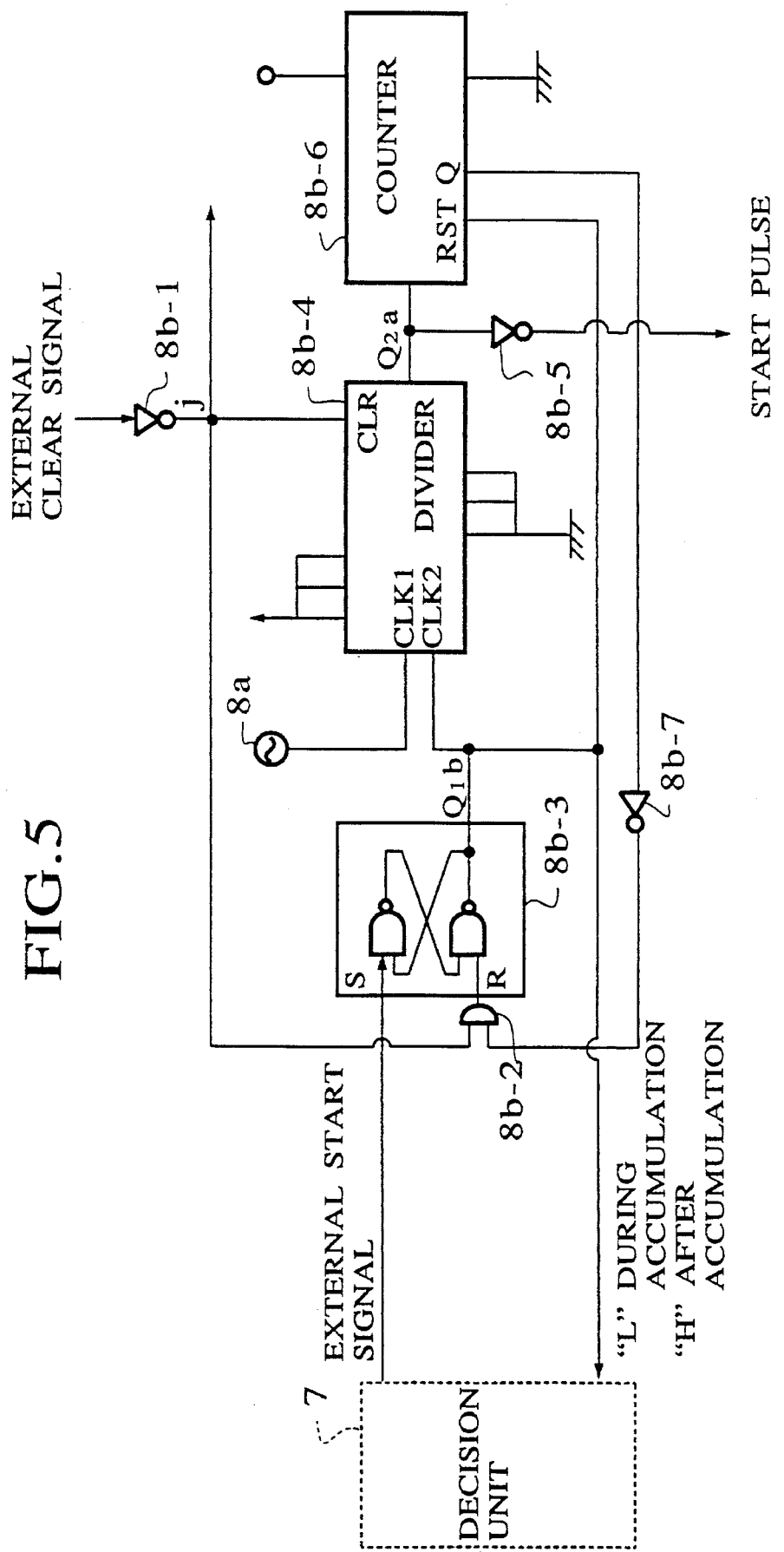
FIG. 5 is a circuit diagram showing a start pulse generator (a circuit for setting the number of accumulation cycles) of FIG. 2.

The accumulation operation will be explained in detail. Components of the controller 8 will be explained in detail at first. FIG. 5 is a circuit diagram showing the start pulse generator (the circuit for setting the number of accumulation operations) 8b. This circuit has an RS flip-flop 8b-3, a divider 8b-4, and a counter 8b-6. The RS flip-flop 8b-3 receives an external start signal from the decision unit 7, as well as an output of an AND gate 8b-2 that provides an AND of an external clear signal and a count end signal from the counter 8b-6. These input signals determine an output Q1b of the RS flip-flop 8b-3. The divider 8b-4 receives an output of the clock oscillator 8a, a control signal j that is an inverted external clear signal provided by an inverter 8b-1, and the output Q1b of the RS flip-flop 8b-3. These input signals determine an output Q2a of the divider 8b-4. The output Q2a is inverted by an inverter 8b-5 into a start pulse. The counter 8b-6 receives the output Q2a of the divider 8b-4 and adds up counts. The counter 8b-6 provides a count continuation signal, which is inverted by an inverter 8b-7 and is transferred to the AND gate 8b-2. The counter 8b-6 also provides an accumulation status signal according to counting conditions. Namely, in the start pulse generator 8b, the output Q1b of the RS flip-flop 8b-8 becomes low (L) in response to the external start signal, to release the inhibit state of the clock input of the divider 8b-4, so that the divider 8b-4 divides a 15-MHz clock signal by 32 to provide start pulses at intervals of four microseconds. The number of start pulses is, for example, 8192. When receiving the 8192th start pulse, the counter 8b-6 provides an output with a 14th bit of high (H) to reset the RS flip-flop 8b-3. This stops the divider 8b-4. The output of the counter 8b-6 is L while the start pulses are being provided, and it becomes H after 8192 start pulses are provided. The output of counter 8b-6 is properly transferred to the decision unit 7.

Figure 6:
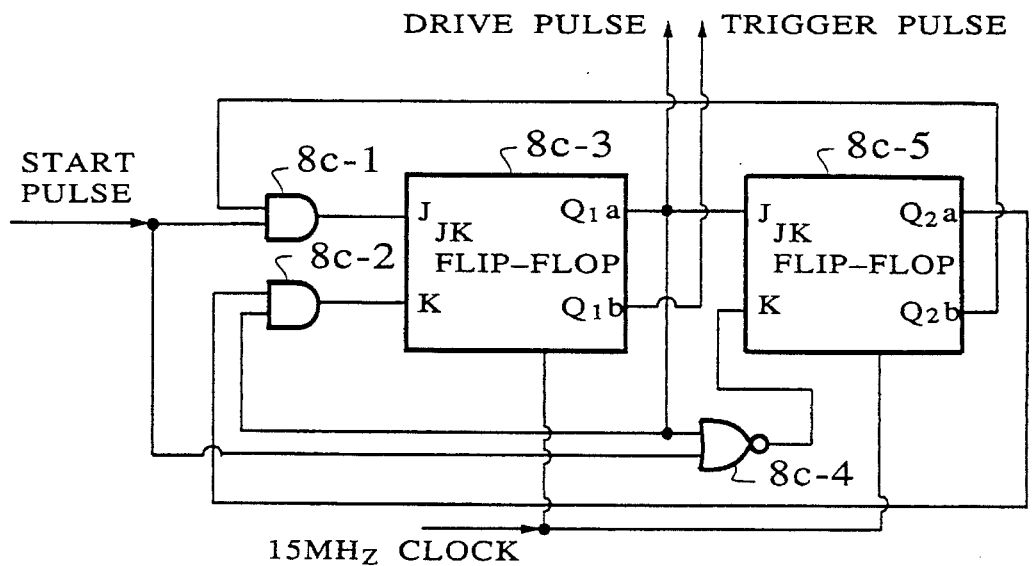
FIG. 6 is a circuit diagram showing a trigger generator of FIG. 2.
Figure 7:
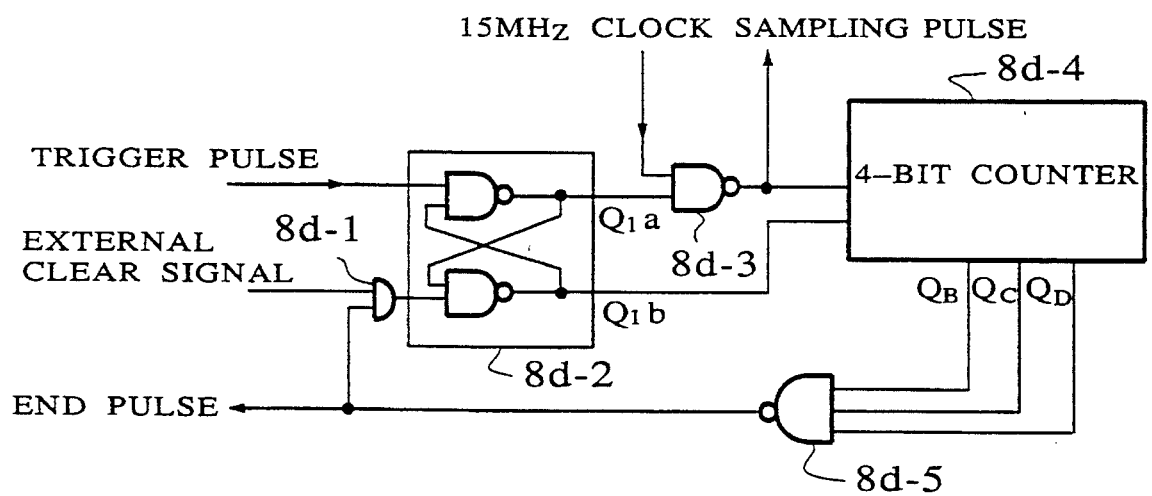
FIG. 7 is a circuit diagram showing a sampling pulse generator of FIG. 2.
Figure 8:
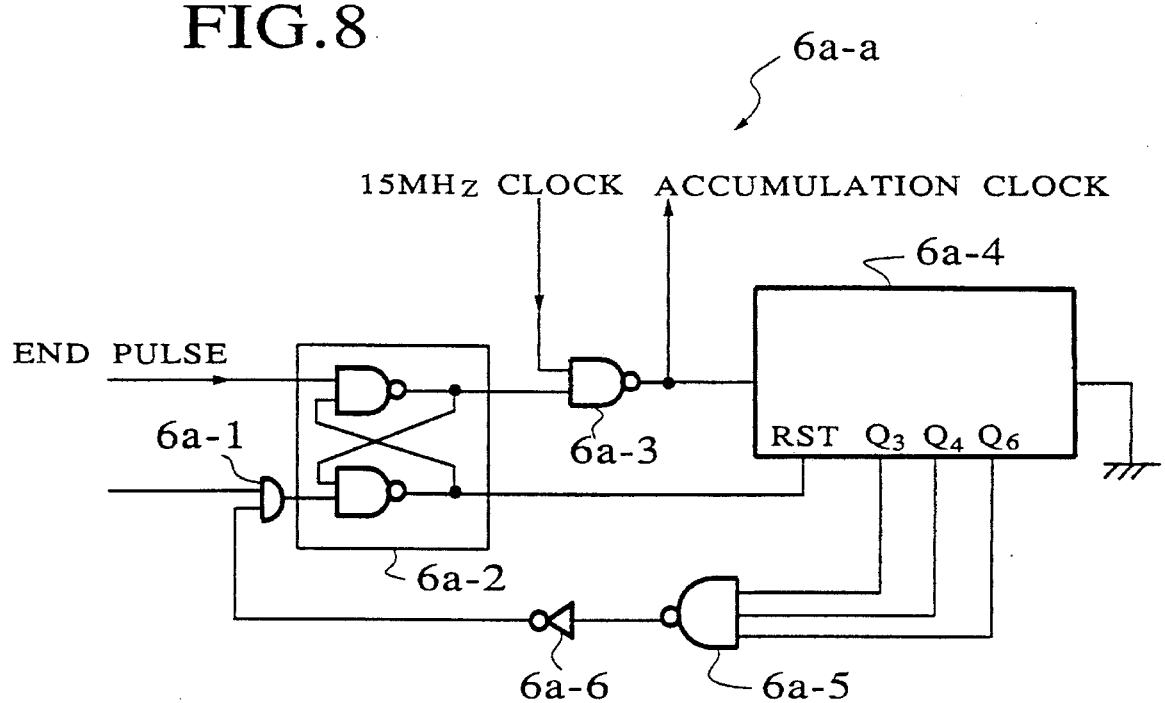
FIG. 8 is a circuit diagram showing an accumulation clock generator that is a part of a timing circuit of FIG.
Figure 9:
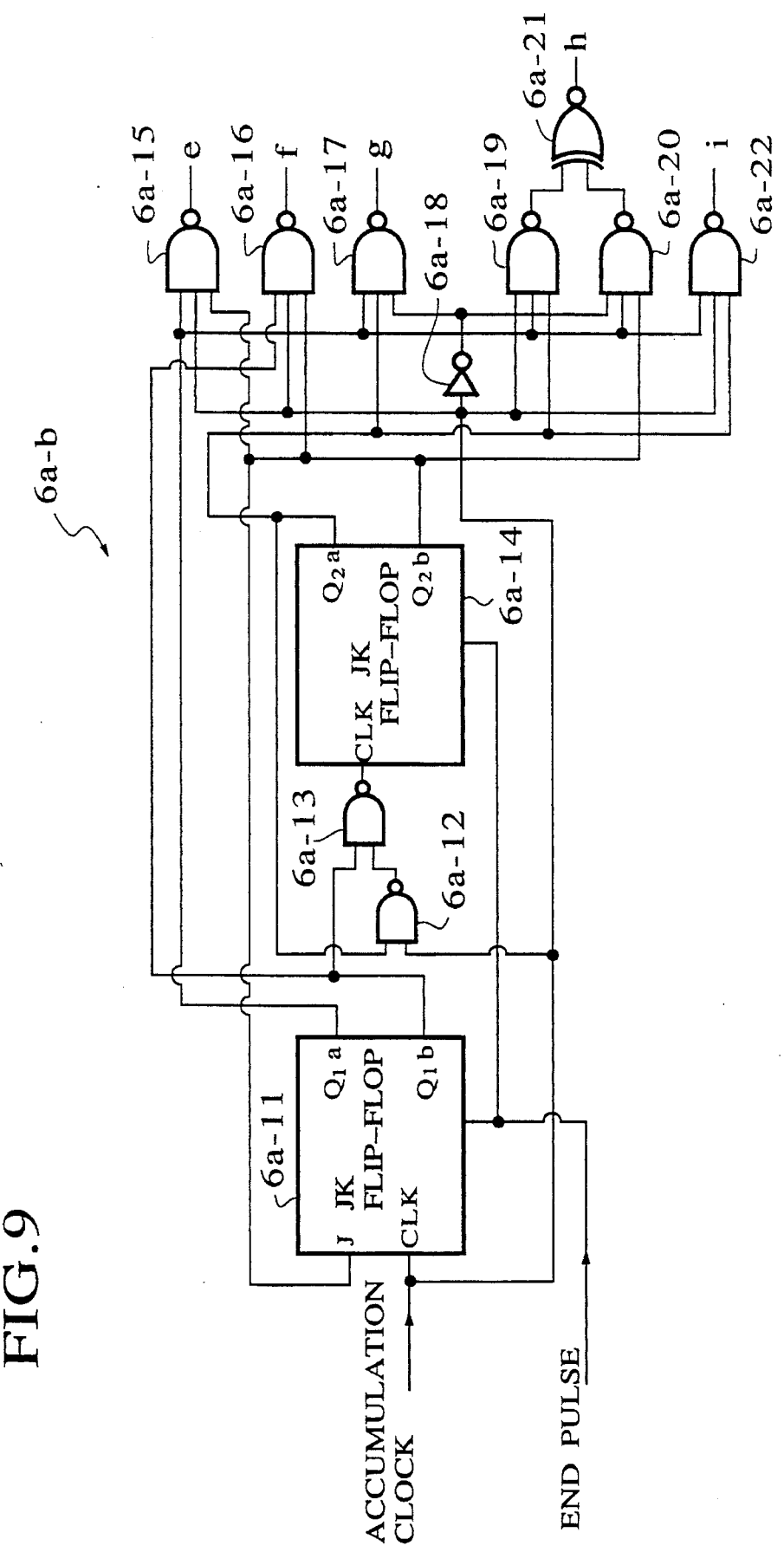
FIG. 9 is a circuit diagram showing a control pulse generator that is a part of the timing circuit of FIG. 2.

FIG. 6 is a circuit diagram showing the trigger generator 8c. The trigger generator 8c has JK flip-flops 8c-3 and 8c-5. The JK flip-flop 8c-3 receives outputs of AND gates 8c-1 and 8c-2. The AND gate 8c-1 provides an AND of a start pulse and an output Q2b of the JK flip-flop 8c-5. The AND gate 8c-2 provides an AND of an output Q1a of the JK flip-flop 8c-3 and an output Q2a of the JK flip-flop 8c-5. These input signals determine the outputs Q1a and Q1b of the JK flip-flop 8c-3. The output Q1a is a drive pulse for driving the light emitting element 5a-2 such as an LED, and the output Q1b is a trigger pulse. The JK flip-flop 8c-5 receives an output of a NOR gate 8c-4 that provides a NOR of the output Q1a of the JK flip-flop 8c-8 and the start pulse. These input signals determine the outputs Q2a and Q2b of the JK flip-flop 8c-5. FIG. 7 is a circuit diagram showing the sampling pulse generator 8d. The sampling pulse generator 8d has an RS flip-flop 8d-2 and a four-bit counter 8d-4. The RS flip-flop 8d-2 receives a trigger pulse and an output of an AND gate 8d-1, which provides an AND of an external clear signal and an end pulse. These input signals determine outputs Q1a and Q1b of the RS flip-flop 8d-2. A NAND gate 8d-8 provides a sampling pulse according to a NAND of the output Q1a and a clock signal. The output of the NAND gate 8d-8 is also supplied to the four-bit counter 8d-4 for counting sampling pulses. When outputs QB, QC, and QD of the counter 8d-4 corresponding to bits 2 to 4 simultaneously become H at the 14th sampling pulse, a three-input NAND gate 8d-5 becomes L. This resets the RS flip-flop 8d-2 and stops the output of the NAND gate 8d-8. The output of the three-input NAND gate 8d-5 is provides as an end pulse indicating an end of sampling pulses. FIG. 8 is a circuit diagram showing an accumulation clock generator 6a-a forming the timing circuit 6a. The clock generator 6a-a resembles the sampling pulse generator 8d of FIG. 7. The sampling pulse generator 8d provides sampling pulses in response to a trigger pulse, while the accumulation clock generator 6a-a provides an accumulation clock in response to an end pulse. FIG. 9 shows a control pulse generator 6a-b forming the timing circuit 6a. The control pulse generator 6a-b has two JK flip-flops 6a-11 and 6a-14 and a plurality of NAND gates 6a-15 to 6a-22. The JK flip-flop 6a-11 receives an output Q2b of the JK flip-flop 6a-14 and an accumulation clock. These input signals determine outputs Q1a and Q1b of the JK flip-flop 6a-11. The JK flip-flop 6a-14 receives an output of a NAND gate 6a-13, which provides a NAND of the output Q1b of the JK flip-flop 6a-11 and an output of a NAND gate 6a-12. The NAND gate 6a-12 provides a NAND of the accumulation clock and an output Q2a of the JK flip-flop 6a-14. These input signals determine the outputs Q2a and Q2b of the JK flip-flop 6a-14. The NAND gate 6a-15 provides a control signal e (address counter) according to the output Q1a of the JK flip-flop 6a-11, accumulation clock, and the output Q2b of the JK flip-flop 6a-14. The NAND gate 6a-16 provides a control signal f (accumulation counter) according to the output Q1b of the JK flip-flop 6a-11, accumulation clock, and the output Q2b of the JK flip-flop 6a-14. The NAND gate 6a-17 provides a control signal g (count up) according to the output Q1a of the JK flip-flop 6a-11, the output Q2a of the JK flip-flop 6a-14, and an inverted accumulation clock from an inverter 6a-18. An XOR (Exclusive-OR) gate 6a-21 provides a control signal h (memory I/O switching) according to outputs of the NAND gates 6a-19 and 6a-20. The NAND gate 6a-19 provides a NAND of the accumulation clock, the output Q1a of the JK flip-flop 6a-11, and the output Q2a of the JK flip-flop 6a-14. The NAND gate 6a-20 provides a NAND of the inverted accumulation clock, the output Q1a of the JK flip-flop 6a-11, and the output Q2b of the JK flip-flop 6a-14. The NAND gate 6a-22 provides a control signal 1 (memory write pulse) according to the output Q1a of the JK flip-flip 6a-11, accumulation clock, and the output Q2a of the JK flip-flop 6a-14.

Figure 10:
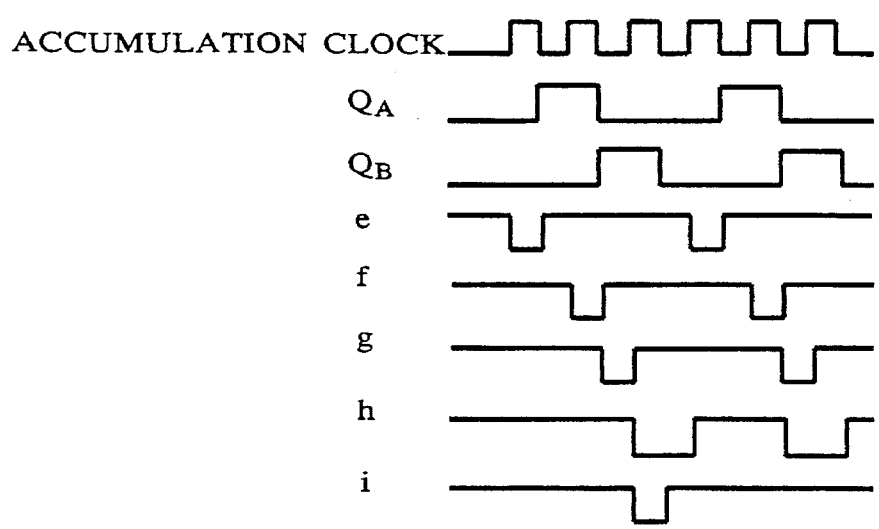
FIG. 10 is a timing chart showing signals provided by the control pulse generator of FIG. 9.

FIG. 10 is a timing chart showing the signals generated by the control pulse generator 6a–b. A reference mark QA represents the output Q1b of the JK flip-flop 6a-11 and QB the output Q2a of the JK flip-flop 6a-14. The control signal e becomes L with the accumulation clock of H, the signal QA of L, and the signal QB of L. The control signal f becomes L with the accumulation clock of H, the signal QA of H, and the signal QB of L. The control signal g becomes L with the accumulation clock of L, the signal QA of L, and the signal QB of H. The control signal h becomes L with the output signal QA of L and the signal QB of H. The control signal i becomes L with the accumulation signal of H, the signal QA of L, and the signal QB of H.

Figure 11:
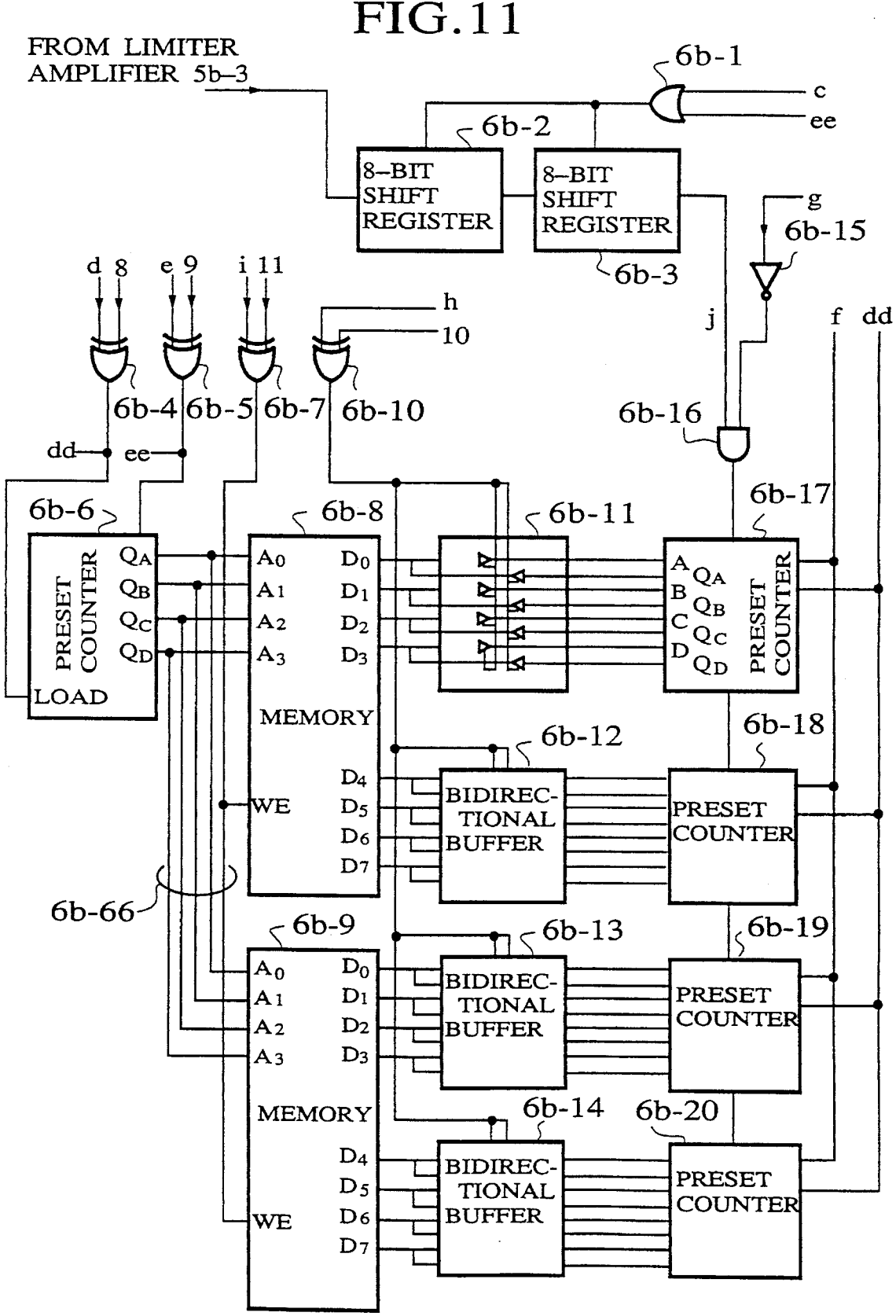
FIG. 11 is a circuit diagram showing a sampler accumulator of FIG. 2.

FIG. 11 is a circuit diagram showing the sampler accumulator 6b. The sampler accumulator 6b has 8-bit shift registers 6b-2 and 6b-3, an address setting preset counter 6b-6, memories 6b-8 and 6b-9, bidirectional buffers 6b-11 to 6b-14, and cumulative preset counters 6b-17 to 6b-20. The 8-bit shift registers 6b-2 and 6b-3 are cascaded, to sample an output of the limiter amplifier 5b-3 in response to an output of an OR gate 6b-1, which provides an OR of a sampling pulse c and a control signal ee. The shift registers 6b-2 and 6b-3 shift and store the sampled data. The preset counter 6b-6 sets addresses for the memories 6b-8 and 6b-9 according to an output of an XOR gate 6b-4 that receives the control signal d and a control signal 8 of the decision unit 7, and an output of an XOR gate 6b-5 that receives the control signal e and a control signal 9 of the decision unit 7. The memories 6b-8 and 6b-9 are switched to a read mode or to a write mode according to an output of an XOR gate 6b-7 that receives the control signal i and a control signal 11 of the decision unit 7. The bidirectional buffers 6b-11 to 6b-14 are initially under the read mode to provide data out of the memories 6b-8 and 6b-9 and are switched to another direction according to the control signal h and a control signal 10 of the decision unit 7. Under the read mode, the data of the memories 6b-8 and 6b-9 are loaded to the cumulative preset counters 6b-17 to 6b-20, and under the write mode, the data of the cumulative preset counters 6b-17 to 6b-20 are loaded to the memories 6b-8 and 6b-9. The cumulative preset counters 6b-17 to 6b-20 increment the loaded data according to the control signal f, a control signal dd, and an output of an AND gate 6b-16 that receives an output J of the 8-bit shift register 6b-3 and an inverted control signal g inverted by an inverter 6b-15.

Figure 12:
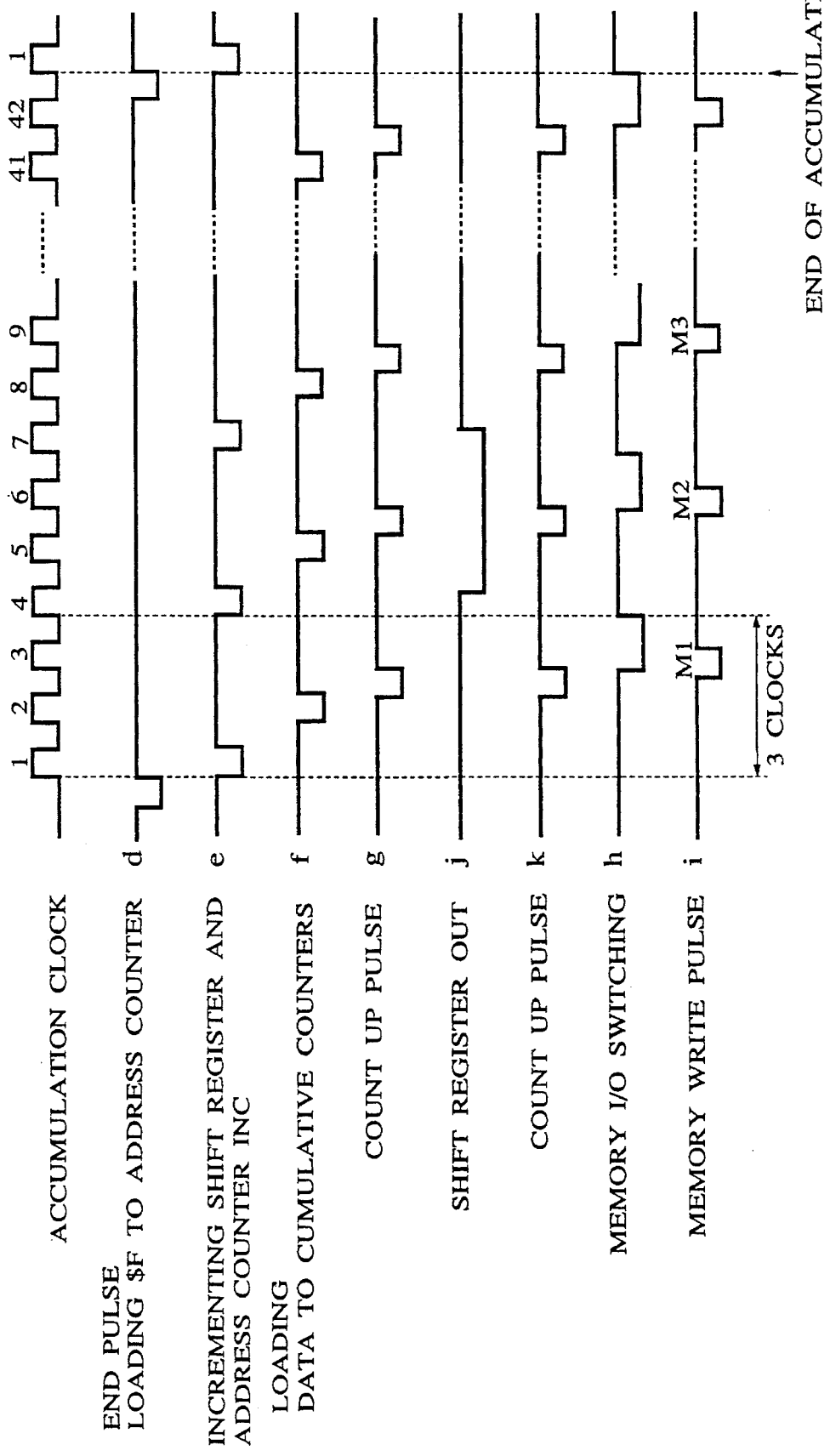
FIG. 12 is a timing chart showing an accumulation operation carried out by the circuit of FIG. 11.

FIG. 12 is a timing chart showing the accumulation operation. When the end pulse d is provided to indicate that the sampling pulse generator 8d has stopped the sampling pulses c, each bit of the preset counter 6b-6 is preset to H, and the cumulative preset counters 6b-17 to 6b-20 are cleared. In synchronization with the end pulse d, the accumulation clock generator 6a-a continuously provides, for example, 42 accumulation clock pulses. According to the control signal e provided by the control pulse generator 6a-b of FIG. 9, the preset counter 6b-6 is incremented, to send $0 to an address bus 6b-66 to select an address zero of the memories 6b-8 and 6b-9 that are in the read mode in advance. Then, memory outputs D0 to D7 provide memory contents at the address zero. At the same time, the control signal e is supplied to the clock terminals of the 8-bit shift register 6b-2 and cumulative preset counter 6b-18, so that the contents of the shift register 6b-2 are shifted by one bit and are provided to the AND gate 6b-16. According to the control signal f, the contents of the memories 6b-8 to 6b-9 are loaded to the cumulative preset counters 6b-17 to 6b-20. When the control signal j is H, the control signal g increments the cumulative preset counters 6b-17 to 8b-20, and if the signal j868 is L, the increment is not carried out because the control signal g is not provided to the other input of the AND gate 6b-16 that controls the input of the cumulative preset counter 6b-17. The control signal h switches the I/O direction of the bidirectional buffers 6b-11 to 6b-14, to transfer the contents of the cumulative preset counters 6b-17 to 6b-20 to the memories 6b-8 and 6b-9. When the control signal i is provided to the XOR gate 6b-7, the memories 6b-8 and 6b-9 are put in the write mode, and the contents of the cumulative preset counters 6b-17 to 6b-20 are written into the memories at the address zero. As explained above, a memory address corresponding to one bit of the 8-bit shift registers 6b-2 and 6b-3 is read, accumulated, and written with three accumulation clock pulses, so that a set of 14 bits is completely accumulated with 42 pulses. This operation is carried out 8192 times, to provide accumulated data. According to an output of the start pulse generator (the circuit for setting the number of accumulation cycles) 8b, the decision unit 7 determines that the 8192 accumulation cycles have been completed, controls the memories 6b-8 and 6b-9 of the sampler accumulator 6b and the bidirectional buffers 6b-11 to 6b-14, to read the accumulated data out of the memories 6b-8 and 6b-9, determines whether or not the data contain a reflected pulse from a target, and calculates a distance to the target.

Figure 13:
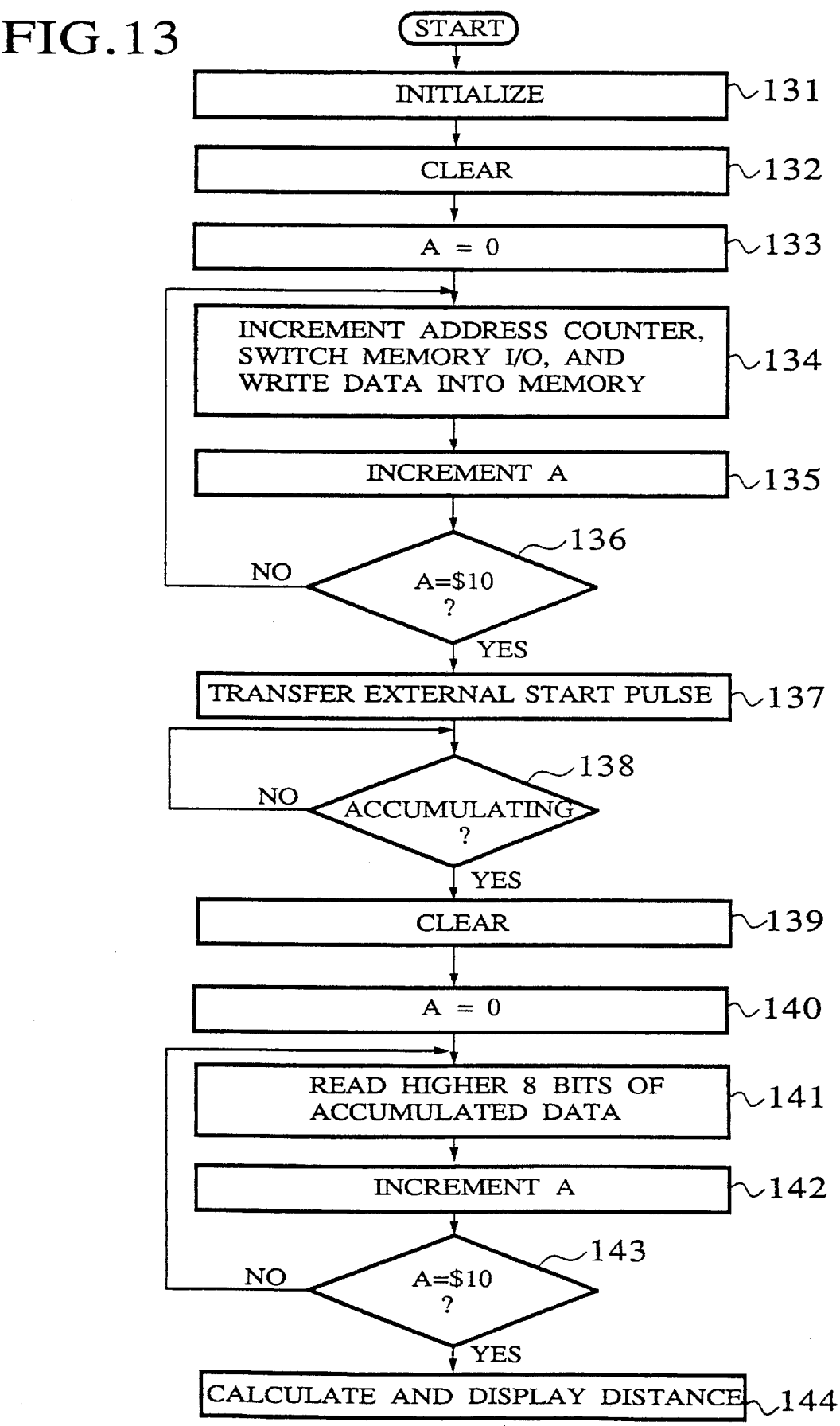
FIG. 13 is a flowchart showing steps carried out by a decision unit of FIG. 2.

FIG. 13 is a flowchart showing steps carried out by the decision unit 7. Step 131 initializes the decision S unit 7, to thereby initialize inputs 0 to 7 read by the cumulative storage unit 6 and inputs 8 to 12. At the same time, the control signals 8 to 11 to the XOR gates 6b-4, 6b-5, 6b-7, and 6b-10 are initialized. In step 132, the decision unit 7 clears the divider 8b-4 and counter 8b-6 of the start pulse generator 8b and the preset counter 6b-6 and cumulative preset counters 6b-17 to 6b-20 of the sampler accumulator 6b. Step 133 clears an internal counter of the controller 7. Thereafter, a cumulative memory clear routine is executed. Step 134 provides the control signals 9, 10, and 11 to let the XOR gates 6b-5, 6b-7, and 6b-10 provide output signals. Step 18S increments the address counter. Step 136 determines whether or not the incremented value is equal to $10. These steps increment the 8-bit preset counters 6b-2 and 6b-3 and change the I/0 direction of the bidirectional buffers 6b-11 to 6b-14 toward the memories 6b-8 and 6b-9, so that cleared outputs, for example, $00 of the cumulative preset counters 6b-17 to 6b-20 are written into the memories 6b-8 and 6b-9. These steps are repeated by incrementing the 8-bit shift registers 6b-2 and 6b-8, to clear the contents of the memories at addresses $00 to $10. If the step 136 determines that the incremented value is below $10, the step 134 is repeated, and if it is equal to $10, step 137 transfers an external start pulse to the start pulse generator 8b, to start a series of accumulation operations. Step 138 determines whether or not the start pulse generator 8b is providing an accumulation status signal of H. If the signal is not H, the step 138 is repeated. If it is H, it is determined that the accumulation process has been completed, and step 139 clears the preset counter 6b-6, and step 140 clears the internal counter of the decision unit 7. The cumulative memories are put in the read mode, and higher 8 bits are read out of the cumulative memories. Namely, step 141 provides the XOR gate 6b-5 with the control signal 9 to increment the preset counter 6b-6. Step 142 increments the counter. Step 143 determines whether or not the contents read into the memories 6b-8 and 6b-9 are equal to $10. If the incremented value is below $10, the step 141 is repeated, and if it is equal to $10, step S144 calculates distance to a target according to the accumulated data. The calculated distance, and if necessary, an alarm are displayed on a CRT.

Figure 14:
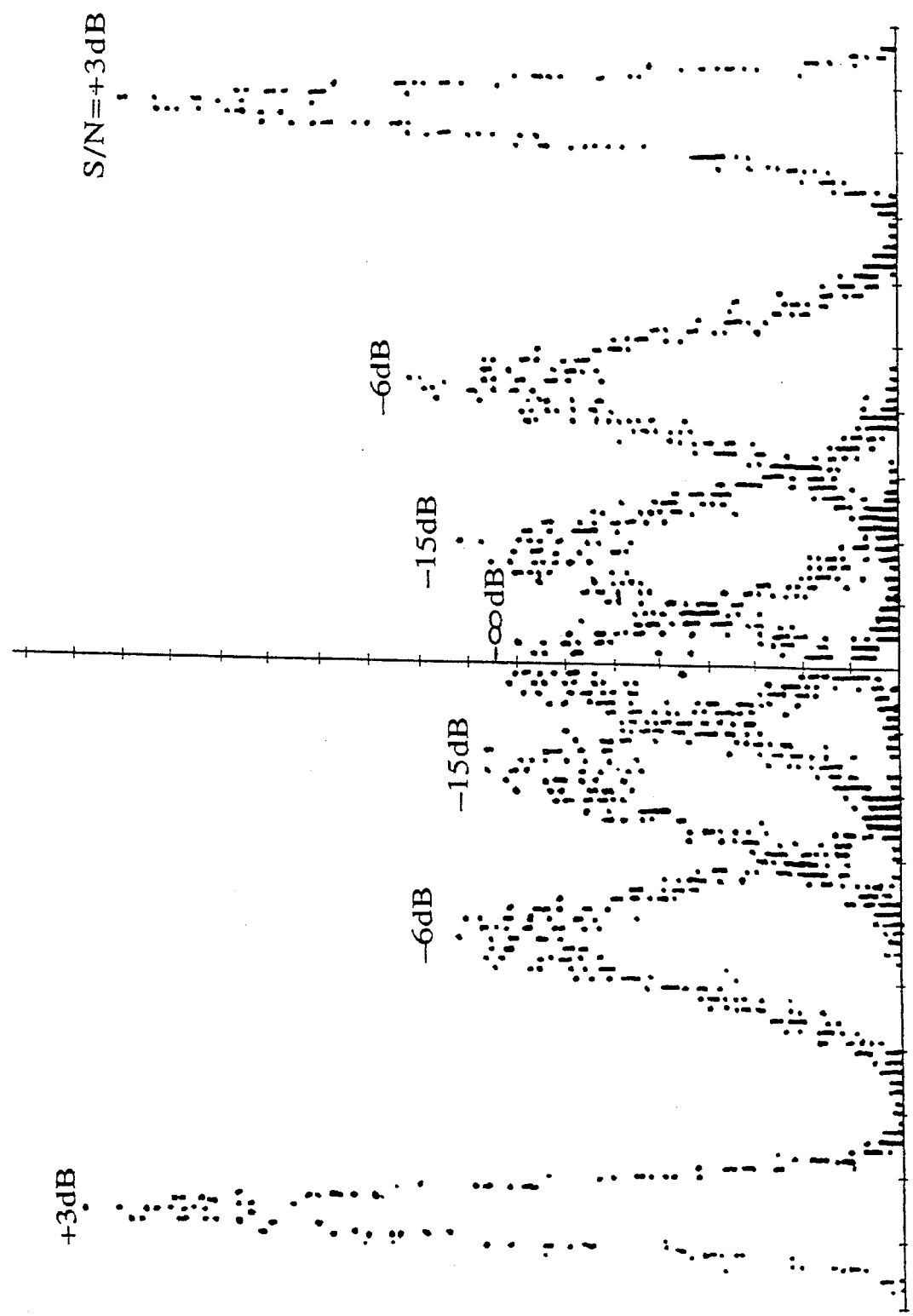
FIG. 14 is a probability distribution of an accumulated value k obtained by repeating an accumulation cycle involving Na=128 accumulation operations 2000 times.
Figure 15:
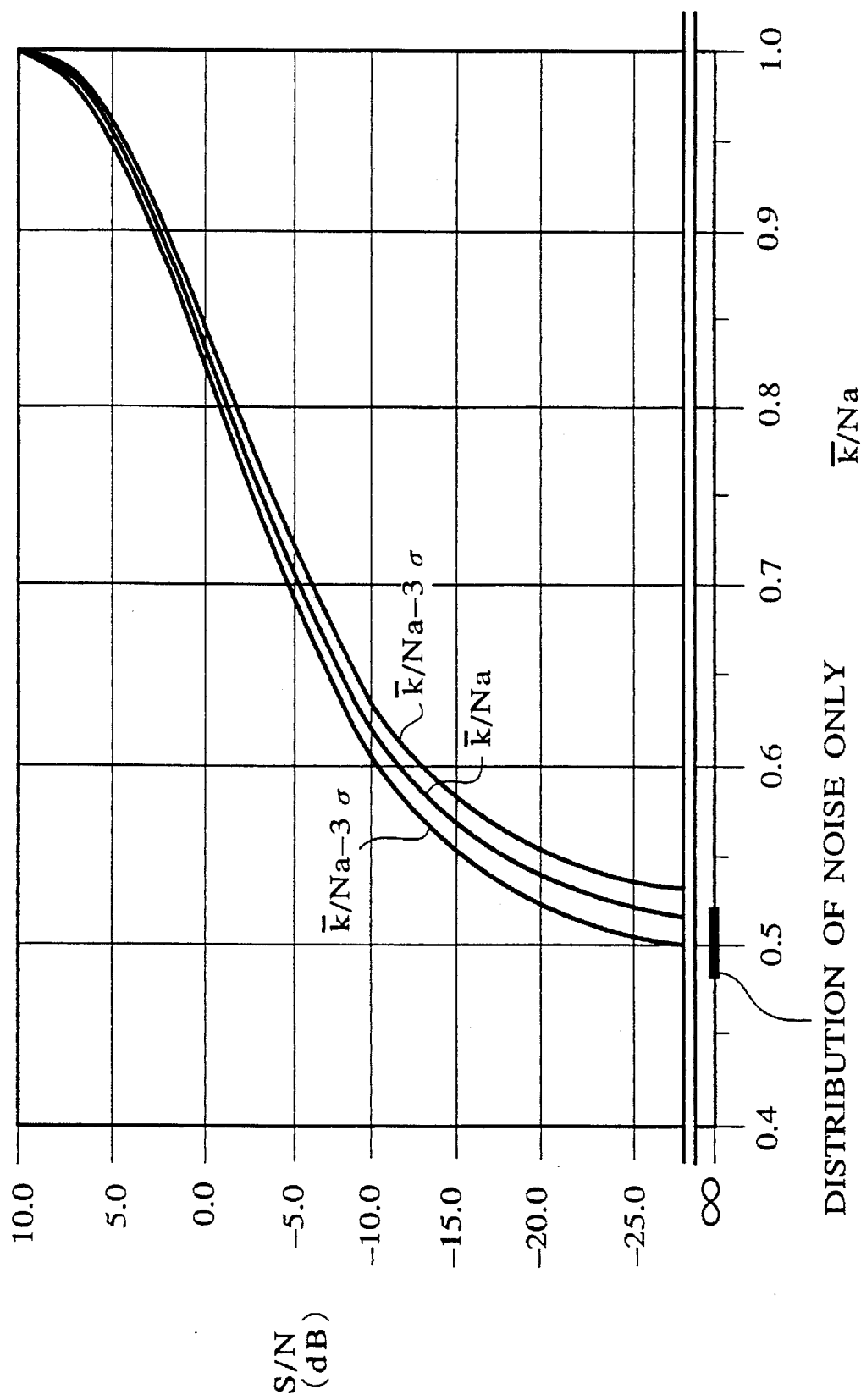
FIG. 15 shows a distribution of a normalized accumulated value k with Na=8192 in the range of an expected value of $\overline{k}/Na$ to $3\sigma$.
Figure 19:
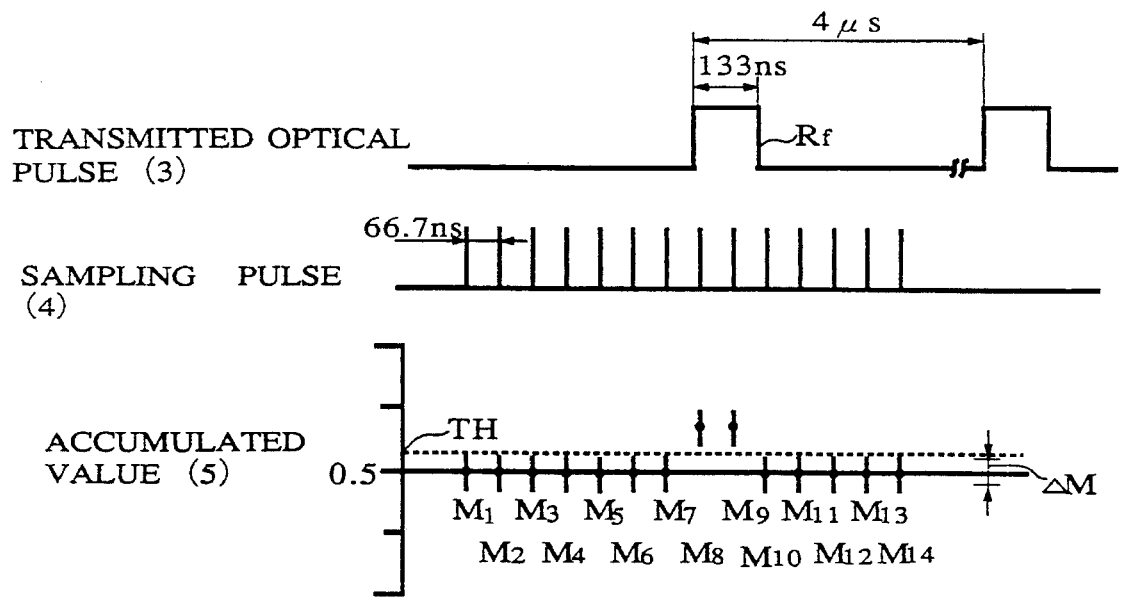
FIGS. 19, 20, and 21 explain an interference wave process according to the second embodiment.

FIG. 14 shows a probability distribution of an accumulated value k for S/N ratios of +3,−6, −15, and −∞ (noise only) dB. For each of the S/N ratios, the number $N_a$ of accumulation operations is 128, which is repeated 2000 times. The right half of the figure for $k/N_a$ of 0.5 to 1.0 corresponds to a positive signal phase, and the left half thereof for $k/N_a$ of 0.0 to 0.5 corresponds to a negative signal phase. The measurement result for S/N=−∞ dB of FIG. 14 agrees with a result of calculation ($N_a$=128) of FIG. 4. The conventional radar apparatus needs an S/N ratio of 15.6 dB for discriminating a signal from noise at an accuracy of 99.865%. On the other hand, this embodiment greatly improves the S/N ratio by accumulating sampled phases 128 times, so that a signal of about −6 dB is discriminable. A duration for discriminating the signal is four microseconds ×128=512 microseconds with a pulse repetition period of four microseconds as shown in FIG. 19. This duration is very short. FIG. 15 shows a result of calculation of a normalized k in the range of an expected value $\bar{k}/Na$ and $3\sigma$ with $N_a$=8192. As the $N_a$ increases, the width of a probability distribution narrows in proportion to $(N_a)^{1/2}$. A necessary accumulation period is four microseconds ×8192=32 milliseconds, which is sufficiently short as a car distance measuring period in a car radar apparatus. In FIG. 15, it has been experimentally verified similar to the case of FIG. 14 that a signal of less than −20 dB is discriminable from noise. The embodiment simply samples the phases of a received signal and carries out accumulation operations, to greatly improve the S/N ratio. The circuits for carrying out the accumulation operations are standard logic circuits, so that the sampling, accumulation, and storage steps are carried out at high speed as and when required. This results in accumulating many data in a given period, to improve the S/N ratio. The logic circuits may be an array of gates formed on an IC chip to realize high speed and low noise operation. Similarly, the photosensor which may be a PIN photodiode or a phototransistor, the limiter amplifier, and the zero-cross comparator may be fabricated on a single chip or on a hybrid IC, to provide a low-noise, compact, light-weighted, reliable radar apparatus.

This embodiment considers only the positive and negative phases of a reflected signal, to quickly convert the signal into a binary signal, sample the phases thereof, and store them. Accordingly, the embodiment is capable of carrying out many accumulation operations to speedily detect a weak reflected signal based on a low-power transmission signal. The embodiment realizes high sensitivity in detecting a reflected signal. The radar apparatus according to this embodiment is simple and compact and secures a required measuring range. The embodiment employs a low-power light emitter, a radio transmitter, or an ultrasonic wave transmitter, as the pulsesignal transmitter. Such transmitter is reliable, has a long service life, and is safe to the human body. This embodiment employs memories to carry out the accumulation operations. It is possible to arrange a counter for counting each bit of the sampling shift register, so that the counter is incremented according to whether or not the corresponding bit is H or L after each sampling operation. The embodiment adds up one in response to a sampling result of H and adds nothing in response to a sampling result of L. Instead, one may be added in response to a sampling result of H, and one may be subtracted in response to a sampling result of L. In this case, a result of the addition and subtraction, i.e., a probability of occurrence of H and L is each 0.5 if there is only noise, to provide an average of zero. If the S/N ratio is sufficiently high, an average will be one.

Figure 16:
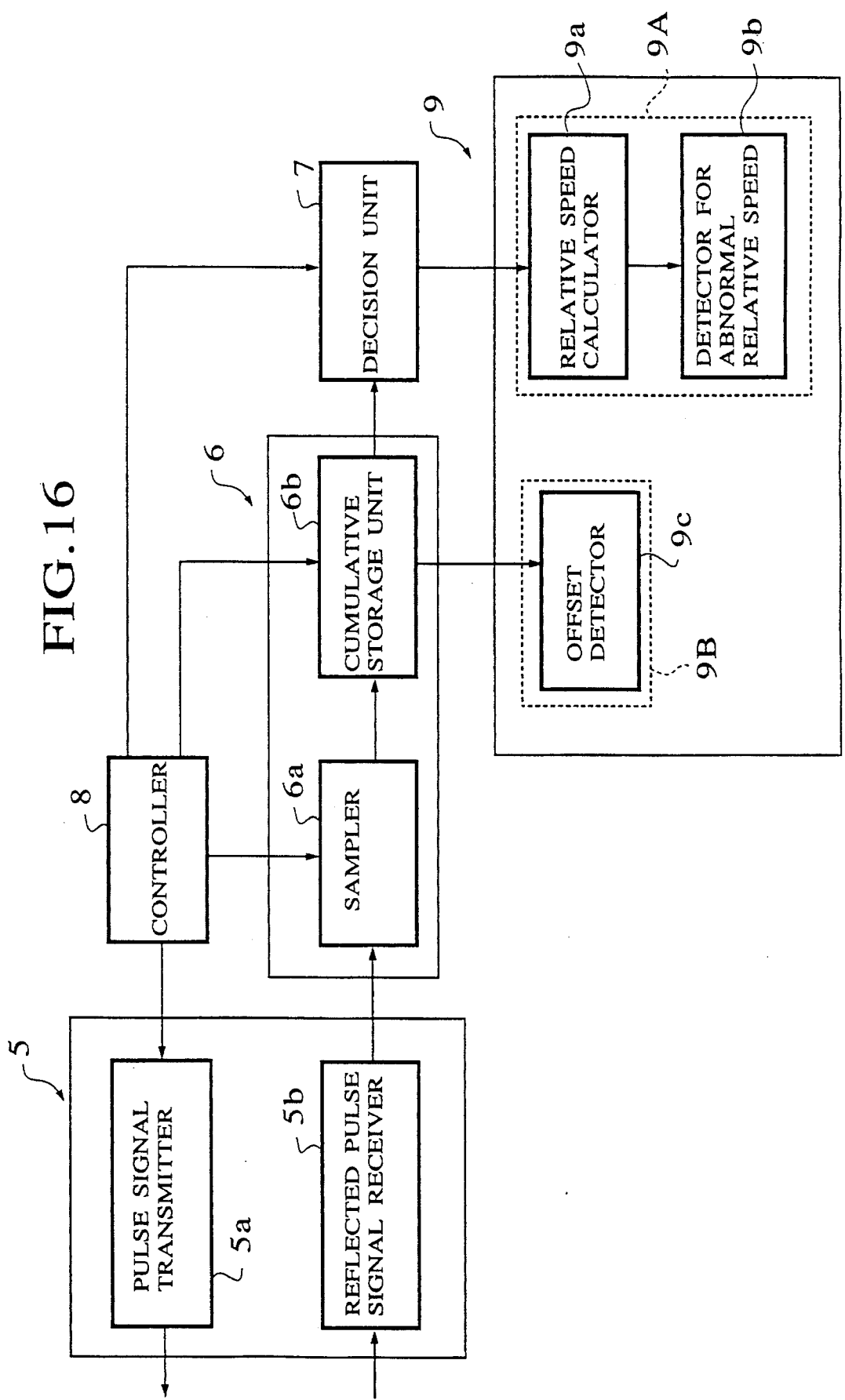
FIG. 16 is a block diagram showing a second embodiment of the present invention.
Figure 17:
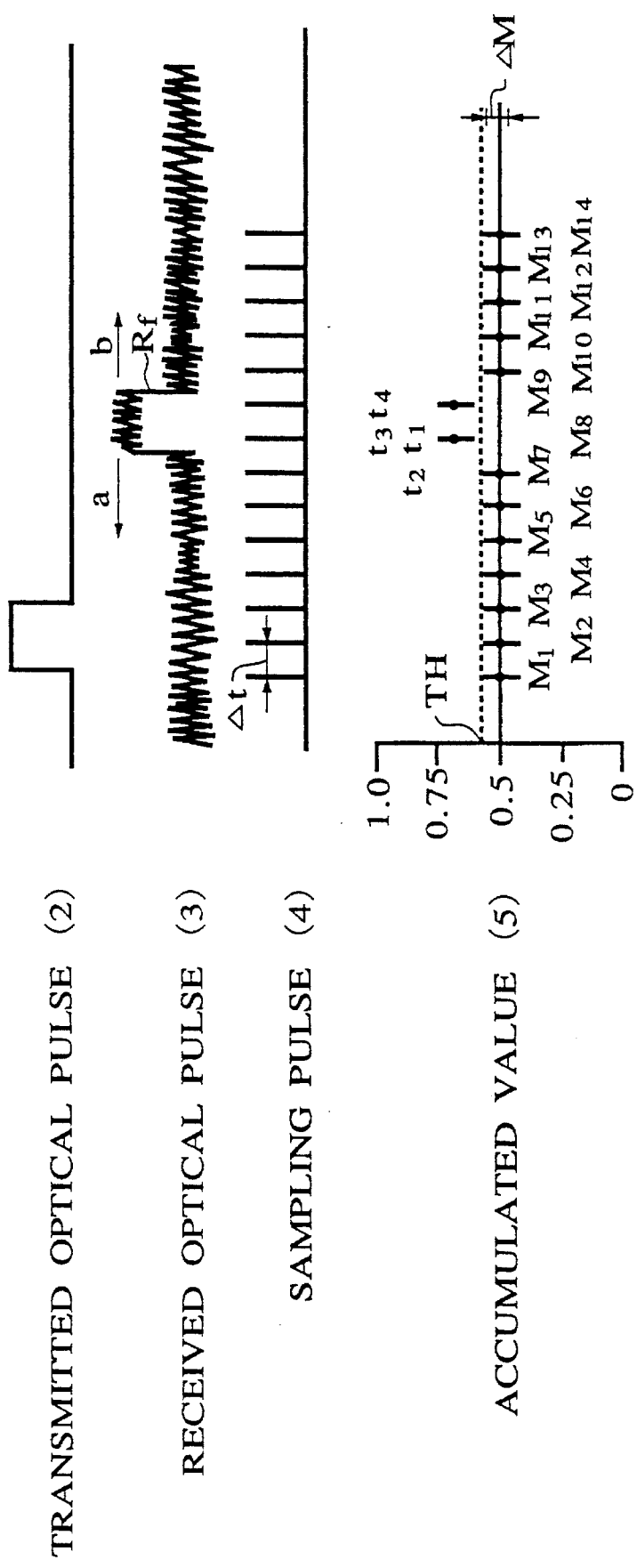
FIG. 17 explains the detection of a reflected pulse and the calculation of a relative speed according to the second embodiment.

The second embodiment of the present invention will be explained with reference to the drawings. FIG. 16 is a block diagram generally showing the second embodiment. The same parts as those of the first embodiment such as the radar head, operational storage unit, decision unit, and controller are represented with like reference marks, and their explanations will not be repeated. An interference detector 9 has a first interference detector 9A and a second interference detector 9B. The first detector 9A has a relative speed calculator 9a for calculating the relative speed of a target according to an elapsed time in detecting a reflected signal and an abnormal relative speed detector 9b for detecting an abnormality in a value calculated by the relative speed calculator 9a. The second detector 9B has an offset detector 9c for detecting an offset in accumulated data provided by an operational storage unit 6, to determine whether or not there is an interference signal. FIG. 17 explains a reflected wave detecting operation and a relative speed calculating operation carried out by the relative speed calculator 9a. An optical pulsesignal (2) is transmitted and reflected by an external target. The reflected pulse is detected as an optical pulsesignal (3) Involving noise. The signal (3) is behind the transmission signal (2) by a predetermined period. Transmission of the signal (2) and detection of the signal (3) are carried out in synchronization with sampling pulses. Similar to the first embodiment, the sampling pulses (4) are generated at intervals of 66.7 nanoseconds corresponding to a distance of 10 meters. This example employs 14 sampling pulses to measure 130 meters. It is possible to employ other pulse intervals to measure other distances. Accumulated values (5) are stored in memories M1 to M14 corresponding to the sampling pulses, respectively. A distribution of the accumulated values has a width of ΔM corresponding to the number of accumulation operations. If an accumulated value (5) exceeds a threshold TH, a reflected pulse Rf is detected, and if it is below the threshold TH, it is determined to be noise. Instead of the optical pulsesignal (2), an ultrasonic pulsesignal may be employed. In this case, the interval of pulses is determined according to a sonic velocity. The optical pulsesignal is preferable because it allows smaller pulse intervals.

In FIG. 17, the signal (3) has pulses in the memories M8 and M9. The pulse in the proximal memory M8 is detected at time t1. When the target is approaching toward the radar apparatus, i.e., when a distance to the target is shortening, the received pulse (3) moves in the direction of an arrow mark a. The pulse in the memory M7 is detected at time t2. A difference between t1 and t2 corresponds to a distance narrowed by the target and a difference between the pulses detected in the M8 and M7. Namely, the difference corresponds to a period in which the sampling point of the reflected pulse Rf shifts one sampling interval $\Delta t$, which corresponds to a distance of 10 meters. Accordingly, a relative approaching speed is obtained as $10/(t2-t1)$ m/s. When the target is separating from the radar apparatus, the reflected pulse Rf moves in the direction of an arrow mark b. At time t3, the accumulated value in the memory M8 becomes below the threshold TH, and the reflected pulse Rf disappears. At time t4, the accumulated value in the memory M9 drops below the threshold TH, and the reflected pulse Rf disappears. A difference between t4 and t3 corresponds to a distance to the target and a period in which the sampling point of the reflected pulse Rf moves the sampling interval, i.e., 10 meters. Accordingly, a relative separating speed is calculated as $10/(t4-t3)$ m/s. When the radar apparatus is approaching to or separating from the target at a speed of, for example, 100 Km/h, its relative speed is about 28 m/s. In this case, a time to move 10 meters is $10/28=0.36$ seconds. A period for detecting a reflected pulse is 32 milliseconds with 8192 accumulation operations. This period is less than $\frac{1}{10}$ of the moving speed. Accordingly, an error in calculating a relative speed due to the detection period is about ±1 m/s. If the relative speed is slower than 28 m/s, the time to move 10 meters becomes longer than 0.36 seconds, to further reduce the error.

Figure 18:
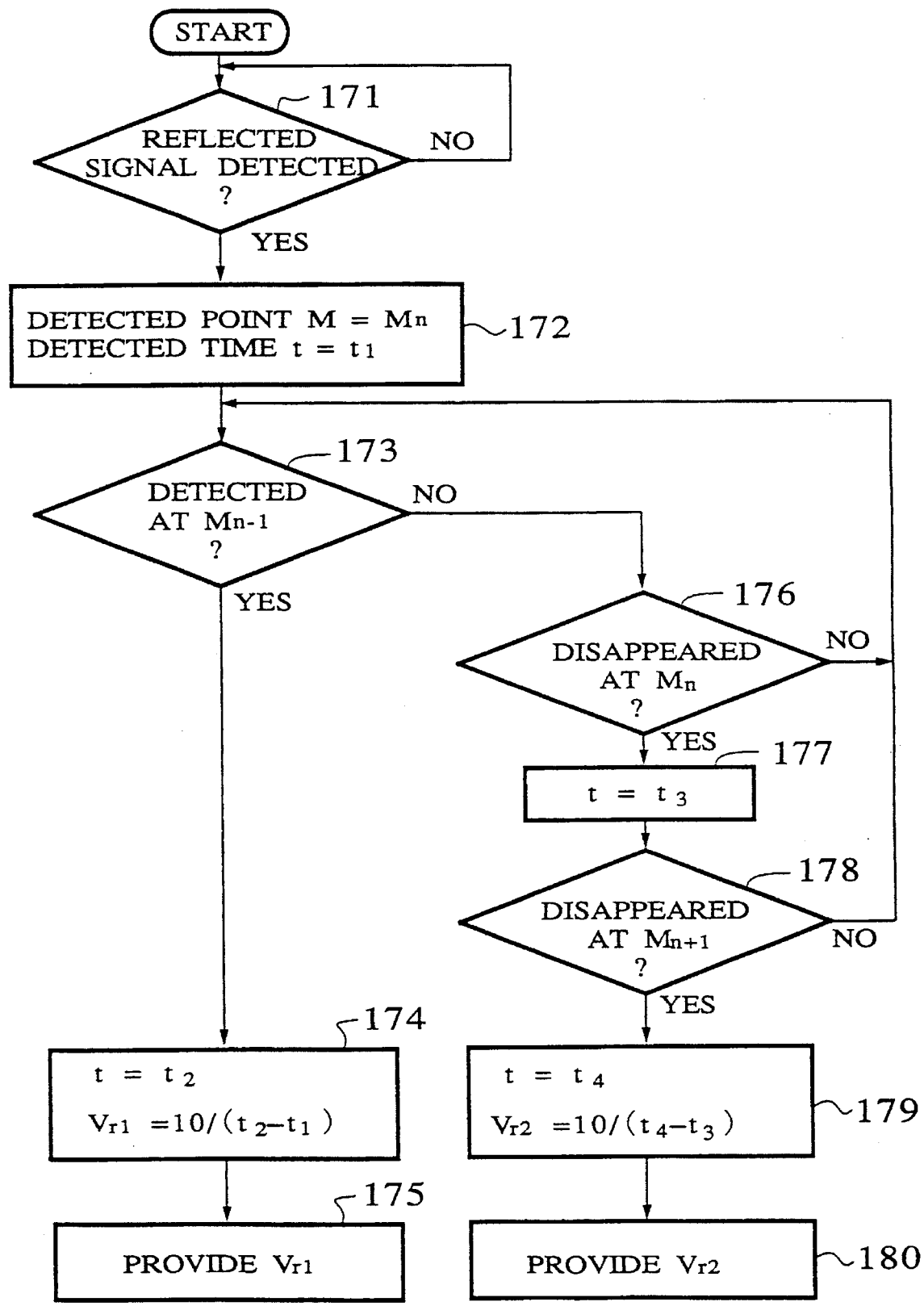
FIG. 18 is a flowchart showing steps of calculating a relative speed according to the second embodiment.

FIG. 18 is a flowchart showing steps of calculating a relative speed. Step 171 checks accumulated values in the memories M1 to Mn from the nearest one thereof, to see whether or not there is a reflected pulse therein. If YES, step 172 sets the memory in question as Mn and stores detection time t1. Step 173 determines whether or not a memory $Mn-_1$ in front of the memory Mn includes a reflected pulse. If YES, step 174 stores detection time t2 and divides 10 meters corresponding to the sampling interval by t2-t1 as follows:

$$Vr1=10/ (t2-t1) \quad (10)$$

Step 175 provides the Vr1.

If the step 173 determines that the memory $Mn-_1$ contains no reflected pulse, step 176 determines whether or not the reflected pulsestill exists in the memory Mn. If YES, the step 173 is repeated, and if NO, step 177 stores time t3 at which the reflected pulse has disappeared from the memory Mn. Step 178 determines whether or not the reflected pulse has disappeared from the memory $Mn+_1$. If the reflected pulsestill exists in the memory $Mn+_1$, the step 173 is repeated, and if not, step 179 stores time t4 at which the reflected pulse has disappeared from the memory $Mn+_1$ and divides 10 meters corresponding to the sampling interval by t4-t3 as follows:

$$Vr2=10/ (t4-t3) \quad (11)$$

Step 180 provides the Vr2.

In this way, the detection and disappearance of a reflected pulse are observed at the nearest sampling point. This may require the optical transmission pulse to sharply rise. It is not required, however, to shorten the width of the pulse. On the contrary, it is preferable to extend the pulse width longer than the sampling pulse interval of 66.7 nanoseconds. The probability of noise of exceeding the threshold TH is not always zero, and if it exceeds the threshold TH, it will cause erroneous detection. To prevent this, the width of the optical transmission pulse is extended so that a reflected pulse is simultaneously detected at two or more sampling points, which may be consecutive or not. This will reduce the probability of erroneous detecting noise as a reflected pulse. An embodiment employing an optical transmission pulse whose width covers two sampling points will be explained later with reference to the third embodiment of the present invention. Extending the width of a transmission pulse is equivalent to increasing the number of accumulation operations. Employing two accumulated values is equal to obtaining a margin of 3 dB in the S/N ratio if the threshold is unchanged. Namely, the technique of employing two accumulated values allows to lower the threshold, while securing the same erroneous detection probability achieved by detecting a reflected pulse at a single sampling point. The second embodiment thus improves detection sensitivity by 3 dB. This embodiment allows the optical transmission pulse to be wide and improves the S/N ratio. The second embodiment correctly calculates an approaching or separating speed even with coarse sampling intervals. The second embodiment relaxes pulse transmission conditions, to thereby make the transmitter and controller simplified, small-sized, and light-weighted.

Figure 20:
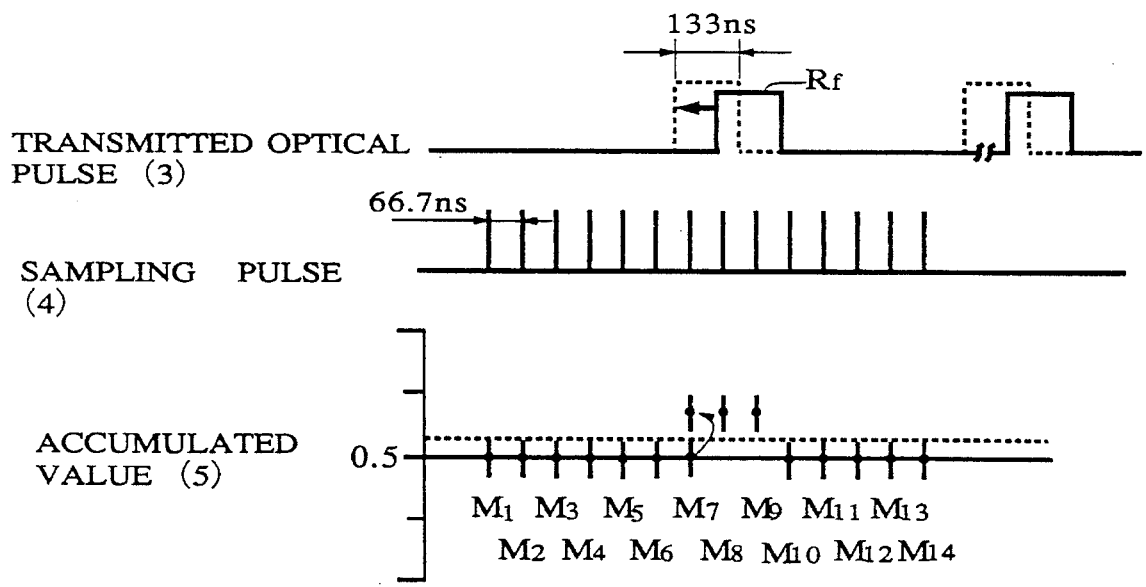
Figure 21:
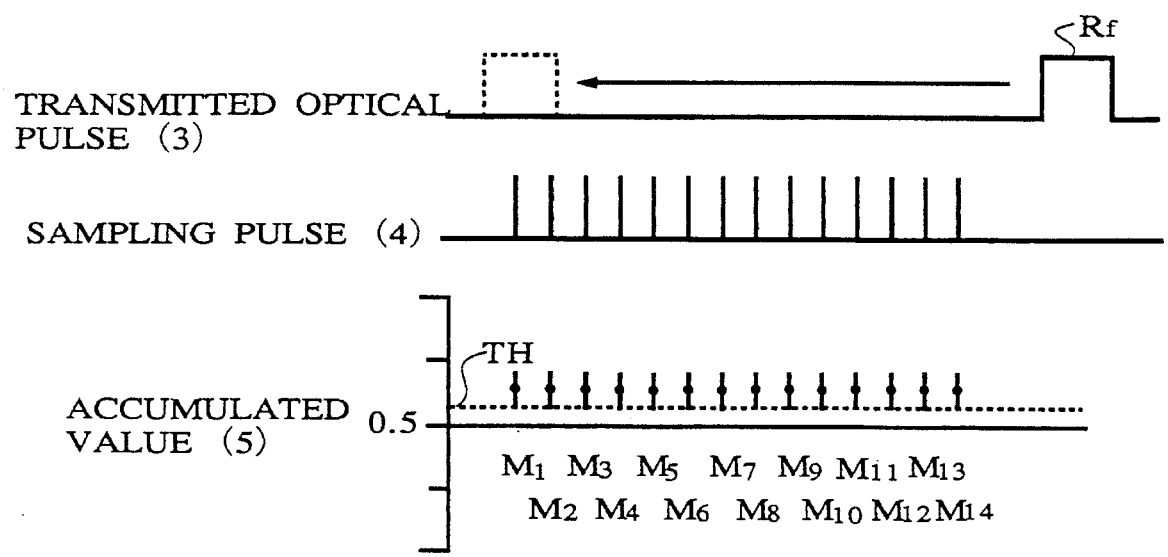

FIGS. 19 to 21 explains a technique of processing an interference signal caused by a pulsesignal transmitted from a target. If a car equipped with a radar apparatus is stopped and if there is an opposite car stopped equipped with a like radar apparatus, the car will receive a pulse signal from the opposite car. In this case, the radar apparatus of the car will detect the opposite car, if the radar apparatuses of both the cars employ a reference clock signal of the same frequency fc and if the pulsesignal from the opposite car reaches the car in question within a period set for distance measurement. The reference clock signal is usually generated by a crystal oscillator having a frequency error of $\Delta f$. This frequency error causes a synchronization error in a pulsesignal, thereby influencing measurement and accumulation operations. When the ratio ($\Delta f/fc$) of the frequency error $\Delta f$ to the reference frequency fc is smaller than $2\times10^{-7}$ (FIG. 19), the frequency error will provide a relative speed of $2\times10^{-7}3\times10^8$ (where $3\times10^8$ is the velocity of light). Accordingly, it is observed that the opposite car is moving at a speed of 60 m/s (216 Km/h). In this case, it is impossible to determine whether it is an error due to an interference with the pulsesignal transmitted from the opposite car or the opposite car is actually moving at the observed speed. If this radar apparatus serves as a collision alarm device, it may provide a wrong alarm. When the ratio $\Delta f/fc$ further increases within an accumulation period of 32 milliseconds, to cover twice (133 nanoseconds) a sampling interval, i.e., $133\times10^{-9}/32\times10^{-3}=4.16\times10^{-6}$ due to the interference with the pulsesignal from the opposite car, the situation worsens.

If the ratio $\Delta f/fc$ is greater than $2\times10^{-7}$ and smaller than $4.16\times10^{-6}$, it is observed that the opposite car is moving at a relative speed of 60 m/s (216 Km/h). This speed is abnormal as the speed of a standard car, so that it is determined to be erroneous detection due to the interference.

If the ratio Δf/fc is in this range, it is possible to identify the erroneous detection caused by the interference by monitoring a relative speed. Namely, the abnormal relative speed detector 9b provides an abnormality output if the relative speed is greater than 60 m/s. FIG. 20 explains the case of the ratio Δf/fc being above $4.16\times10^{-6}$ and below the ratio of sampling interval to accumulation period (in the above case, four microseconds to 32 milliseconds=$1.25\times10^{-4}$ or below). As explained above, a sampling point moves for $4.16\times10^{-6}$0.032=133 nanoseconds or more within the accumulation period of 32 milliseconds due to the interference if the frequency error ratio exceeds $4.16\times10^{-6}$. Accordingly, if the appearance and disappearance of a reflected pulse are observed at the nearest sampling point as in the case of FIG. 18, it will be impossible to calculate the relative speed. Accordingly, it is determined that erroneous detection has occurred due to the interference. In this way, the alarming logic according to the second embodiment employs two parameters, i.e., a distance and a relative speed, to surely identify erroneous detection due to an interference and issue no wrong alarm. In this range of frequency error ratio, a received pulse is observed over three sampling points or more which are at time intervals of 66.7 nanoseconds. When the frequency error ratio further increases, the interference gradually covers all sampling points. If the frequency error ratio Δf/fc is equal to the ratio of sampling interval to accumulation period, i.e., $1.25\times10^{-4}$ and is in synchronization with the interference at the start of accumulation operations, the sampling point where a reflected pulse is detected moves for $1.25\times10^{-4}\times0.032=4$ microseconds, which is equal to the pulsesignal transmission interval, after 32 milliseconds in which 8192 accumulation operations are completed. Accordingly, erroneous detection due to the interference is always observed at every sampling point at a time ratio of 133 nanoseconds/4 microseconds =3.33% with respect to a pulse width of 133 nanoseconds. If the S/N ratio of the interference is sufficiently high, an offset of 8192× 0.0333=273 due to the interference occurs on the 8192 accumulation operations. The threshold TH for detecting a pulse in the 8192 accumulation operations is about 0.5 (an average of noise) plus 0.02 in terms of a normalized accumulated value. Accordingly, the offset is greater than the threshold, i.e., 8192×0.02=163. If it is set to cause a uniform offset at every sampling point when a target causes an interference, it is possible to identify the interference by monitoring accumulated data to see whether or not the uniform offset has occurred. When the frequency error ratio Δf /fc is below $1.25\times10^{-4}$, the offset will occur irregularly. If there are a plurality of targets with the frequency error ratio Δf /fc of below $1.25\times10^{-4}$, a pulse will be observed over more than three sampling points, so that it is impossible to correctly identify the interference from the offset on accumulated values. If the frequency error ratio Δf /fc is set to be greater than the ratio of sampling interval to accumulation period ($1.25\times10^{-4}$) (FIG. 21), the uniform offset will be always observed on accumulated data. In this case, the interference is identifiable according to an output of the offset detector 9c. At the same time, the threshold TH is set according to a proper offset value, and if an actual reflected pulse from a target exceeds the threshold TH, the pulse will be detected. Accordingly, a distance to the target is correctly measurable even with the interference with the target. Alternatively, the offset due to the interference may be removed by a proper removing device, to detect a true reflected pulse.

As explained above, the interference signal is detectable and removable by monitoring a relative speed and an offset in accumulated data and by removing the offset. To detect the interference with a target, the frequency error ratio Δf/fc must be greater than $2\times10^{-7}$ so that the abnormal relative speed detector 9b may detect the interference. This prevents the collision alarm device from providing a wrong alarm. The offset is detectable dependent on the frequency error ratio. To surely detect the interference, the frequency error ratio Δf/fc must be greater than the ratio of sampling interval to accumulation period ($1.25\times10^{-4}$). This results in dispersing the interference over all sampling points, so that the interference is removed and a reflected pulse from a target is detected. Namely, a reflected pulse greater than the offset is detectable. When the offset is 0.0333, the threshold TH is calculated as 0.5533 by adding an average of 0.5 for noise plus a threshold of 0.02 for non-interference signal to the threshold TH. This enables the radar apparatus to detect a signal up to −17 dB. This corresponds to a sensitivity loss of 3 dB compared with a signal detection level of −20 dB with no interference. Due to the sensitivity loss of 3 dB, a measuring distance will be shortened 0.91 times, or 0.84 times if the sensitivity loss is 6 dB. This results, however, in minimizing or removing interference signals. As explained above, the frequency error ratio Δf/fc of a reference clock signal is set to disperse an interference signal from a target over all sampling points, thereby removing the interference signal.

This embodiment detects an interference signal from a target according to a relative speed and data accumulated in memories and removes the interference signal. The embodiment properly selects the frequency of the reference clock signal and the frequency error ratio Δf/fc thereof, to minimize the influence of the interference signal. The embodiment thus minimizes or removes erroneous detection due to the interference signal. The embodiment realizes a reliable car distance alarm device and a collision alarm device, to secure safety driving. A 15-MHz reference clock frequency fc has a period of 66.7 nanoseconds that correspond to a distance of 10 meters in the radar apparatus. If a measurement error of 1%, i.e., one meter per 100 meters is allowable, the frequency error ratio Δf/fc must be $10^{-2}$ or below, i.e., the frequency must be in the range of 14.85 to 15.15 MHz. To secure the frequency error ratio Δf/fc equal to the ratio of sampling interval to accumulation period, i.e., $1.25\times10^{-4}$ or over, the frequency must be distributed such that a space of 300 KHz between 14.85 MHz and 15.15 MHz is filled with 160 pulses at intervals of $15\times10^6\times1.25\times10^{-4}=1875$ Hz. The reference clock frequency fc is not necessarily of 15 MHz. Many frequency distributions are possible. When the frequency error ratio Δf/fc exceeds the ratio of sampling interval to accumulation period, an interference signal from an opposite car is detectable as a uniform offset value with no regard to an abnormal relative speed. Accordingly, if a relative speed of 216 Km/h or higher actually occurs, an abnormal speed alarm will be issued to warn that the cars are approaching each other at a speed of 120 Km/h or over.

The third embodiment of the present invention will be explained. The third embodiment is a modification of the second embodiment. FIG. 22 is a block diagram showing the third embodiment. The same parts as those of the first embodiment such as the radar head and cumulative storage unit are represented with like reference marks, and their explanations will not be repeated. A decision unit 77 is basically the same as the decision unit 7 of the first embodiment. The decision unit 77 has a function of determining whether or not the detection point of a reflected signal from a target has moved, i.e., whether or not the relative speed of the target has changed. The decision unit 77 controls a relative speed detection counter 12, an error detection preventive unit 13, and a relative speed calculator 14. A controller 88 is basically the same as the controller 8 of the first embodiment and provides a trigger pulse to a driver 5a-1 of a pulsesignal transmitter 5a. According to this embodiment, the transmitter 5a transmits an optical pulsesignal whose width covers at least two consecutive sampling points. The counter 12 counts the number of trigger pulses provided by a trigger pulse generator 8c and informs the decision unit 77 or relative speed calculator 14 of the count. The counter 12 is cleared after the relative speed calculator 14 calculates the relative speed of the target. The error detection preventive unit 13 is set by the controller 88 and confirms whether or not a reflected pulse is detected over at least two consecutive sampling points in a sampling period. When the reflected pulse is not detected over at least two sampling points, it is determined to be noise. The relative speed calculator 14 multiplies the number of the trigger pulses by the interval of the trigger pulses, i.e., four microseconds and divides a distance corresponding to one sampling interval (10 meters in this embodiment similar to the first embodiment) by the result of the multiplication, to provide a relative speed, i.e., the approaching or separating speed of the target. According to the third embodiment, when an optical pulse is transmitted, a reflected optical pulse is received after a given time needed for the transmitted pulse being reflected by the target and reaching the radar apparatus. The transmission and reception of the pulse are carried out in response to the sampling pulses. The sampling pulses are generated at intervals of, for example, 66.7 nanoseconds corresponding to a distance of 10 meters. This embodiment employs 14 sampling pulses to measure 130 meters. Sampled data are accumulated in memories M1 to M14 corresponding to the sampling pulses, respectively. The accumulated data show a distribution width of $\Delta M$ depending on the number of accumulation operations. When accumulated values at optional two consecutive sampling points exceed each a threshold TH, a reflected pulse is detected. If the accumulated value is below the threshold TH, it is determined to be noise.

A method of calculating a relative speed according to the third embodiment will be explained. When a reflected pulse from a target is detected, the sampling point of the reflected pulse is set as a reference, and a period in which the sampling point moves in a forward direction (the direction of the arrow mark a in the first embodiment of FIG. 17) or in a backward direction (in the direction of the arrow mark b in FIG. 17) by one position is counted. According to the counted period, the relative speed of the target is calculated. If the target is approaching toward the radar apparatus, the reflected pulse is detected in a shorter time. Accordingly, the sampling point of the reflected pulse moves forward by one. During this period, the number of trigger pulses T is counted, and the count k is multiplied by the interval (four microseconds) of the trigger pulses T. The multiplication result corresponds to a period in which the received pulse moves for the sampling interval (10 meters). Accordingly, the relative approaching speed is obtained as 10/(k·T). When the target is separating from the radar apparatus, the period between the transmission and reception of a pulse becomes longer, so that the sampling point of the reflected pulse moves backward by one. The number of trigger pulses T is counted, and the count k of the trigger pulses is multiplied by the interval of the trigger pulses T, i.e., four microseconds. A result of the multiplication corresponds to a period in which the received pulse moves for the sampling interval (10 meters). Accordingly, the separating speed is calculated as 10/(k·T).

Figure 28:
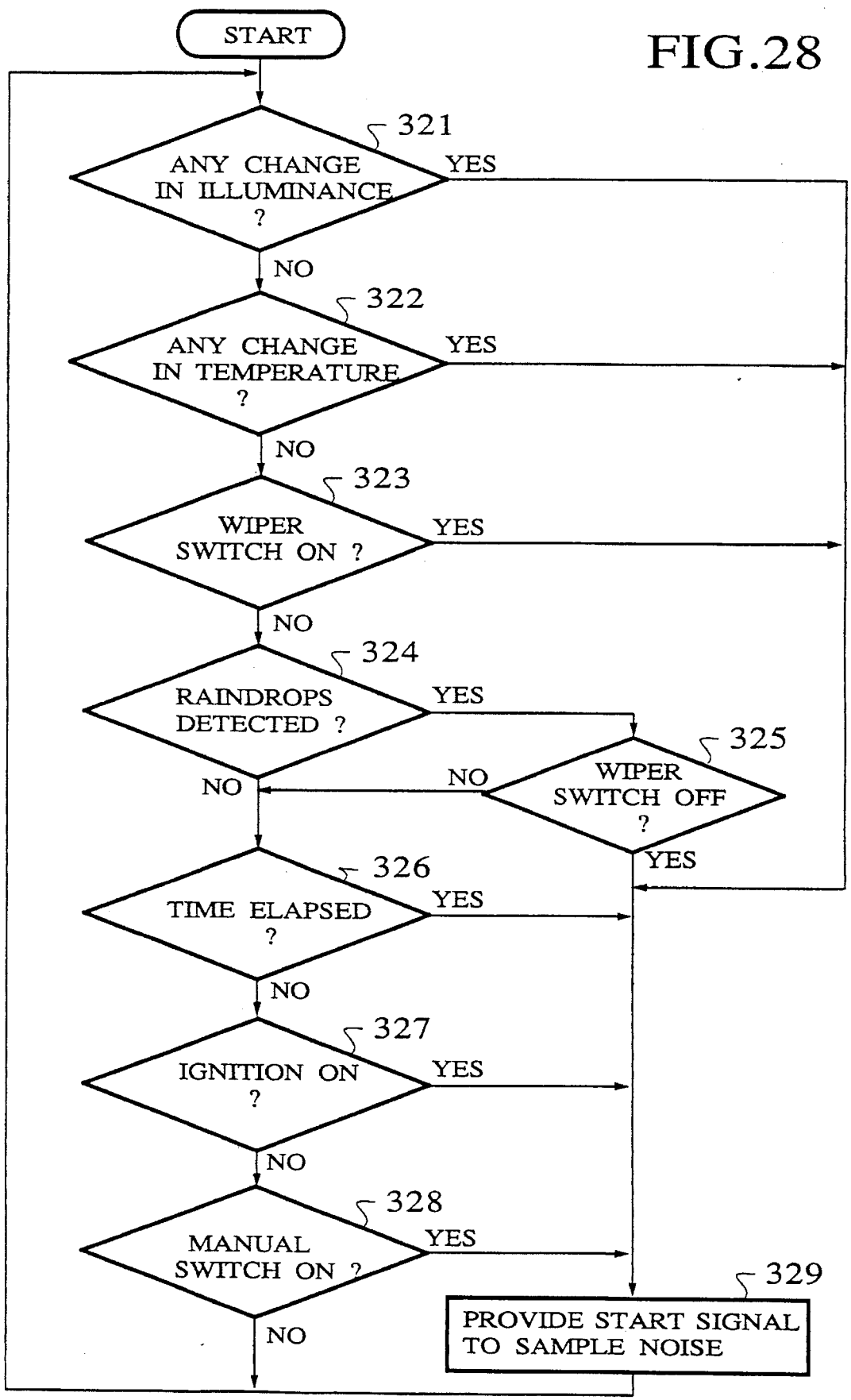
FIG. 28 is a flowchart showing steps carried out by the fifth embodiment.

FIG. 28 is a flowchart showing steps carried out by the third embodiment of the present invention. Step 231 determines whether or not a trigger pulse T has been provided. If YES, step 232 increments the counter 12, and step 233 determines whether or not a first part of a reflected pulse has been detected. According to this embodiment, the width of the pulse from the transmitter 5a extends over two sampling points. Accordingly, the first part of the reflected pulse is firstly detected in response to a sampling pulse. If the first part has been detected, step 234 determines whether or not a second part of the pulse has been detected. The reason why the second part of the pulse is detected is because, as explained above, a true reflected pulse extends over at least two sampling pulses. This may prevent erroneous detection. If the step 234 determines that there is no second part, the step 288 is repeated. If the second part is detected, it is determined that the detected pulse is a true reflected pulse, and step 235 changes a sampling point where the first part of the previous reflected pulse has been detected from Mn to Mm. Step 236 changes a sampling point where the first part of the present reflected pulse has been detected from M to Mn. Step 237 determines whether or not the sampling points Mn and Mm are equal to each other. If YES, it is determined that the relative speed of the target is substantially zero, and the step 231 is repeated. If the Mn and Mm are not equal to each other, it is determined that the relative speed of the target is changing, i.e., the target is approaching or separating. Step 238 determines whether or not the first part of the present reflected pulse has been detected at a sampling point Mm−1. If NO, step 242 is carried out, and if YES, it is determined that there is an approaching speed, and step 239 calculates the approaching speed Vr1 as follows:

$$Vr1=10/(t\cdot T) \tag{12}$$

where t is a count counted by the counter 12 and T is the interval (four microseconds) of the trigger pulses. Step 240 provides the approaching speed Vr1. Step 241 clears the counter 12, and the step 231 is repeated. If the step 238 determines that the first part of the present reflected pulse has not been detected at the sampling point Mm−1, the step 242 determines whether or not the first part of the present reflected pulse has disappeared at the sampling point Mm. If NO, the step 231 is repeated, and if YES, step 243 determines whether or not the first part of the present reflected pulse has been detected at a sampling point Mm+1. If NO, the step 231 is repeated, and if YES, it is determined that there is a separating speed, and step 244 calculates the separating speed Vr2 as follows:

$$Vr2=10/(t\cdot d) \tag{13}$$

where t is a count counted by the counter 12 and T is the interval (four microseconds) of the trigger pulses. Step 245 provides the separating speed Vr2. Step 246 clears the counter 12, and the flow returns to the step 231.

In this way, this embodiment sets a sampling point where a reflected pulse is newly detected as a reference point. According to the reference point, the embodiment counts a shift of the reflected pulse on sampling points, to calculate a relative speed. This may require the transmission pulse to steeply rise. It is not necessary, however, to shorten the width of the pulse. It is rather preferable to extend the pulse width longer than the interval of the sampling pulses. In this example, the probability of a signal caused only by noise exceeding the threshold TH for detecting a reflected pulse is not zero. Namely, there is a possibility of erroneous detection. Such erroneous detection due to noise will be reduced by always checking whether or not a reflected pulse is detected at consecutive two sampling points. This technique is equivalent to further accumulating data. Under the same threshold TH, the technique of employing two accumulated values is equivalent to obtaining a margin of 3 dB. In other words, the threshold TH may be decreased to obtain the same error detection probability provided by detecting a reflected pulse at one sampling point. Namely, detection sensitivity is improved by 3 dB. The third embodiment employs the sampling points as distance gates and calculates a relative speed according to an interval between the sampling points where reflected pulses are detected or an interval between the sampling points where a reflected pulse appears and disappears. This interval is counted according to the trigger pulses and corresponds to a predetermined distance. Even if the width of the transmission pulse is wide and the sampling interval is coarse, the relative speed is correctly and speedily calculable. This embodiment widens the transmission pulse width longer than the sampling interval so that a reflected pulse is detected at two sampling points or more, to reduce the probability of erroneous detection and improve pulse detection sensitivity. It is possible that noise exceeds the threshold just before a reflected pulse covering two sampling points is detected. In this case, the step 233 detects the noise, the step 234 detects a first part of a true reflected pulse and then a second part of the reflected pulse. In this case, the embodiment will provide an approaching speed even if the actual relative speed is zero. To prevent this, there is inserted a step of postponing the relative speed calculation if a reflected pulse is detected at consecutive three or more sampling points. In this case, the erroneous detection will be avoided only with an additional delay time corresponding to one trigger pulse. If noise is detected at consecutive two or more sampling points, erroneous detection will be avoided by considering a nonexistent distance. This embodiment employs a simple arrangement to effectively prevent erroneous detection, correctly measure a distance, and calculate a relative speed.

Figure 24:
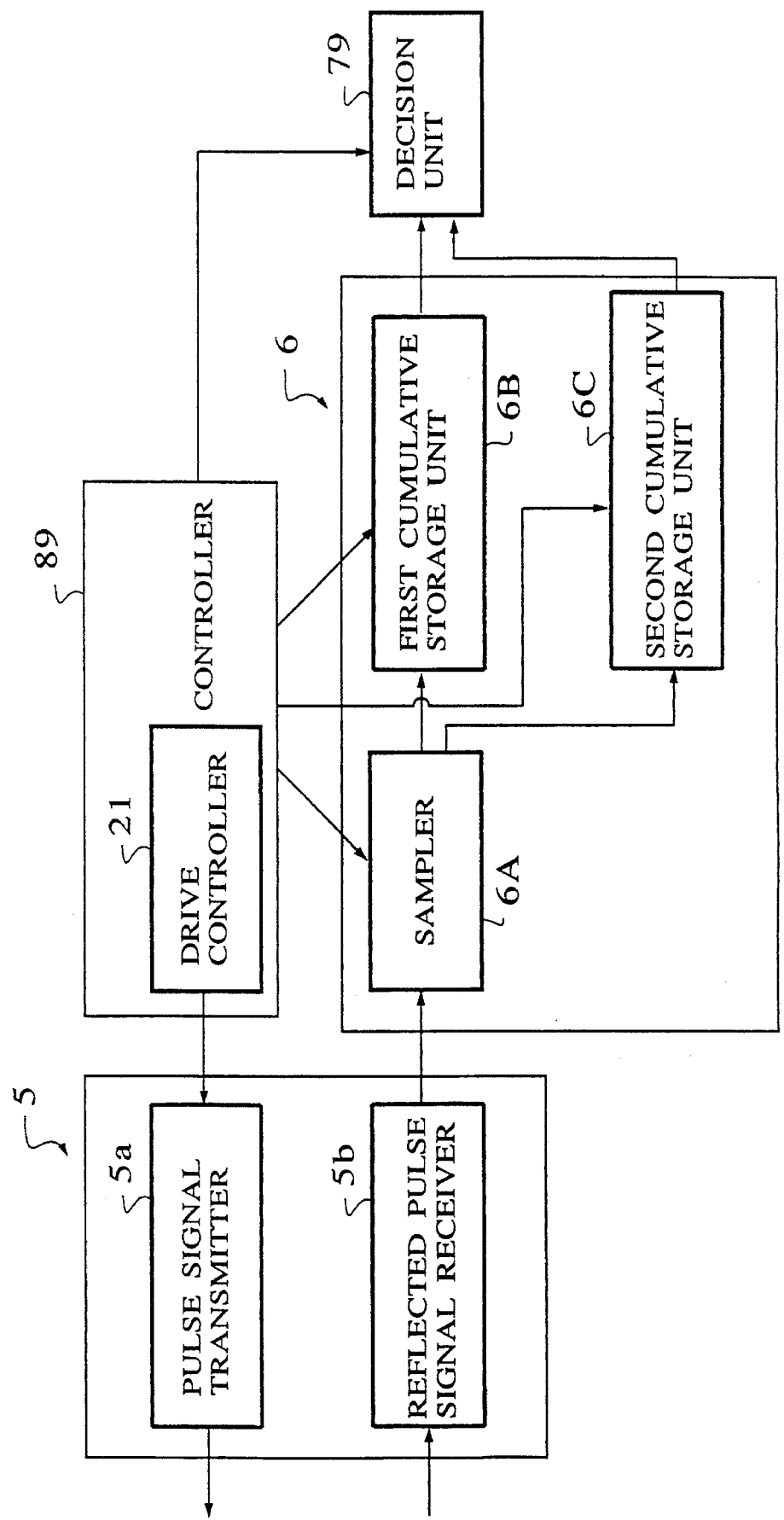
FIG. 24 is a block diagram showing a fourth embodiment of the present invention.

The fourth embodiment of the present invention will be explained with reference to the drawings. FIG. 24 is a block diagram showing the fourth embodiment. In the figure, the same parts as those of the first embodiment such as the radar head and sampler are represented with like reference marks, and their explanations will not be repeated. A pulsesignal transmitter 5a transmits a pulse signal, which is sampled by a sampler 6A. A first cumulative storage unit 6B sequentially accumulates data sampled by the sampler 6A. The first cumulative storage unit 6B is the same as that of the first embodiment. While the transmitter 5a is inactive, the sampler 6A samples data, which are sequentially accumulated in a second cumulative storage unit 6C. Namely, the second cumulative storage unit 6C accumulates only noise data. In response to an instruction from a controller 89, a decision unit 79 fetches data from the first cumulative storage unit 6B and determines whether or not the data contain a reflected pulse from a target, similar to the first embodiment. The decision unit 79 has a function of calculating the relative speed of the target, similar to the second embodiment. In response to an instruction from the controller 89, the decision unit 79 fetches data from the second cumulative storage unit 6C, detects a noise level at each sampling point in one sampling period, and uses the noise levels as thresholds for detecting the reflected pulse from the target. The controller 89 controls the radar head S, sampler 6A, first cumulative storage unit 6B, and decision unit 79, to detect the reflected pulse from the target and calculate the relative speed of the target, similar to the first embodiment. The controller 89 also controls second cumulative storage unit 6C, and a drive controller 21, to detect the noise level of each sampling point in one sampling period. The drive controller 21 has a function of instructing the sampler 6A to sample noise, a function of counting the number (for example, 8192) of noise level detecting operations carried out after sampling a reflected signal, and a function of terminating the noise level detecting operations according to the count. It is possible to provide a function of stopping the transmitter 5a once the number of trigger pulses provided by a trigger generator 8C reaches a predetermined value.

Figure 25A:
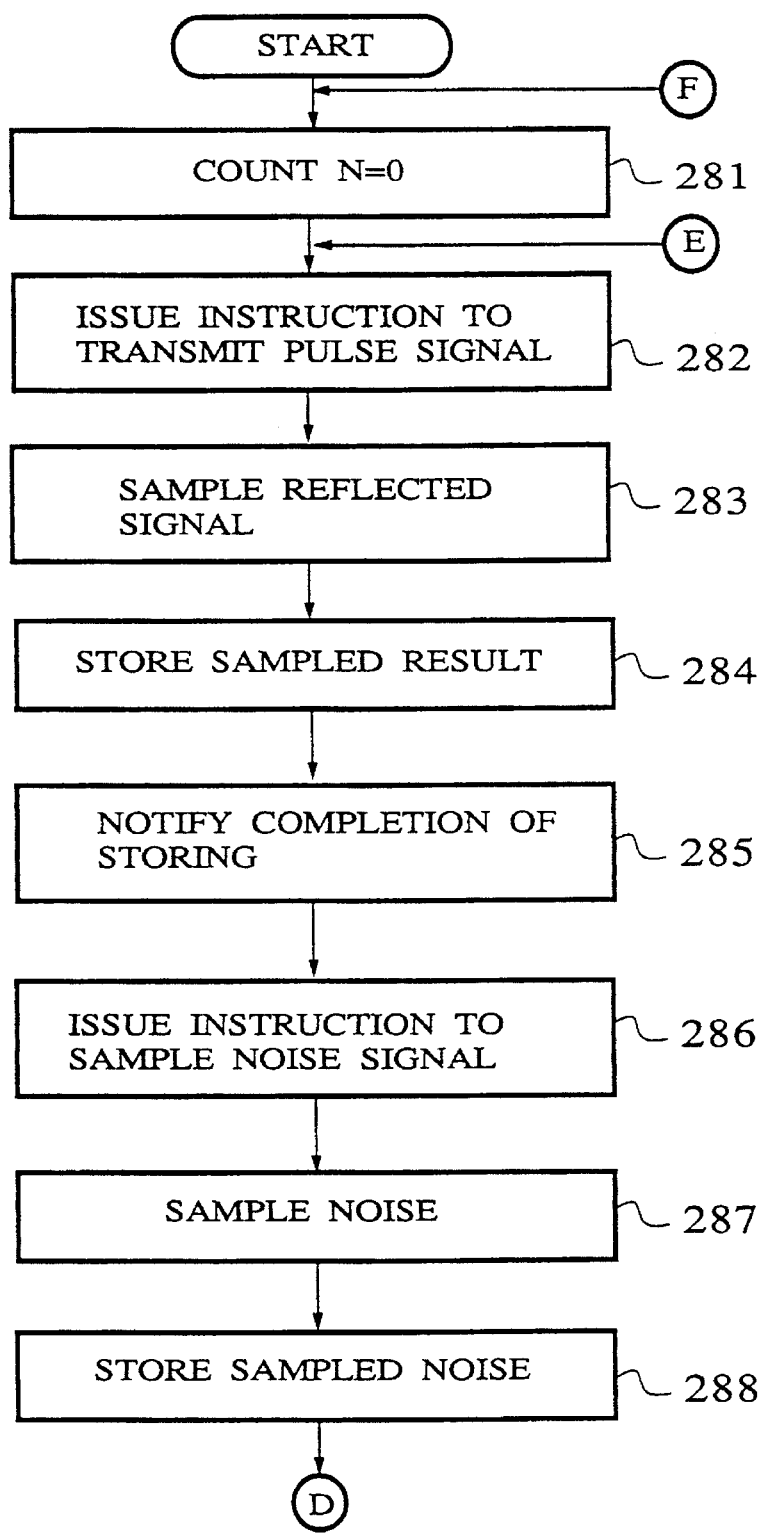
FIGS. 25a and 25B are flowcharts showing steps carried out by the fourth embodiment of the present invention.
Figure 25B:
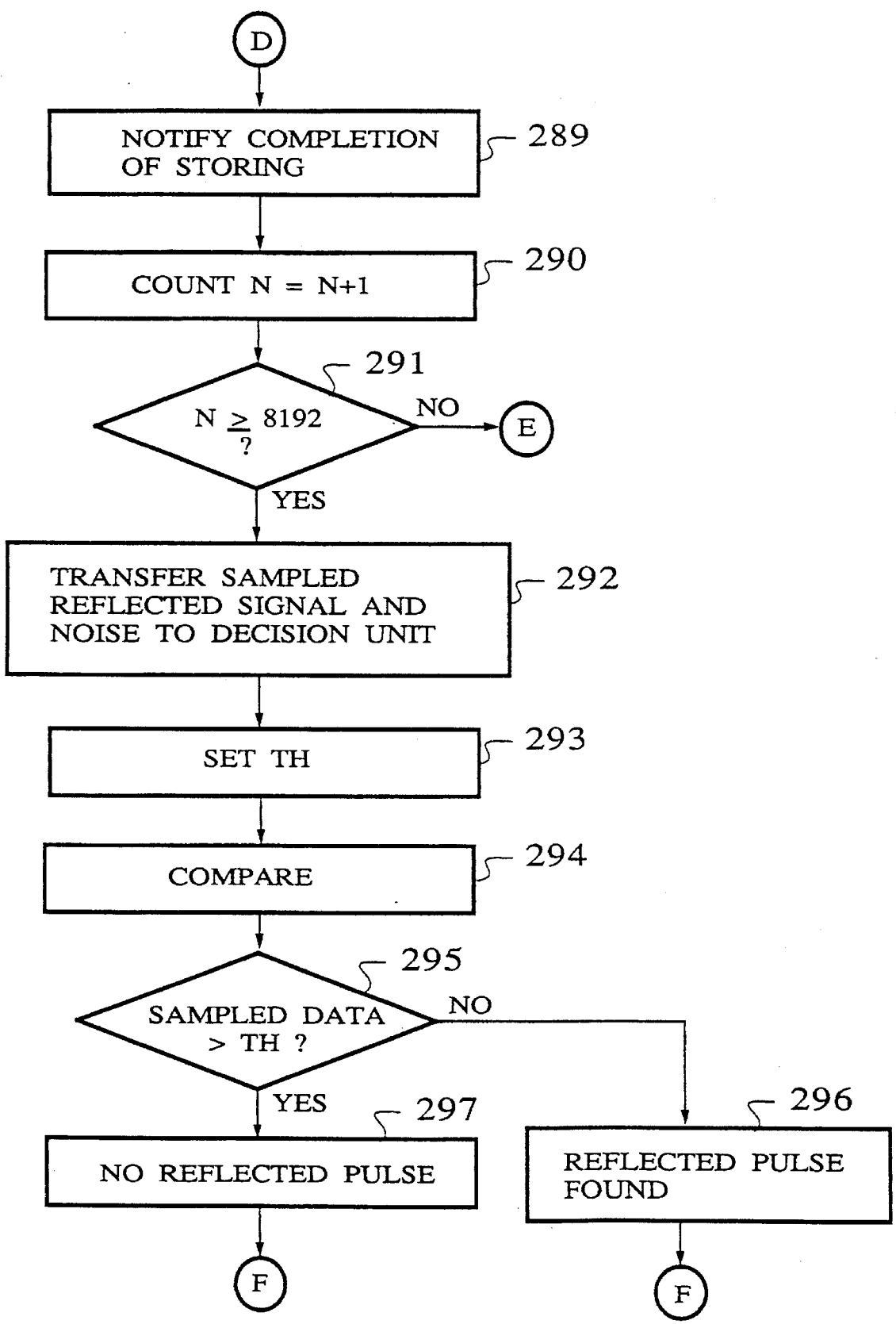

FIG. 25 is a flowchart showing steps carried out according to the fourth embodiment. Step 281 resets the counter N=0. Step 282 instructs the transmitter 5a to transmit a pulsesignal. Step 283 samples a reflected signal from a target. Step 284 transfers sampled data to the first cumulative storage unit 6B, which accumulates the data. Step 285 informs the decision unit 79 of the completion of the storage of the data. Step 286 instructs to sample noise. Step 287 samples noise. Step 288 transfers the sampled noise data to the second cumulative storage unit 6C, which accumulates the data. Step 289 informs the decision unit 79 of the completion of the storage of the noise data. Step 290 increments the counter N=N+1. Step 291 determines if N≧8192. If N<8192, the flow returns to the step 282. If N>8192, step 292 transfers the sampled signal and noise data to the decision unit 79. Step 293 recognizes a noise level at each sampling point according to the noise data and sets, for the corresponding sampling point, a threshold TH for detecting a reflected pulsesignal. Namely, each noise level is set as a threshold TH. Step 294 compares the noise levels with the sampled reflected signal. Step 295 determines whether or not there is a reflected pulse that is greater than the thresholds. If NO, step 296 determines that there is no reflected pulse from the target, and the flow returns to the step 281. If there is the reflected pulse greater than the thresholds, step 297 determines that the reflected pulse from the target has been detected, and the flow returns to the step 281. If the reflected pulse from the target is detected, a distance to the target and the relative speed of the target are calculated according to the detected pulse, and calculated results and an alarm if necessary are displayed on a CRT.

According to the first or second embodiment, all the accumulated values higher than a threshold TH was detected as a reflected signal from a target. On the other hand, the individual noise levels were measured for each sampling point and set as shown by the curve $C_{TH}$ in FIG. 26, to compare with the individual accumulated value in this fourth embodiment. Then, the accumulated value M6, which corresponds to high noise level N6, will not be detected as a real reflected signal from the target. Hence, the fourth embodiment can avoid erroneous detection due to the noise. The fourth embodiment samples noise Just after sampling a reflected signal from a target. This is to sample environmental noise due to sunlight, temperature, humidity, engine, alternator, fluctuations in a power source voltage, etc. The fourth embodiment samples only noise Just after sampling a reflected signal from a target. The present invention is not limited to this. For example, noise may be sampled after transmitting a plurality of pulses, or noise may be sampled s times after transmitting k pulses. Instead of if N≧8192 in the step 291, the integer multiple of 8192 can be employed. The second cumulative storage unit 6C may be omitted, and the first cumulative storage unit 6B may alternately detect a reflected signal and noise. The fourth embodiment of the present invention employs a simple arrangement to prevent erroneous detection due to noise, accurately measure a distance, and correctly calculate a relative speed. It is possible to control the controller 89 or drive controller 21 according to external signals, to optionally set the sampling timing of noise.

Figure 27:
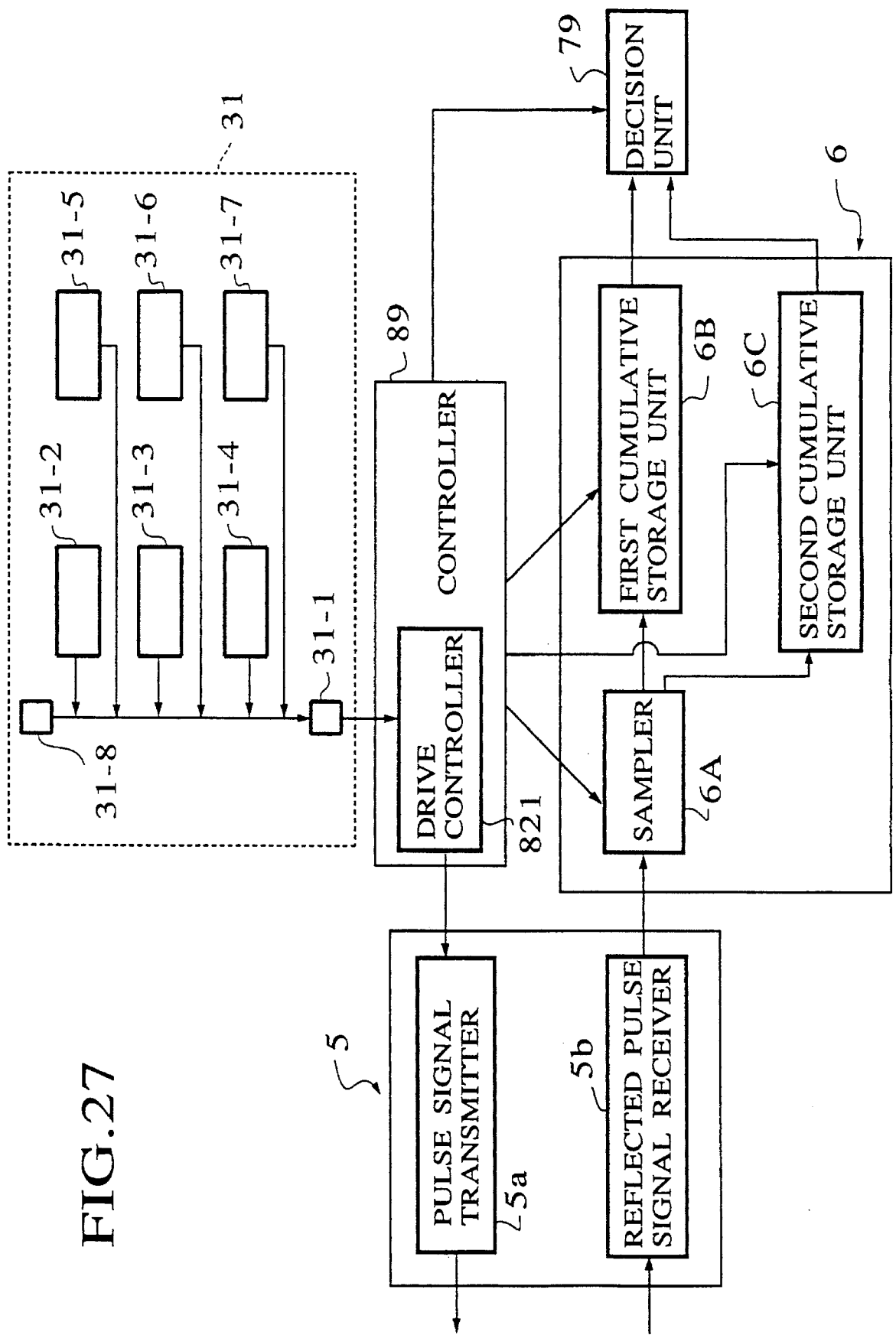
FIG. 27 is a block diagram showing a fifth embodiment of the present invention.

The fifth embodiment of the present invention will be explained with reference to the drawings. FIG. 27 is a block diagram showing the fifth embodiment. In the figure, the same parts as those of the fourth embodiment such as the radar head, cumulative storage unit, decision unit, and controller are represented with like reference marks, and their explanations will not be repeated. A drive controller 821 has a function of instructing a sampler 6A to sample noise, a function of counting the number of operations (for example, 8192) of detecting noise levels after sampling a reflected signal, a function of terminating the noise level detecting operations according to the count, and a function of counting trigger pulses provided by a trigger generator 8C (as shown in FIG. 2) and suspending a pulsesignal transmitter 5a at every predetermined number of trigger pulses, similar to the fourth embodiment. The fifth embodiment differs from the fourth embodiment in that it has a function of controlling the start or end of the noise level detecting operations in response to an instruction provided by an external controller 31. The external controller 31 has a notify unit 31-1 for notifying the drive controller 821 of the start of noise sampling, an illuminance sensor 31-2 for measuring environmental illuminance, a temperature sensor 31-3 for measuring an ambient temperature and the temperature of the radar proper, a wiper switch 31-4 for monitoring the operation of a wiper, a raindrop sensor 31-5 for sensing whether or not there are raindrops or the quantity of raindrops, a timer 31-6 for measuring time, an ignition switch 31-7 for recognizing the operations of a car on which the radar apparatus is mounted, and a manual switch 31-8. The notify unit 31-1 may have a threshold for determining whether or not the sensors 31-2, 31-3, 31-5, and 31-6 are providing an output, and a function of recognizing the ON/OFF states of the switches 31-4, 31-7, and 31-8. The threshold and function may be included in these sensors and switches.

FIG. 28 is a flowchart showing steps carried out by the fifth embodiment. Step 321 determines whether or not there is a change in illuminance. If YES, step 329 starts to sample noise, and then the step 321 is repeated. If there is no change in illuminance, step 322 determines if there is a change in temperature. If YES, the step 329 starts to sample noise, and then the step 321 is repeated. If there is no change in temperature, step 323 determines if the wiper switch 31-4 has been turned ON. If YES, the step 329 starts to sample noise, and the flow returns to the step 321. If the wiper switch 31-4 has not been turned ON, step 324 determines if there are raindrops. If YES, step 325 determines whether or not the wiper switch 31-4 has been turned OFF. If there are no raindrops, step 326 is carried out. If the step 325 determines that the wiper switch 31-4 has been turned OFF, the step 329 starts to sample noise, and the flow returns to the step 321. If the wiper switch 31-4 has not been turned OFF, the step 326 is carried out. The step 326 determines if a predetermined time has passed. If YES, the step 329 starts to sample noise, and the flow returns to the step 321. If the predetermined time has not passed, step 327 determines if the ignition switch 31-7 has been turned ON. If YES, the step 329 starts to sample noise, and the flow returns to the step 321. If the ignition switch has not been turned ON, step 328 determines whether or not the manual switch 31-8 has been turned ON. If YES, the step 329 starts to sample noise, and the flow returns to the step 321. If the manual switch 31-8 has not been turned ON, the flow returns to the step 321.

In this way, the fifth embodiment employs the external controller 31 for controlling the drive controller 821 for controlling whether or not noise must be sampled. The external controller 31 involves the illuminance sensor 31-2, temperature sensor 31-3, wiper switch 31-4, raindrop sensor 31-5, timer 31-6, ignition switch 31-7, and manual switch 31-8. Accordingly, the fifth embodiment is capable of changing thresholds for detecting a reflected pulse from a target whenever noise is caused due to sunlight, temperature, raindrops, engine, alternator, and fluctuations in a power source voltage. Accordingly, the fifth embodiment always correctly catches a reflected pulse from a target, measures a distance to the target, and calculates the relative speed of the target. The fifth embodiment freely sets thresholds for detecting a reflected pulse from a target according to environmental conditions or driver's request. The fifth embodiment employs a simple arrangement to prevent erroneous detection due to noise, accurately measure a distance, and calculate a relative speed.

Figure 29:
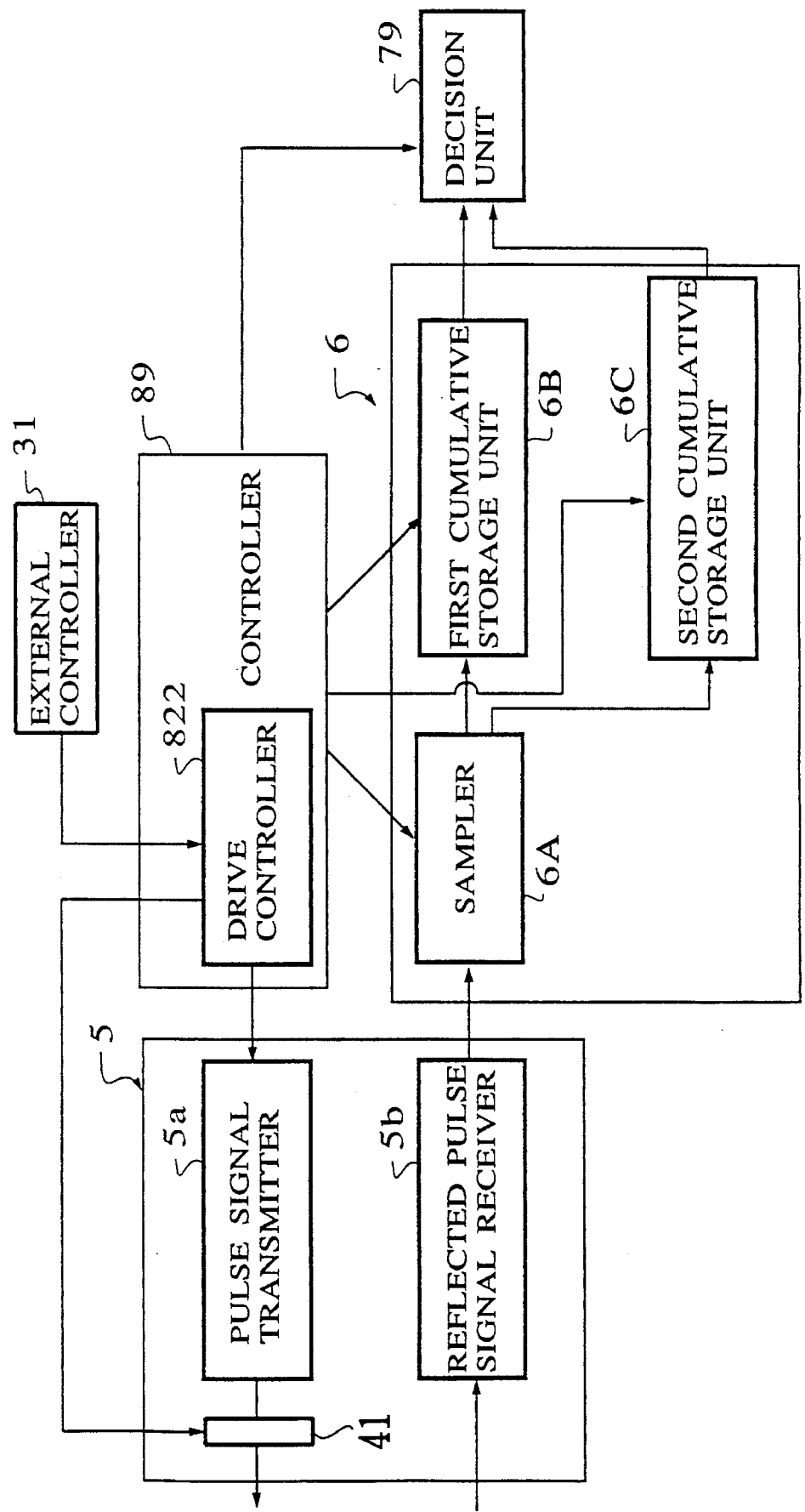
FIG. 29 is a block diagram showing a sixth embodiment of the present invention.

The sixth embodiment will be explained with reference to the drawings. FIG. 29 is a block diagram showing the sixth embodiment. In the figure, the same parts as those of the fourth embodiment such as the radar head, cumulative storage unit, decision unit, and controller are represented with like reference marks, and their explanations will not be repeated. A drive controller 822 recognizes the sampling timing of noise according to an internal instruction provided by a controller 89 or an external instruction provided by the external controller 31 of FIG. 27. The drive controller 822 controls a shutter 41. The shutter 41 is a liquid crystal shutter or a mechanical shutter. In response to an instruction from the drive controller 822, the shutter 41 is opened and closed to control the transmission of a pulsesignal provided by a transmitter 5a.

Figure 30:
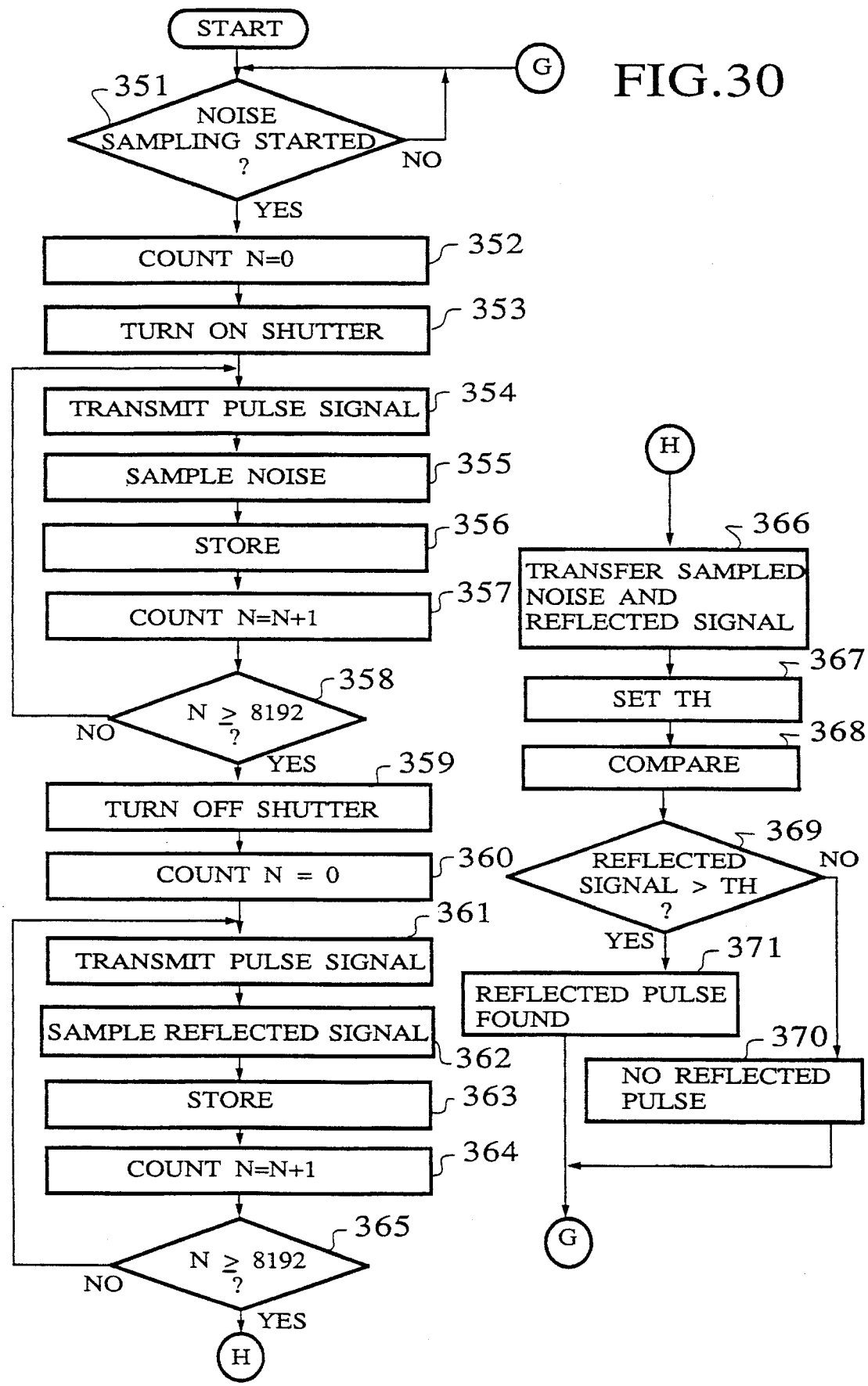
FIG. 30 is a flowchart showing steps carried out by the sixth embodiment.

FIG. 30 is a flowchart showing steps carried out by the sixth embodiment of the present invention. Step 351 determines whether or not a signal to start sampling noise has been provided. If YES, step 352 zeroes a counter, and step 353 turns ON, i.e., closes the shutter 41. Step 354 causes the transmitter 5a to transmit a pulsesignal. Since the shutter 41 is closed, the pulsesignal is blocked. Step 355 drives a receiver 5b to sample noise. Step 356 accumulates the sampled noise in a second cumulative storage unit 6C. Step 357 increments the counter to N+1. Step 358 determines if $N \geq 8192$. If $N < 8192$, the flow returns to the step 354. If $N \geq 8192$, step 359 turns OFF, i.e., opens the shutter 41. Step 360 zeroes the counter, and step 361 transmits the pulsesignal from the transmitter 5a. Since the shutter 41 is open, the pulse signal is transmitted outside. Step 362 drives the receiver 5b to sample a reflected pulsesignal from a target. Step 363 accumulates the sampled signal in a first cumulative storage unit 6B. Step 364 increments the counter to N+1. Step 365 determines if $N \geq 8192$. If $N < 8192$, the flow returns to the step 361. If $N \geq 8192$, step 366 transfers the sampled noise and signal to a decision unit 79. Step 367 detects noise levels according to the sampled noise, and according to the noise levels, sets thresholds for detecting a reflected pulse. Step 368 compares the thresholds with the sampled signal. Step 369 determines whether or not there is any sampled value that exceeds the thresholds. If there is no data that exceeds the thresholds, step 370 determines that there is no reflected pulse, and the flow returns to the step 351. If there is a value that exceeds the thresholds, step 371 determines that there is a reflected pulse, and the flow returns to the step 351.

The sixth embodiment arranges the shutter 41 in front of the transmitter 5a. The shutter 41 is opened and closed in response to an external signal. When the shutter 41 is closed, noise is detected. Accordingly, the thresholds for detecting a reflected pulse from a target are changed according to noise due to sunlight, temperature, rain, engine, alternator, fluctuations in a power source voltage, etc. The thresholds may be changed according to driver's requirements. The sixth embodiment is capable of always correctly catching a reflected pulse from a target. The sixth embodiment employs a simple arrangement to prevent erroneous detection due to noise, correctly measure a distance, and calculate a relative speed. The step 365 is not limited to determine if N≧8192. With a greater number to check N, it is possible to sample noise once after transmitting a plurality of pulses, or sample noise s times after transmitting k pulses. The sixth embodiment employs a simple arrangement to accurately measure a distance and speedily calculate a relative speed.

Figure 31:
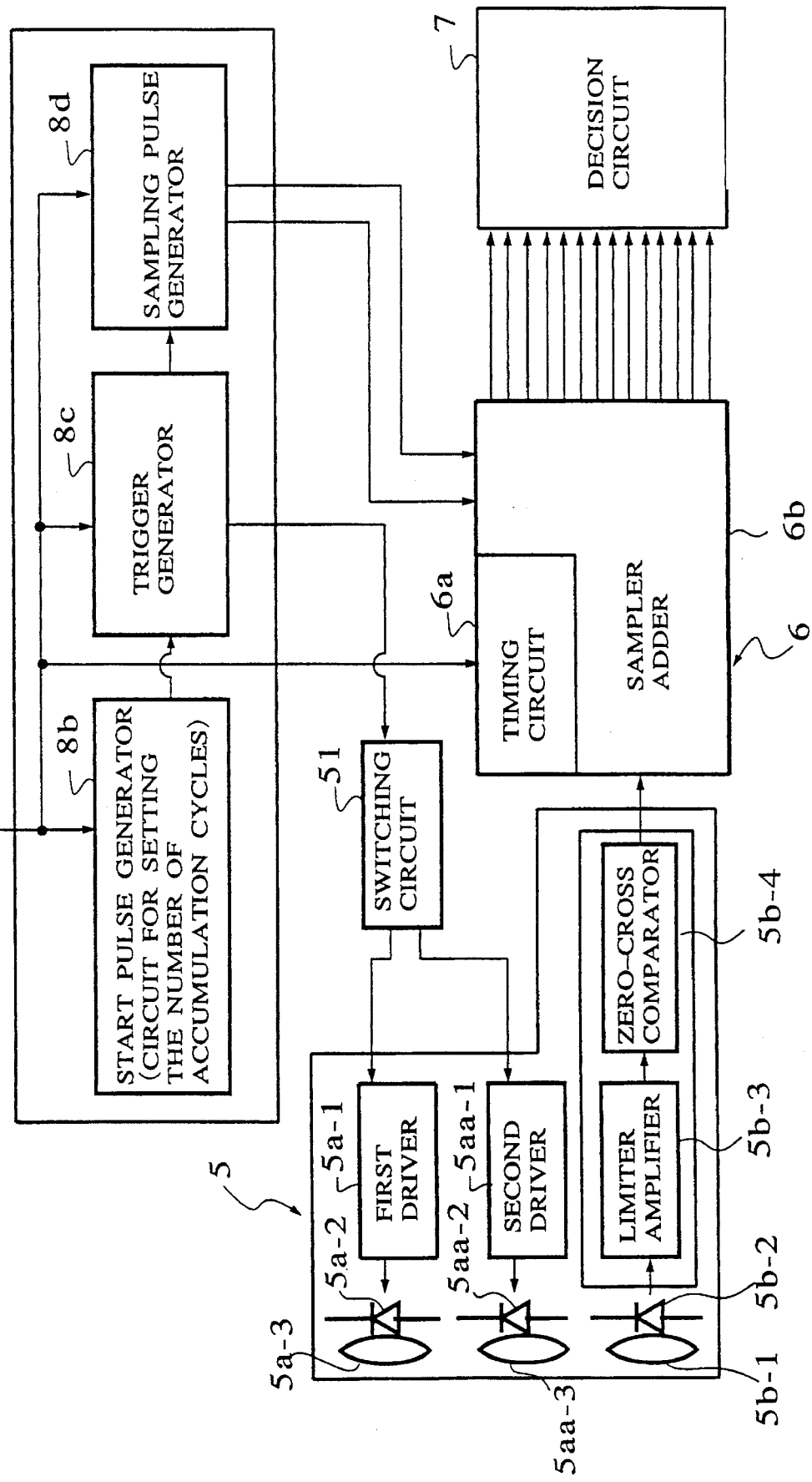
FIG. 31 is a block diagram showing a seventh embodiment of the present invention.
Figure 32:
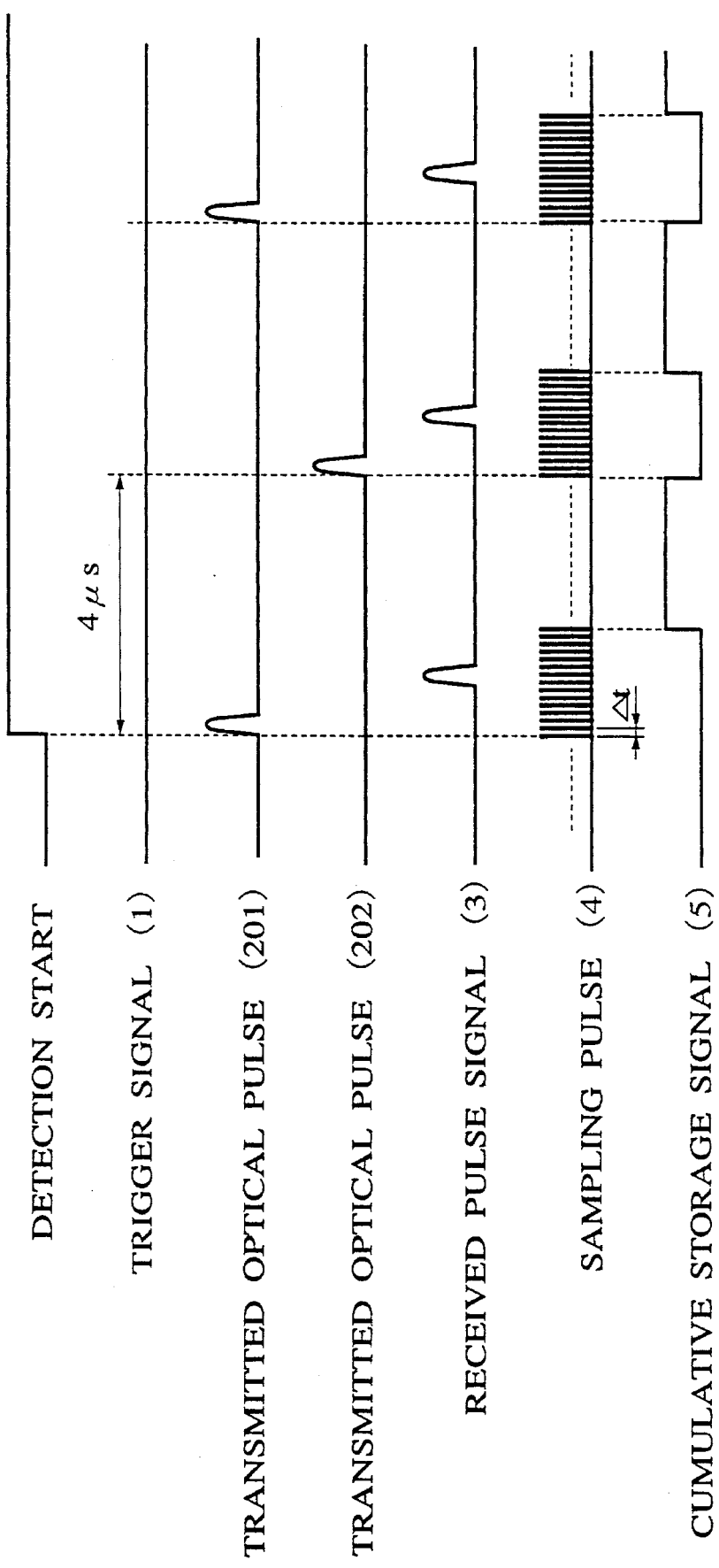
FIG. 32 is a timing chart showing the seventh embodiment.
Figure 82:
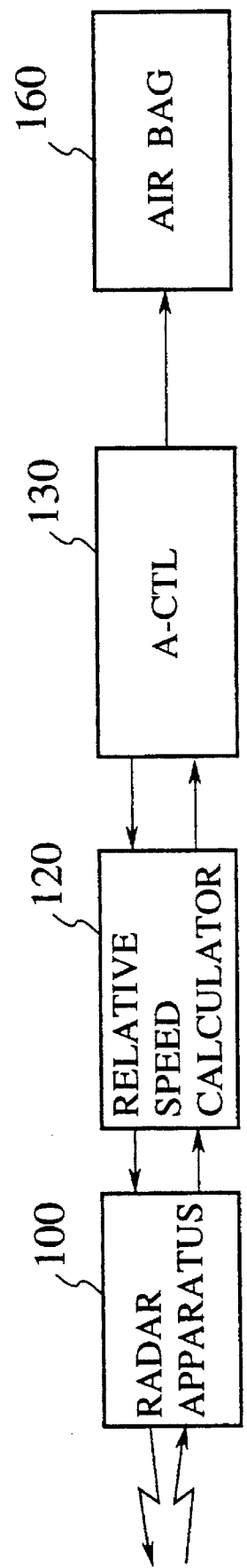
FIG. 82 is a block diagram showing a precrash air bag system employing the radar apparatus of the present invention.

The seventh embodiment of the present invention will be explained with reference to the drawings. FIG. 31 is a block diagram showing the seventh embodiment. In the figure, the same parts as those of the first embodiment are represented with like reference marks and their explanations will not be repeated. A radar head 5 of this embodiment has two pulsesignal transmitters 5a and 5aa having the same arrangement. The transmitter 5a includes a series circuit of a first driver 5a-1, a light emitting element 5a-2, and a lens 5a-3. The transmitter 5aa includes a series circuit of a second driver 5aa-1, a light emitting element 5aa-2, and a lens 5aa-3. The light emitting elements 5a-2 and 5aa-2 may be LEDs or semiconductor laser diodes. Pulse signals from the transmitters 5a and 5aa may be electromagnetic or sonic wave signals. In this case, elements for transmitting the electromagnetic or sonic wave signals must be employed instead of the light emitting elements. A switching circuit 51 receives a trigger pulse from a trigger generator 8c, to acknowledge the timing of a pulsesignal to be transmitted outside, and alternately provides the first and second drivers 5a-1 and 5aa-1 with the trigger pulse. It is possible to arrange three or more transmitters, or an array of transmitters. FIG. 82 is a timing chart showing the seventh embodiment. Once a controller 8 provides a detection start signal, a trigger pulse (1) is provided at every four microseconds. A pulse 201 is transmitted in response to every odd trigger pulse (1), and a pulse 202 is transmitted in response to every even trigger pulse (1). If there are three or more light emitting elements, they alternately emit pulses at intervals of four microseconds. Namely, the controller 8, switching circuit 51, and drivers 5a-1 and 5aa-1 alternately drive the transmitters at predetermined intervals. For example, let's consider the case that 14 sampling pulses (4) are provided. The interval Δt of the sampling pulses corresponds to 10 meters. The sampling value of "0" or "1" is stored to the corresponding sampling point for each sampling pulse. A cumulative storage signal (5) is provided when no sampling pulse is provided. While the signal (5) is being provided, sampled data are accumulated and stored. According to the seventh embodiment, the switching circuit 51 alternately provides the first and second drivers 5a-1 and 5aa-1 with a trigger pulse, so that the number of activations of the light emitting element 5a-2 is halved due to the light emitting element 5aa-2. With the simple arrangement, the seventh embodiment doubles the service lives of the light emitting elements 5a-2 and 5aa-2. This results in improving the durability and reliability of the light emitting elements 5a-2 and 5aa-2. If one of the light emitting elements is broken during operation, the other element may accumulate and store data at a sampling interval of eight microseconds that is double the normal interval of four microseconds. This secures safety driving. As explained with reference to,the first embodiment, the light emitting elements may have small output power, to easily improve the durability of the light emitting elements. The seventh embodiment further improves the durability and safety of the elements.

Figure 33:
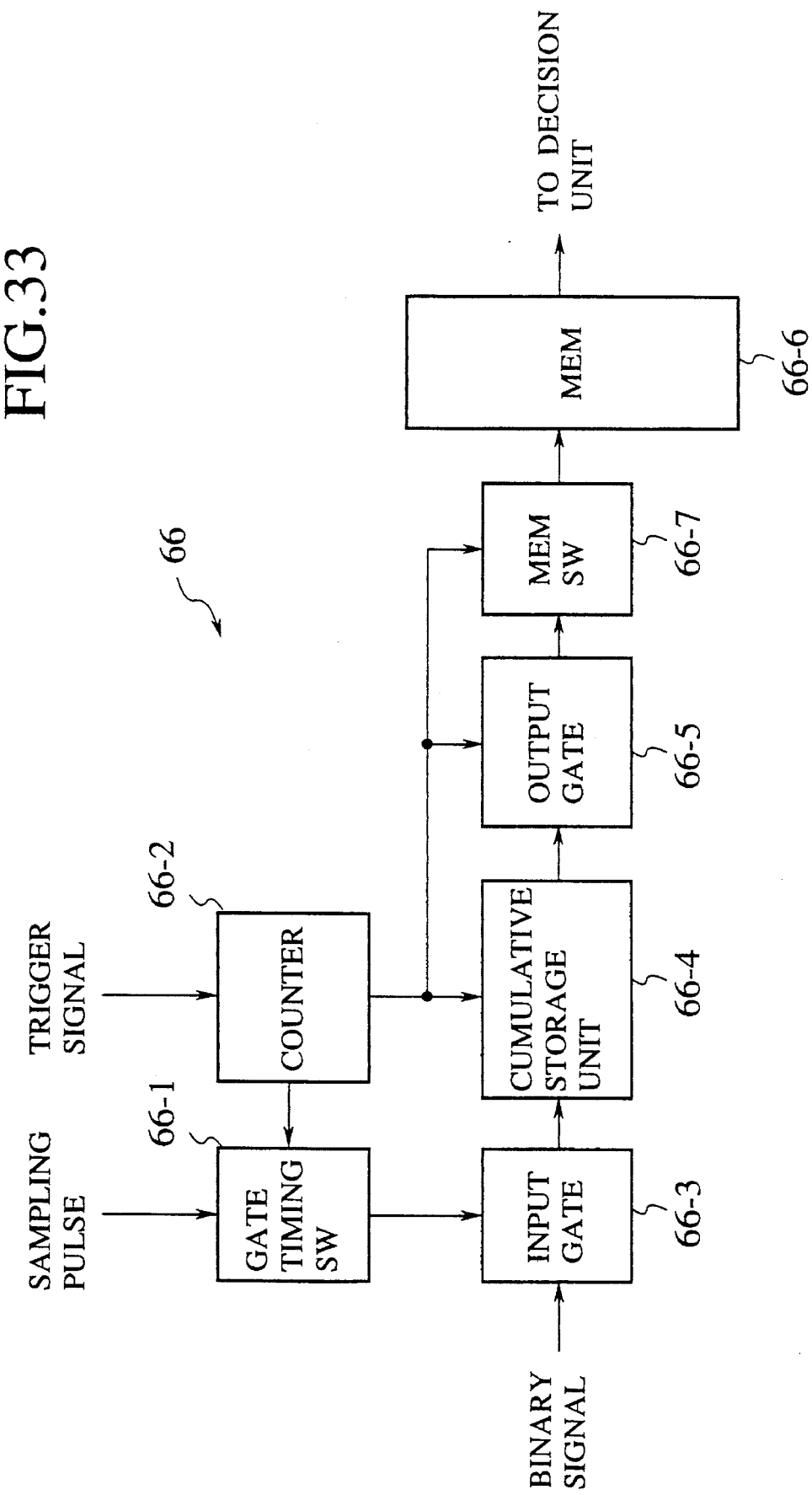
FIG. 33 is a block diagram showing an eighth embodiment of the present invention.
Figure 34:
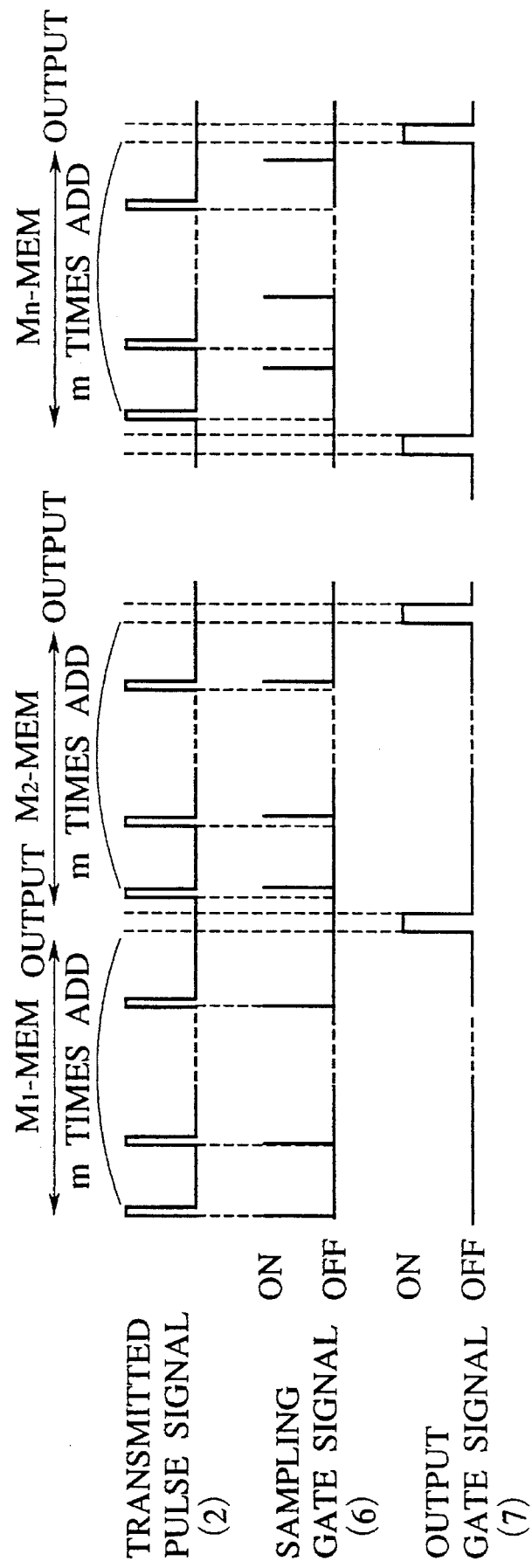
FIG. 34 is a timing chart showing a sampling operation of the eighth embodiment.
Figure 35:
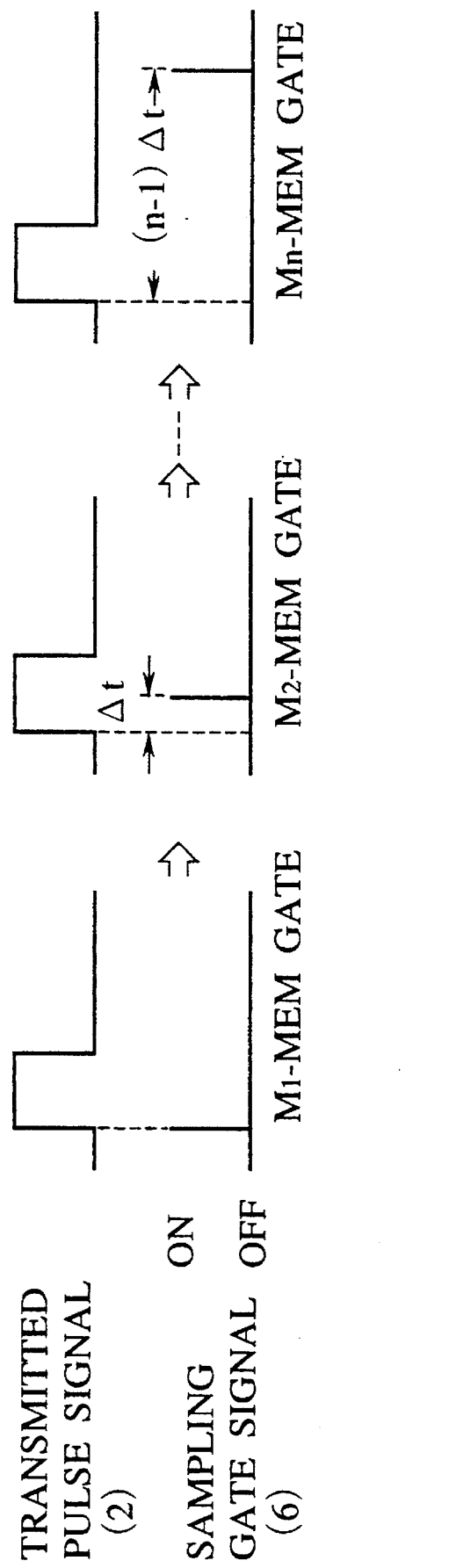
FIG. 35 is a timing chart showing the sampling operation of the eighth embodiment.
Figure 36:
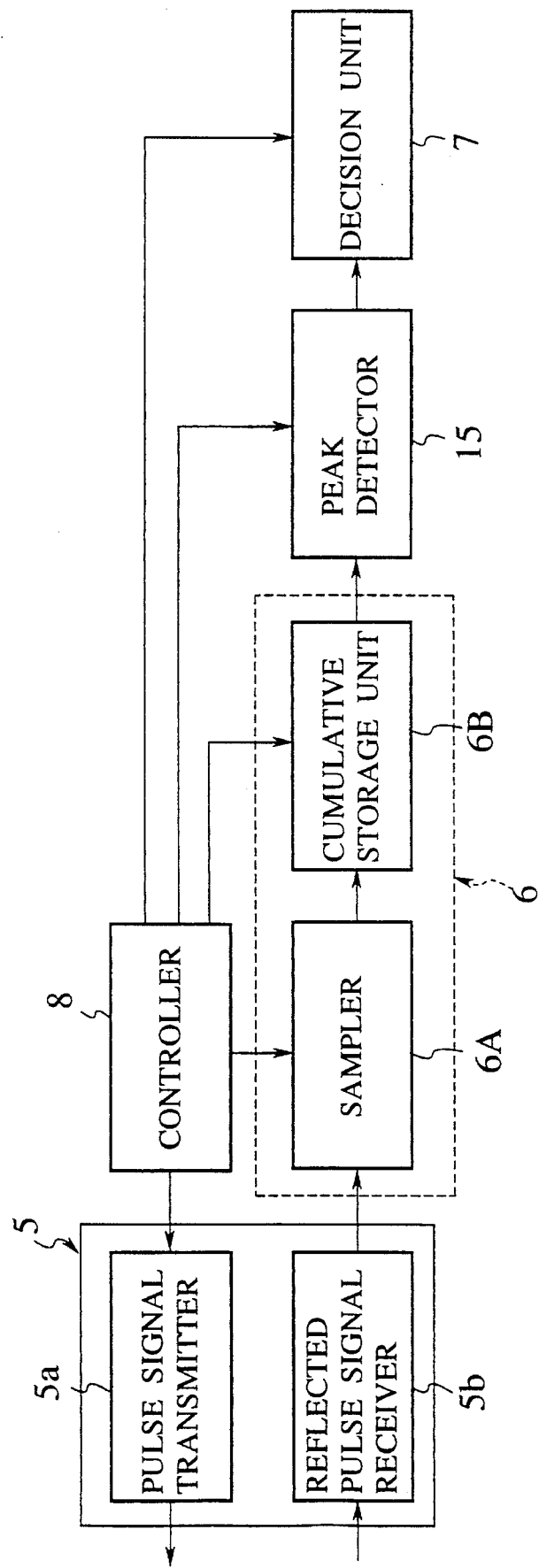
FIG. 36 is a block diagram showing a ninth embodiment of the present invention.

A radar apparatus according to the eighth embodiment of the present invention will be explained with reference to FIGS. 33 to 35. This radar apparatus is characterized by the structure of an operational storage unit 66 of FIG. 33. The operational storage unit 66 may be substituted for the operational storage unit 6 of any one of the first to seventh embodiments. The operational storage unit 66 has a gate timing switch 66-1, which receives a sampling pulse from a sampling pulse generator 8d and provides a gate instruction for a predetermined sampling point. A counter 66-2 counts trigger signals from a trigger generator 8c and provides a sampling timing switch signal when a predetermined number of trigger signals is counted. An input gate 66-3 receives a binary signal in response to a gate timing signal from the gate timing switch 66-1. A cumulative storage unit 66-4 successively accumulates and stores the binary signal at each sampling point. An output gate 66-5 provides the accumulated value stored in the cumulative storage unit 66-4 in response to a signal from the counter 66-2. A memory 66-6 stores the accumulated values of 14 sampling points that temporally differ from one another. A memory switch 66-7 is switched to store the accumulated value provided by the output gate 66-5 in the memory 66-6 at an address corresponding to a specified sampling point.

An operation of the operational storage unit 66 will be explained with reference to the timing charts of FIGS. 34 and 35. A principle of the operation will be explained at first. Upon counting m trigger signals, the counter 66-2 provides the gate timing switch 66-1 with a gate timing switch signal, the cumulative storage unit 66-4 with a clear signal, the output gate 66-5 with an output signal, and the memory switch 66-7 with a memory address switch signal. In response to the signal from the counter the gate timing switch 66-1 changes the position of a sampling pulse according to which it provides the input gate 66-3 with an input gate signal. Whenever receiving the input gate signal from the gate timing switch 66-1, the input gate 66-3 receives a binary signal and transfers it to the cumulative storage unit 66-4. The cumulative storage unit 66-3 cumulatively stores the binary signal. In response to the output signal from the counter 66-2, the output gate 66-5 transfers the accumulated value stored in the cumulative storage unit 66-4 to a corresponding one of addresses M1 to Mn of the memory 66-6 specified by the memory switch 66-7. Thereafter, the cumulative storage unit 66-4 is cleared. As shown in the timing charts of FIGS. 34 and 35, a first round of m sampling operations (m=8192 in the preceding embodiments) is carried out by accumulating and storing a binary signal m times in response to a first sampling pulse in each of the m sampling operations. Upon counting m trigger signals, the counter 66-2 provides the output gate 66-5 with an output instruction. The output gate 68-5 transfers the accumulated value stored in the cumulative storage unit 66-4 to the address M1 of the memory 66-6 through the memory switch 68-7. The gate timing switch 66-1 changes gate timing so that the input gate 66-8 may receive an input gate signal in response to a second sampling pulse in each sampling operation, to transfer a binary signal to the cumulative storage unit 66-4. After m cumulative and storing operations, the accumulated value stored in the cumulative storage unit 66-4 is transferred to the address M2 of the memory 66-6 through the memory switch 66-7. In this way, the timing of opening the input gate 66-3 is shifted by one sampling pulse period Δt whenever m trigger signals have been counted, and the accumulated value stored in the cumulative storage unit 66-4 is transferred each time to a corresponding one of the addresses M3, M4, and so on of the memory 66-6. In this way, each sampling round accumulates and stores a binary signal m times in response to an "n"th sampling pulse, and an accumulated value of each round of m sampling operations is transferred to the address Mn of the memory 66-6. In this way, the binary signal is sampled at n sampling points. After the completion of the n rounds of the m sampling operations, the contents of the memory 66-6 are sent to the decision unit 7, 77, or 79 to detect a reflected pulse Rf from a target and calculate the distance to the target, similar to the preceding embodiments.

A modification of this embodiment may employ two memories 66-6. In this case, the same operation as mentioned above is carried out when the pulse transmitter is stopped, and accumulated values are stored in the second memory 66-6 at corresponding addresses. Similar to the fourth to sixth embodiments of FIGS. 24 to 30, this modification detects a noise level for each sampling point and uses the noise level as a threshold for finding a reflected pulse Rf from a target, to accurately measure the distance to the target. Each of the first to eighth embodiments transmits a pulse, samples the pulse at temporally different sampling points, accumulates sampled values, divides the accumulated value of each sampling point by the number of cumulative operations, to provide a normalized value, and calculates the distance to a target according to the sampling point whose normalized value is above a threshold TH. If it is required only to determine whether or not there is an obstacle in the range of, for example, one meter around the radar apparatus, it is sufficient to provide a circuit that samples a binary signal predetermined times at a sampling point corresponding to a distance of one meter, accumulates the sampled values, calculates a normalized value, compares the normalized value with a predetermined threshold TH or a separately measured noise level, and if the normalized value is higher than the threshold TH, determines that there is an obstacle. Thereafter, an alarm may be issued or displayed. Another modification of the eighth embodiment may set different numbers of cumulative operations depending on sampling points. A signal received from a far target involves a low S/N ratio and requires a large number of cumulative operations. On the other hand, a signal received from a near target involves a high S/N ratio and requires a small number of cumulative operations. Accordingly, the modification reduces the number of cumulative operations for near sampling points and increases the same for far sampling points. This is realized by adjusting the timing of an end pulse provided by the start pulse generator 8b through the sampling pulse generator 8d of FIGS. 2 and 31.

In this way, the eighth embodiment collects an accumulated value for noise at each sampling point and employs it as a threshold for the sampling point. Accordingly, this embodiment surely removes the influence of noise at each sampling point when detecting a target and accurately calculating the distance to the target.

A radar apparatus according to the ninth embodiment of the present invention will be explained with reference to FIGS. 36 to 40. The same reference marks as those of the first embodiment of FIGS. 1 and 2 represent like parts. The radar apparatus of the ninth embodiment has a radar head 5, an operational storage unit 6 for sampling a binary signal from the radar head 5 and cumulatively storing values sampled at sampling points, a decision unit 7 for specifying a sampling point whose cumulative value is above a threshold TH and calculating the distance to a target, and a controller 8 for controlling these elements. These parts are the same as those of the first embodiment. The radar head, operational storage unit, decision unit, and controller of the ninth embodiment may be those of FIGS. 16, 22, 24, 27, and 29. The ninth embodiment is characterized by a peak detector 15 arranged between the operational storage unit 6 and the decision unit 7. The peak detector 15 may be a software program executed by a computer that forms the decision unit 7. The peak detector 15 compares each of the accumulated values of sampling points stored in the operational storage unit 6 with the threshold TH and specifies a sampling point whose accumulated value exceeds the threshold TH. If there are a plurality of sampling points whose accumulated values are each above the threshold TH, the peak detector 15 estimates by approximation a peak according to the accumulated values of these sampling points. The estimated peak is transferred to the decision unit 7.

Figure 37:
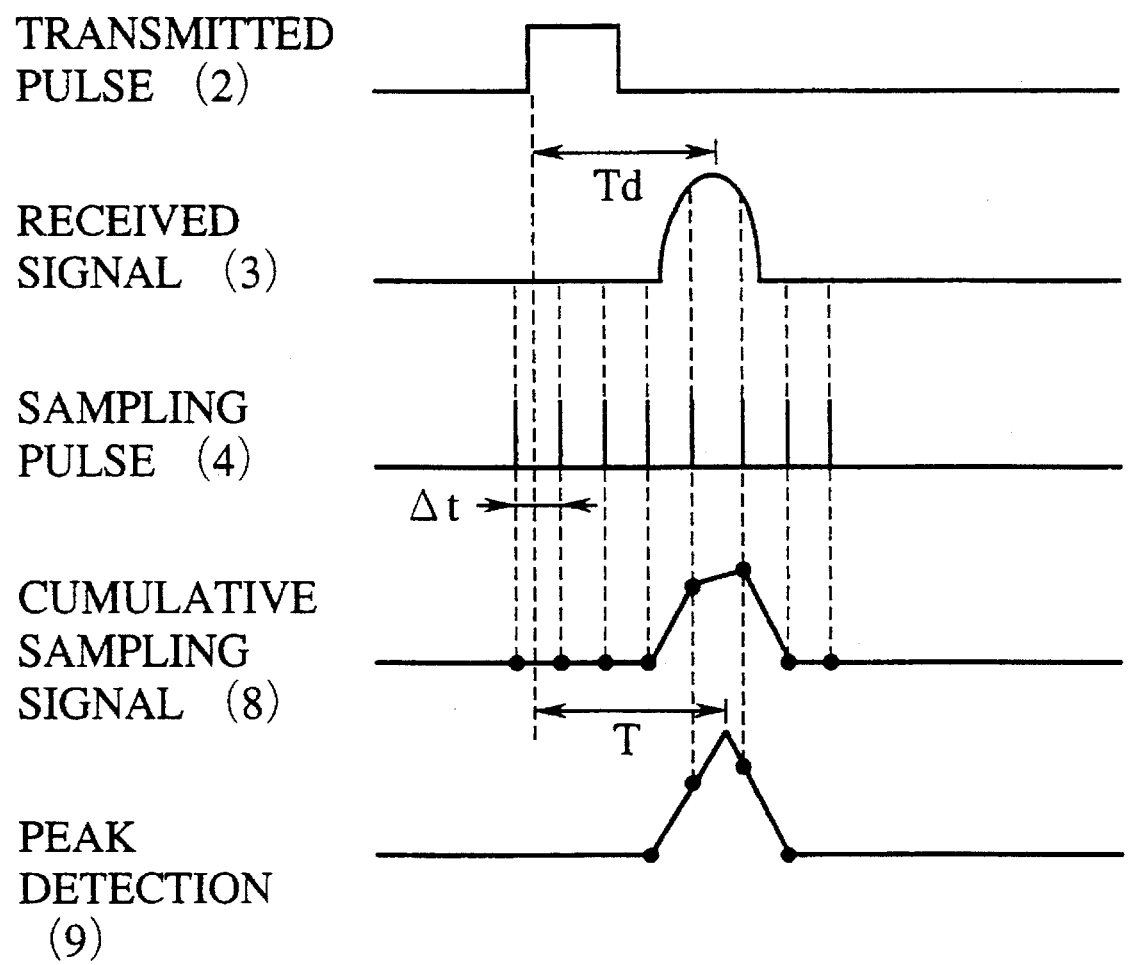
FIG. 37 is a timing chart showing the ninth embodiment.
Figure 38:
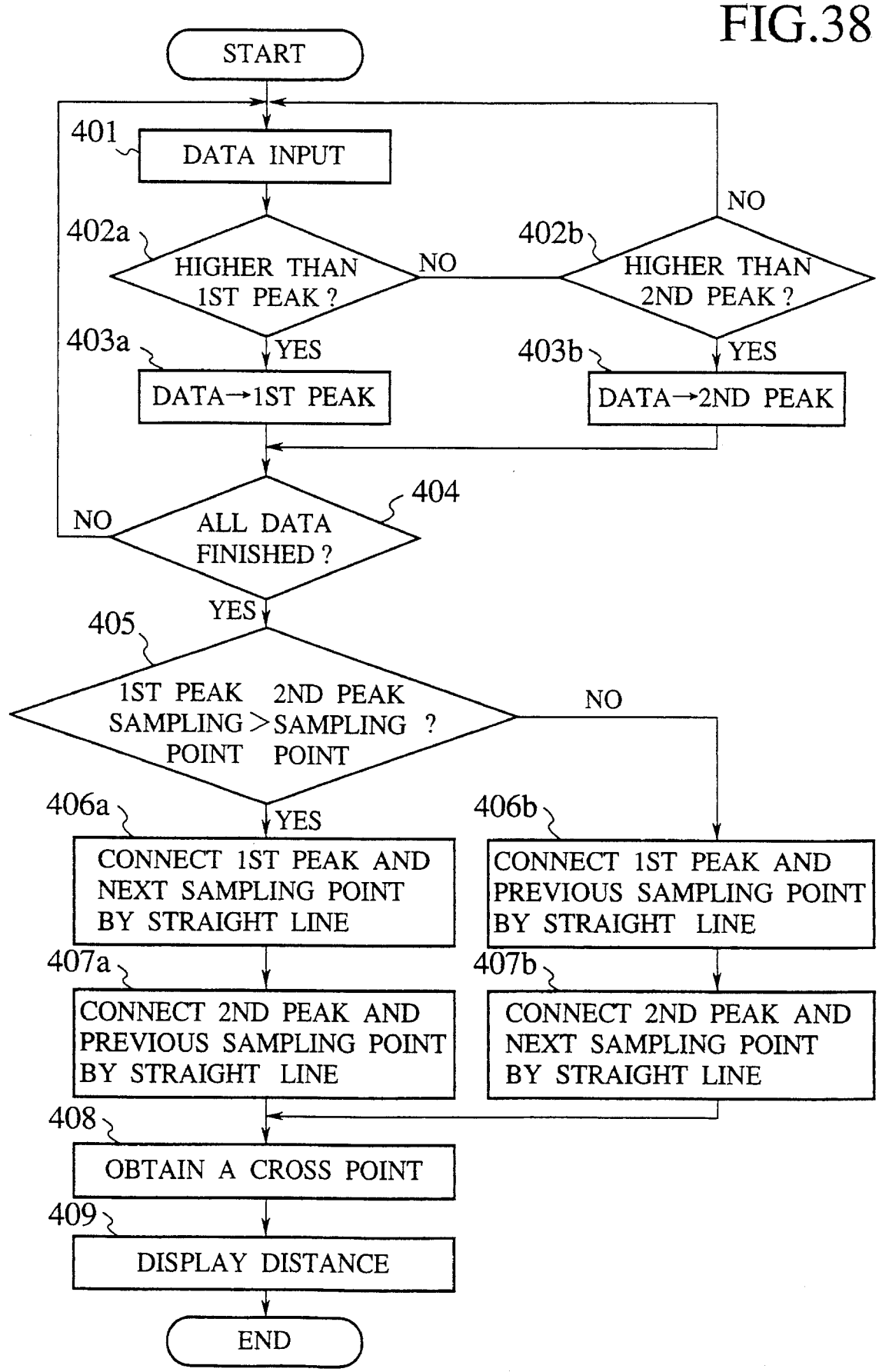
FIG. 38 is a flowchart showing steps carried out by the ninth embodiment.
Figure 39:
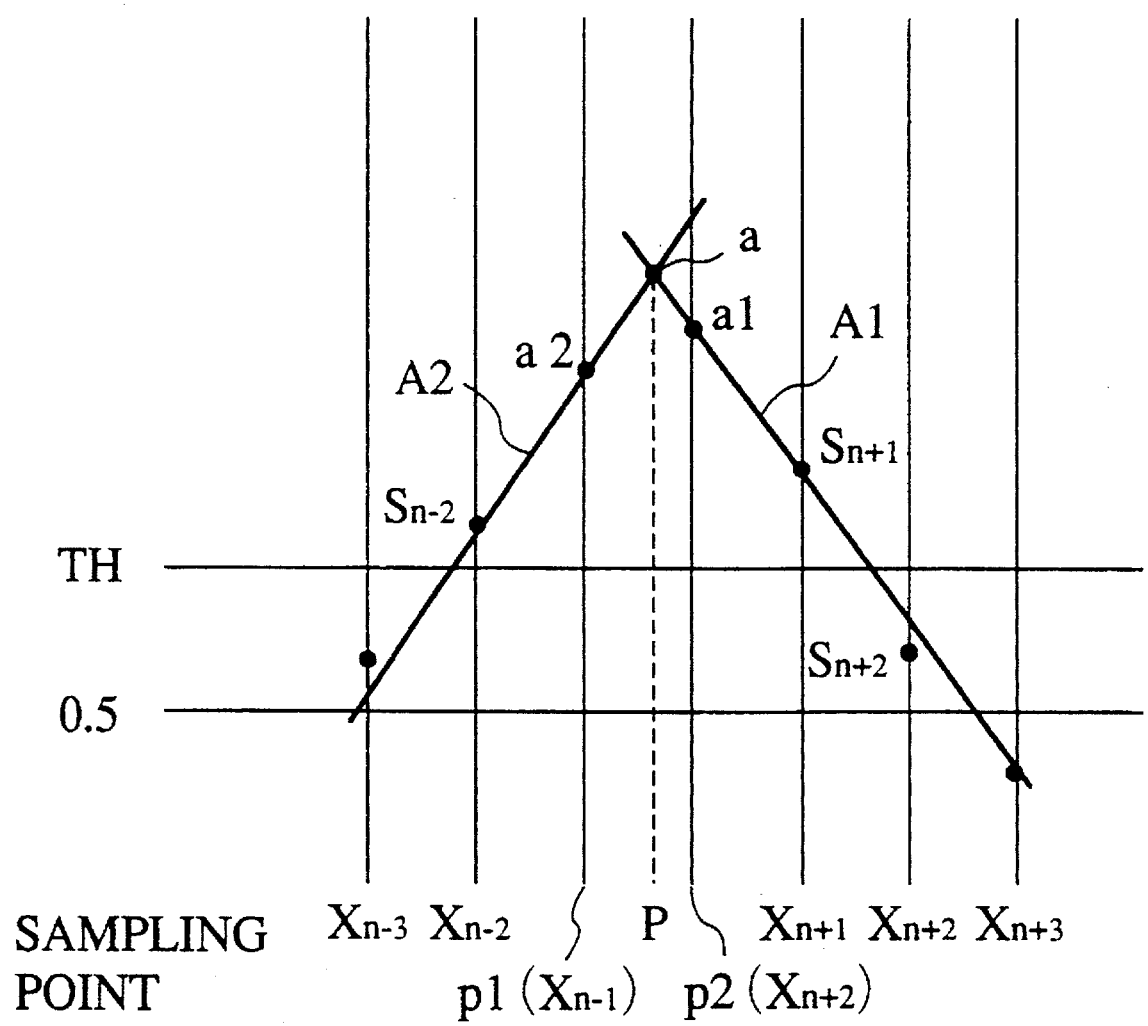
FIG. 39 explains an approximation technique of the ninth embodiment.

An operation of the peak detector 15 will be explained with reference to FIGS. 37 to 39. A pulsesignal transmitter 5a transmits a pulsesignal (2) at a sampling frequency of, for example, 4 μs as in the preceding embodiments. The pulse width of the pulsesignal (2) is greater than a sampling pulse interval Δt, which is 66.7 ns in the preceding embodiments. A reflected pulsesignal receiver 5b continuously receives an external signal (3), converts it into a binary signal, and transfers the binary signal to the operational storage unit 6. The pulsesignal (2) from the transmitter 5a is reflected by a target as a reflected pulsesignal Rf and is received by the receiver 5b with a time delay Td corresponding to the distance to the target. In response to one of a predetermined number of (for example, 14) sampling pulses (4) in each trigger period, the operational storage unit 6 samples the binary signal and cumulatively stores the sampled value for a corresponding sampling point. The number of sampling operations in each distance measuring operation is 8192 in the preceding embodiments. This number of sampling operations is equal to the number of trigger signals (FIG. 3), or the number of pulsesignals to be emitted from the transmitter 5a. After the completion of the sampling operations, the accumulated values (8) of the respective sampling points are transferred to respective memories. Since the width of the transmitted pulse (2) is greater than the sampling pulse interval Δt, the reflected pulse Rf is detectable at a plurality of the sampling points. Accordingly, the peak detector 15 receives the accumulated values (8) from the operational storage unit 6 and carries out a peak detection process as indicated with (9) and provides the decision unit 7 with a time delay T between the timing of the transmitted pulse and the detected peak.

The steps of detecting a peak will be explained with reference to FIGS. 38 and 39. Steps 401 to 404 successively read accumulated values Si of sampling points Xi, set a largest accumulated value exceeding a threshold TH as a first peak value a1 and a second largest accumulated value exceeding the threshold TH as a second peak value a2, and identify sampling points p1 and p2 corresponding to the first and second peak values a1 and a2. In the example of FIG. 39, the first peak p1 corresponding to a sampling point Xn is farther from the radar apparatus than the second peak p2 corresponding to a sampling point Xn−1. The accumulated values of the sampling points Xn and Xn−1 are Sn and Sn−1, which correspond to the first and second peak values a1 and a2. Step 405 determines which of the first and second peaks p1 and p2 is farther than the other. If the first peak p1 is farther than the second peak p2, step 406a extends a straight line A1 from the accumulated value a1 (=Sn) of the first peak p1 (=Xn) to the accumulated value Sn+1 of a sampling point Xn+1 that is next ahead the sampling point Xn. Step 407a extends a straight line A2 from the accumulated value a2 (=Sn−1) of the second peak p2 (=Xn−1) to the accumulated value Sn−2 of a sampling point Xn−2 in front of the sampling point Xn−1. If the step 405 determines that the first peak p1 is closer than the second peak p2, step 406b extends a straight line from the accumulated value al of the first peak p1 to the accumulated value of a sampling point in front of the first peak p1, and step 407b extends a straight line from the accumulated value a2 of the second peak p2 to the accumulated value of a sampling point behind the second peak p2. Step 408 finds an intersection "a" of the two straight lines A1 and A2 as an accumulated peak value, and a time p corresponding to the intersection as a time delay T between the timing of the transmitted pulse and the reception of a corresponding reflected pulse. In this way, the peak detector 15 approximates the waveform of the received reflected pulse Rf by tangents around a peak, estimates the peak from the intersection of the tangents, calculates a time delay T of the peak, and provides the decision unit 7 with the time delay T. The decision unit 7 calculates a distance corresponding to the time delay T and issues an alarm if necessary. If the temporal intervals Δt of the sampling points correspond to a distance of, for example, 10 m, step 409 calculates a distance L corresponding to the time delay T as L=10×T / Δt (m).

Figure 40:
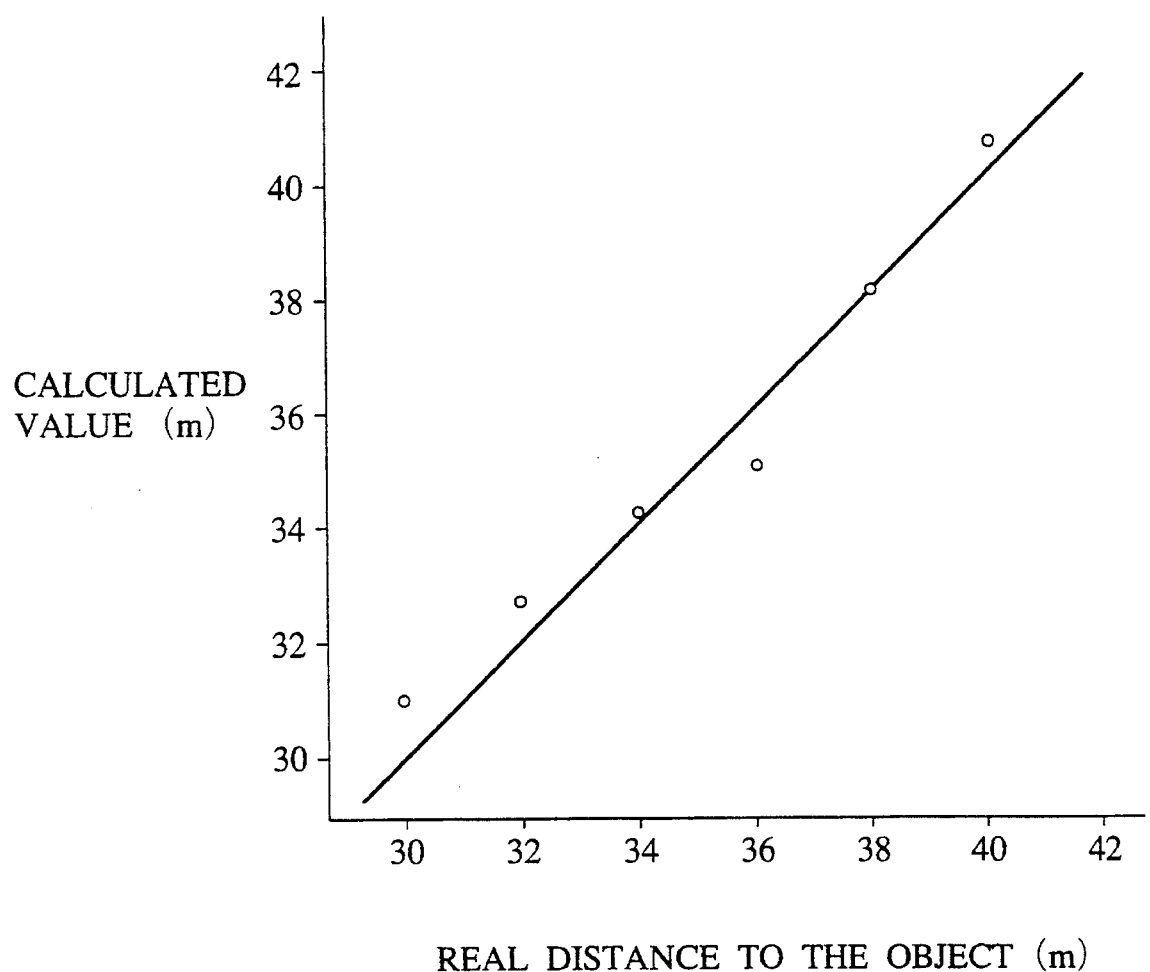
FIG. 40 is a graph showing accuracy of the ninth embodiment in measuring distance.
Figure 41:
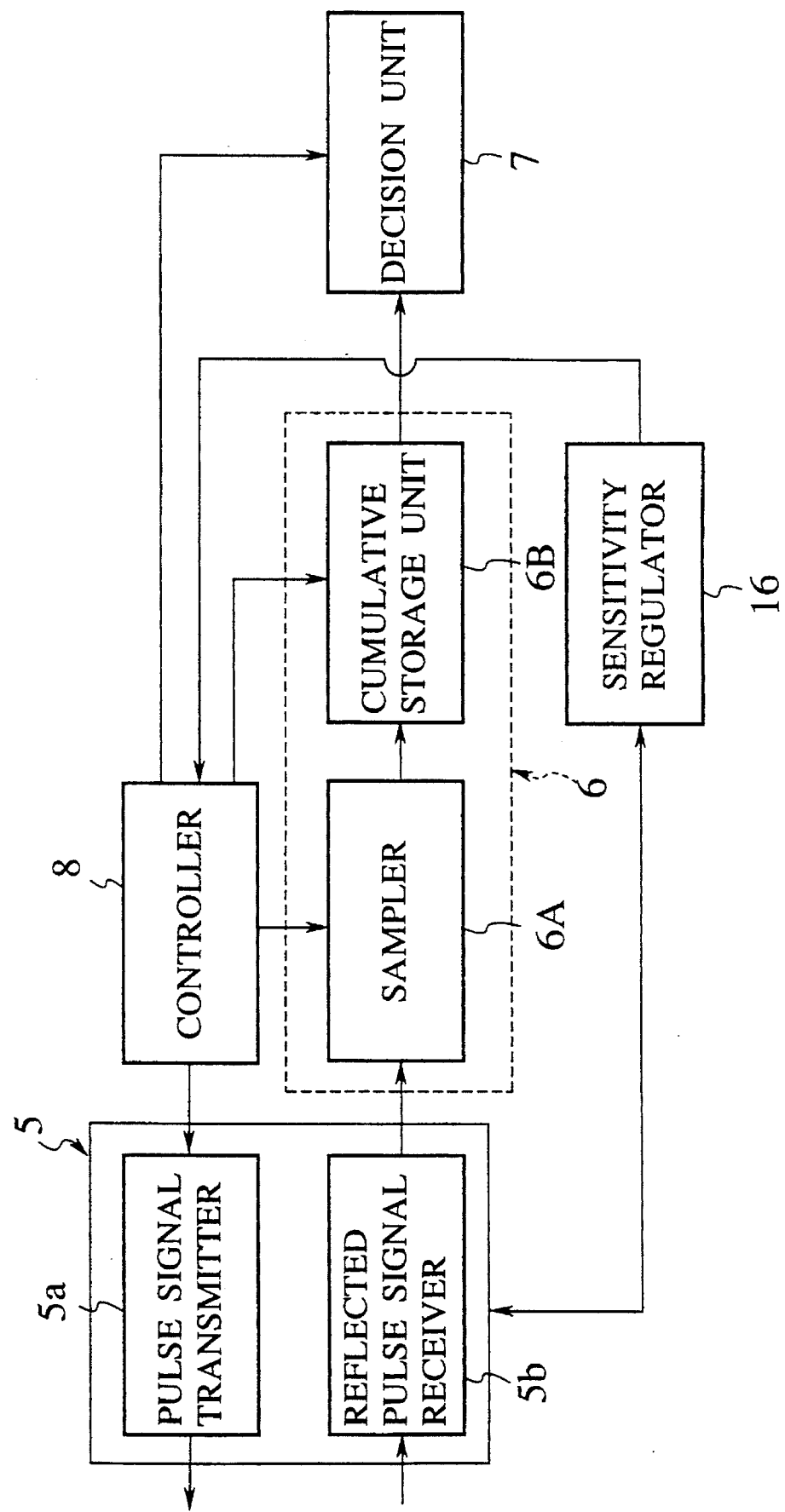
FIG. 41 is a block diagram showing a 10th embodiment of the present invention.

The operation of the decision unit 7 may be any one of the preceding embodiments. The ninth embodiment may be employed to detect a relative speed. The approximation technique of the peak detector 15 of the ninth embodiment is not limited to the one mentioned above. Other approximation techniques such as a quadratic curve approximation involving time on an X-axis and cumulative data on a Y-axis may be employed. In this way, the peak detector 15 is capable of finding a peak of a received signal even if it is positioned between two sampling points. This embodiment improves distance measurement accuracy without dividing sampling points. FIG. 40 shows results of measurement carried out by the radar apparatus of the ninth embodiment with sampling points being set at intervals of 10 m and targets being placed at intervals of 2 m within 10 m between distances of 30 to 40 m. The targets are correctly measured without dividing the sampling intervals into small ones.

In this way, the ninth embodiment of the present invention finds an approximate curve connecting sampling points whose accumulated values exceed each a threshold, estimates a peak on the approximate curve, obtains a delay time from the timing of signal transmission to the peak, and calculates a distance corresponding to the delay time. This embodiment is capable of precisely measuring the distance to a target even if the target is present between adjacent sampling points. Namely, this embodiment is capable of accurately measuring the distance to a target even with rough sampling points.

Figure 42:
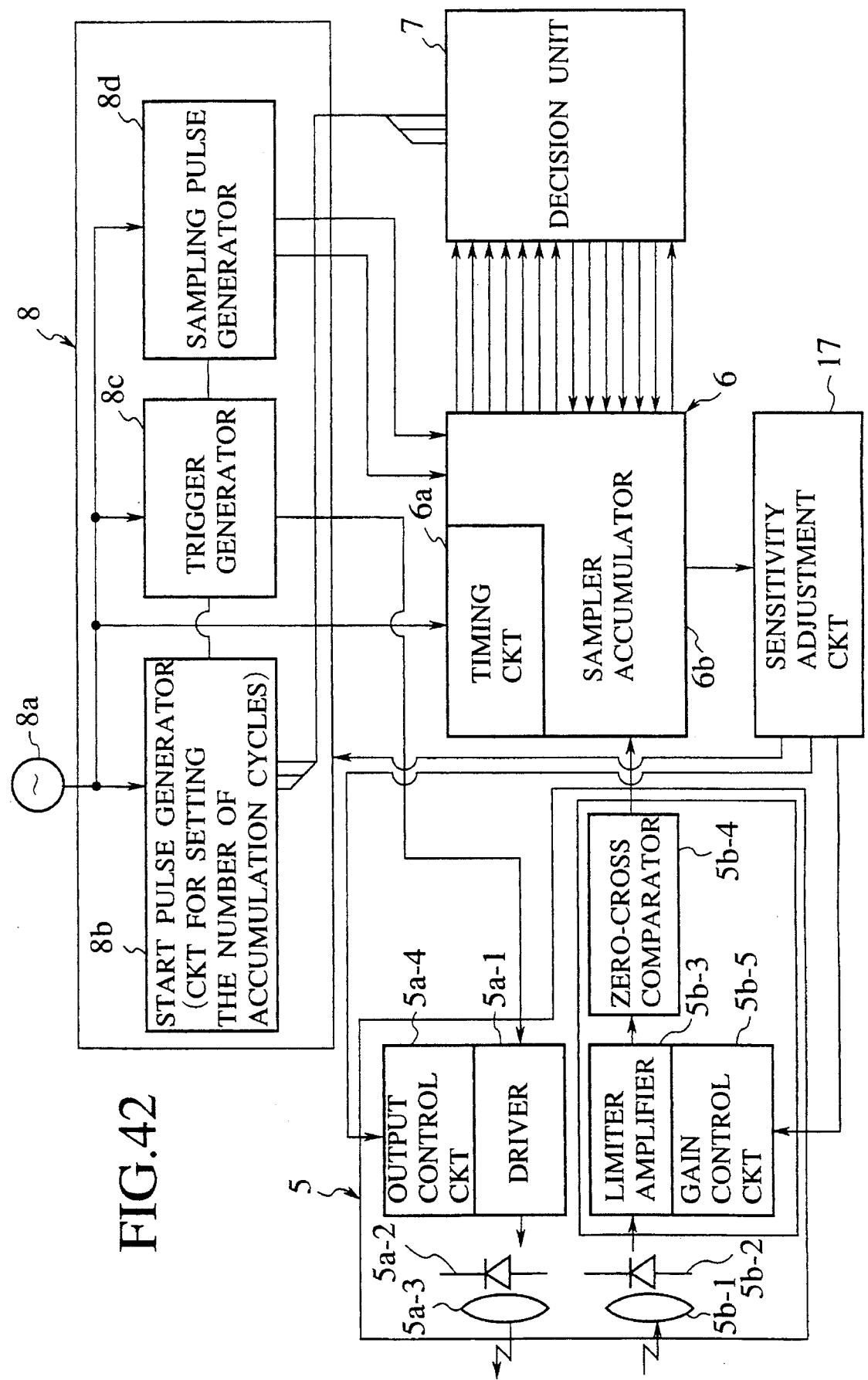
FIG. 42 is a block diagram showing a circuit of the th embodiment.

A radar apparatus according to the 10th embodiment of the present invention will be explained with reference to FIGS. 41 to 47. This embodiment is characterized by a sensitivity regulator 16. The sensitivity regulator 16 decreases the sensitivity of the radar apparatus if a normalized value of one sampling point stored in an operational storage unit 6 is above an upper limit, and increases the sensitivity if none of normalized values of sampling points is above a lower limit. The other parts of this embodiment are the same as those of the radar apparatus of FIG. 1 and are represented with like reference marks. FIG. 42 shows the details of the 10th embodiment. Compared with the radar apparatuses of FIGS. 2 and 16, the radar apparatus of the 10th embodiment has additional elements. A radar head 5 of the 10th embodiment has a pulsesignal transmitter 5a, which consists of a driver 5a-1 provided with an additional output control circuit 5a-4 for variably controlling a pulsesignal to be transmitted. A signal receiver 5b consists of a limiter amplifier 5b-3 provided with an additional gain control circuit 5b-5 for providing a variable gain control function, i.e., an AGC function. An output/gain adjustment circuit 17 is a microcomputer and serves as the sensitivity regulator 16 of FIG. 41. The adjustment circuit 1V may be a discrete circuit, or a software program executed by the computer that forms a decision circuit V. The output control circuit 5a-4 for automatically controlling a transmission pulse may be a potentiometer, which automatically adjusts, in response to an external signal, an output resistor of the driver 5a-1, to thereby adjust a current or a voltage applied to a light emitting element 5a-2 such as a laser diode. The gain control circuit 5b-5 for automatically adjusting the gain of the limiter amplifier 5b-3 may be a standard AGC circuit.

An operation of the radar apparatus of the 10th embodiment will be explained. A sampler accumulator 6b of an operational storage unit 6 stores accumulated values of sampling points. The output/gain adjustment circuit 17 checks, after the completion of each distance measurement operation, each normalized value obtained by dividing the accumulated value of each sampling point by the number of cumulative operations. If any one of the normalized values is above an upper limit A, the adjustment circuit 17 provides an instruction to lower the output power of a transmission signal and/or suppress the gain of a received signal. On the other hand, if each of the normalized values is blow a lower limit B, the adjustment circuit 17 provides an instruction to increase the output power of a transmission signal and/or increase the gain of a received signal. The lower limit B is usually a threshold TH. Upon receiving the instruction to increase or decrease the output power of a transmission signal, the output control circuit 5a-4 increases or decreases the power of the driver 5a-1 step by step at a predetermined pitch, to strengthen or weaken a transmission pulsestep by step. Upon receiving the instruction to increase or decrease the gain of a received signal, the gain control circuit 5b-5 increases or decreases the gain of the limiter amplifier 5b-3 step by step at a predetermined pitch, to increase or decrease the strength of a received signal step by step. After the completion of a distance measuring operation carried out after the output and/or gain adjustment, normalized values are again checked. If any one of them is still above the upper limit A, the output and/or gain decreasing operation is repeated. On the other hand, if all of the normalized values are still below the lower limit B, the output and/or gain increasing operation is repeated. As a result, normalized values of the sampling points for detecting a reflected pulse are put between the upper and lower limits A and B.

Figure 45:
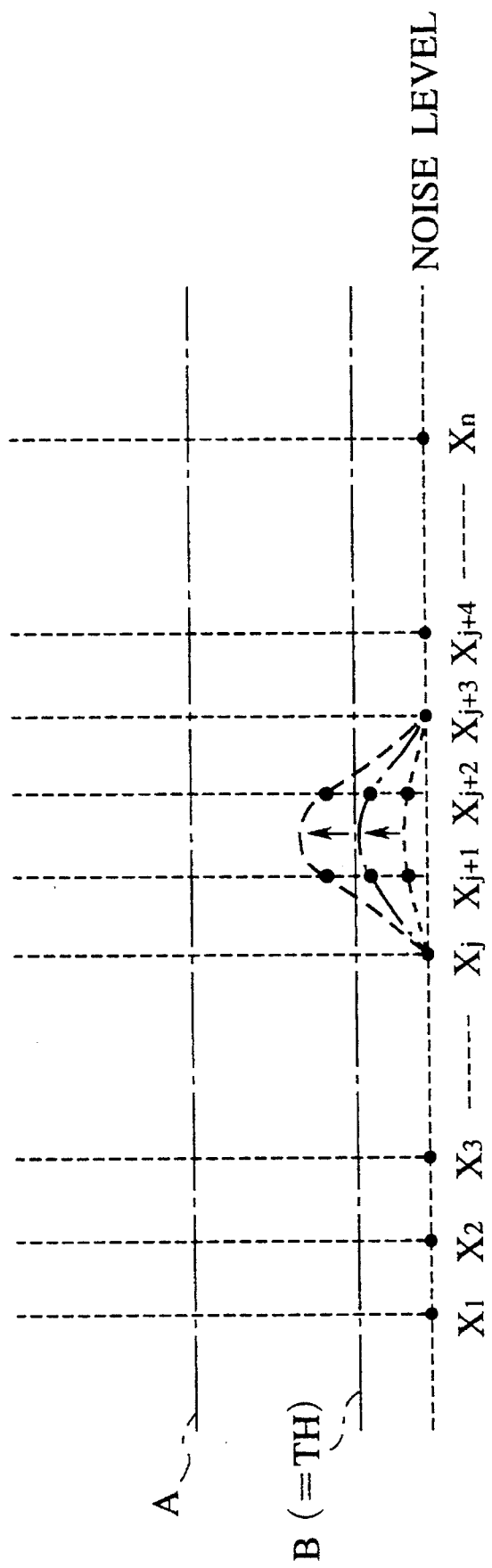
FIG. 45 explains an output gain increasing operation of the 10th embodiment.

The steps of automatically adjusting the sensitivity of the radar apparatus by adjusting an output and/or a gain will be explained with reference to the flowchart of FIG. 43. Step 420 sets a maximum gain and a maximum output to prevent excessive gain and output. Step 421 and the following steps are repeated whenever a distance measuring operation is carried out. The steps 421 and 422 carry out a distance measuring operation. In step 423, the output/gain adjustment circuit 17 scans accumulated values of sampling points stored in the sampler accumulator 6b and determines whether or not any one of normalized values of the accumulated values is above the upper limit A. If there are sampling points such as Xi+1 and Xi+2 of FIG. 44 whose normalized values are each above the upper limit A, it is determined that the distance measuring sensitivity of the radar apparatus is too high. Accordingly, the adjustment circuit 17 provides output and/or gain reduction instructions to decrease the output power of a transmission pulse and/or the gain of a received signal by one step in step 424. Then, the next distance measuring operation is carried out. If the step 423 determines that there is no normalized value above the upper limit A, step 425 checks to see whether or not there is any sampling point whose normalized value is above the lower limit B. If there is no normalized value that exceeds the lower limit B as shown in FIG. 45, it is determined that the sensitivity of the radar apparatus is too weak. In FIG. 45, the lower limit B is equal to a threshold TH. The adjustment circuit 17 provides output and/or gain increase instructions to increase the output power of a transmission pulse and/or the gain of a received signal by one step in step 426. Then, the next distance measuring operation is carried out. The steps 421 to 426 are repeated until the normalized values of all of the sampling points are below the upper limit A and any one of them is above the lower limit B. These steps automatically optimize the distance measurement sensitivity of the radar apparatus. Once the sensitivity is automatically adjusted in this way, the decision circuit 7 carries out an original distance calculation process in step 427.

Automatically adjusting the sensitivity of the radar apparatus enables the radar apparatus to measure the distance to a far target as well as the distance to a near target. If the output power of a transmission signal and the gain of a received signal are fixed to large values to measure a far target, normalized values of the sampling points Xi+1 and Xi+2 of FIG. 44 will reach a saturation value S above the upper limit A when measuring the distance to a near target. Then, it will be impossible to correctly measure the distance to the near target. On the other hand, if the output power of a transmission signal and the gain of a received signal are fixed to small values to measure a near target, normalized values of the sampling points XJ+1 and XJ+2 of FIG. 45 are below the threshold TH when measuring a far target. In this case, the distance to the far target will not be measured even if a reflected pulse from the target is detected. The sensitivity adjustment mentioned above solves these problems, and the radar apparatus may receive a reflected pulse from a target at optimum reception strength and correctly measures the distance to the target without regard to the length of the distance. This results in improving the reliability of a distance measuring operation. The automatic sensitivity adjustment is not limited to that mentioned above. For example, the sensitivity adjustment may be carried out by adjusting the gain of a received signal at first, and if it is insufficient, the output power of a transmission signal will be adjusted. Alternatively, the sensitivity adjustment may be carried out by adjusting the output power of a transmission signal at first, and if it is insufficient, the gain of a received signal will be adjusted. To simplify a circuit structure, the sensitivity adjustment may be carried out only by adjusting the gain of a received signal, or only by adjusting the strength of a transmission signal.

Figure 46:
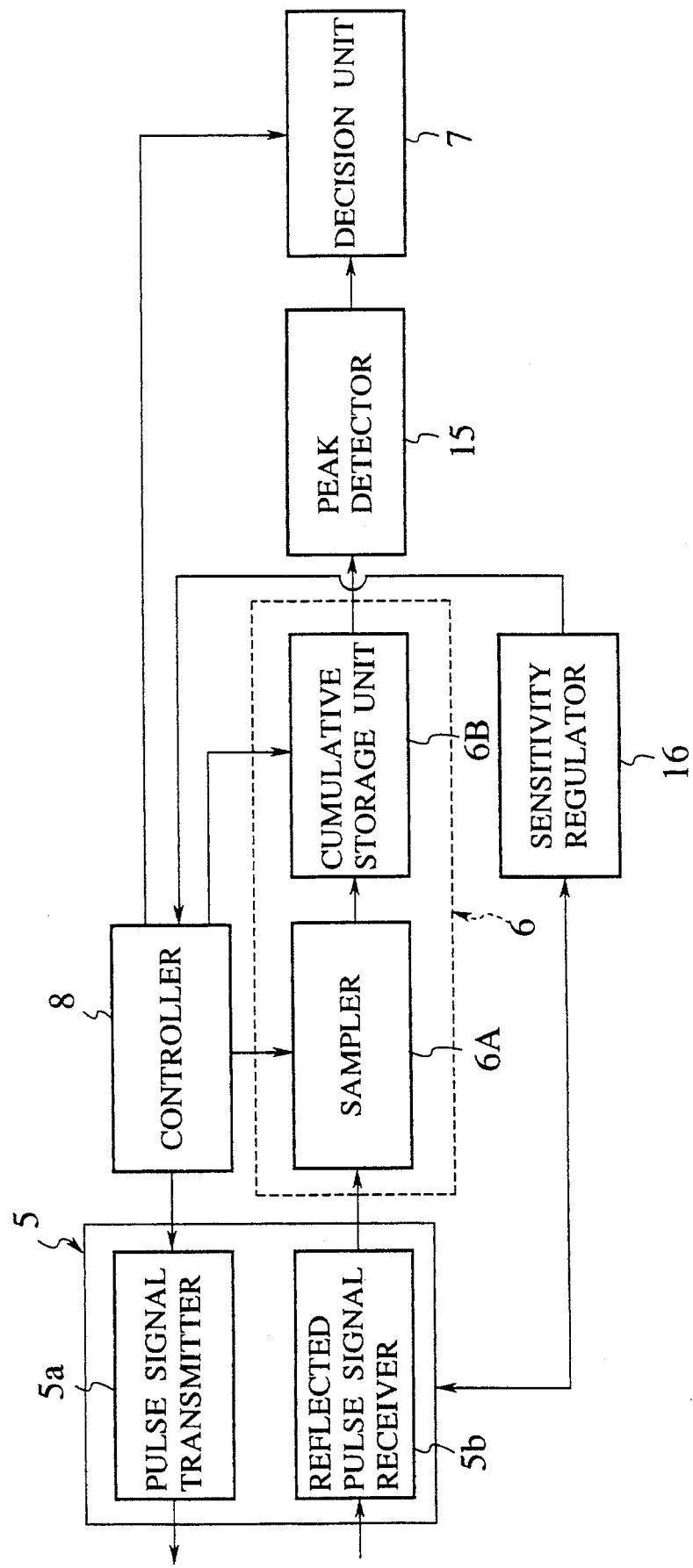
FIG. 46 is a block diagram showing a modification of the 10th embodiment.
Figure 47A:
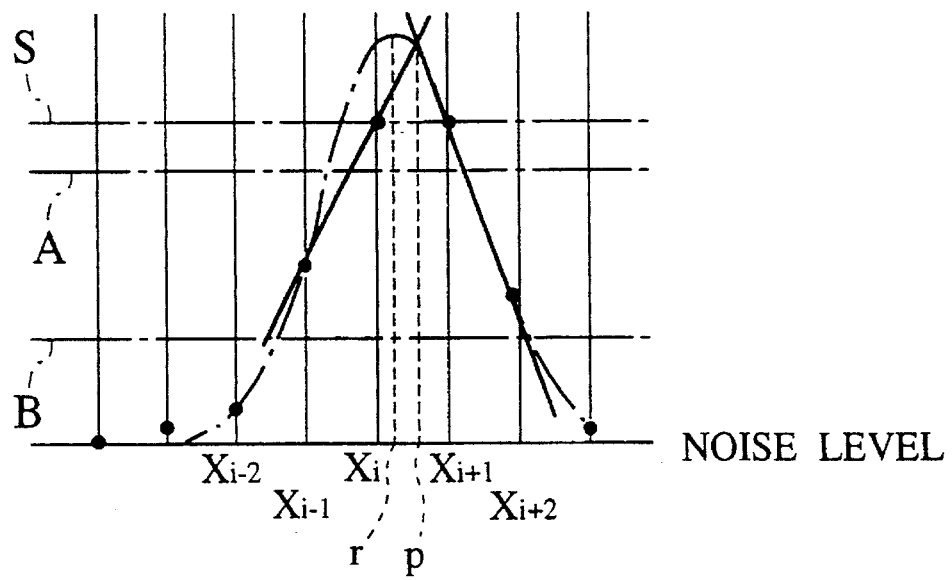
FIGS. 47A and 47B explain output gain adjusting and peak detecting operations of the modification of the 10th embodiment.
Figure 47B:
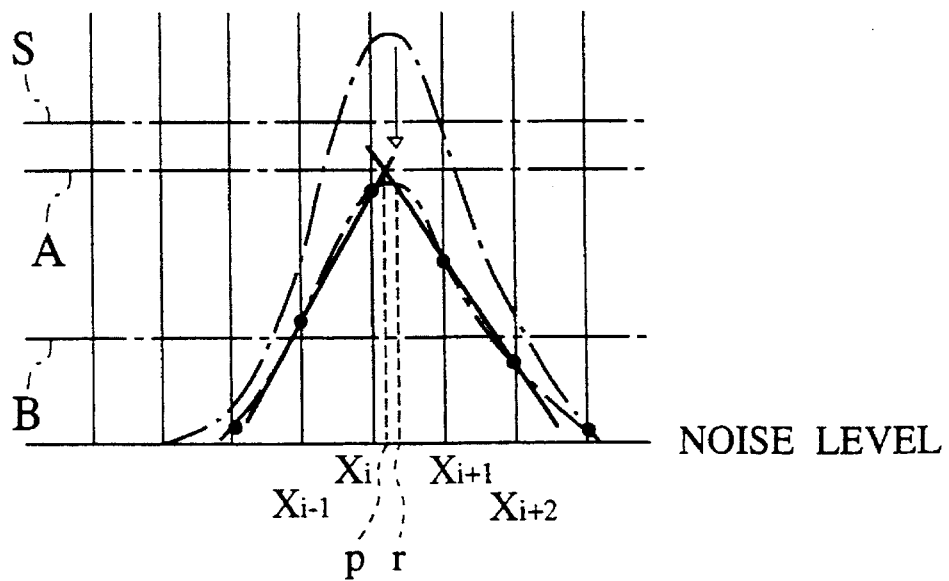
Figure 48:
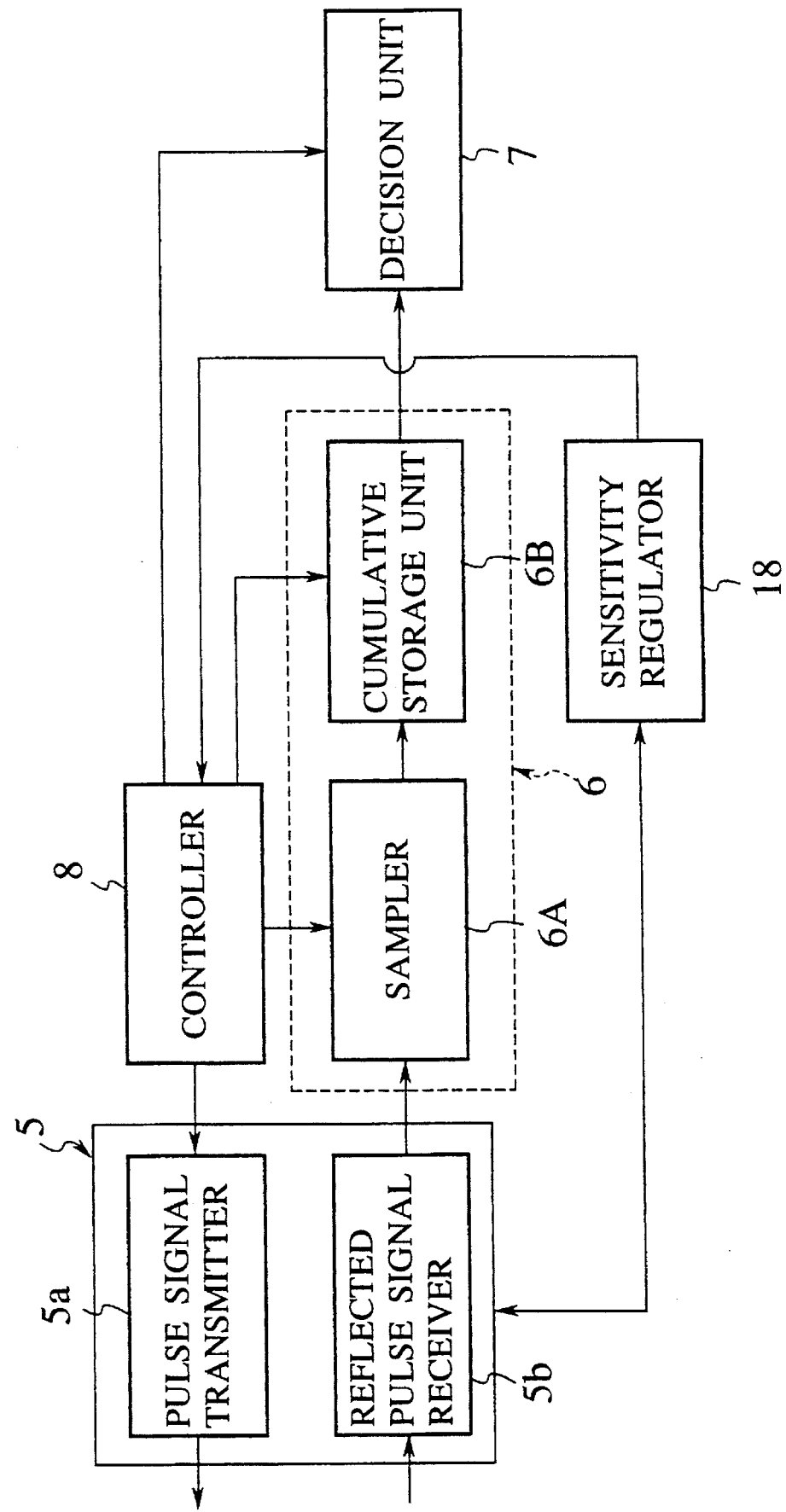
FIG. 48 is a block diagram showing an 11th embodiment of the present invention.

FIG. 46 shows a modification of the 10th embodiment. This modification adds the sensitivity regulator 16 of the 10th embodiment to the radar apparatus having the peak detector 15 of the ninth embodiment of FIG. 36. If there is no sensitivity regulator 16 as shown in FIG. 47A, the peak detector 15 may detect a peak p that deviates from an actual peak r on a received signal, if the normalized value of a sampling point Xi reaches a saturation value S. If the sensitivity regulator 16 is provided as shown in FIG. 47B, the automatic sensitivity adjustment may put the normalized value of every sampling point below the upper limit A, to correctly detect a peak p. This modification improves distance measuring accuracy.

In this way, the radar apparatus of the 10th embodiment decreases the sensitivity thereof if the accumulated value of any one of sampling points is above an upper limit, and increases the sensitivity if the accumulated value of none of the sampling points is above a lower limit, to thereby always maintain each accumulated value at a proper level, correctly detect the presence of a target, and accurately calculate the distance to the target. The sensitivity regulator of the 10th embodiment adjusts the strength of a transmission pulse and/or the amplification gain of a received signal, to always maintain an accumulated value at a proper level, to thereby correctly detect the presence of a target and accurately calculate the distance to the target.

Figure 49:
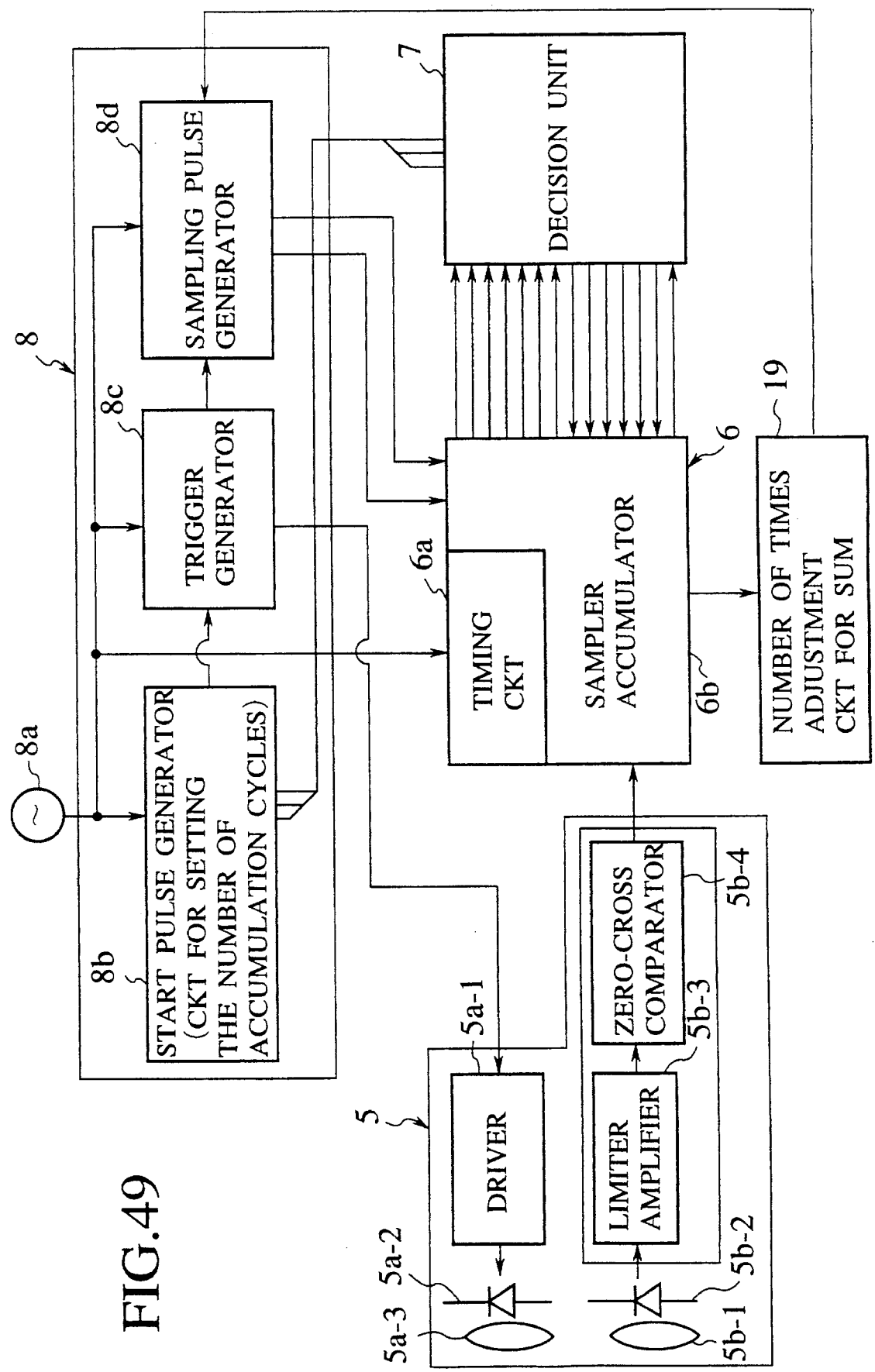
FIG. 49 is a block diagram showing a circuit of the 11th embodiment.

A radar apparatus according to the 11th embodiment of the present invention will be explained with reference to FIGS. 48 to 54. This embodiment is characterized by a sensitivity regulator 18. If any one of the normalized values of sampling points stored in an operational storage unit 6 is above an upper limit that is set in advance, the sensitivity regulator 18 reduces the number of cumulative operations carried out by the operational storage unit 6. If none of the normalized values is above a lower limit that is set in advance, the sensitivity regulator 18 increases the number of cumulative operations carried out by the operational storage unit 6. In this way, the sensitivity regulator 18 automatically sets the number of cumulative operations to a required minimum, to complete a distance measuring operation within a shortest time with a sufficient S/N ratio. The other parts of this embodiment are the same as those of the radar apparatus of FIG. 1 and are represented with like reference marks. FIG. 49 shows the details of the 11th embodiment. In addition to the radar apparatus of FIGS. 2 and 31, the 11th embodiment of FIG. 49 has a circuit 19 for adjusting the number of cumulative operations. The circuit 19 corresponds to the sensitivity regulator 18 of FIG. 48 and is a microcomputer. The circuit 19 may be realized by a software program executed by a computer that forms a decision circuit 7. An operation of the adjustment circuit 19 will be explained. A sampler accumulator 6b of the operational storage unit 6 stores accumulated values of respective sampling points. Each of the accumulated values is divided by the number of cumulative operations, to provide a normalized value. The adjustment circuit 19 checks each normalized value whenever a distance measuring operation is completed. If any one of the normalized values of the sampling points is above a predetermined upper limit A1 (FIG. 51), the adjustment circuit 19 issues an instruction to decrease the number Na of cumulative operations to be carried out in each distance measuring operation. The number of cumulative operations is 8192 in the preceding embodiments. On the other hand, if all of the normalized values are below a lower limit B1 (FIG. 51), the adjustment circuit 19 issues an instruction to increase the number of cumulative operations to be carried out in each distance measuring operation. The decrease or increase instruction issued by the adjustment circuit 19 is supplied to a sampling pulse generator 8d of a controller 8. Then, the sampling pulse generator 8d hastens or delays the timing of providing an end pulse by one step. Namely, the sampling pulse generator 8d counts the number of trigger signals provided by a trigger generator 8c, and when the count (equal to the number of cumulative operations) reaches a set value, provides the end pulse. In this way, the number of cumulative operations carried out by the sampler accumulator 6b is decreased or increased. Namely, the accumulated value of each sampling point for detecting a reflected pulse stored in the sampler accumulator 6b is reduced or increased according to the number of cumulative operations. After the completion of a distance measurement operation carried out after the adjustment of the number of cumulative operations, the adjustment of reducing the number of cumulative operations is again carried out if any one of the normalized values is over the upper limit A1, and the adjustment of increasing the number of cumulative operations is repeated if all of the normalized values are below the lower limit B1. In this way, the 11th embodiment detects a target and calculates the distance to the target with a required minimum of cumulative operations with a sufficient S/N ratio. When there is a target close to the radar apparatus, the S/N ratio is originally large and it is required to quickly detect the target. The 11th embodiment is capable of measuring the distance to a target with a minimum number of cumulative operations, to realize a high-speed operation in particular when the target is close to the radar apparatus.

Figure 50:
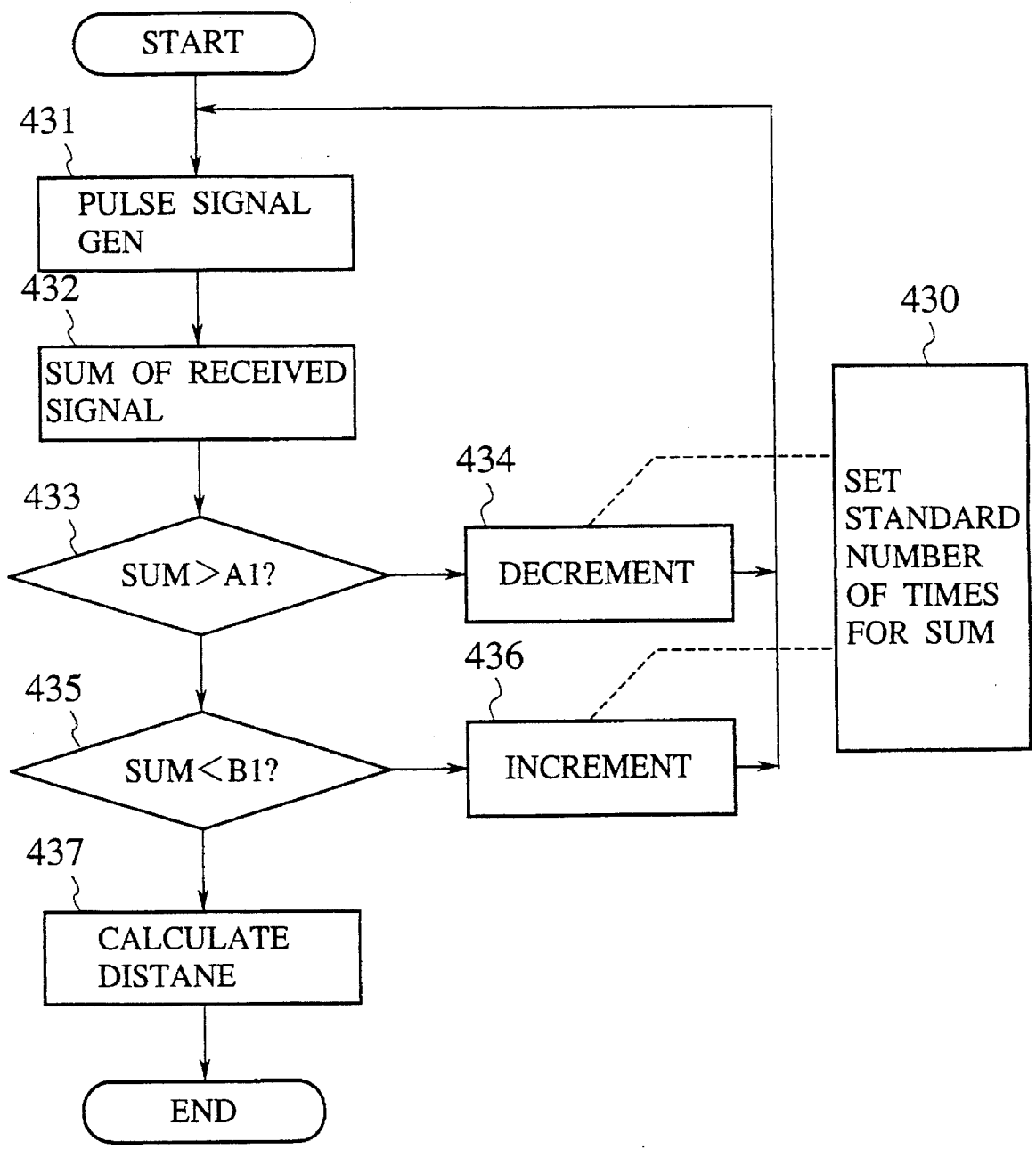
FIG. 50 is a flowchart showing steps carried out by the 11th embodiment.
Figure 51:
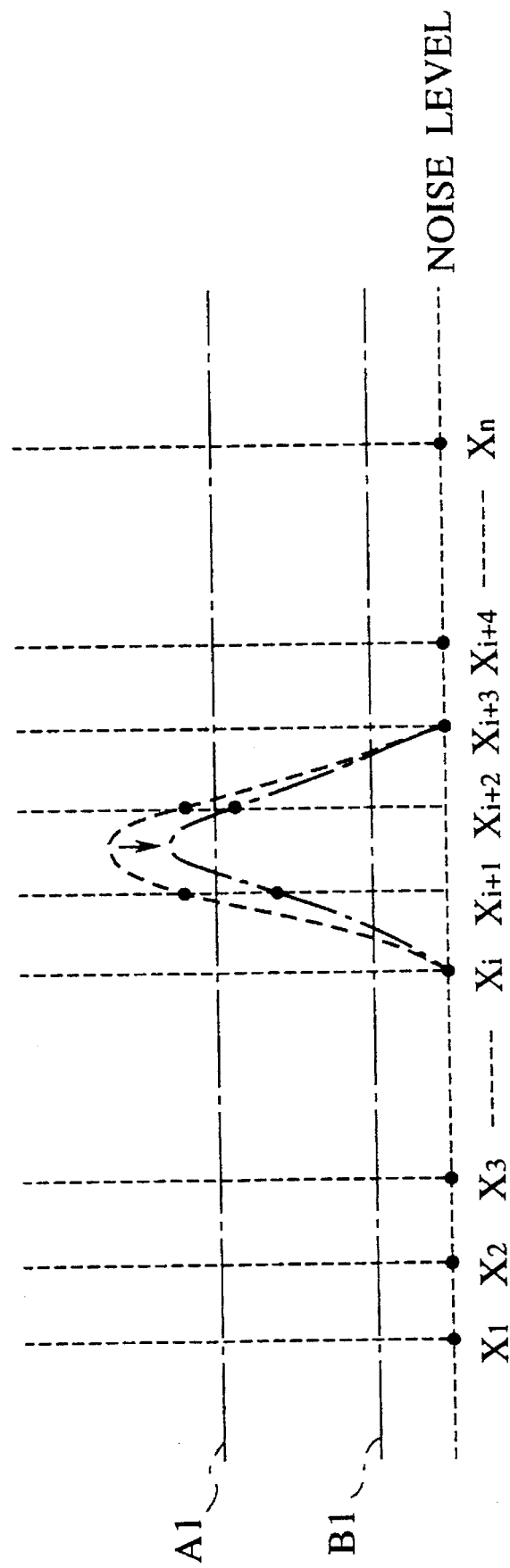
FIG. 51 explains an operation of reducing the number of cumulative operations according to the 11th embodiment.
Figure 52:
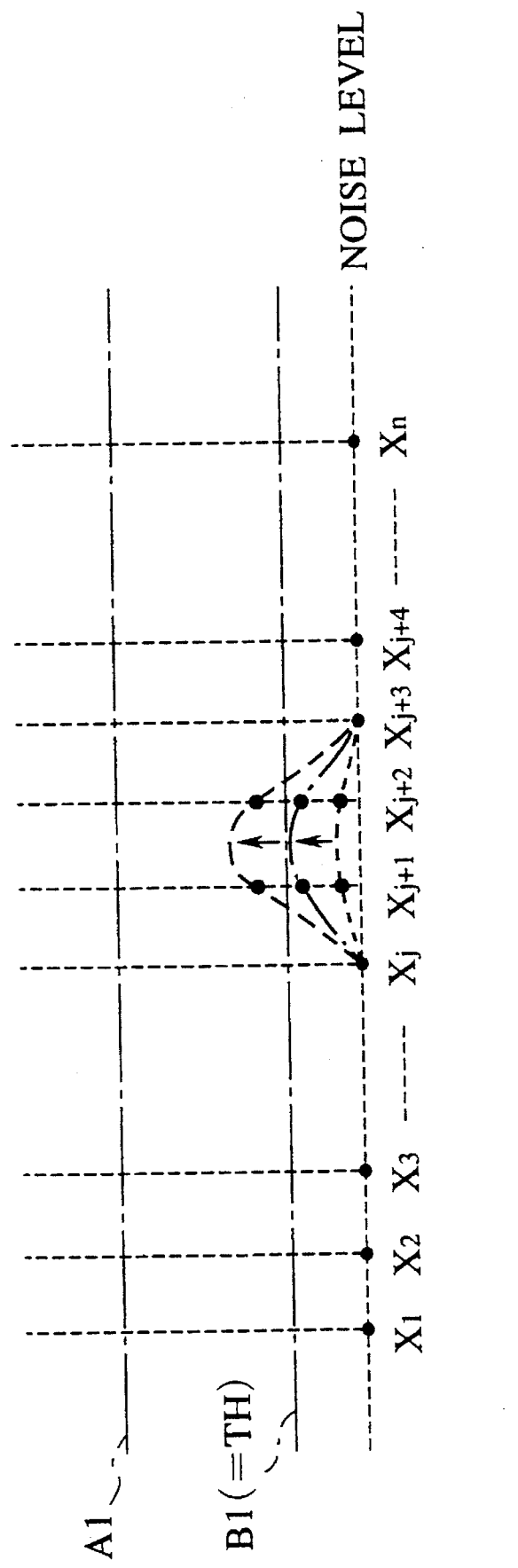
FIG. 52 explains an operation of increasing the number of cumulative operations according to the 11th embodiment.

The steps of automatically adjusting the number of cumulative operations will be explained with reference to the flowchart of FIG. 50. Step 430 sets the number Na of cumulative operations to, for example, 8192. Namely, as in the preceding embodiments, the range of 0 to 130 m is sampled at 14 sampling points at intervals of 10 m. A period of a transmission pulse is 4 μs, and a sampling pulse interval Δt is 66.7 ns. Steps 431 and 432 carry out a distance measuring operation. The circuit 19 for adjusting the number of cumulative operations scans accumulated values of the sampling points stored in the sampler accumulator 6b and checks to see if any one of the normalized values of the accumulated values is above the upper limit A1 in step 488. If the normalized values of, for example, sampling points Xi+1 and Xi+2 are above the upper limit A1 as shown in FIG. 51, the adjustment circuit 19 instructs, in step 434, the sampling pulse generator 8d to hasten the output timing of an end pulse by one step, to reduce the number of cumulative operations to be carried out by the sampler accumulator 6b. Then, the next distance measuring operation is carried out. If the step 433 determines that there is no normalized value exceeding the upper limit A1, step 435 checks to see if there is a sampling point whose normalized value is greater than the lower limit B1. If there is no normalized value that exceeds the lower limit B1 as shown in FIG. 52, the adjustment circuit 19 instructs, in step 436, the sampling pulse generator 8d to delay the output timing of an end pulse by one step, to increase the number of cumulative operations to be carried out by the sampler accumulator 6b. Then, the next distance measuring operation is carried out. These steps 431 to 436 are repeated until normalized values of all the sampling points are below the upper limit A1 and at least one of them is above the lower limit B1. In this way, this embodiment automatically adjusts the number of cumulative operations to a required minimum to detect a target and measure the distance to the target with a sufficient S/N ratio. Once the sensitivity of the radar apparatus is automatically adjusted through the above steps, a decision circuit 7 carries out an original distance measuring process in step 437.

In this way, this embodiment automatically adjusts the number of cumulative operations to detect a target and calculate the distance to the target with a required minimum number of cumulative operations and a sufficient S/N ratio. A target close to the radar apparatus provides a large S/N ratio. Accordingly, it is required to speedily measure the distance to the close target. This embodiment is capable of speedily measuring the distance to the close target with a small number of cumulative operations.

Figure 53:
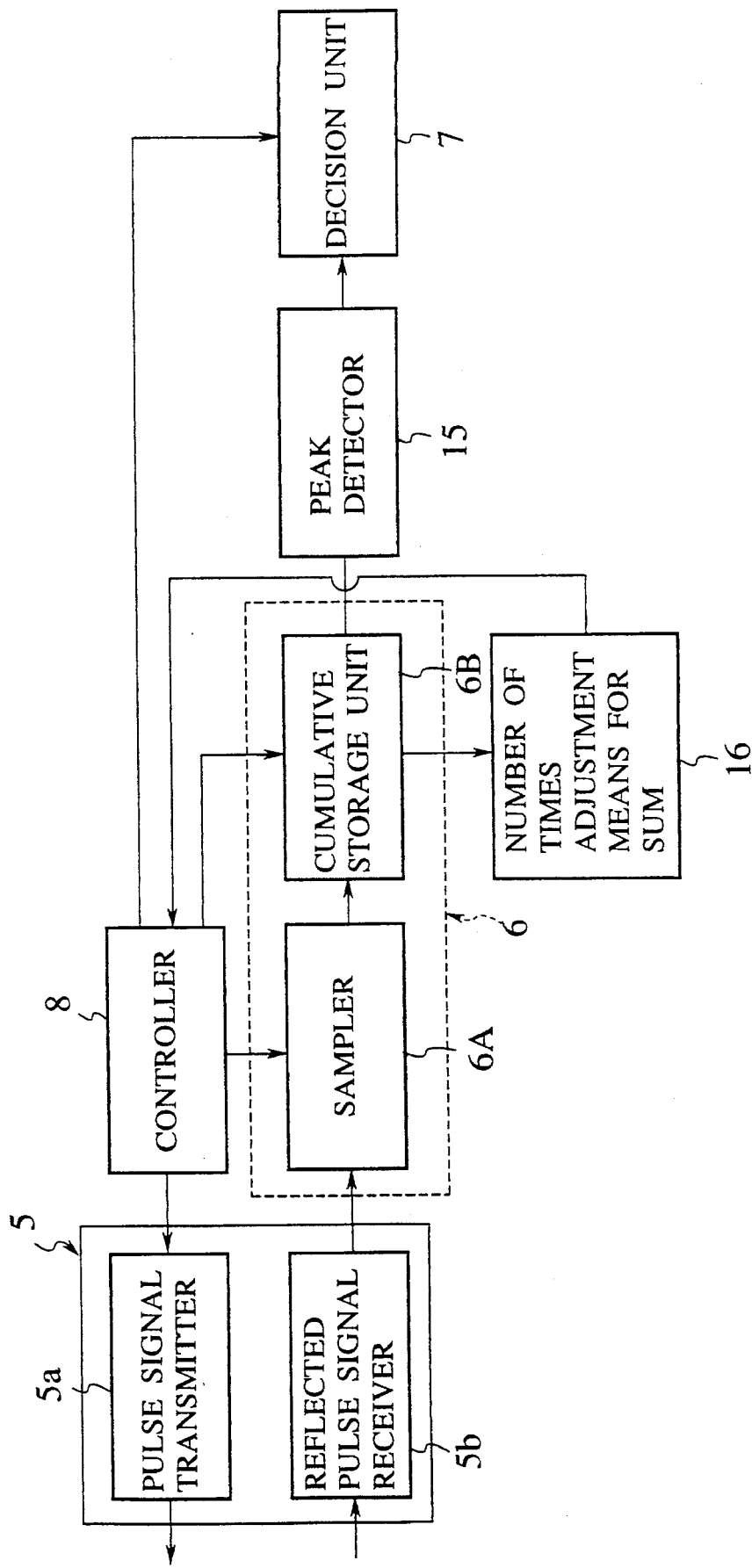
FIG. 53 is a block diagram showing a modification of the 11th embodiment.
Figure 54:
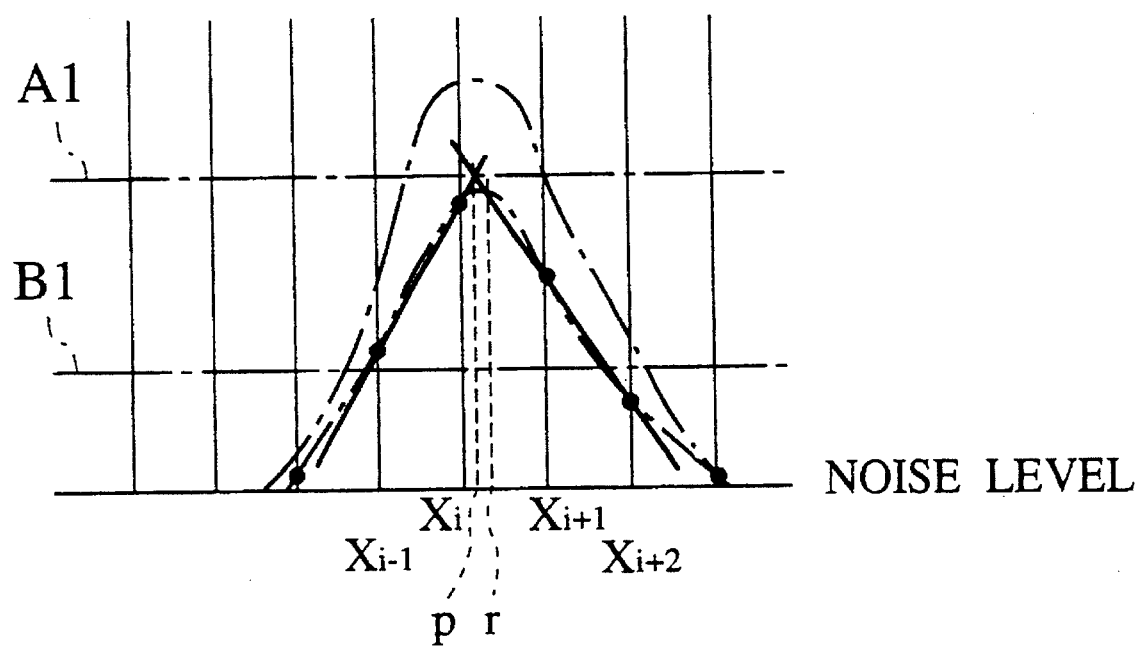
FIG. 54 explains an operation of adjusting the number of cumulative operations according to the modification of the 11th embodiment.

FIG. 53 shows a modification of the 11th embodiment. This modification adds the sensitivity regulator 18 mentioned above to the radar apparatus having the peak detector 15 of the ninth embodiment of FIG. 36. As shown in FIG. 54, this modification automatically optimizes the number of cumulative operations at first and then measures the distance to a target. In this case, the peak detector 15 can correctly quickly detect a peak p.

The 10th and 11th embodiments may be combined together to provide a radar apparatus having the functions of automatically adjusting the output power of a transmission signal, the gain of a received signal, and the number of cumulative operations. An operation of this combination will be explained. Sampling and accumulating operations are carried out 1024 times. If there is any sampling point whose accumulated value is above the upper limit A or A1, the gain of the receiver is decreased and/or the output power of the transmitter is decreased. If there is no sampling point whose accumulated value is above the lower limit after the 1024 sampling and accumulating operations, the gain of the receiver is increased and/or the output power of the transmitter is increased. As a result, an optimum S/N ratio is obtained. When the accumulated values fall between the upper and lower limits, the number of cumulative operations is set to 8192, to always obtain accumulated values with less fluctuations. Thereafter, a normal operation of detecting a reflected signal is carried out. The number of cumulative operations may be 7168 (=8192–1024). In this way, the gain and/or output adjustment is carried out at first with a small number of cumulative operations (quite smaller than a usual number of 8192), to speedily optimize the output power of the transmitter and the gain of the receiver, quickly detect a target, and correctly calculate the distance to the target.

As explained above, this example carries out 1024 sampling and accumulating operations at first. If any one of the accumulated values at sampling points is above the upper limit, the gain of the receiver is decreased and/or the output of the transmitter is decreased. If the accumulated value of every sampling point is below the upper limit, the number of cumulative operations is directly set to 8192, to accumulate values with less fluctuations. Thereafter, a normal operation of detecting a reflected signal is carried out. The number of cumulative operations may be 7168 (=8192–1024). This example firstly adjusts the gain and output power with a mall number of cumulative operations (quite smaller than a usual number of 8192), to speedily optimize the gain and output power. As a result, this example shortens a time for correctly detecting a reflected signal and measuring the distance to a target.

In this way, the radar apparatus of the 11th embodiment employs the circuit for adjusting the number of cumulative operations as the sensitivity regulator, to automatically set the number of cumulative operations to be carried out by the sampler accumulator to a required minimum, to detect a reflected signal with a sufficient S/N ratio. This embodiment is capable of speedily detecting a target and measuring the distance to the target.

A radar apparatus according to the 12th embodiment of the present invention will be explained with reference to FIGS. 55 to 59. Compared with the radar apparatuses of the first to 11th embodiments, the radar apparatus of the 12th embodiment employs a different operational storage unit 6.

According to the first to 11th embodiments shown in, for example, FIGS. 1 and 16, the operational storage unit 6 samples a binary signal from the radar head 5 at, for example, 14 sampling points, accumulates sampled values predetermined times, compares the normalized value of each accumulated value with a threshold, finds a sampling point whose normalized value is above the threshold, calculates a time delay Td corresponding to the found sampling point, and measures the distance to a target according to the time delay Td. On the other hand, the radar apparatus of the 12th embodiment of FIG. 55 employs a radar head 21 that provides a binary signal 213 to an integration circuit 22. The integration circuit 22 integrates the binary signal "m" times for each of "n" range blocks. These range blocks correspond to the sampling points of the first to 11th embodiments. Each of the range blocks is a sampling period corresponding to a sampling pulse interval Δt. An arithmetic unit 23 compares a normalized value of each integrated value with a threshold. If there is any range block (sampling period) whose normalized value is above the threshold, the arithmetic unit 23 calculates, according to a time delay of the range block, the distance to a target.

The structure of the radar apparatus of the 12th embodiment will be explained. The radar head 21 transmits a pulsesignal 211 toward an external target several times at predetermined intervals, receives a signal 212 containing a reflected pulse from the target, and amplifies and converts the received signal into a binary signal 213, which is transferred to the integration circuit 22. The integration circuit 22 integrates the binary signal m times in each range block. The arithmetic unit 23 compares an integrated value 214 of each range block with a threshold. If there is a range block whose integrated value is above the threshold, the arithmetic unit 23 calculates a distance corresponding to the range block and provides distance data 215. The distance data 215 indicates the presence of a target and the distance to the target. A control circuit 24 controls the circuits 21 to 23 and provides control signals such as a trigger signal 216, input timing signal 217, and output timing signal 218. The radar head 21 has substantially the same structure as that of the first embodiment of FIG. 2. The radar head 21 receives a predetermined number of trigger signals 216 at predetermined intervals from the control circuit 24. In response to each trigger signal 216, a transmitter 21a transmits a pulsesignal 211 that may be an optical signal, an ultrasonic wave signal, or an electromagnetic wave signal. A receiver 22b receives an external signal 212 of the same kind as the transmitted pulsesignal 211. A limiter amplifier (AMP) 21c provides a high gain to limit the received signal 219 containing noise. A zero-cross comparator (CMP) 21d determines whether or not an instantaneous value of the amplified signal from the amplifier 21c is greater than a reference value of, for example, 0 V and provides a binary signal. The comparator 21d serves as a binary circuit. The comparator 21d provides the integration circuit 22 with the binary signal 213.

Figure 56:
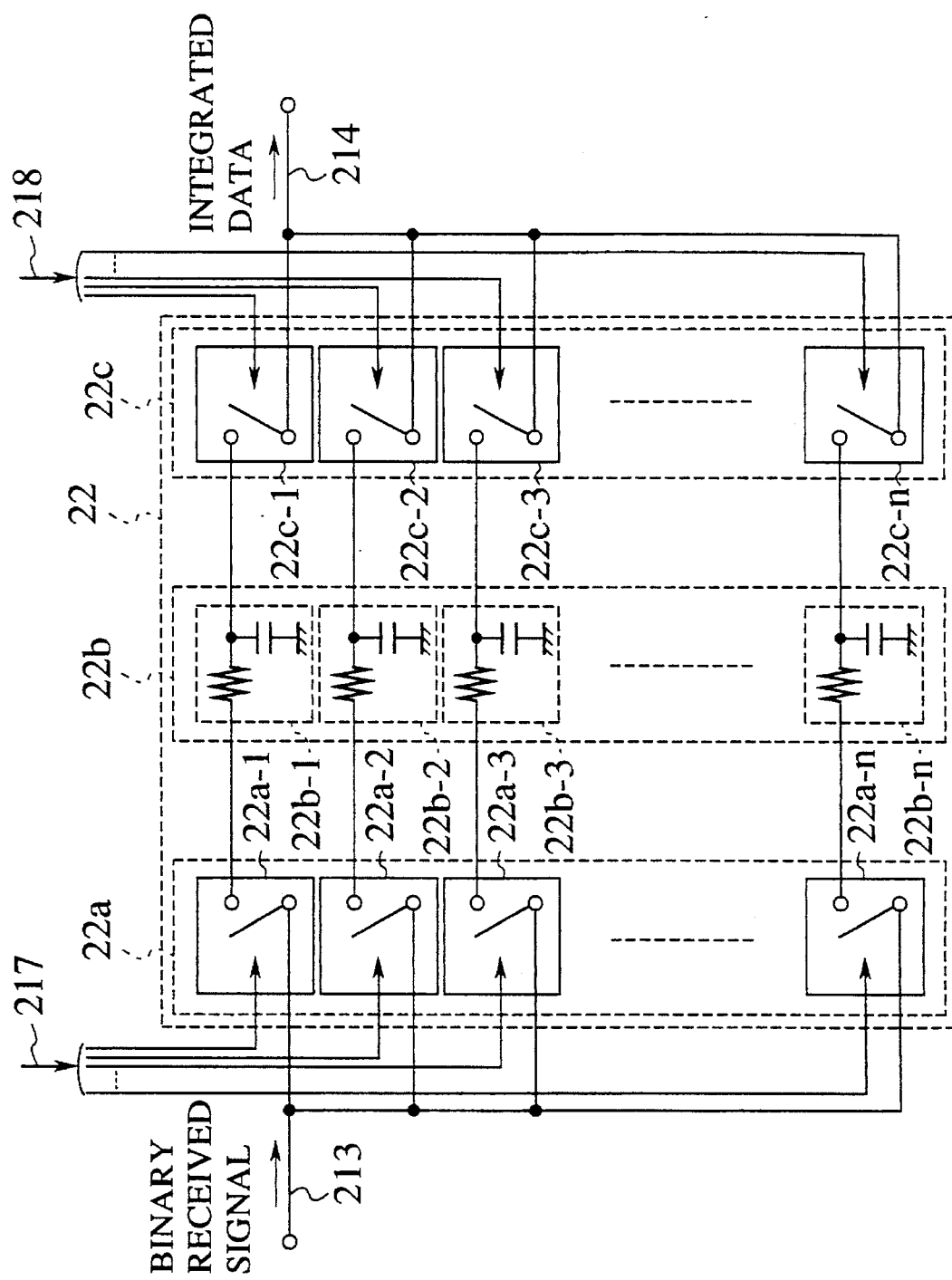
FIG. 56 is a block diagram showing an integration circuit of the 12th embodiment.

FIG. 56 shows the structure of the integration circuit 22. The binary signal 231 is divided into "n" range blocks (sampling periods) each having a temporal width of Δt. The integration circuit 22 integrates each of the range blocks m times. For this purpose, the integration circuit 22 has "n" analog input switches 22a-1 to 22a-n, "n" RC integrators 22b-1 to 22b-n for integrating the binary signal 213 that is provided during ON time of the corresponding input switches 22a-1 to 22a-n, and "n" analog output switches 22c-1 to 22c-n for passing the integrated values of the integrators 22b-1 to 22b-n, respectively. The input switches 22a-1 to 22a-n are turned ON and OFF in response to the input timing signal 217 from the control circuit 24. The output switches 22c-1 to 22c-n are turned ON and OFF in response to the output timing signal 218 from the control circuit 24.

Figure 57:
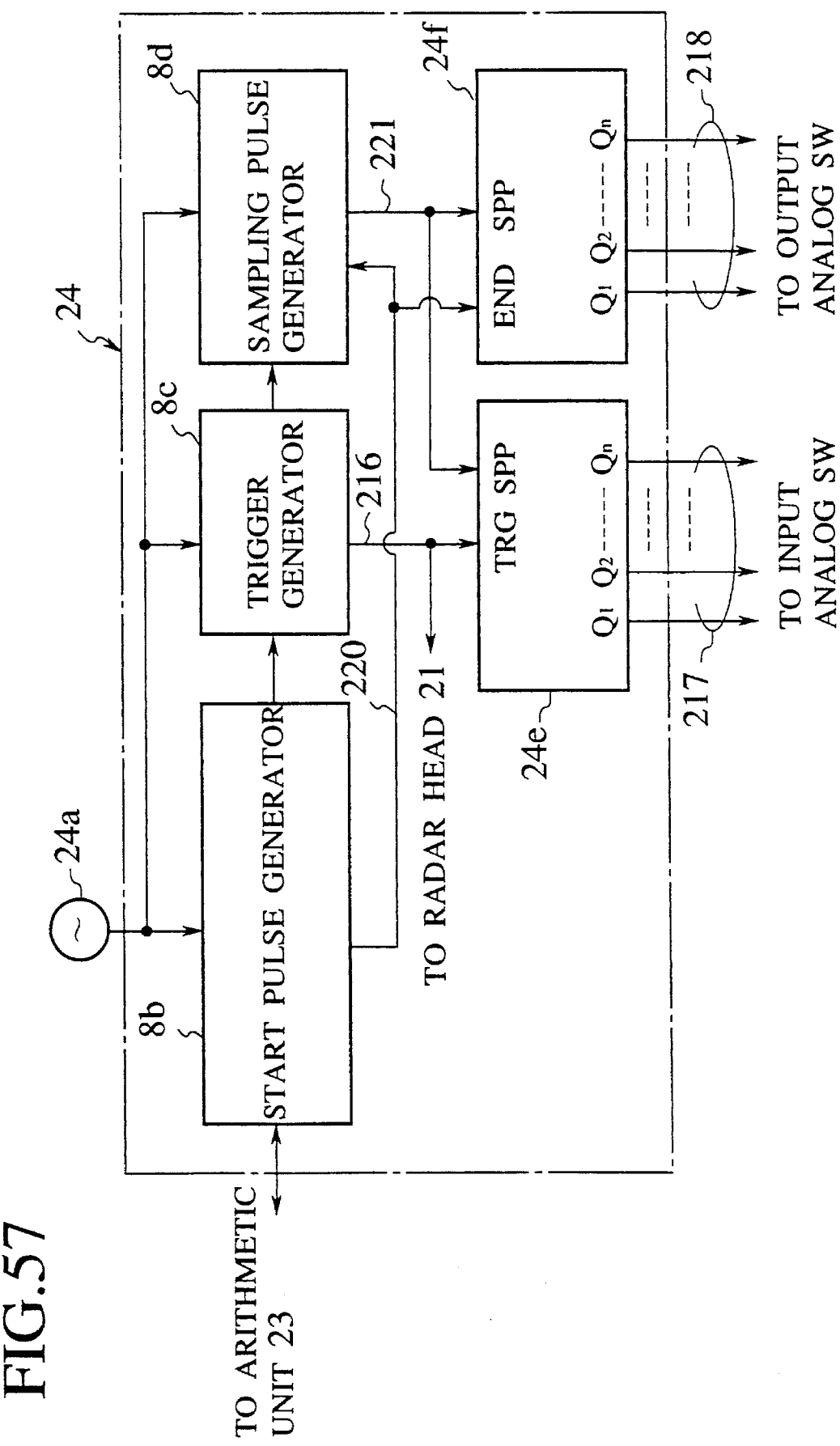
FIG. 57 is a block diagram showing a control circuit of the 12th embodiment.

FIG. 57 shows the control circuit 24. The control circuit 24 has a clock transmitter 24a, a start pulse generator 8b, a trigger generator 8c, and a sampling pulse generator 8d. These elements are the same as those of the control circuit 8 of FIG. 2. The control circuit 24 additionally has an n-bit shift register 24e for providing the input timing signal 217 in response to the sampling pulsesignal from the sampling pulse generator 8d and the trigger signal from the trigger generator 8c, and an n-bit shift register 24f for providing the output timing signal 218 in response to the end pulsesignal 220 from the start pulse generator 8b and the sampling pulsesignal 221 from the sampling pulse generator 8d.

Figure 59:
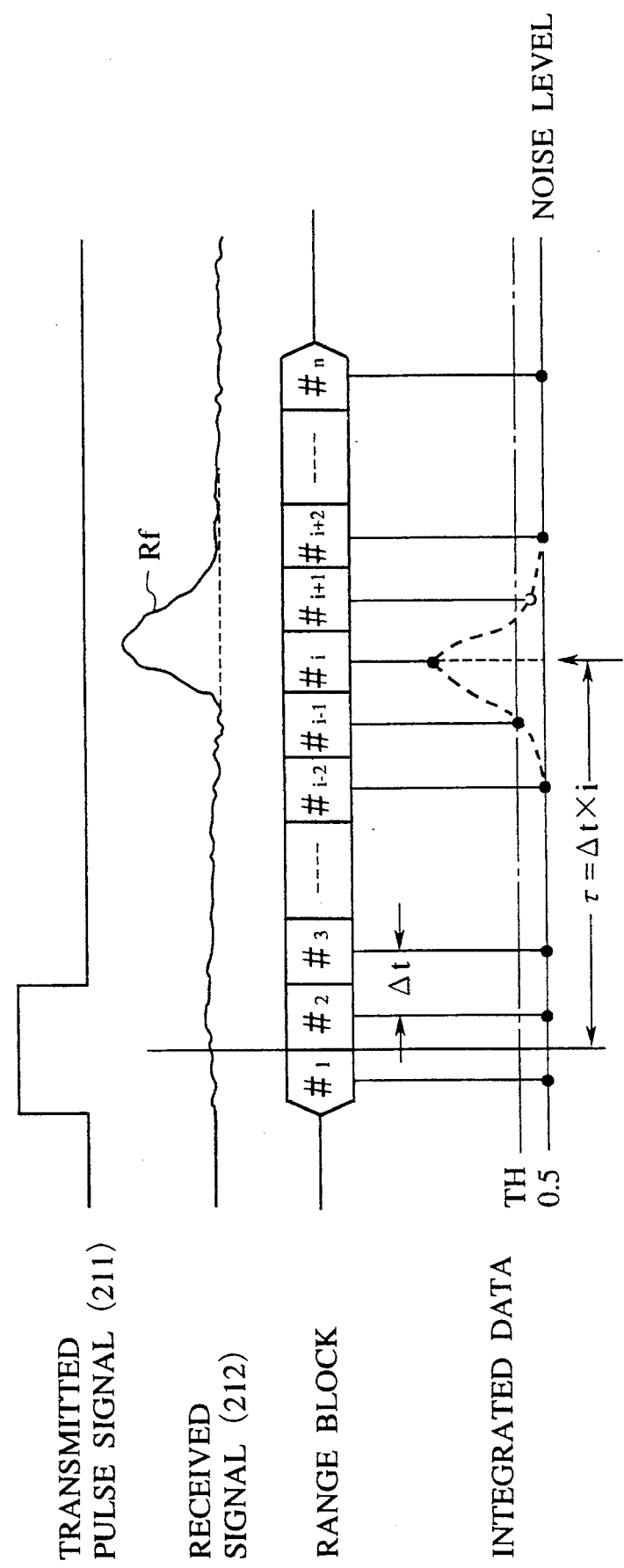
FIG. 59 is a timing chart showing a distance measuring operation of the 12th embodiment.

An operation of the radar apparatus of the 12th embodiment will be explained. The arithmetic unit 23 issues a start instruction to the control circuit 24. The start pulse generator 8b provides the trigger generator 8c with a start pulse. The trigger generator 8c generates trigger signals 216 m times (for example, m=8192) at intervals of, for example, 4 μs. The trigger signals 216 are supplied to the transmitter 21a of the radar head 21. In response to each of the trigger signals 216, the transmitter transmits a pulsesignal 211 as shown in FIG. 59. At the same time, the receiver 21b continuously receives an external signal 212 that resembles the transmitted signal 211. The received signal 219 containing noise is supplied to the limiter amplifier 21c, which amplifies the signal. The amplified signal is converted by the zero-cross comparator 21d into a binary signal 213. The zero-cross comparator 21d determines whether or not an instantaneous value of the received signal 219 is greater than a reference value of, for example, 0 V. If it is smaller than the reference value, the comparator 21d provides 0 V (="0") as the binary signal 213, and if it is greater than the reference value, 5 V (="1") as the binary signal 213. If the received signal 212 contains only noise, the probabilities of 0 and 1 of the signal are each 0.5 The probability of greater than the reference value is between 0.5 and 1 depending on the S/N ratio of the signal. The probability of greater than the reference value and the S/N ratio correspond to each other at the ratio of 1:1. The sampling pulse generator 8d of the control circuit 24 generates n (for example, 14) sampling pulses at intervals of Δt (for example, 66.7 ns) in response to each trigger pulse generated by the trigger generator 8c. In response to each of the sampling pulses, the n-bit shift register 24e sequentially shifts a high level among output terminals Q1 to Qn and sends the input timing signal 217 to the integration circuit 22.

Figure 58:
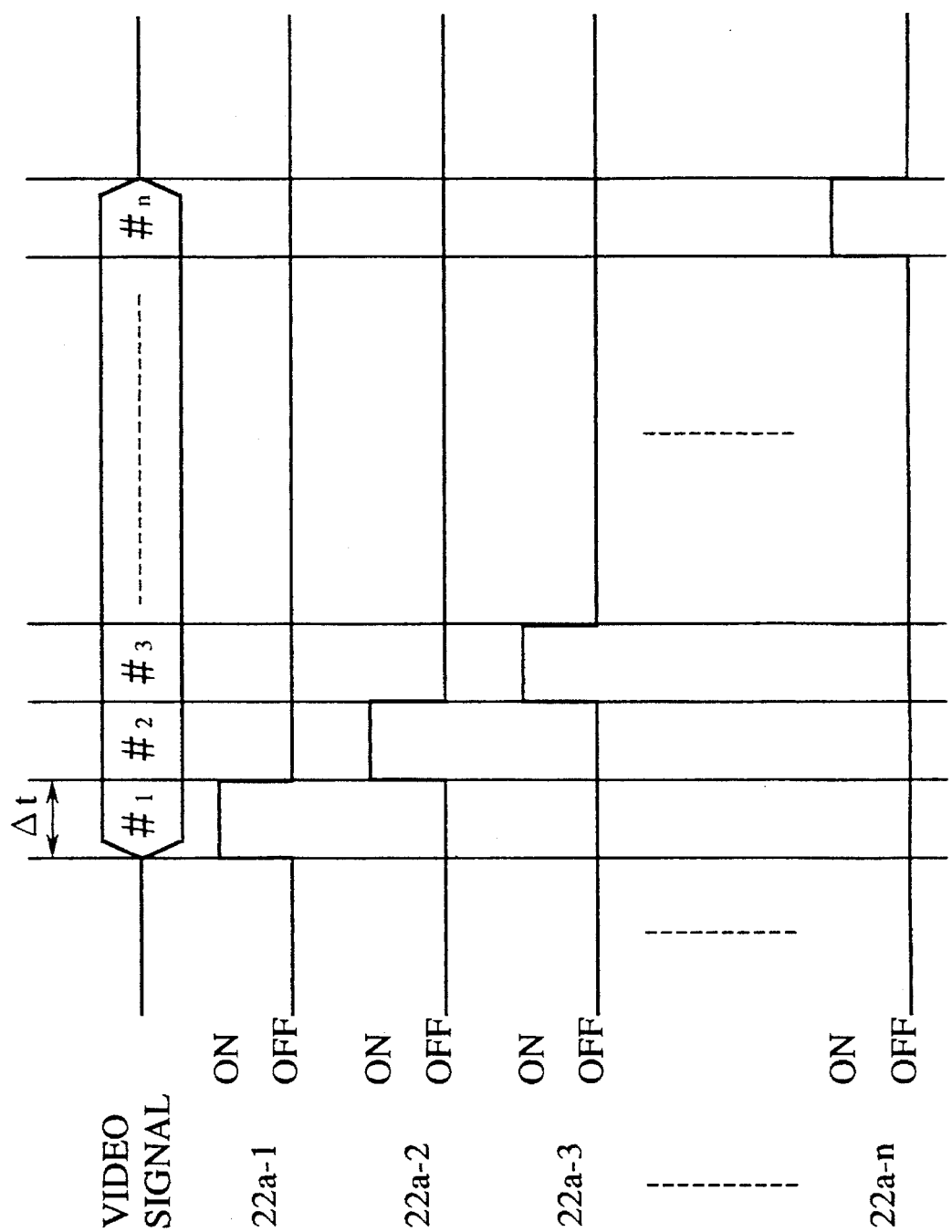
FIG. 58 is a timing chart showing an operation of the integration circuit of the 12th embodiment.

In FIG. 58, one of the analog input switches 22a-1 to 22a-n of the integration circuit 22 is turned ON when a corresponding one of the bits of the input timing signal 217 is high. When the corresponding bit drops to low, the switch in question is turned OFF. While one of the switches 22a-1 to 22a-n is ON, the binary signal 213 is supplied to a corresponding one of the integrators 22b-1 to 22b-n that corresponds to one of the range blocks. The integrator is charged through a capacitor, to integrate the binary signal 213 for the sampling period Δt. In this way, the input analog switches 22a-1 to 22a-n are successively turned ON and OFF one by one. After one integration operation is complete, the next integration operation is carried out in response to a trigger signal. The integration operation is repeated m times in response to m trigger signals. The sampling pulse generator 8d counts the trigger signals. Once m trigger signals have been counted, the end pulse 220 is supplied to the n-bit shift register 24f for controlling output timing. The shift register 24f receives sampling pulses at intervals of Δt from the sampling pulse generator 8d and sequentially shifts a high level among output terminals Q1 to Qn, to provide the integration circuit 22 with the output timing signal 218. One of the analog output switches 22c-1 to 22c-n of the integration circuit 22 corresponding to a high-level bit of the output timing signal 218 is turned ON. When the bit drops to low, the switch in question is turned OFF. While the switch is ON, the switch provides the arithmetic circuit 23 with the integrated value 214 of the integrator connected to the switch. This process is repeated. After receiving n integrated values from the integrators, the arithmetic unit 23 normalizes the integrated values according to the saturation voltage of the integrators of, for example, 5 V representing "1," and checks to see whether or not there is a range block whose normalized value is above a threshold TH.

If the received signal contains only noise, the normalized value thereof will be 0.5, and if it contains a reflected pulse from a target, the normalized value will be between 0.5 and 1 depending on the S/N ratio of the received signal. In FIG. 59, the range block whose normalized value exceeds the threshold is, for example, #i. In FIG. 59, a normalized value is plotted at the center of each range block. This is only for the sake of easy understanding of the relationship between the range block and the normalized value. Namely, each plotted point does not necessarily indicate the normalized value at the center of the range block. The range block #1 indicates a sampling period corresponding to a 0-meter position, range block #2 corresponds to a 10-meter position, range block #3 corresponds to a 20-meter position, and range block #i corresponds to a (i-1)-meter position. This is applicable to all timing charts following FIG. 59. Since the normalized value of the range block #i is above the threshold TH, a time delay τ between the timing of a transmitted pulse and a target detected in the range block #i is calculated as τ=Δt×i. When each range block corresponds to 10 meters, the distance to the target is calculated by multiplying i by 10 meters. In this way, the arithmetic unit 23 provides distance data 215. According to the 12th embodiment, the transmitter 21a repeatedly transmits the pulsesignal 211, and the receiver 21b continuously receives the external signal 212 containing a reflected pulse from a target. The integration circuit 22 repeatedly integrates the received signal 212 in each sampling period. The arithmetic unit 23 normalizes the integrated value of each range block, i.e., each sampling period. Each normalized value is compared with the threshold TH to discriminate the reflected pulse from noise. If there is any range block whose integrated value is above a noise level, a distance corresponding to the range block is calculated as the distance to the target. Even if the received signal contains high-level noise, integration is repeated to improve the S/N ratio of the received signal that contains the reflected pulse. Accordingly, this embodiment is capable of correctly detecting a target and calculating the distance to the target.

In this way, the radar apparatus of the 12th embodiment extracts a sampling period that involves an integrated value greater than a predetermined threshold, calculates a distance corresponding to this sampling period, and automatically correctly finds the distance to a target.

Figure 60:
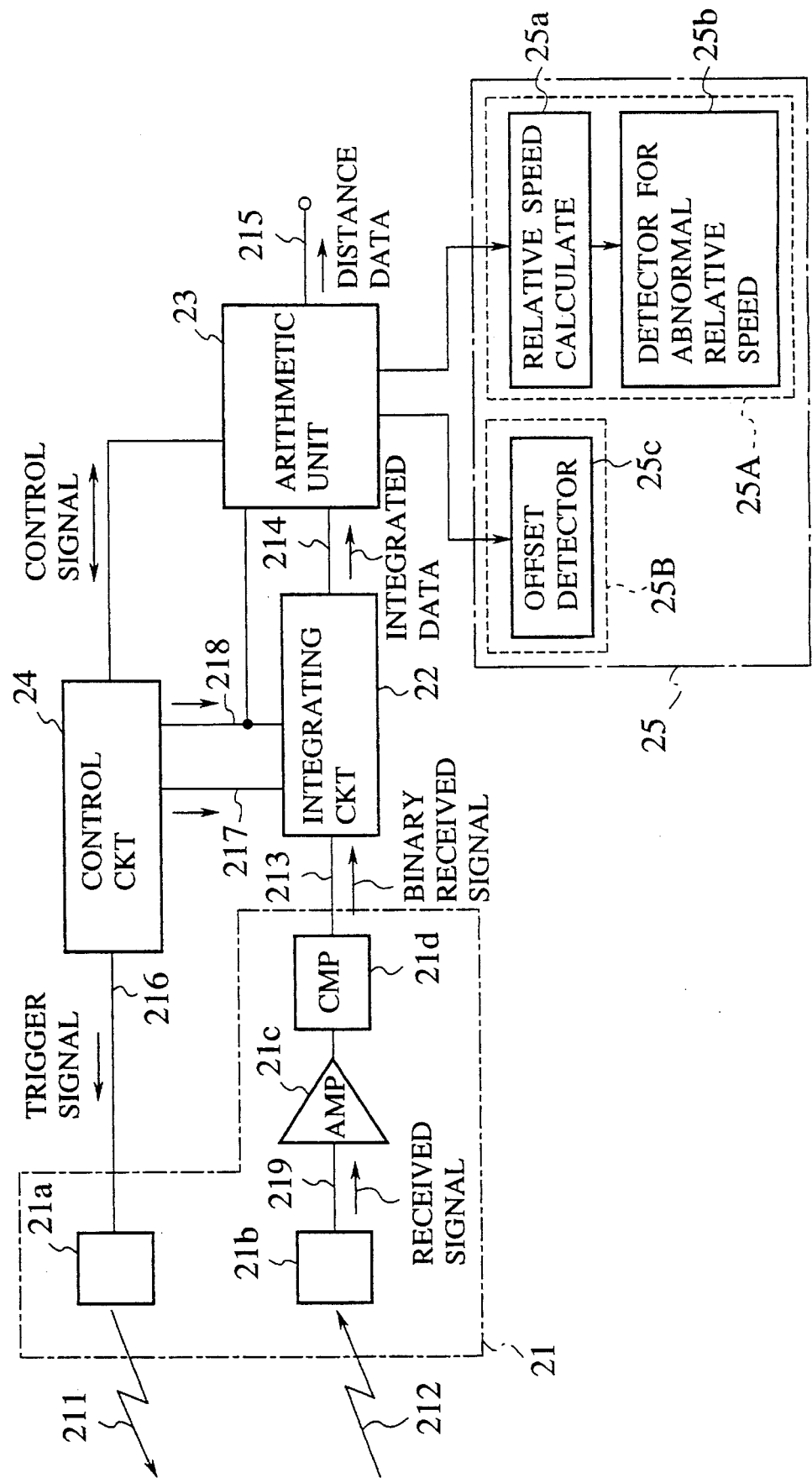
FIG. 60 is a block diagram showing a 13th embodiment of the present invention.

A radar apparatus according to the 13th embodiment of the present invention will be explained with reference to FIG. 60 as well as FIGS. 17 to 21 for the second embodiment. In FIG. 60, a radar head 21, an integration circuit 22, an arithmetic unit 23, and a control circuit 24 are the same as those of the 12th embodiment and are not explained again. An interference detector 25 has a first interference detector 25A and a second interference detector 25B. The first interference detector 25A has a relative speed calculator 25a for calculating the relative speed of a target according to an elapsed time that is used to detect a reflected pulse, and a detector 25b for detecting an abnormal relative speed according to a result of the calculation of the relative speed calculator 25a. The second interference detector 25B has an offset detector 25c for detecting an offset in an integrated value provided by the integration circuit 22 and determining whether or not there is an interference wave.

An operation of the 13th embodiment will be explained with reference to FIGS. 17 to 21. Memories M1 to M14 (=Mn) store normalized values of integrated values provided by the integration circuit 22 and arithmetic unit 23. A pulsesignal (2) of FIG. 17 is transmitted from a transmitter 21a. A receiver 22b continuously receives a signal (3). The pulsesignal (2) is reflected by a target and received by the receiver 21b, and therefore, a reflected pulse Rf with noise will be detected in the received signal (3). The transmission of the pulsesignal (2) and the reception of the signal (3) are carried out in response to sampling pulses. An interval Δt between adjacent sampling pulses (4) is, for example, 66.7 ns corresponding to a distance of 10 m. Fourteen sampling periods are adopted to measure the range of 0 to 130 m at intervals of 10 m. The memories M1 to M14 store integrated values (accumulated values in FIGS. 17 to 21) (5) of range blocks corresponding to the sampling periods, respectively. If any one of the integrated values (5) exceeds a threshold TH, it is determined that the reflected pulse has been detected. If none of the integrated values (5) is above the threshold TH, it is determined that the received signal is a noise signal. In FIG. 17, integrated values stored in the memories M8 and M9 among are each above the threshold TH, to indicate the presence of the reflected pulse Rf. In this case, a distance corresponding to the range block #8 corresponding to the memory M8 that is closer to the radar apparatus than the memory M9 is selected to calculate the distance to the target. Namely, the distance is 70 m in this example.

A technique of calculating a relative speed will be explained. For the received signal (3), the reflected pulse Rf has been detected in the memories M8 and M9. The reflected pulse Rf is detected in the closer memory M8 at time t1. When the target is a car that is approaching the radar apparatus, the distance to the car gradually shortens. In this case, the reflected pulse Rf moves in the direction of an arrow mark a. Accordingly, the reflected pulse Rf is detected in the memories M8 and M9 at the measuring time t1. Thereafter, the reflected pulse Rf is detected in the memories M7 and M8 at measuring time t2. The time difference between the time points t1 and t2 corresponds to a time in which the reflected pulse Rf is shifted by the period Δt of one range block. In the example, Δt is equal to a distance of 10 m. Accordingly, the relative approaching speed of the car is 10/ (t2–t1) m/s. If the car is separating from the radar apparatus, the reflected pulse Rf moves in the direction of an arrow mark b. Accordingly, the integrated value in the memory M8 drops below the threshold TH at time t3. Namely, the reflected pulse Rf disappears from the memory M8. Thereafter, the integrated value in the memory M9 drops below the threshold TH at time t4 to indicate that the reflected pulse Rf has disappeared. The time difference between the time points t4 and t3 corresponds to a time in which the reflected pulse Rf is shifted by one range block corresponding to a distance of 10 m. Accordingly, the relative separating speed of the car is 10/(t4−t3) m/s. If the radar apparatus is approaching or separating from a stationary target at a speed of 100 km/h, the relative speed is about 28 m/s. Then, a time for moving a distance of 10 m is 10/28 =0.36 s (=360 ms). At this time, a time necessary for detecting the reflected pulse Rf is 32 ms with 8192 integral operations, which is less than 1/10 of the shift time. Accordingly, the detection time causes an error of about ±1 m/s in the relative speed. If the relative speed is less than 28 m/s, the shift time for 10 m is larger than 0.36 s, to further decrease the error.

The steps of calculating a relative speed will be explained in detail with reference to the flowchart of FIG. 18. Step 171 checks integrated values in the memories M1 to Mn from the nearest one thereof, to see whether or not a reflected pulse Rf is detectable therein. If YES, step 172 sets the memory in question as Mn and stores time t1 when the reflected pulse Rf has been detected. Step 173 determines whether or not the reflected pulse Rf is detectable in a memory Mn−1 in front of the memory Mn. If YES, step 174 finds time t2 when the reflected pulse Rf has been detected, and calculates an approaching speed Vr1 as 10/(t2−t1). Step 175 provides the approaching speed Vr1. If the step 173 determines that the reflected pulse is not detectable in the memory Mn−1, step 176 checks to see whether or not the reflected pulse is still detectable in the memory Mn. If YES, the step 173 is repeated, and if NO, step 177 stores time t3 when the reflected pulse has disappeared. Step 178 checks to see if the reflected pulse Rf is detectable in a memory Mn+1. If YES, the step 173 is repeated, and if NO, step 179 finds time t4 when the reflected pulse Rf has disappeared, and calculates a relative separating speed Vr2 as 10/(t4−t3). Step 180 provides the relative separating speed Vr2.

In this way, the appearance and disappearance of a reflected pulse are detected at the nearest sampling point. This may require a transmitted pulse to sharply rise. It is not required, however, to shorten the width of the pulse. On the contrary, it is preferable to extend the pulse width longer than the temporal length of each range block (sampling period) $\Delta t$. The probability of noise of exceeding the threshold TH is not always zero, and if it exceeds the threshold TH, it will cause erroneous detection. To prevent this, it is preferable to always confirm that a reflected pulse is simultaneously detected in at least two (including consecutive two) range blocks. This results in reducing the erroneous detection due to noise. This is equivalent to further integrating an integrated value. Employing two integrated values is equal to obtaining a margin of 3 dB in the S/N ratio if the threshold is unchanged. If the same probability of erroneous detection as that achieved by detecting a reflected pulse in one range block is allowed, the 13th embodiment is capable of lowering the detection threshold and improving the detection sensitivity by 3 dB.

Operations of the detector 25b for detecting an abnormal relative speed and the offset detector 25c for detecting an offset in an integrated value and determining whether or not there is an interference wave will be explained. An interference between like pulsesignals transmitted from opposing cars will be explained. For example, a car equipped with the radar apparatus of the present invention is stopping, and an opposite car is also stopping. The opposite car is equipped with a like radar apparatus. The car in question will receive a pulsesignal from the opposite car. In this case, the radar apparatus of the car in question will detect the opposite car, if the radar apparatuses of both the cars employ a reference clock signal of exactly the same frequency and if a pulsesignal from the opposite car reaches the car in question within a period set for distance measurement. The reference clock signal, however, is usually generated by a crystal oscillator having a frequency error. This frequency error causes a synchronization error in pulsesignals, thereby influencing measurement and integrated values of the radar apparatus. When the frequency error is smaller than $2\times10^{-7}$ (FIG. 19), it corresponds to a relative speed of $2\times10^{-7}\times3\times10^{8}$ (where $3\times10^{8}$ is the velocity of light). Accordingly, the frequency error may be erroneously detected as if the opposite car is moving at a speed of 60 m/s (216 Km/h). In this case, it is impossible to determine whether it is an error due to an interference with the pulsesignal transmitted from the opposite car or the opposite car is actually moving at the detected speed. If this radar apparatus serves for a collision alarm system, it will provide a wrong alarm. If the frequency error is greater than $2\times10^{-7}$ and smaller than $4.16\times10^{-6}$, it will be erroneously detected as if the opposite car is moving at a relative speed of 60 m/s (216 Km/h) or over. This speed is abnormal as the speed of a standard car, so that it is determined to be an error caused by interference. It is possible in this case to identify erroneous detection caused by interference by monitoring a relative speed. Namely, the detector 25b provides an abnormality output if a relative speed calculated by the relative speed calculator 25a is greater than 60 m/s.

If the frequency error is above $4.16\times10^{-6}$ and below the ratio of sampling interval to distance measuring period (in the above case, 4 μs to 32 ms=$1.25\times10^{-4}$ or below) as shown in FIG. 20, an interference wave moves for $4.16\times10^{-6}\times0.032$ =133 ns or more within one distance measuring time of 32 ms. Accordingly, if the appearance and disappearance of a reflected pulse are monitored at the nearest range block as in the above case, it will be impossible to calculate a relative speed. Accordingly, the alarming logic employing two parameters, i.e., a distance and a relative speed will issue no wrong alarm. A received pulse is observed over three range blocks or more each having a width of 66.7 ns. When the frequency error further increases, the influence of an interference wave spreads over all range blocks. If the frequency error reaches the ratio of sampling interval to distance measuring period of $1.25\times10^{-4}$ and if the interference wave is synchronous at the start of integration operations, the interference wave moves for $1.25\times10^{-4}\times0.032$ =4 μs, which is equal to the integration repetition frequency or sampling interval, after 32 ms in which 8192 integral operations are carried out. Accordingly, the interference is always observed in every range block at a time ratio of 133 ns /4 ms=3.33% with respect to a pulse width of 133 ns. If the S/N ratio of the interference wave is sufficiently high, an offset of 8192×0.0333=273 will be caused by the interference wave after 8192 integral operations. A threshold for detecting a pulse in the 8192 integral operations is about 0.5 (an average of noise) plus 0.02 in terms of a normalized value. Accordingly, the offset is greater than the threshold portion, i.e., 8192×0.02=163. It is possible, therefore, to identify the interference wave by checking to see if a uniform offset is occurring in every range block. When the frequency error is below $1.25\times10^{-4}$, it is impossible to correctly identify the interference wave from an offset in integrated values because the offset of this is irregular and because pulses will be observed in more than three range blocks if there are a plurality of targets.

If the frequency error is greater than the ratio of sampling interval to distance measuring period (=$1.25\times10^{-4}$) (FIG. 21), a uniform offset will be always observed in integrated data. In this case, the interference wave is identifiable according to an output from the offset detector 25c. If an integrated value representing a reflected pulse from a genuine target is greater than the offset, the target is detectable. Accordingly, the distance to the target is correctly measurable even with the interference wave. As explained above, an interference wave is detectable and removable by monitoring a relative speed and an offset in integrated data and by removing the offset. The frequency error must be greater than $2 \times 10^{-7}$ to detect the interference wave according to a relative speed and prevent a wrong alarm. Detecting an offset is dependent on the frequency error. To surely detect an interference wave, the frequency error must be greater than the ratio of sampling interval to distance measuring period (=$1.25 \times 10^{-4}$). This frequency error spreads the influence of an interference wave over all range blocks, to enable the detection of the interference wave as well as a target. Namely, a reflected pulse greater than the offset is detectable. When the offset is 0.0333, a threshold is calculated as 0.5533 by adding the offset to an average noise of 0.5 plus a threshold portion of 0.02. This enables the radar apparatus to detect a signal of up to −17 dB. This corresponds to a sensitivity loss of 3 dB compared with a signal detection level of −20 dB with no interference. Due to the sensitivity loss of 3 dB, a measuring distance will be shortened to 0.91 times of the case without an interference wave, or 0.84 times of the same if the sensitivity loss is 6 dB. In this way, the influence of an interference wave is minimized. As explained above, a large interference wave is detectable and removable if a frequency error in a reference clock signal is set to spread the influence of the interference wave over all range blocks.

The 13th embodiment detects an interference wave according to a relative speed and integrated values stored in memories and removes the adverse effect of the interference wave. The embodiment properly selects the frequency and frequency error of a clock signal, to minimize the influence of an interference wave such as erroneous detection. The embodiment realizes a reliable car distance alarm system and a collision alarm system. A 15-MHz reference clock frequency has a period of 66.7 ns that corresponds to a distance of 10 m in the radar apparatus. If a measurement error of 1%, i.e., one meter per 100 m is allowable, the frequency error will be $10^{-2}$ or below so that the frequency will be in the range of 14.85 to 15.15 MHz. To secure a frequency error of $1.25 \times 10^{-4}$ or over, the frequency must be distributed such that a space of 300 KHz between 14.85 MHz and 15.15 MHz is filled with 160 pulses at intervals of $15 \times 10^{6} \times 1.25 \times 10^{-4} = 1875$ Hz. The reference clock frequency is not necessarily 15 MHz, and many other frequency distributions are possible.

As explained above, the 13th embodiment finds a sampling period that involves an integrated value larger than a predetermined threshold, calculates a distance corresponding to the sampling period, and automatically correctly provides the distance to a target. This embodiment employs an interference detector for detecting an interference wave contained in a reflected signal received by a receiver, and an interference wave remover for removing the interference wave. Accordingly, this embodiment is capable of detecting an interference wave transmitted from a radar apparatus installed in an opposite car, and removing the influence of the interference wave from integrated results provided by an integration circuit. As a result, this embodiment correctly detects a target and calculates the distance to the target.

Figure 61:
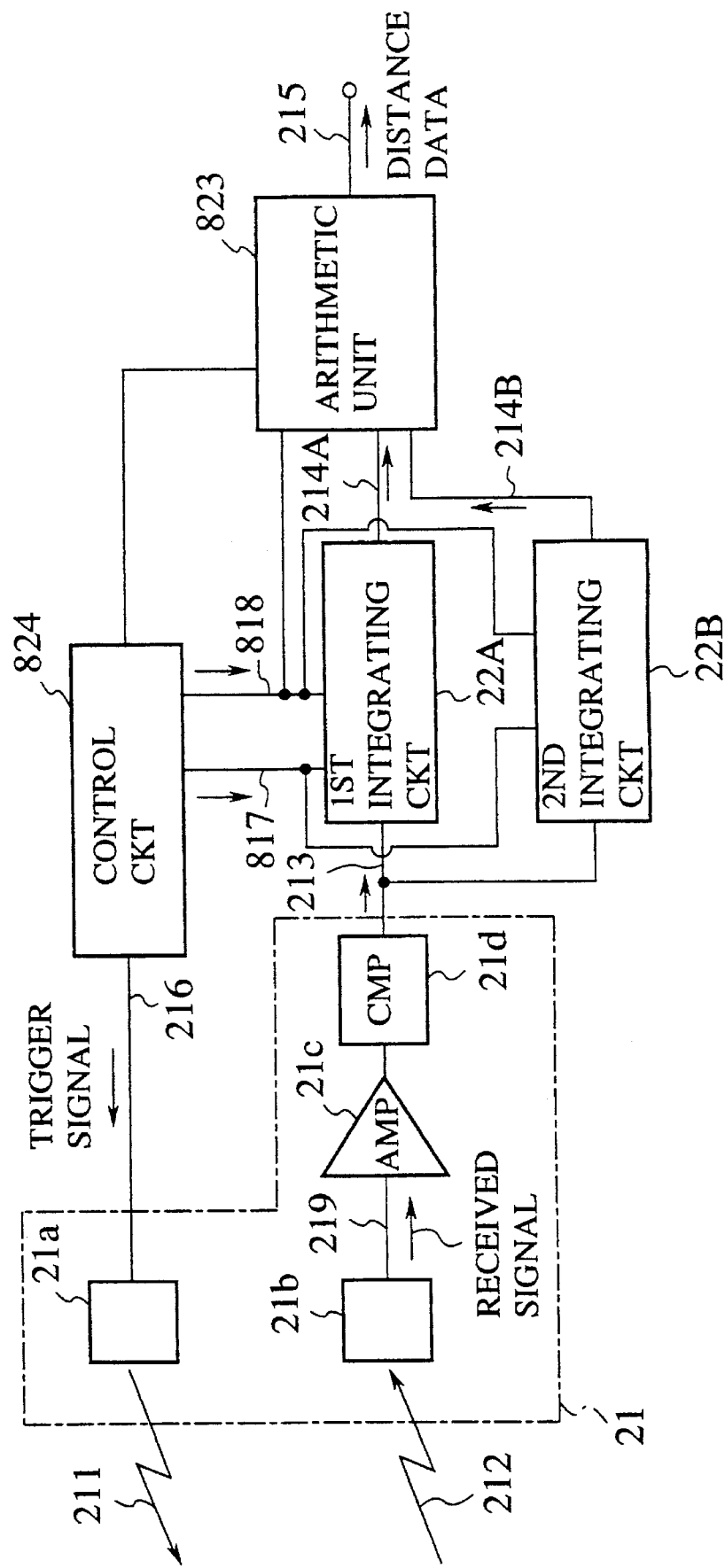
FIG. 61 is a block diagram showing a 14th embodiment of the present invention.
Figure 62:
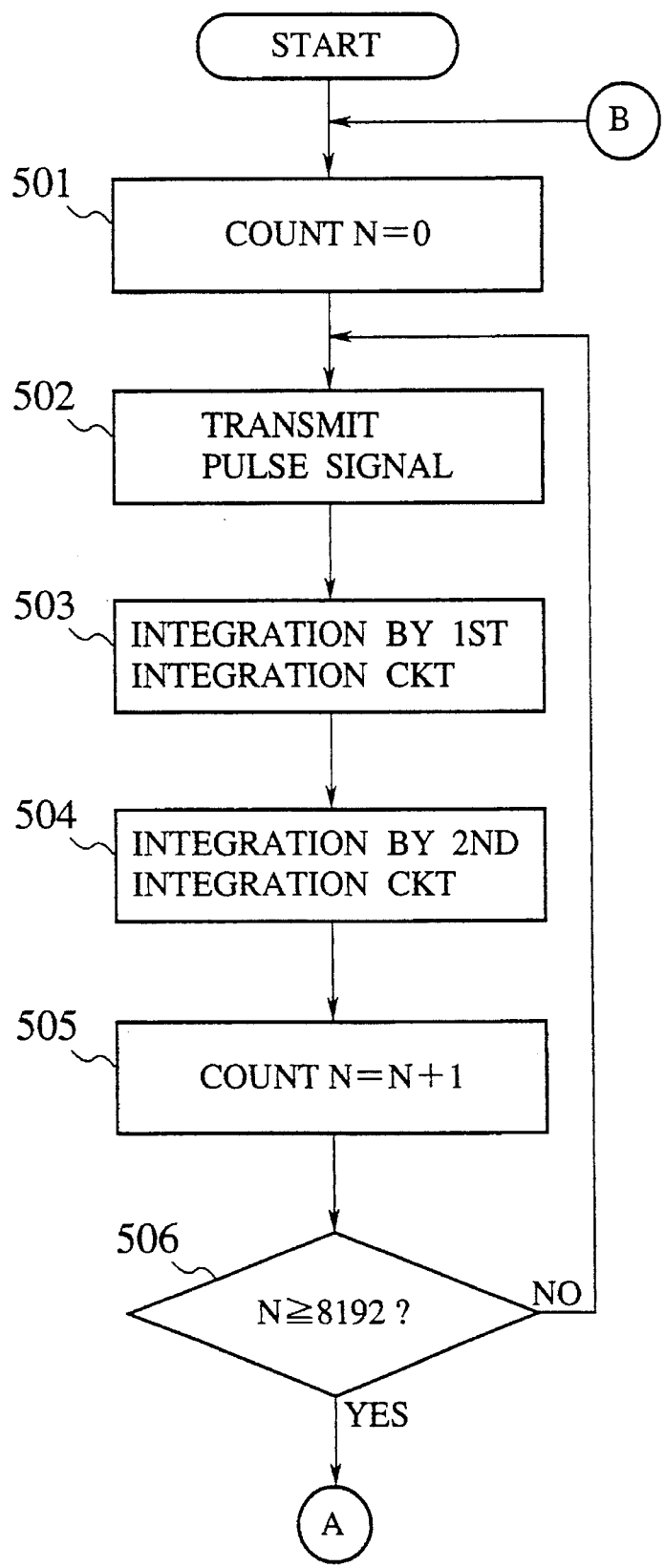
FIG. 62 is a flowchart showing a first part of steps carried out by the 14th embodiment.
Figure 63:
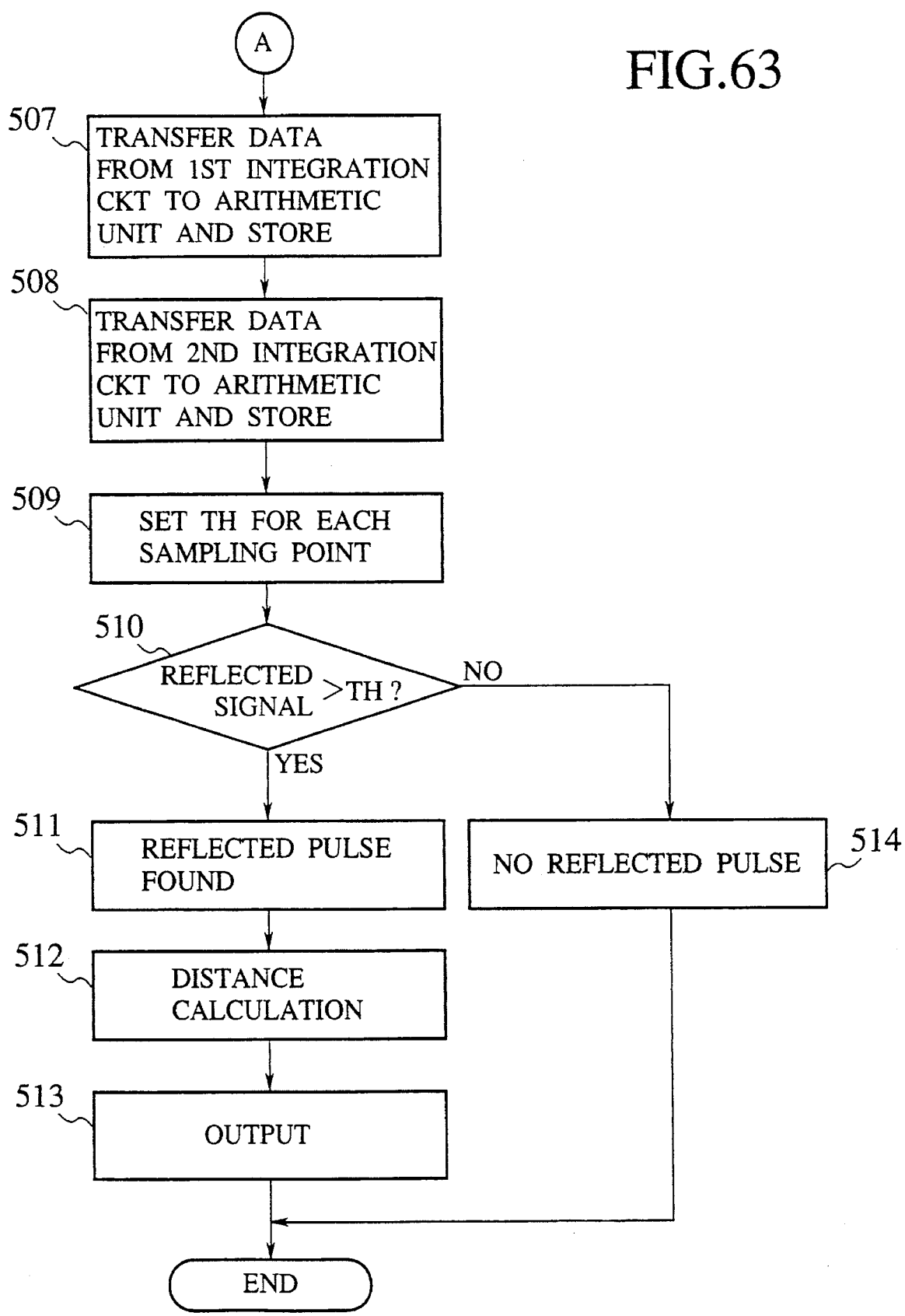
FIG. 63 is a flowchart showing a second part of the steps carried out by the 14th embodiment.

A radar apparatus according to the 14th embodiment of he present invention will be explained with reference to FIGS. 61 to 63. The same parts as those of the 12th embodiment are represented with like reference marks. The 14th embodiment is characterized by a first integration circuit 22A and a second integration circuit 22B arranged side by side. The first integration circuit 22A has a plurality of integrators for successively integrating a binary signal 213 according to input timing signals 817 from a control circuit 824. The structure of the first integration circuit 22A is the same as that of the integration circuit 22 of the 12th embodiment of FIG. 56. The second integration circuit 22B has a plurality of integrators for successively integrating the binary signal 213 according to the input timing signals 817 from the control circuit 824 while a transmitter 21a is stopping. Namely, the second integration circuit 22B repeatedly integrates only noise. The internal structure of the second integration circuit 22B is the same as that of the first integration circuit 22A. Only difference between them is that they receive different input timing signals 817 from the control circuit 824.

An arithmetic unit 823 fetches integrated values 214A from the integrators of the first integration circuit 22A in response to an instruction from the control circuit 824, normalizes each of the fetched values 214A, and stores the normalized values. The arithmetic unit 823 fetches integrated values 214B from the second integration circuits 22B in response to an instruction from the control circuit 824, normalizes each of the fetched values as noise levels of respective range blocks, and stores the normalizes values, i.e., noise levels. Thereafter, the arithmetic unit 823 compares the normalized values of the integrated values 214A with the noise levels one by one, detects a reflected pulse in a range block if the normalized value of the range block is above the noise level, and calculates the distance to a target. The control circuit 824 transmits a predetermined number of trigger signals to let the transmitter 21a emit pulses for a predetermined period, and stops the transmitter 21a for a predetermined period without sending the trigger signals. While the transmitter 21a is being driven, the control circuit 824 provides the first integration circuit 22A with the input timing signal 817 and output timing signal 818 in response to trigger signals. While the transmitter 21a is stopping, the control circuit 824 provides the second integration circuit 22B with the input timing signal 817 and output timing signal 818. The control circuit 824 instructs the arithmetic circuit 823 to calculate noise levels and detect a reflected pulse. To achieve these functions, the 13th embodiment employs the shift registers 24e and 24f of FIG. 57 with the number of bits being 2n instead of n, the terminals Q1 to Qn being connected to the first integration circuit 22A, and the terminals Qn+1 to Q2n being connected to the second integration circuit 22B.

Figure 64:
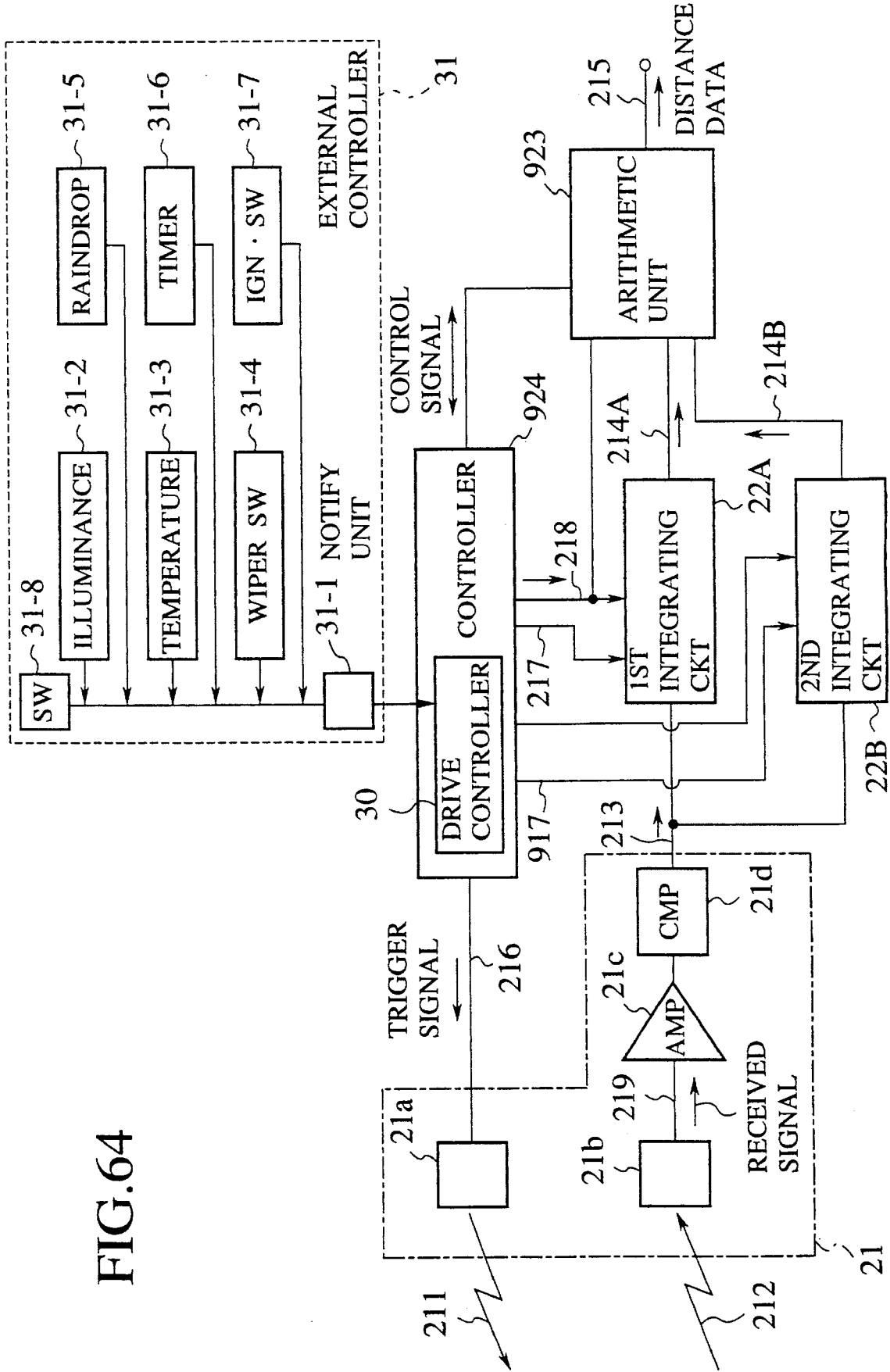
FIG. 64 is a block diagram showing a 15th embodiment of the present invention.
Figure 65:
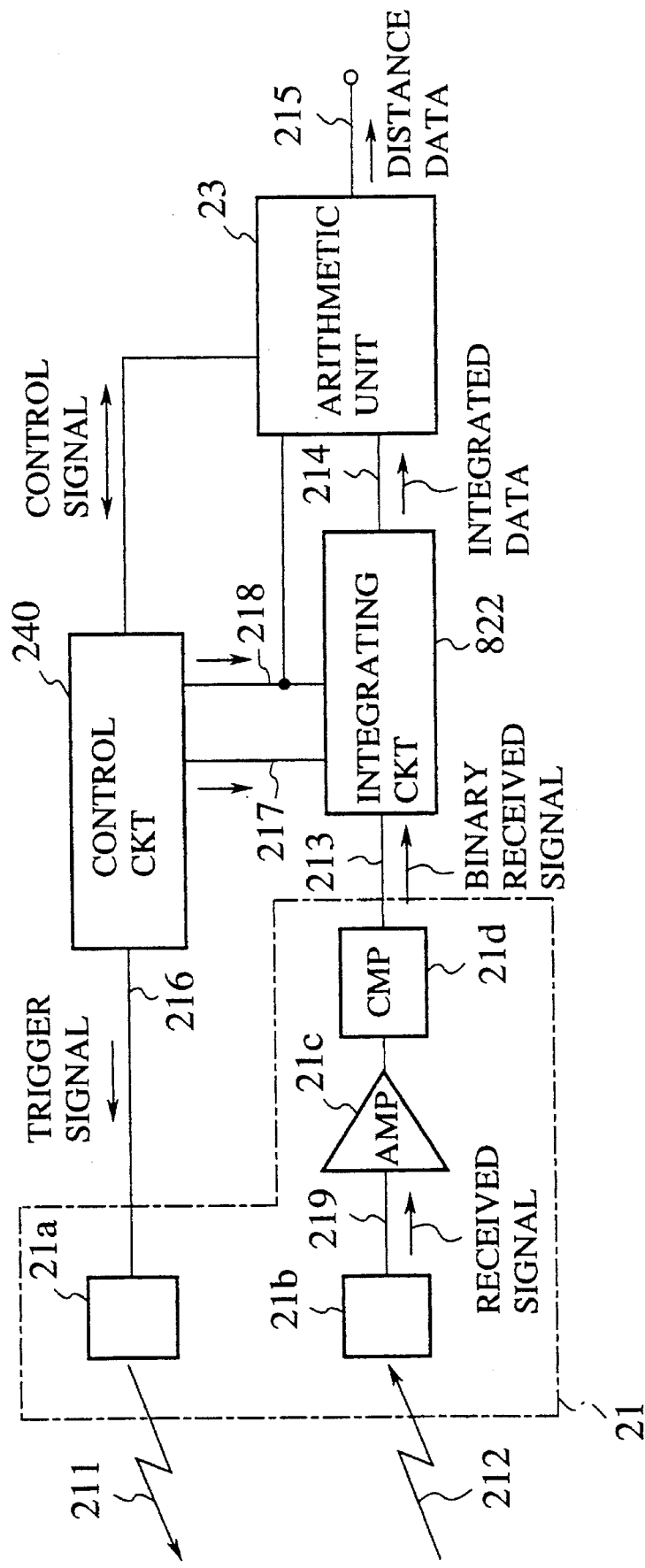
FIG. 65 is a block diagram showing a 16th embodiment of the present invention.

An operation of the radar apparatus of the 14th embodiment will be explained with reference to FIGS. 62 to 64. Step 501 resets a counter (N=0). In step 502, the transmitter 21a transmits a pulsesignal (2), a receiver 21b receives a signal and provides a binary signal 219. In step 503, the first integration circuit 22A integrates the binary signal. At this time, the output of the terminals Q1 to Qn of the shift register 24e of the control circuit 824 serves as the input timing signal 817 for the first integration circuit 22A, so that the integrators 22b-1 to 22b-n sequentially carry out an integral operation once. Thereafter, the terminals Qn+1 to Q2n of the shift register 24e provide the second integration circuit 22B with the input timing signal 817. The integrators of the second integration circuit 22B sequentially integrate a binary signal representing noise in step 504. Step 505 increments the counter by one (N=N+1). Step 506 checks to see if the number of integral operations is equal to m, which is, for example, 8192. If the step 506 determines that it is equal to 8192, the terminals Q1 to Qn of the shift register 24*f* of the control circuit 824 provide the first integration circuit 22A with the output timing signal 818. As a result, the integrated values of the integrators 22*b*-1 to 22*b*-n are successively transferred to the arithmetic unit 823 and stored in memories M1 to Mn for range blocks, respectively, in step 507. Thereafter, the terminals Qn+1 to Q2n of the output shift register 24*f* provide the second integration circuit 22B with the output timing signal 818. The integrators of the second integration circuit 22B successively transfer integrated values representing noise levels to the arithmetic unit 823. These noise levels of the range blocks are stored in the memories M1 to Mn, respectively, in step 508. Step 509 sets these noise levels as thresholds TH. The received data and noise levels (TH) stored in the memories M1 to Mn are compared with each other in step 510. If there is a range block whose data is above the noise level, it is determined that the range block involves a reflected pulse in step 511. A distance corresponding to the range block is calculated as the distance to a target in step 512, and the distance is provided in step 513. If the step 510 determines that there is no range block whose data exceeds the corresponding noise level, step 514 determines that there is no obstacle.

Figure 26:
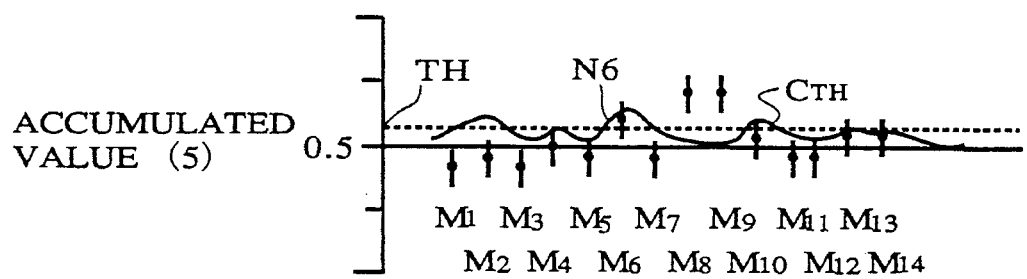
FIG. 26 shows thresholds based on noise levels according to the fourth embodiment.
Figures 23, 23A, 23B:
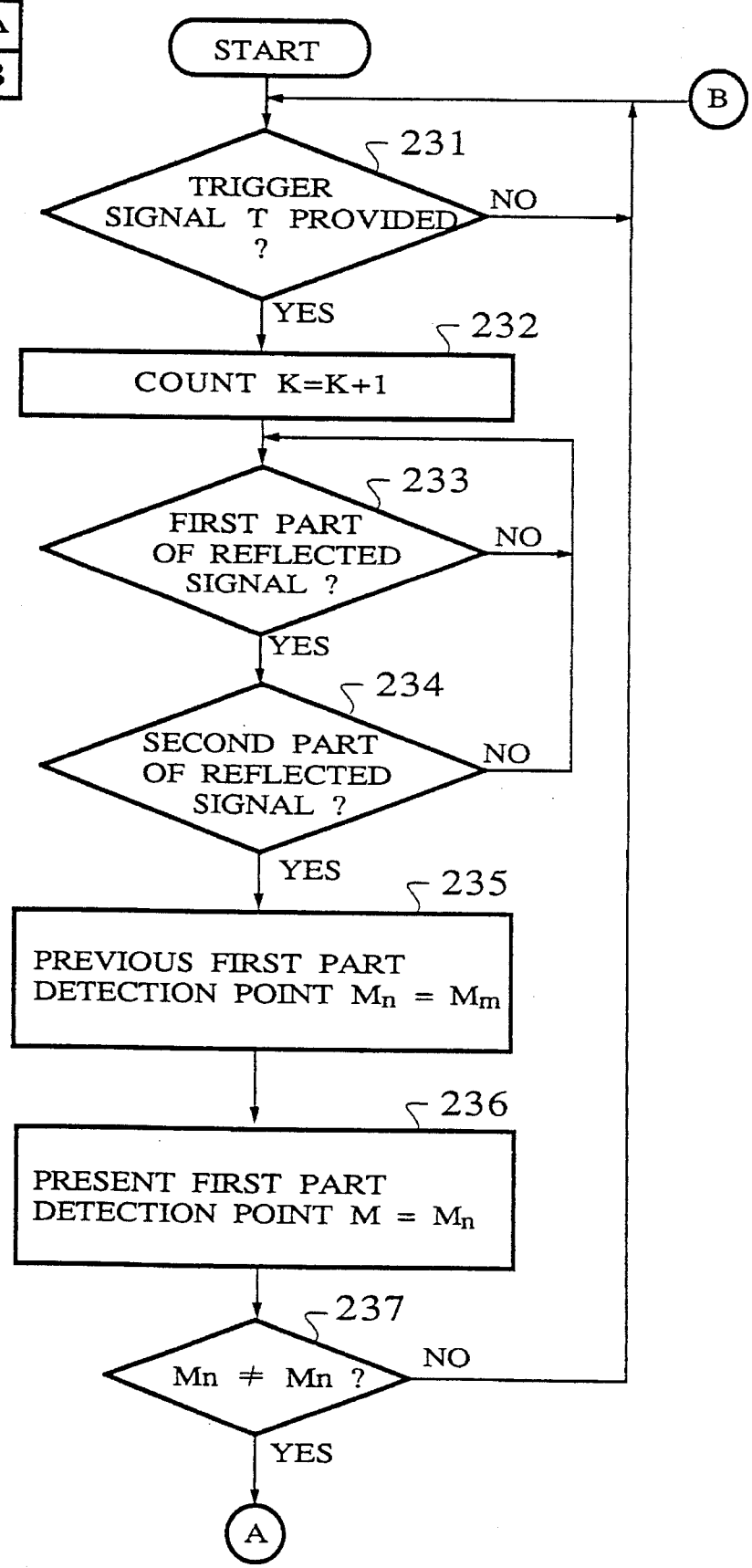
FIGS. 23a and 23B are flowcharts showing steps carried out by the third embodiment.
Figure 23B:
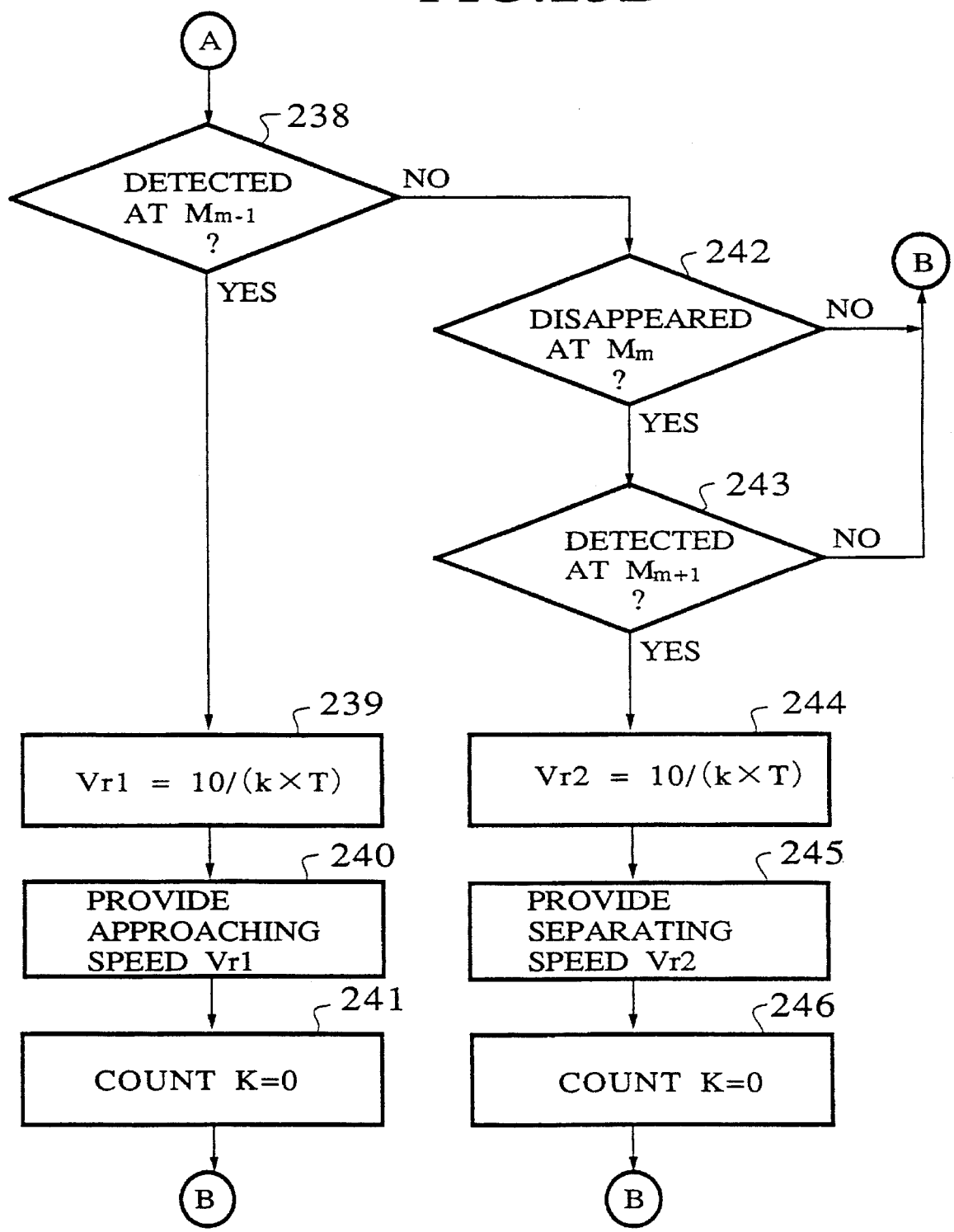

The 14th embodiment carries out the same distance measuring process as the third embodiment of FIG. 26. Namely, the 14th embodiment does not fix a threshold TH in advance to find a target in one range block. Instead, the 14th embodiment sets an individual noise level measured in advance for each range block as indicated with a curve CTH in FIG. 26. In this figure, it is known that the noise level N6 of the range block M6 is high, and therefore, the 14th embodiment does not determine the range block M6 contains a reflected pulse, to thereby avoid erroneous detection due to noise. The 14th embodiment measures a noise level just after each distance measuring operation. It is possible to transmit "m" pulsesignals at first, to let the first integration circuit 22A work. Thereafter, the pulsesignals are stopped to let the second integration circuit 22B to integrate noise "m" times. Then, the integrated results are transferred to the arithmetic unit 823, which compares them with each other as shown in FIG. 26. In this case, the second Integration circuit 22B of the 14th embodiment may be omitted. The control circuit 824 alternately stops and runs the transmitter 21*a* and provides the first integration circuit 22A with the input timing signal 817 and output timing signal 818, so that the first integration circuit 22A alternately carries out the reflected pulse detection operation and the noise detection operation.

As explained above, the radar apparatus of the 14th embodiment repeatedly integrates a binary signal and employs noise levels as thresholds, to detect a reflected pulse from a target in high S/N ratio even if the reflected pulse is weak, to thereby correctly detect the target.

A radar apparatus according to the 15th embodiment of the present invention will be explained with reference to FIG. 64. The same parts as those of the 14th embodiment of FIG. 61 are represented with like reference marks. A control circuit 924 has a drive controller 30. The driver controller 30 counts the number of operations (for example, 8192) of a second integration circuit 22B to detect noise levels. When the number reaches the predetermined value, the drive controller 30 stops the detection of noise levels. In response to an instruction from an external control circuit 31, the driver controller 30 instructs the second integration circuit 22B to start detecting noise levels. The external control circuit 31 is the same as that of FIG. 27. In the external control circuit 31, a notify circuit 31-1 receives signals from sensors 31-2, 31-3, and 31-5, a time-up signal from a timer 31-6, and ON switch signals from switches 31-4, 31-7, and 31-8. In response to any one of these signals, the notify circuit 31-1 provides the drive controller 30 with a notify signal to start a noise sampling operation. In response to this signal, the drive controller 30 provides the second integration circuit 22B with an input timing signal 917 to start a noise level integration, similar to the 14th embodiment. The notify circuit 31-1 may have a threshold to determine whether or not the sensors 31-2, 31-3, and 31-5 and the timer 31-6 are providing outputs, as well as a function of recognizing ON and OFF states of the switches 31-4, 31-7, and 31-8. These threshold and function may be provided for the sensors, timer, and switches. The operation of the 15th embodiment is the same as that explained with reference to the flowchart of FIG. 28 of the fifth embodiment. In this way, the 15th embodiment employs the external controller 31 for controlling the drive controller 30 that controls a noise sampling operation. The external control circuit 31 includes the illuminance sensor 31-2, temperature sensor 31-3, wiper switch 31-4, rain drop sensor 31-5, timer 31-6, ignition switch 31-7, and manual switch 31-8. Noise levels are affected by sunlight, temperatures, rain, engine conditions, alternator operation, power source voltage, etc. Whenever these conditions change, noise levels used to detect a reflected pulse from a target are measured to change thresholds TH. Accordingly, the 15th embodiment is capable of always correctly detecting a reflected pulse from a target and measuring the distance to and relative speed of the target.

In this way, the radar apparatus of the 15th embodiment detects a reflected signal from a target at a high S/N ratio by repeatedly integrating a binary signal and using noise levels as thresholds, even if the reflected signal is weak. This embodiment finds a sampling period that involves a larger integrated value than the threshold and correctly calculates the distance to the target. The 15th embodiment collects an integrated value for noise in each sampling period and employs it as a threshold of the sampling period. The 15th embodiment, therefore, surely removes the influence of noise in each sampling period when detecting a target and measuring the distance to the target.

Figure 66:
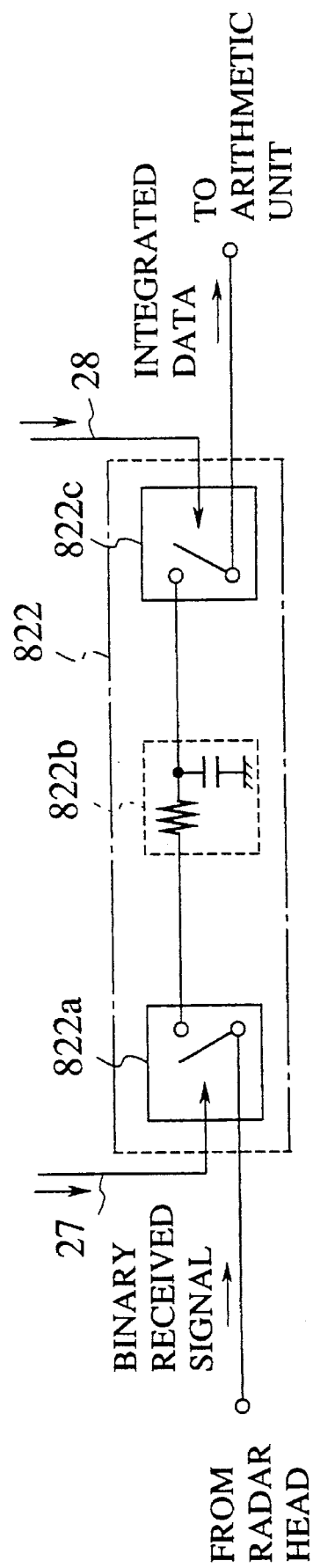
FIG. 66 is a block diagram showing an integration circuit of the 16th embodiment.
Figure 67:
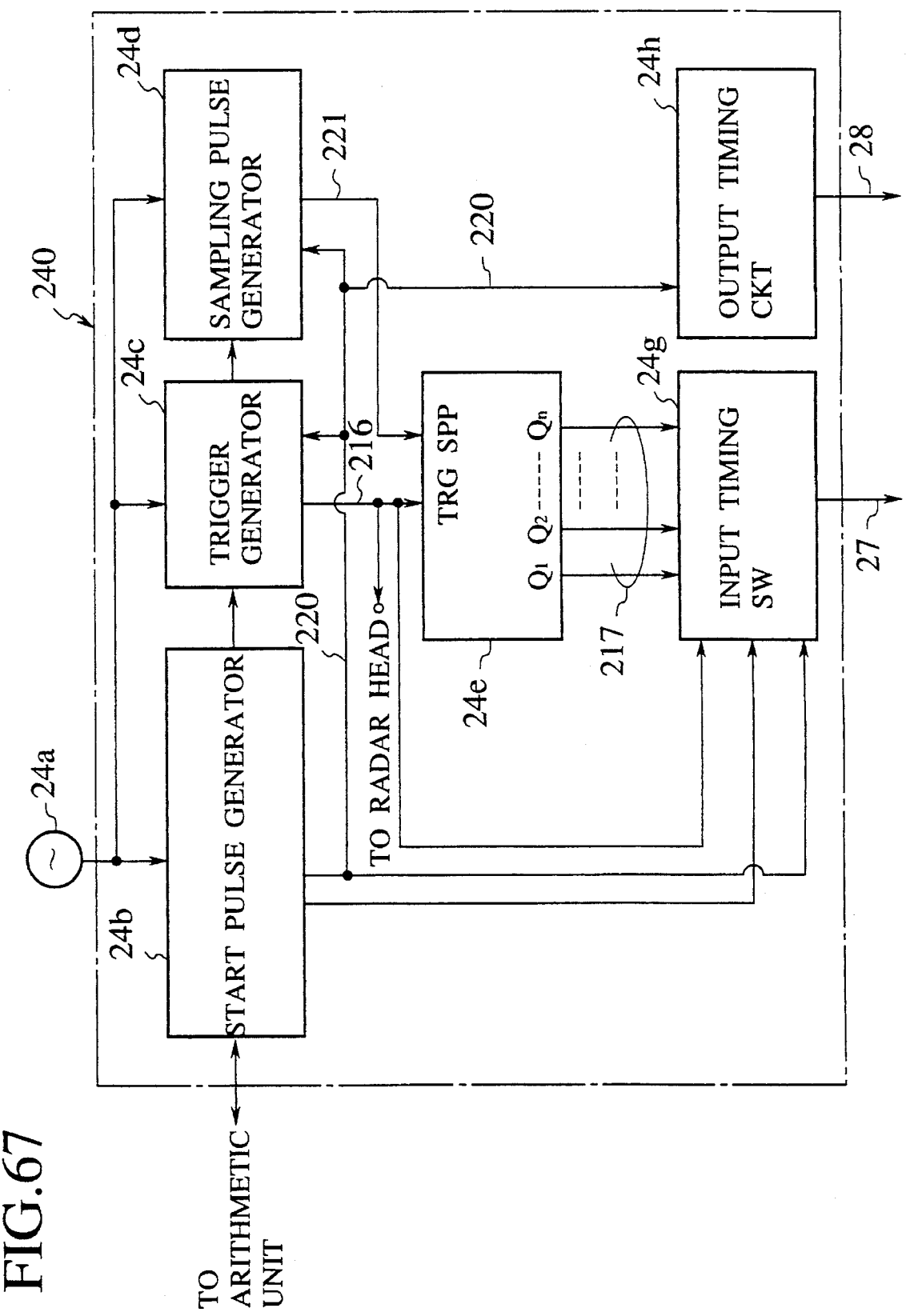
FIG. 67 is a block diagram showing a control circuit of the 16th embodiment.

A radar apparatus according to the 16th embodiment of the present invention will be explained with reference to FIGS. 65 to 69. This embodiment is characterized by an integration circuit 822 and a control circuit 240. The other parts of this embodiment are the same as those of the 12th embodiment of FIG. 55 and are represented with like reference marks. In FIG. 66, the integration circuit 822 has an analog input switch 822*a*, an RC integrator 822*b*, and an analog output switch 822*c*. In FIG. 67, the control circuit 240 has, similar to the radar apparatus of FIG. 55, a clock transmitter 24*a*, a start pulse generator 24*b*, a trigger generator 24*c*, a sampling pulse generator 24*d*, and an input shift register 24*e*. The control circuit 240 of this embodiment is characterized by an input timing switch 24*g* and an output timing circuit 24*h*. The input timing switch 24*g* receives an input timing signal 217 from the input shift register 24*e* and provides an input switching signal 27 in the same sampling period through "m" sampling operations. The output timing circuit 24*h* provides an output switching signal 28 in response to an end pulse 220 from the sampling generator 24*d* upon the completion of "m" integration operations. The input switching signal 27 is sent to the analog input switch 822*a* of the integration circuit 822 of FIG. 66. The output switching signal 28 is sent to the analog output switch 822*c* of the integration circuit 822.

An operation of the radar apparatus of the 16th embodiment will be explained with reference to the timing charts of FIGS. 68 and 69. Firstly, the principle of the operation will be explained. Whenever counting "m" trigger signals, the input timing switch 24g of the control circuit 240 shifts the input timing signal 217 from Q1 to Q2, Q2 to Q3, and the like, and provides the analog input switch 822a of the integration circuit 822 with the input switching signal 27 at the shifted timing. In response to the input switching signal 27, the analog input switch 822a is turned ON for a selected sampling period "i" of Δt, to transfer a binary signal from a radar head 21 to the integrator 822b. This operation is repeated for m (8192in the preceding embodiments) sampling operations. After the completion of the m sampling operations, the end pulse 220 is sent to the output timing circuit 24h, which sends the output switching signal 28. The signal 28 turns ON the analog output switch 822c of the integration circuit 822, so that the integrated value in the integrator 822b is provided to an arithmetic unit 23 in which the integrated value is stored in a memory Mi specified by the control circuit 240. After the completion of m integration and storage operations of the binary signal for the sampling period i, another m integration and storage operations are carried out for a sampling period i+1.

Figure 68:
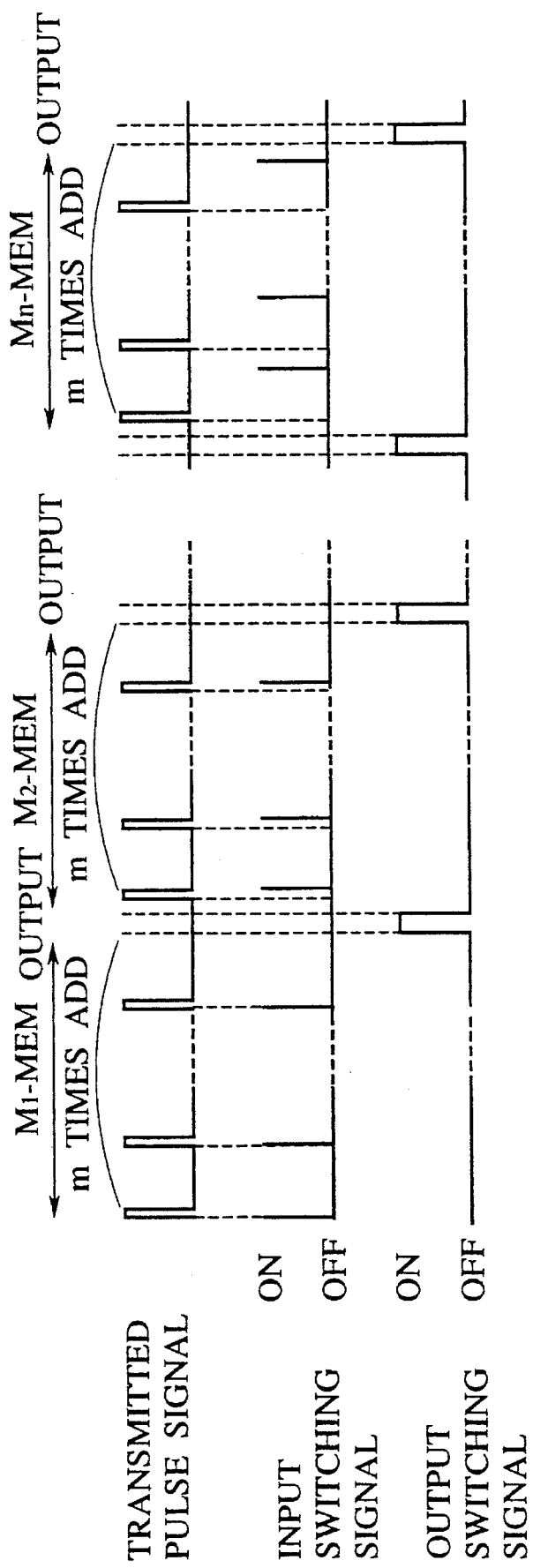
FIG. 68 is a timing chart showing a sampling operation of the 16th embodiment.
Figure 69:
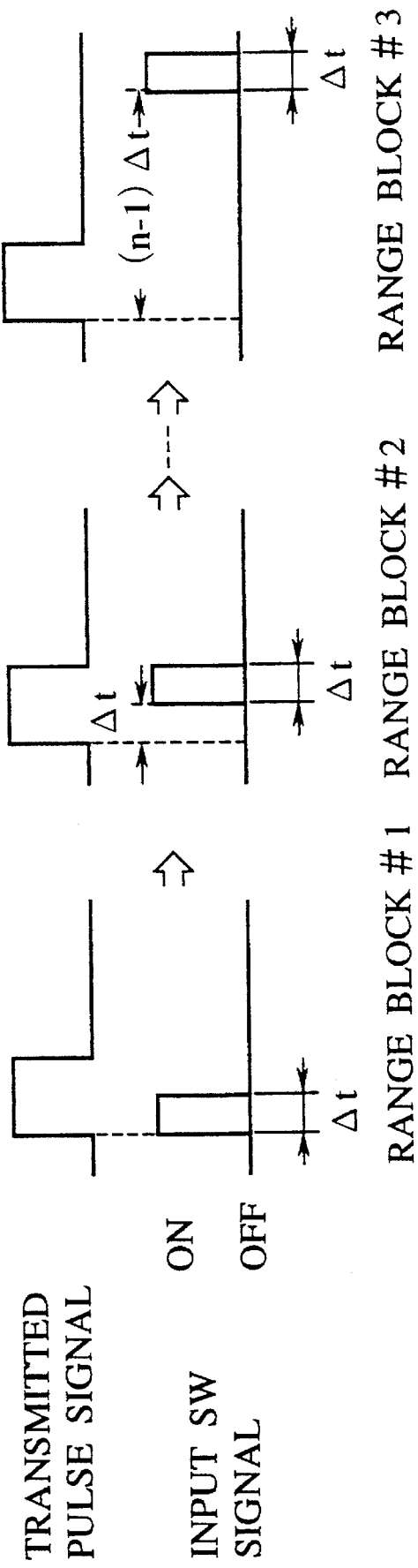
FIG. 69 is a timing chart showing the sampling operation of the 16th embodiment.

In the first m sampling operations (m=8192 in the preceding embodiments) in FIGS. 68 and 69, the analog input switch 822a of the integration circuit 822 is turned ON for the first sampling period of Δt (the first range block #1) in response to the input switching signal 27, to integrate the binary signal m times in the first range block #1. Thereafter, the output timing circuit 24h provides the analog output switch 822c with the output timing signal 28 in response to the end pulse 220, and the integrated value of the integrator 822b is transferred to the arithmetic unit 23 in which the integrated value for the first range block #1 is stored in the memory M1. The input timing switch 24g changes the output timing of the switching signal such that the input switching signal 27 is provided in synchronization with the second sampling pulse. The analog input switch 822a is turned ON for the sampling period of Δt in the second range block #2 in response to the input switching signal synchronized with the second sampling pulse, and the binary signal is integrated by the integrator 822b. Such operations are repeated m times. The output timing circuit 24h provides the analog output switch 822c with the output timing signal 28, and the integrated value of the integrator 822b is transferred to the arithmetic circuit 23 in which the integrated value for the second range block #2 is stored in the memory M2. In this way, the timing of opening the analog input switch 822a is shifted by one sampling period of Δt whenever m trigger signals have been counted. The integrated value of each m sampling operations is sequentially stored in the memories M3, M4, and so on in the arithmetic unit 23. In the last, the binary signal is integrated m times in the "n"th sampling period, i.e., a range block #n, and the integrated value is stored in the memory Mn, to complete the sampling of the binary signal for the n range blocks. Thereafter, the arithmetic unit 23 detects a reflected pulse Rf and calculates the distance to a target according to the range block in which the reflected pulse Rf has been detected, like the preceding embodiments. The 16th embodiment simplifies the structure of the integration circuit 822 and reduces costs.

A modification of the 16th embodiment will be explained. The arithmetic unit 23 is provided with memory areas corresponding to the memories M1 to Mn, respectively. While the transmitter 21a is stopping to transmit pulses, the operations mentioned above are carried out to store integrated values in these memory areas. Similar to the 14th and 15th embodiments of FIGS. 61 to 64, this modification detects noise levels for the range blocks, respectively, to use them as thresholds for detecting a reflected pulse Rf. This results in correctly measuring the distance to a target. Any one of the 12th to 16th embodiments samples a signal in different sampling periods after transmitting pulsesignals, integrates a binary signal, divides each integrated value by the saturation voltage of the integrator, to provide a normalized value, calculates a distance corresponding to a range block in which the normalized value exceeds a threshold TH, and provides the distance as the distance to a target. If it is required only to see if there is an obstacle in the range of, for example, one meter around a car in which the radar apparatus is installed, a simple circuit will do. This circuit simply integrates a binary signal a predetermined number of times in a range block corresponding to the distance of one meter, normalizes the integrated value, compares the normalized value with a threshold TH or a noise level separately measured, determines that there is an obstacle if the normalized value is greater than the threshold or noise level, and issues or displays an alarm.

There is a modification of the 16th embodiment that sets different number of integral operations for range blocks, respectively. When a target is far from the radar apparatus, the S/N ratio of a received signal from the target is low, so that the number of integral operations must be large. When there is a target close to the radar apparatus, the S/N ratio of a received signal from the target is high, so that the number of integral operations may be small. Accordingly, the numbers of integral operations for range blocks corresponding to near distances are set to be small, and the numbers of integral operations for range blocks corresponding to far distances are set to be large. This is realized by adjusting the output timing of an end pulse provided by the start pulse generator 24b through the sampling pulse generator 24d.

As explained above, the 16th embodiment of the present invention employs only one integration circuit for integrating a binary signal. This embodiment is simple and low cost. This embodiment employs an interference detector for detecting an interference wave contained in a reflected signal received by a receiver, and an interference wave remover for removing the interference wave. Even if an opposite car has a radar apparatus to send an interference wave, the radar apparatus of this embodiment detects the interference wave and removes the influence of the interference wave from results provided by an integration circuit. Accordingly, this embodiment correctly detects a target and calculates the distance to the target. This embodiment collects an integrated value for noise of each sampling period and uses the integrated value of noise as a threshold of the corresponding sampling period to thereby surely remove the influence of noise of each sampling period. Consequently, this embodiment accurately detects a target and calculates the distance to the target.

Figure 55:
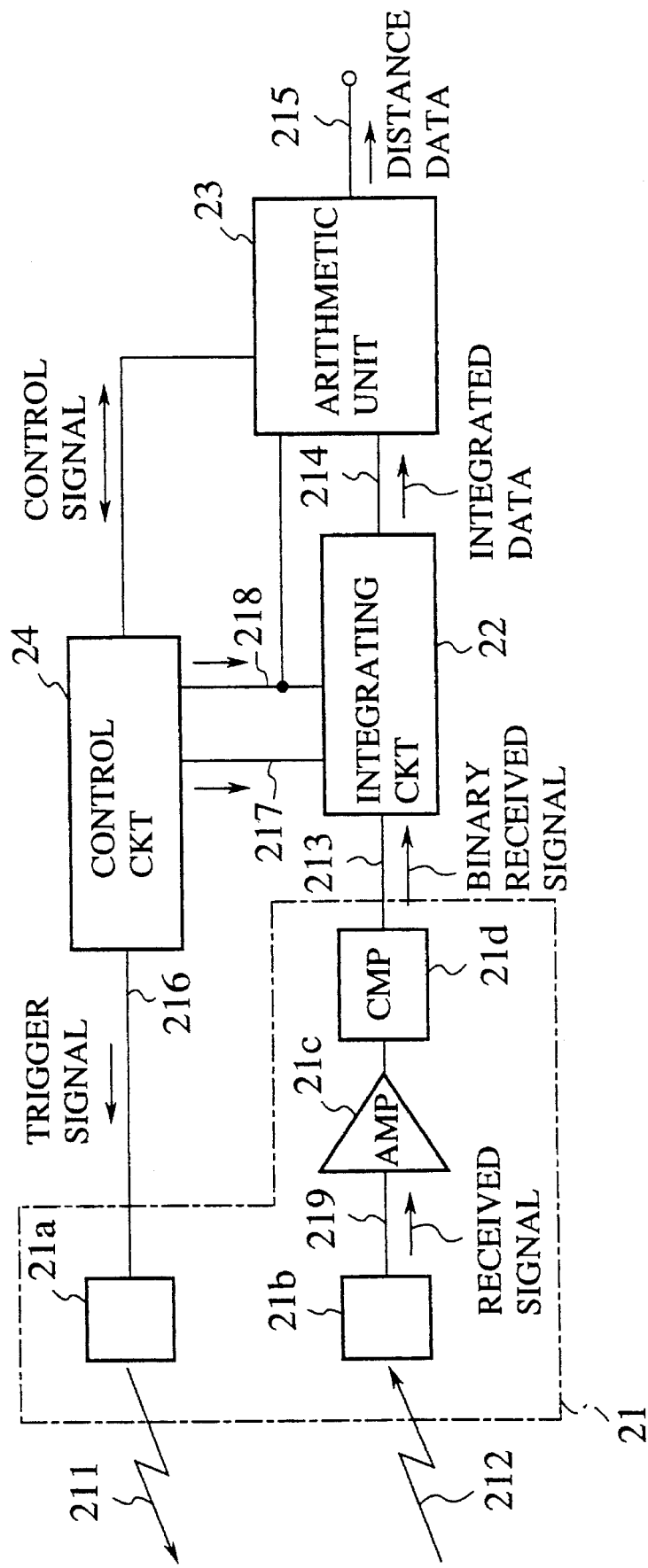
Figure 70:
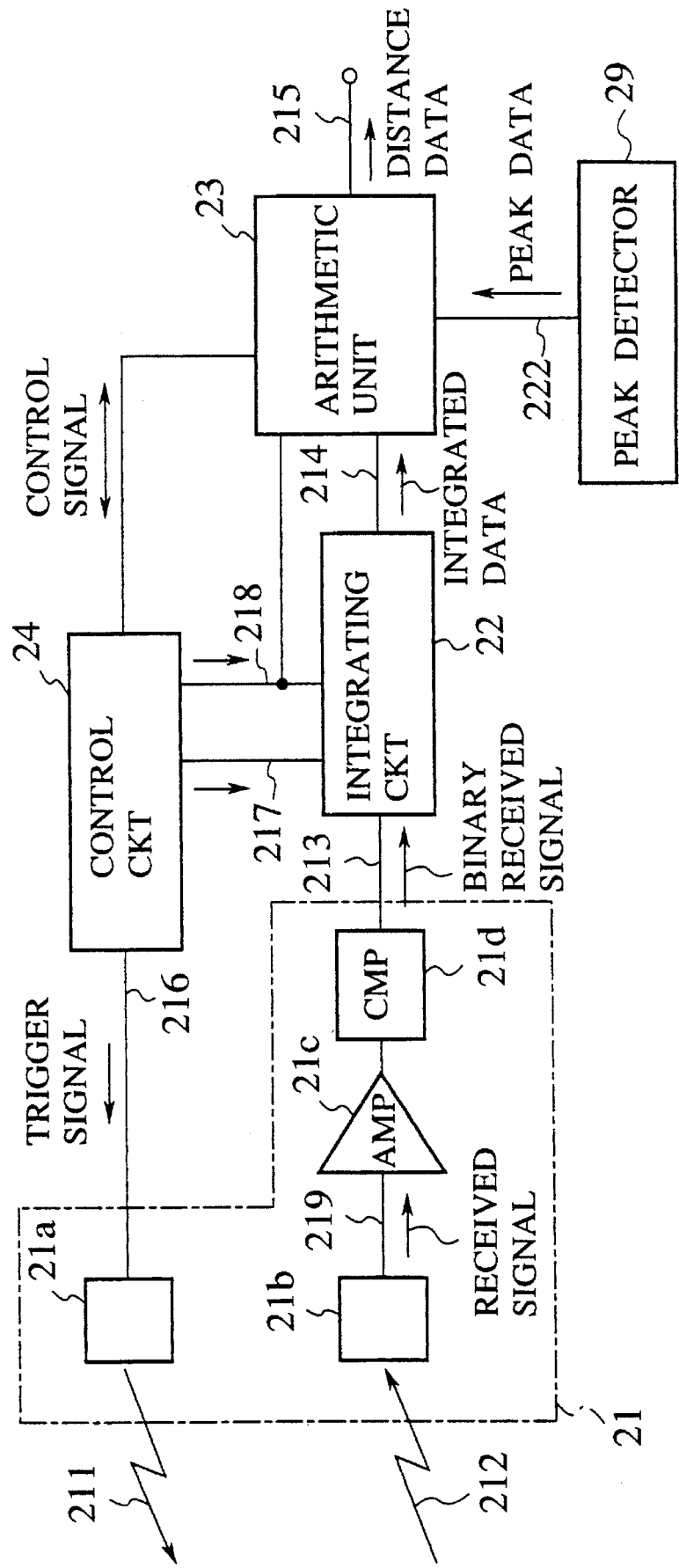
FIG. 70 is a block diagram showing a 17th embodiment of the present invention.
Figure 71:
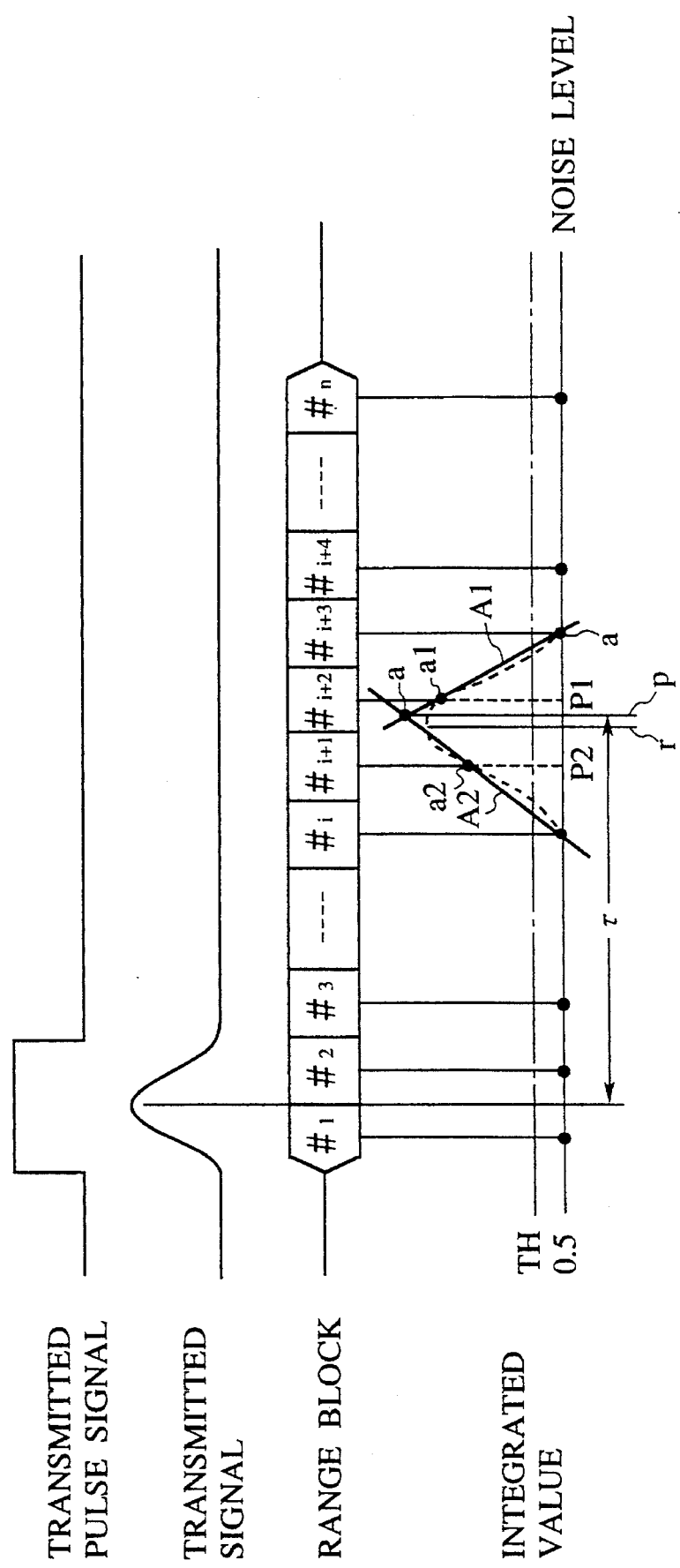
FIG. 71 explains a peak approximation technique of the 17th embodiment.
Figure 72:
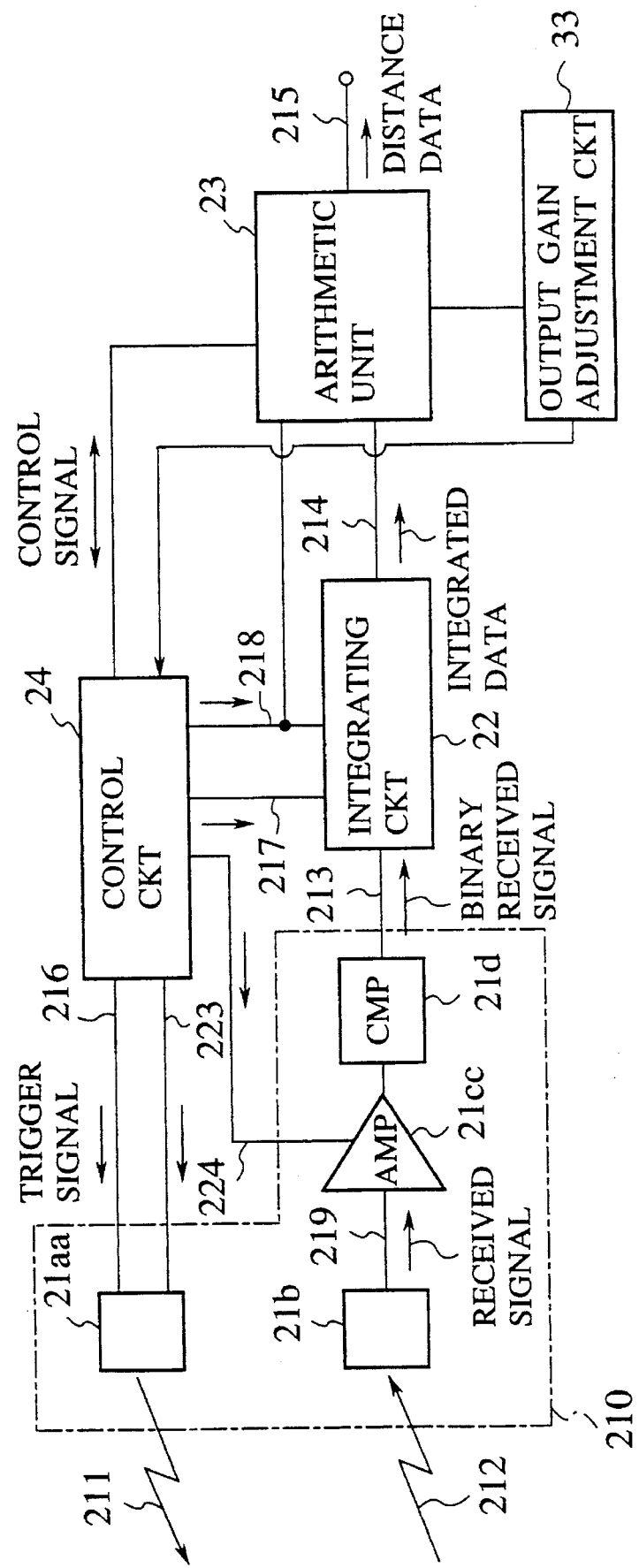
FIG. 72 is a block diagram showing an 18th embodiment of the present invention.
Figure 73:
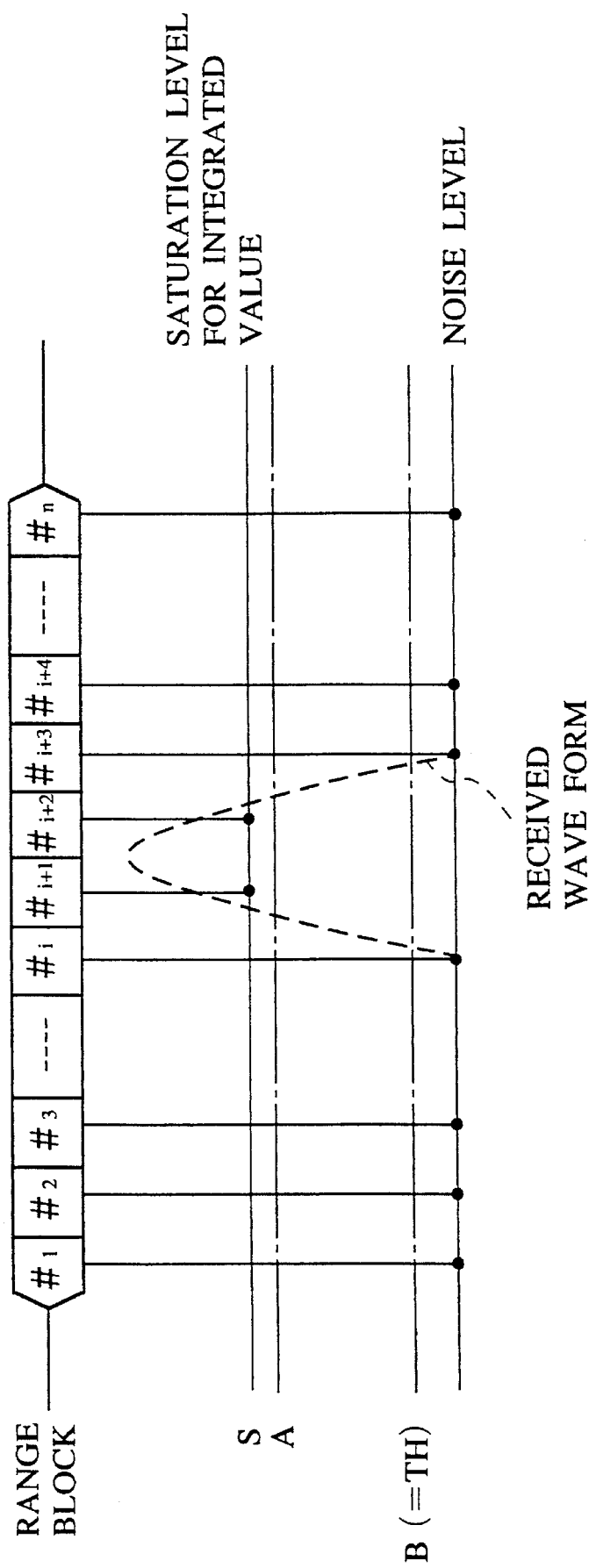
FIG. 73 explains an output gain decreasing operation of the 18th embodiment.

A radar apparatus according to the 17th embodiment of the present invention will be explained with reference to FIGS. 70 and 71. The same parts as those of the 12th embodiment of FIGS. 55 to 57 are represented with like reference marks. The radar apparatus of the 17th embodiment has a radar head 21, an integration circuit 22 for sampling a binary signal from the radar head 21 and integrating the sampled signal, an arithmetic unit 23 for calculating the distance to a target, and a control circuit 24 for controlling these circuits. These circuits are the same as those of the 12th embodiment. Alternatively, the 17th embodiment may employ the radar head, integration circuit, arithmetic unit, and control circuit of FIGS. 60, 61, 64, and 65. The 17th embodiment is characterized by a peak detector 29. The peak detector 29 is realized by a software program executed by a computer that forms the arithmetic unit 23. The peak detector 29 compares the integrated value of each range block provided by the integration circuit 22 with a threshold TH and identifies range blocks whose integrated values are each above the threshold TH. Among the integrated values of the range blocks exceeding the threshold TH, the peak detector 29 finds a peak according to an approximation technique to be explained later, and provides the arithmetic unit 23 with the peak. The peak detection process of the peak detector 29 is substantially the same as that of the peak detector 15 of the ninth embodiment. Namely, the peak detector 29 estimates a peak according to the flowchart of FIG. 38 and the timing chart of FIG. 71. A transmitter 21a transmits pulsesignals at sampling intervals. The width of the pulsesignal must be equal to or greater than a sampling pulse period $\Delta t$, which is 66.7 ns in the preceding embodiments. The period of each sampling process is 4 µs in the preceding embodiments. A receiver 21b continuously receives an external signal, which is amplified and converted into a binary signal through a limiter amplifier 21c and zero-cross comparator 21d. The binary signal is transferred to the integration circuit 22. Each pulse signal from the transmitter 21a is reflected by a target and received as a reflected pulse Rf by the receiver 21b with a delay time Td corresponding to the distance to the target. The integration circuit 22 samples and integrates the binary signal in each of a predetermined number (for example, 14) of range blocks in each trigger period. The number of sampling operations for one distance measuring operation is, for example, 8192. The number of sampling operations is equal to the number of trigger signals (FIG. 3), or the number of pulses transmitted from the transmitter 21a. After the completion of a predetermined number of integral operations, the integrated values of the range blocks are transferred to the peak detector 29. Since the width of each transmitted pulse is greater than the sampling pulse period $\Delta t$, the reflected pulse is detected in a plurality of the range blocks. The peak detector 29 receives the integrated value 214 of each range block from the integration circuit 22 and carries out a peak detection process as shown in FIG. 71 and finds a time delay $\tau$ of a peak with respect to the pulse transmitted timing. The time delay is transferred as peak data 222 to the arithmetic unit 23.

The steps of detecting a peak will be explained with reference to the timing chart of FIG. 71 and the flow chart of the eighth embodiment of FIG. 38. In steps 401 to 404, the integrated values of range blocks #1 to #n are successively read, the largest integrated value above the threshold TH is set as a first peak value a1, the second largest integrated value is set as a second peak value a2, and range blocks corresponding to the first and second peak values a1 and a2 are identified. In the example of FIG. 71, the first peak p1 corresponding to a range block #i+2 is farther than the second peak p2 corresponding to a range block #i+1 from the radar apparatus. Integrated values Si+2 and Si+1 in these range blocks are the peak values a1 and a2. Step 405 determines which of the first and second peaks p1 and p2 is farther from the radar apparatus. If the first peak p1 is farther than the second peak p2, step 406a extends a straight line A1 from the accumulated value a1 (=Si+2) of the first peak p1 (=#i+2) to the accumulated value Si+3 of a range block #i+3 that is farther than the first peak p1 by one block. Step 407a extends a straight line A2 from the accumulated value a2 (=Si+1) of the second peak p2 (=#i+1) to the accumulated value Si of a range block #i closer than the second peak p2 by one block to the radar apparatus. If the step 405 determines that the first peak p1 is closer than the second peak p2 to the radar apparatus, step 406b extends a straight line from the accumulated value a1 of the first peak p1 to the accumulated value of a range block in front of the first peak p1, and step 407b extends a straight line from the accumulated value a2 of the second peak p2 to the accumulated value of a range block behind the second peak p2. Step 408 finds an intersection "a" of the two straight lines A1 and A2 as a peak, and a time $\tau$ corresponding to the intersection "a" as a time between the transmission timing of the transmitted pulse and the reception of a corresponding reflected pulse. The time $\tau$ is supplied to the arithmetic unit 23, which calculates distance data 215 accordingly.

In this way, the peak detector 29 approximates the waveform of the received reflected pulse Rf by tangents close to a peak, calculates the time $\tau$ of the peak estimated from the intersection of the tangents, and provides the arithmetic unit 23 with the peak data 222. The arithmetic unit 23 calculates the distance data 215 corresponding to the time $\tau$ and provides an output accordingly to issue an alarm if necessary. The operation of the arithmetic unit 23 may be any one of the preceding embodiments. The 17th embodiment may be employed to detect a relative speed. The approximation technique of the peak detector of this embodiment is not limited to that mentioned above. Other approximation techniques such as a quadratic curve approximation involving time on an X-axis and cumulative data on a Y-axis may be employed. In this way, the peak detector is capable of calculating the distance to a target more precisely than units of range blocks ($\Delta t$) without dividing each range block into smaller sections. When each range block corresponds to a distance of 10 m, the radar apparatus of FIG. 70 is capable of measuring the distance to a target at an accuracy of 2 m or finer.

In this way, the radar apparatus of the 17th embodiment finds an approximate curve connecting sampling points whose integrated values exceed each a threshold, estimates a peak on the approximate curve, obtains a delay time from the timing of signal transmission to the peak, and calculates a distance corresponding to the delay time. This embodiment is capable of precisely measuring the distance to a target even if the target is present between adjacent sampling periods. Namely, this embodiment is capable of accurately measuring the distance to a target even with rough sampling periods.

A radar apparatus according to the 18th embodiment of the present invention will be explained with reference to FIGS. 72 to 76. This embodiment is characterized by an output/gain adjustment circuit 33 added to an arithmetic unit 23. If an integrated value provided by an integrator for a range block of an integration circuit 22 is above a saturation value, the output/gain adjustment circuit 33 decreases the sensitivity of the radar apparatus. If none of the integrated values provided by the integrators for range blocks of the integration circuit 22 is above a lower limit, the output/gain adjustment circuit 33 increases the sensitivity of the radar apparatus. The same parts as those of the radar apparatus of FIGS. 55 to 57 are represented with like reference marks. A radar head 210 has a transmitter 21aa having a function of changing the power of a transmission signal. A receiver 21b in the radar head 210 receives a signal 212. A limiter amplifier 21cc connected to the receiver 21b has a variable gain control function, i.e., an AGC function. These functions are controlled by an output control signal 223 and a gain control signal 224 provided by the output/gain adjustment circuit 33 through a control circuit 24. The output/gain adjustment circuit 33 may be a discrete unit or a software program executed by a computer that forms the arithmetic unit 23. The transmitter 21aa consists of, similar to the transmitter of FIG. 2, a drive circuit 5a-1, a light emitting element 5a-2 such as a laser diode, and a lens 5a-3 for condensing light toward a target. The output control circuit for automatically controlling the power of a transmission pulse may be a potentiometer, which automatically adjusts, in response to an external signal, an output resistor of the drive circuit 5a-1, to thereby adjust a current or a voltage applied to the light emitting element 5a-2. The limiter amplifier 21cc for automatically adjusting a gain is provided with an AGC circuit.

An operation of the radar apparatus of the 18th embodiment will be explained. The output/gain adjustment circuit 33 checks, after the completion of each distance measurement operation, a normalized value obtained by dividing an integrated value for each range block by the saturation voltage of an integrator. If any one of the normalized values of the range blocks is above a predetermined upper limit A, the adjustment circuit 33 provides an instruction 223 to lower the strength of a transmission signal and/or an instruction 224 to suppress the gain of a received signal. On the other hand, if each of the normalized values is blow a lower limit B, the adjustment circuit 33 provides an instruction 223 to increase the power of the transmission signal and/or an instruction 224 to increase the gain of a received signal. The lower limit B is usually a threshold TH for specifying a noise level. Upon receiving the instruction 223 to increase or decrease the output power of a transmission signal, the transmitter 21aa increases or decreases the output power step by step at a predetermined pitch, to strengthen or weaken a transmission pulsestep by step. Upon receiving the instruction 224 to increase or decrease the gain of a received signal, the limiter amplifier 21cc increases or decreases the gain thereof step by step at a predetermined pitch, to increase or decrease the strength of a received signal step by step. After the completion of a distance measuring operation carried out after the output and/or gain adjustment, normalized values are again checked. If any one of them is still above the upper limit A, the output and/or gain decreasing adjustment is repeated. On the other hand, if all of the normalized values are still below the lower limit B, the output and/or gain increasing adjustment is repeated. As a result, normalized values of the range blocks for detecting a reflected pulse are put between the upper and lower limits A and B.

Figure 43:
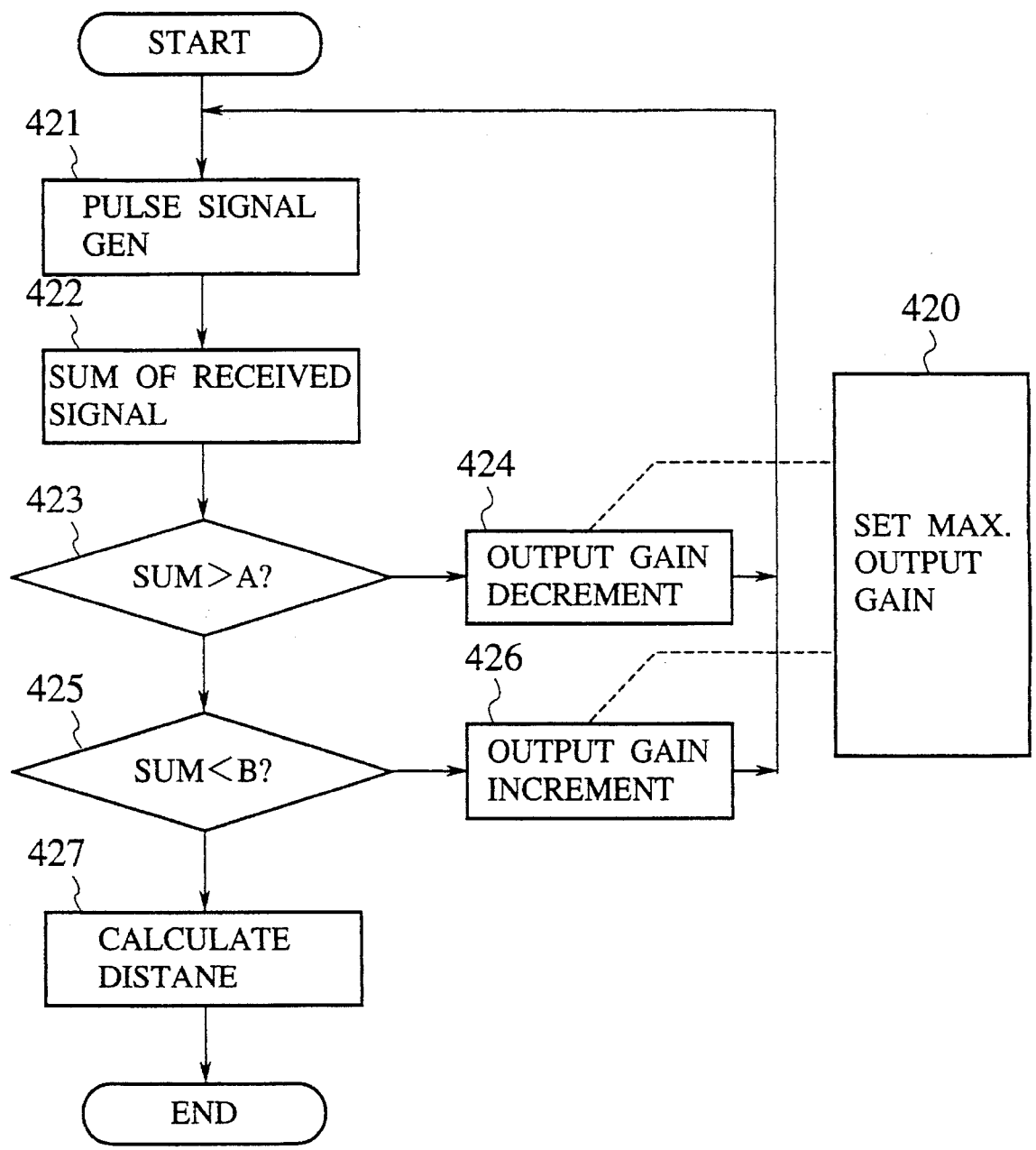
FIG. 43 is a flowchart showing steps carried out by the 10th embodiment.
Figure 44:
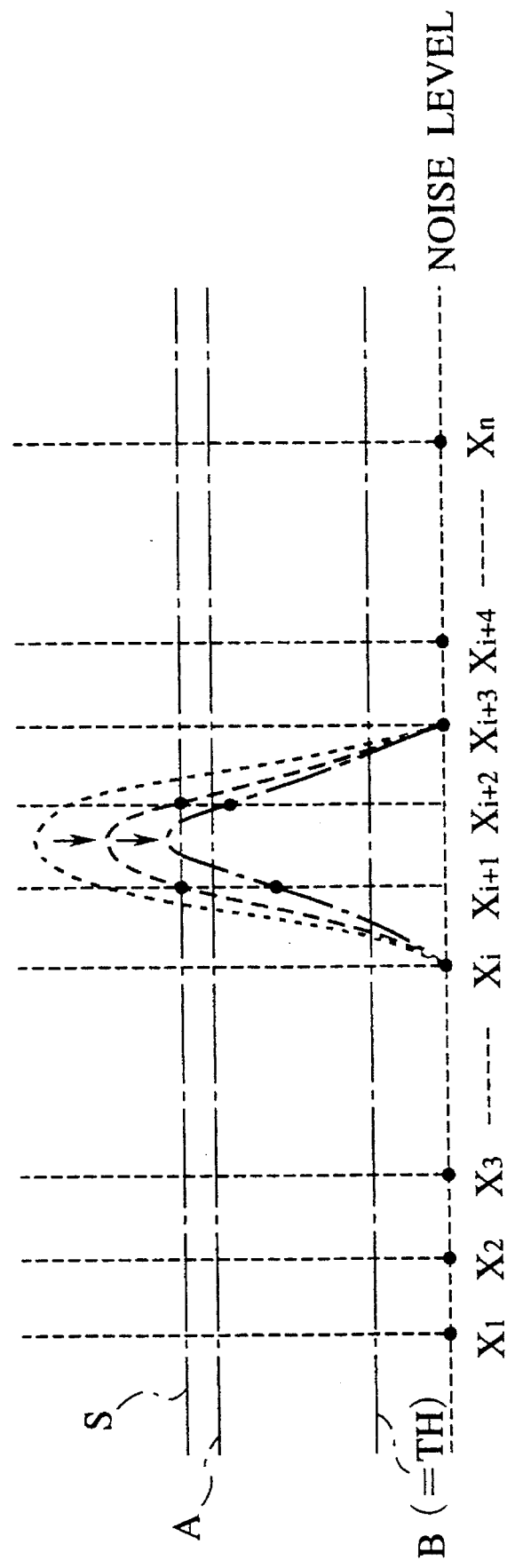
FIG. 44 explains an output gain decreasing operation of the 10th embodiment.
Figure 74:
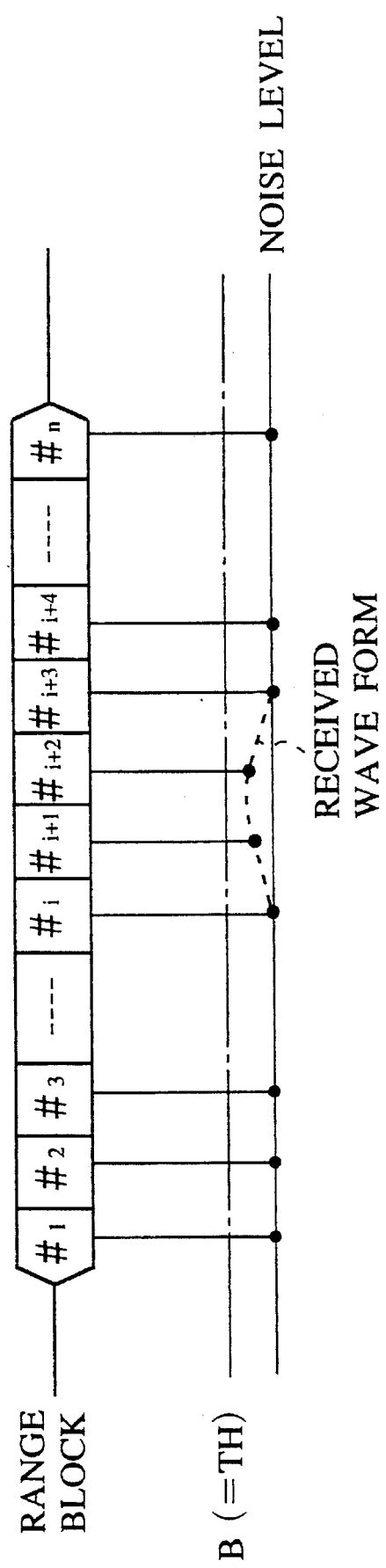
FIG. 74 explains an output gain increasing operation of the 18th embodiment.

The steps of automatically adjusting the sensitivity of the radar apparatus by adjusting output power and/or gain carried out by the output/gain adjustment circuit 33 of the 18th embodiment are substantially the same as those of the 10th embodiment of FIG. 43. The word "accumulated value" in FIG. 43 must be read as "integrated value" in the 18th embodiment. Step 420 sets a maximum gain and a maximum output to prevent excessive gain and output. Step 421 and the following steps are repeated whenever a distance measuring operation is carried out. The steps 421 and 422 carry out a distance measurement operation. In step 423, the output/gain adjustment circuit 33 scans integrated values of respective range blocks transferred to the arithmetic unit 23 and determines whether or not any one of normalized values of the integrated values is above the upper limit A. If there are range blocks such as #i+1 and #i+2 of FIG. 73 whose normalized values are each above the upper limit A, it is determined that the distance measuring sensitivity of the radar apparatus is too high. Accordingly, the adjustment circuit 33 provides the output and/or gain reduction instructions 223 and/or 224 to decrease the output power of a transmission pulse and/or the gain of a received signal by one step in step 424. Then, the next distance measuring operation is carried out. If the step 423 determines that there is no normalized value above the upper limit A, step 425 checks to see if there is any range block whose normalized value is above the lower limit B. If there is no normalized value that exceeds the lower limit B as shown in FIG. 74, it is determined that the sensitivity of the radar apparatus is too weak. In FIG. 74, the lower limit B is equal to a threshold TH. The adjustment circuit 33 provides the output increase instruction and/or gain increase instruction to increase the output power of a transmission pulse and/or the gain of a received' signal by one step in step 426. Then, the next distance measuring operation is carried out. The steps 421 to 426 are repeated until the normalized values of all of the range blocks are below the upper limit A and any one of them is above the lower limit B. These steps automatically optimize the distance measurement sensitivity of the radar apparatus. Once the sensitivity is automatically adjusted in this way, the arithmetic unit 23 carries out an original distance calculation process in step 427.

Automatically adjusting the sensitivity of the radar apparatus enables the radar apparatus to measure the distance to a far target as well as the distance to a near target. If the output power of a transmission signal and the gain of a received signal are fixed to large values to measure a far target, normalized values of the range blocks #i+1 and #i+2 of FIG. 73 will reach a saturation value S above the upper limit A when measuring the distance to a near target. Then, it will be impossible to correctly measure the distance to the near target. On the other hand, if the output power of a transmission signal and the gain of a received signal are fixed to small values to measure the distance to a near target, normalized values of the range blocks #i+1 and #i+2 of FIG. 74 are below the threshold TH when measuring a far target. In this case, the distance to the far target will not be measured even if a reflected pulse from the target is detected. The sensitivity adjustment mentioned above solves these problems, and the radar apparatus may receive a reflected pulse from a target at optimum reception strength and correctly measures the distance to the target without regard to the length of the distance. This results in improving the reliability of a distance measuring operation. The automatic sensitivity adjustment is not limited to that mentioned above. For example, the sensitivity adjustment may be carried out by adjusting the gain of a received signal at first, and if it is insufficient, the output power of a transmission signal will be adjusted. Alternatively, the sensitivity adjustment may be carried out by adjusting the output power of a transmission signal at first, and if it is insufficient, the gain of a received signal will be adjusted. To simplify a circuit structure, the sensitivity adjustment may be carried out only by adjusting the gain of a received signal, or only by adjusting the strength of a transmission signal.

Figure 75:
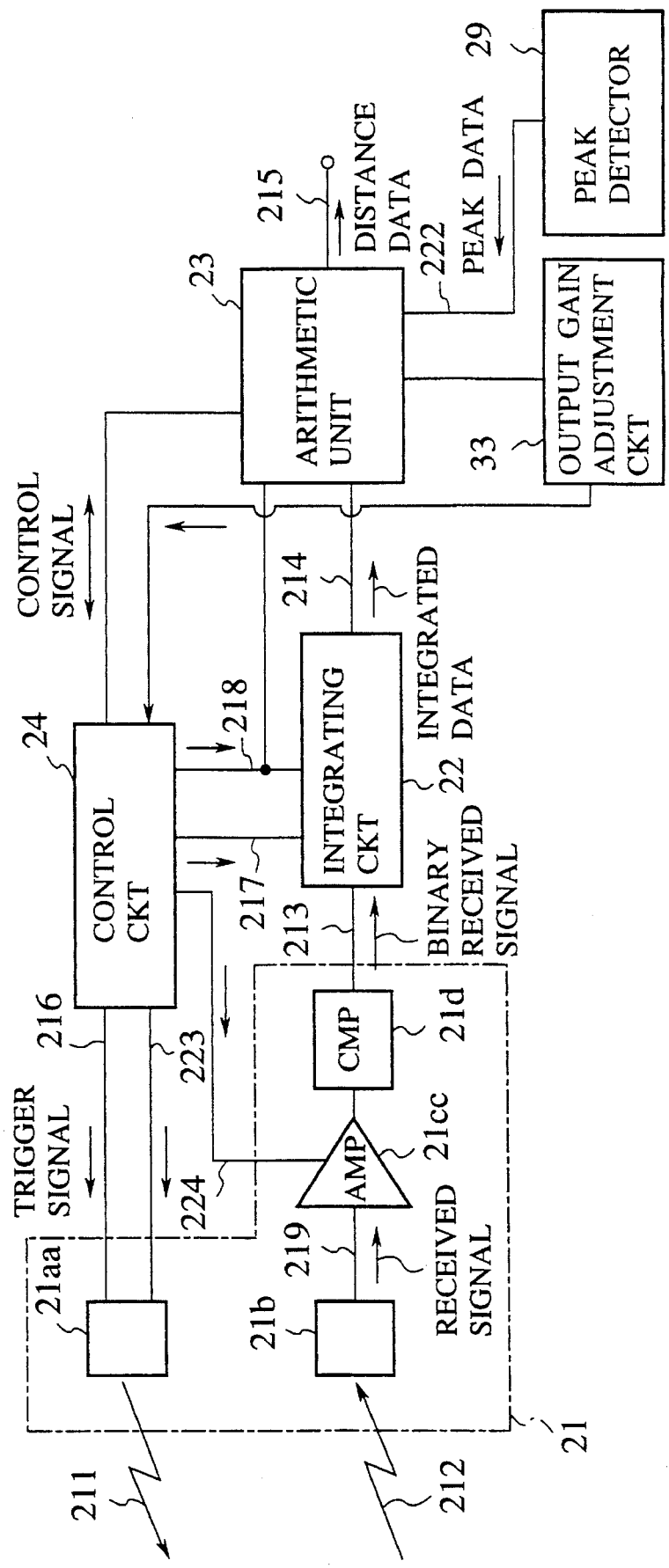
FIG. 75 is a block diagram showing a modification of the 18th embodiment.
Figure 76A:
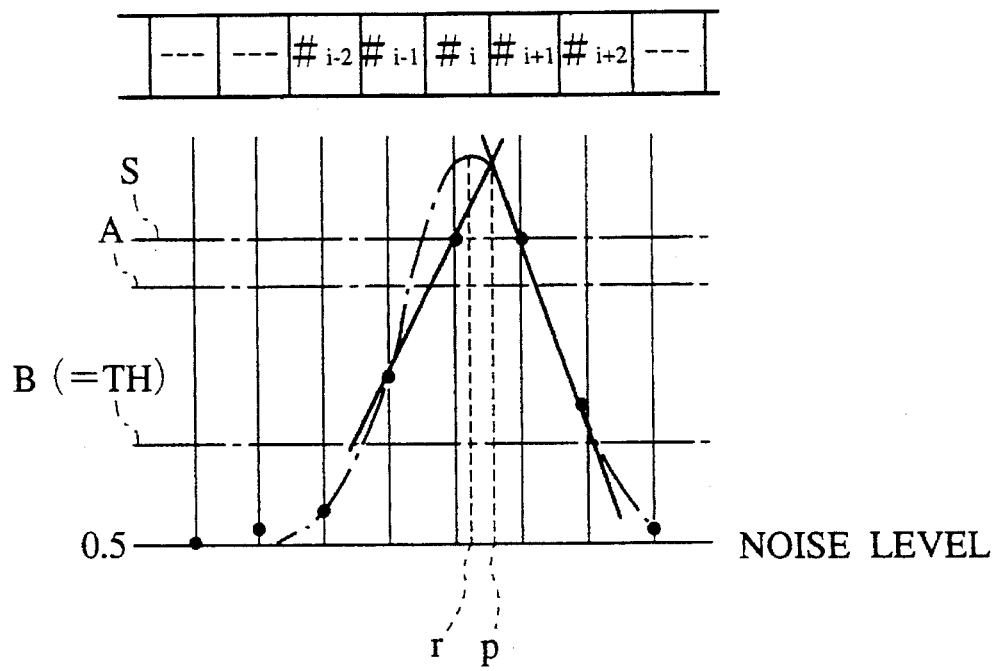
FIGS. 76A and 76B explain sensitivity adjusting and peak detecting operations of the modification of the 18th embodiment.
Figure 76B:
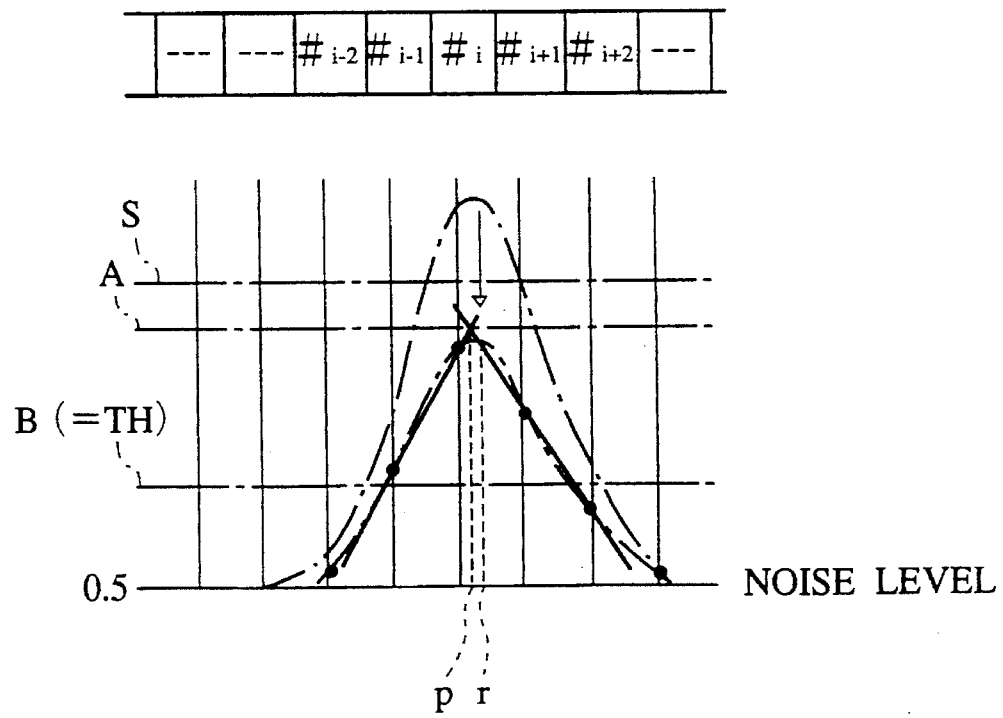

FIG. 75 shows a modification of the 18th embodiment. This modification adds the output/gain adjustment circuit 33 mentioned above to the radar apparatus having the peak detector 29 of the 17th embodiment of FIG. 70. If there is no adjustment circuit 33 as shown in FIG. 76A, the peak detector 29 may detect a peak p that deviates from an actual peak r of a received signal, if the normalized value of a range block #i or #i+1 reaches a saturation value S. If the adjustment circuit 33 is provided as shown in FIG. 76B, the automatic sensitivity adjustment may put the normalized value of every range block below the upper limit A, to correctly detect a peak p. This results in further improving distance measuring accuracy.

In this way, the radar apparatus of the 18th embodiment decreases the sensitivity thereof if the integrated value of any one of range blocks is above an upper limit, and increases the sensitivity if the integrated value of none of the range blocks is above a lower limit, to thereby always maintain each integrated value at a proper level, correctly detect a target, and accurately calculate the distance to the target. This embodiment adjusts the sensitivity of the radar apparatus by adjusting the output power of a transmission pulse and/or the amplification gain of a received signal, to always maintain each integrated value at a proper level, to thereby correctly detect a target and accurately calculate the distance to the target.

Figure 77:
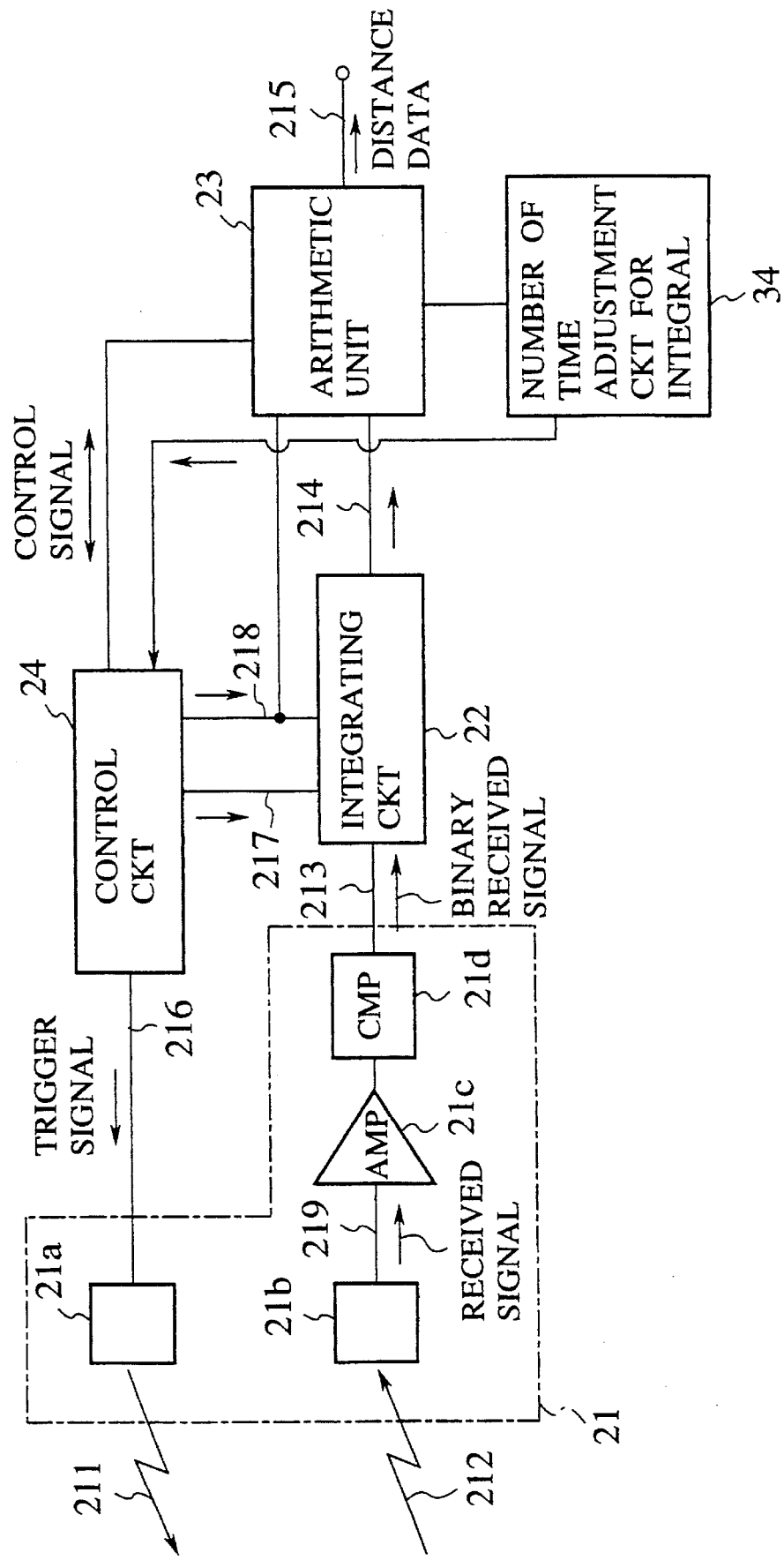
FIG. 77 is a block diagram showing a 19th embodiment of the present invention.

A radar apparatus according to the 19th embodiment of the present invention will be explained with reference to FIGS. 77 and 78. This embodiment is characterized by an adjustment circuit 34 serving as a sensitivity adjuster, for adjusting the number of integral operations. If any one of the normalized values of range block integrators of an integration circuit 22 is above an upper limit that is set in advance, the adjustment circuit 34 reduces the number of integral operations. If none of the normalized values of the range blocks is above a lower limit that is set in advance, the adjustment circuit 34 increases the number of integral operations. The other parts of this embodiment are the same as those of the radar apparatus of FIGS. 55 to 57 and are represented with like reference marks. The adjustment circuit 34 may be realized by a software program executed by a computer that forms an arithmetic unit 23.

An operation of the adjustment circuit 34 will be explained. Each of integrated values of range blocks of the integration circuit 22 is divided by an integration saturation voltage, to provide a normalized value. The adjustment circuit 34 checks each normalized value whenever a distance measuring operation is completed. If any one of the normalized values of the range blocks is above a predetermined upper limit A1 (FIG. 51), the adjustment circuit 34 issues an instruction to decrease the number m of integral operations to be carried out in one distance measuring operation. The number (m) of integral operations is 8192 in the preceding embodiments. On the other hand, if all of the normalized values are below a lower limit B1, the adjustment circuit 34 issues an instruction to increase the number of integral operations to be carried out in one distance measuring operation. The decrease or increase instruction is supplied to a sampling pulse generator 24d of a controller 24. Then, the sampling pulse generator 24d hastens or delays the timing of providing an end pulse by one step. Namely, the sampling pulse generator 24d counts the number of trigger signals provided by a trigger generator 24c, and when the count (equal to the number of integral operations) reaches a set value, provides the end pulse. In this way, the number of integral operations carried out by the integration circuit 22 is increased or decreased. After the completion of a distance measurement operation carried out after the adjustment of the number of integral operations, the adjustment of reducing the number of integral operations is again carried out if any one of the normalized values is above the upper limit A1, and the adjustment of increasing the number of integral operations is repeated if all of the normalized values are below the lower limit B1.

The steps of automatically adjusting the number of integral operations will be explained with reference to the flowchart of FIG. 50 of the 11th embodiment. In this flowchart, the term "accumulated value" must be read as "integrated value" in the 19th embodiment. Step 430 sets the number m of integral operations to, for example, 8192. Namely, as in the preceding embodiments, the range of 0 to 130 m is sampled in 14 range blocks at intervals of 10 m. A transmission period of a transmission pulse is 4 µs, and a sampling pulse interval $\Delta t$, i.e., the sampling period of each range block is 66.7 ns. Steps 431 and 432 carry out one distance measuring operation. The circuit 34 for adjusting the number of integral operations scans integrated values of the range blocks and checks to see if any one of the normalized values of the integrated values of the range blocks is above the upper limit A1 in step 433. If the normalized values of, for example, range blocks #i+1 and #i+2 are each above the upper limit A1, the adjustment circuit 34 instructs, in step 434, the sampling pulse generator 24d to quicken the output timing of an end pulse by one step, to reduce the number of integral operations to be carried out by the integration circuit 22. Then, the next distance measuring operation is carried out. If the step 433 determines that there is no normalized value exceeding the upper limit A1, step 435 determines checks to see if there is a range block whose normalized value is greater than the lower limit B1. If there is no normalized value that exceeds the lower limit B1, the adjustment circuit 34 instructs, in step 436, the sampling pulse generator 24d to slow the output timing of an end pulse by one step, to increase the number of integral operations to be carried out by the integration circuit 22. Then, the next distance measuring operation is carried out. These steps 431 to 436 are repeated until the normalized values of all the range blocks are below the upper limit A1 and at least one of them is above the lower limit B1. In this way, this embodiment automatically adjusts the number of integral operations to a required minimum to detect a target and measure the distance to the target with a sufficient S/N ratio. Once the number of integral operations is automatically adjusted through the above steps, the arithmetic unit 23 carries out an original distance measuring process in step 437.

In this way, this embodiment automatically adjusts the number of integral operations to detect a target and calculate the distance to the target with a required minimum number of integral operations and a sufficient S/N ratio. A target close to the radar apparatus provides a large S/N ratio. Accordingly, it is required to speedily measure the distance to the close target. This embodiment is capable of speedily measuring the distance to the close target with a small number of integral operations.

Figure 78:
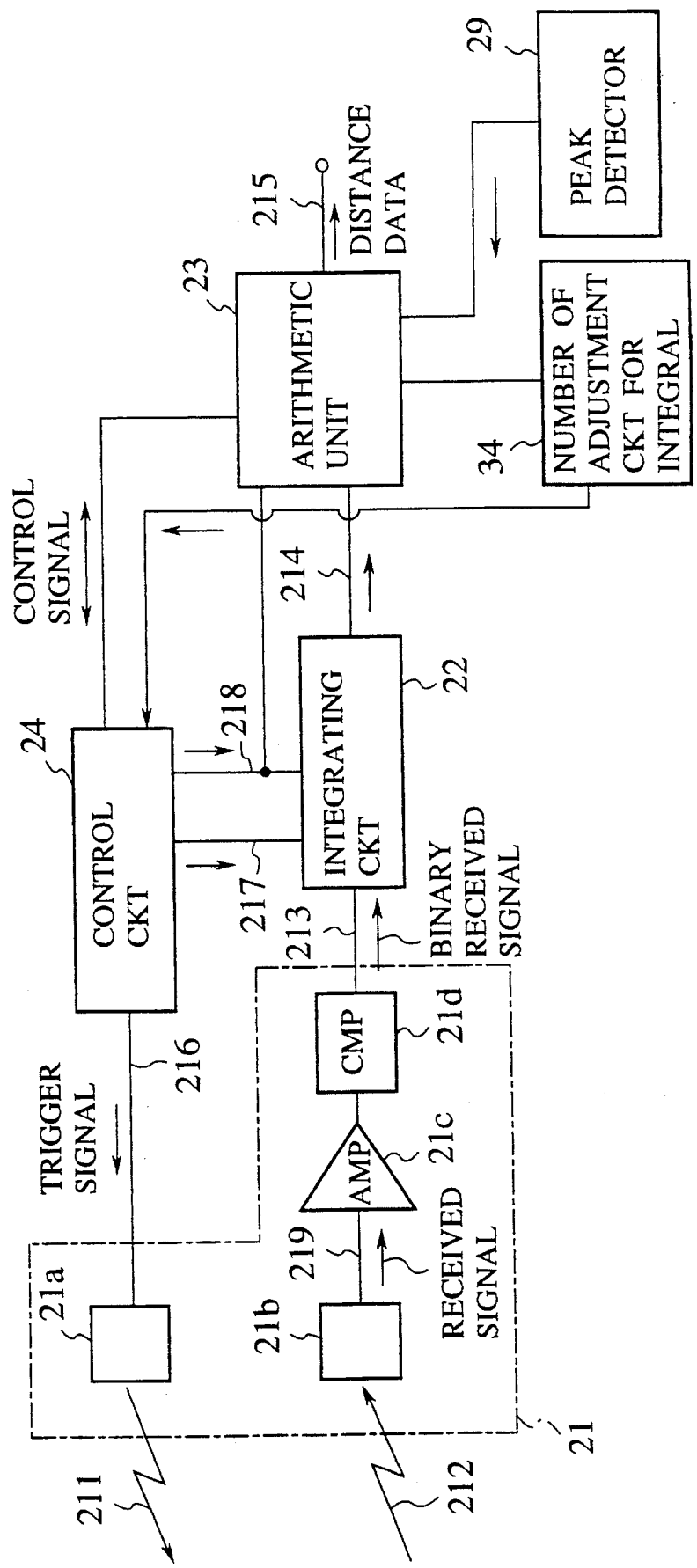
FIG. 78 is a block diagram showing a modification of the 19th embodiment.

FIG. 78 shows a modification of the 19th embodiment. This modification adds the adjustment circuit 34 mentioned above to the radar apparatus having the peak detector 29 of the 17th embodiment of FIG. 70. This modification automatically optimizes the number of integral operations at first and then measures the distance to a target. In this case, the peak detector 29 can correctly quickly detect a peak p.

The 18th and 19th embodiments may be combined together to provide a radar apparatus having the functions of automatically adjusting the output power of a transmission signal, the gain of a received signal, and the number of integral operations. An operation of this combination will be explained. Sampling and integrating operations are carried out 1024 times. If there is any range block whose integrated value is above the upper limit A, the gain of the receiver is decreased and/or the output power of the transmitter is decreased. If there is no range block whose integrated value is above the lower limit after the 1024 sampling and integrating operations, the gain of the receiver is increased and/or the output power of the transmitter is increased. As a result, an optimum S/N ratio is obtained. When the integrated values fall between the upper and lower limits, the number of integral operations is set to 8192, to always obtain integrated values with less fluctuations. Thereafter, a normal operation of detecting a reflected signal is carried out. The number of integral operations to be set may be 7168 (=8192–1024). In this way, the gain and/or output adjustment is carried out at first with a small number of integral operations (quite smaller than a usual number of 8192), to speedily optimize the output power of the transmitter and the gain of the receiver, quickly detect a target, and correctly calculate the distance to the target. As explained above, this example carries out 1024 sampling and integrating operations at first. If any one of the integrated values of the range blocks is above the upper limit, the gain of the receiver is decreased and/or the output of the transmitter is decreased. If the integrated value of every range block is below the upper limit, the number of integral operations is directly set to 8192, to integrate values with less fluctuations. Thereafter, a normal operation of detecting a reflected signal is carried out. The number of integral operations may be 7168 (=8192–1024). This example firstly adjusts the gain and output power with a small number of integral operations (quite smaller than a usual number of 8192), to speedily optimize the gain and output power. As a result, this example shortens a time for correctly detecting a reflected signal and measuring the distance to a target.

In this way, the radar apparatus of the 19th embodiment employs the circuit for adjusting the number of integral operations as the sensitivity regulator, to automatically set the number of integral operations to be carried out by the integration circuit to a required minimum, to detect a reflected signal with a sufficient S/N ratio. This embodiment is capable of speedily detecting a target and measuring the distance to the target.

Figure 79:
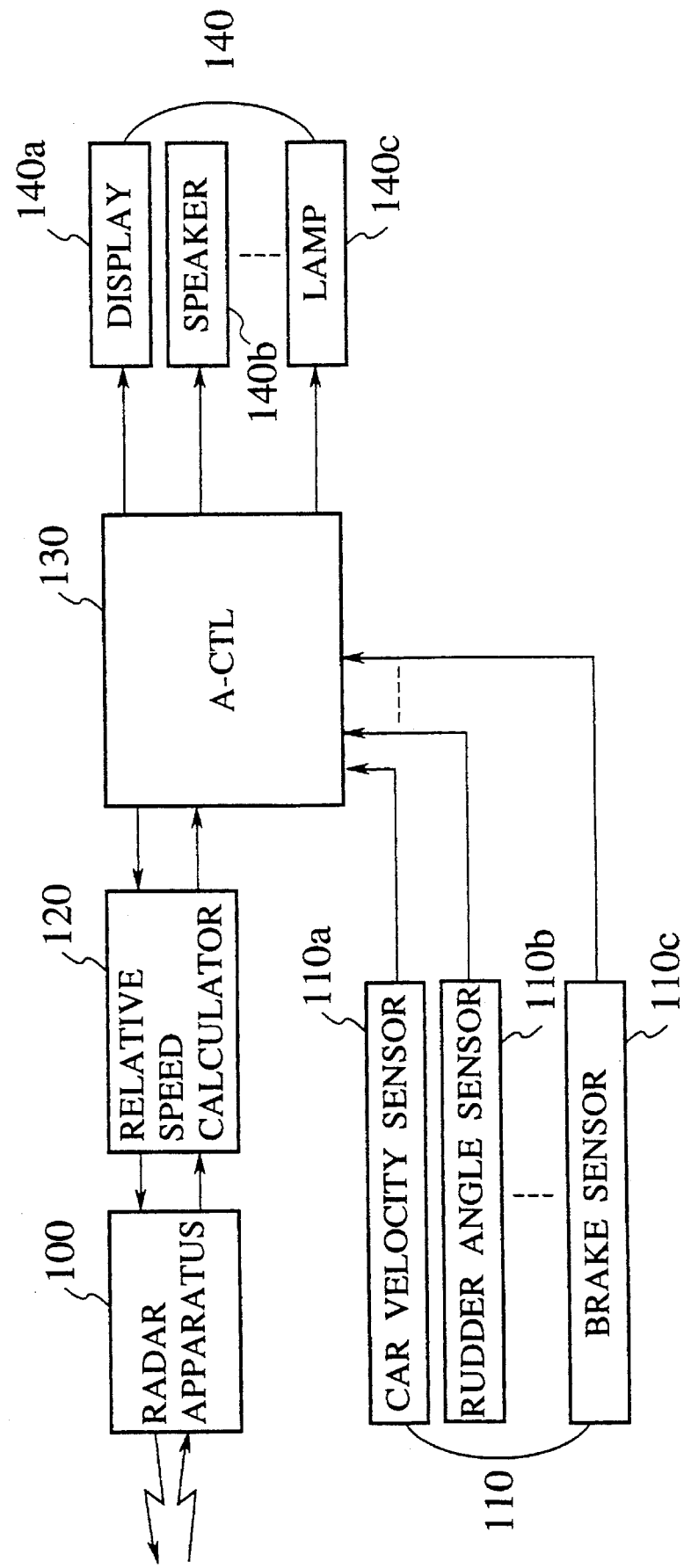
FIG. 79 is a block diagram showing a collision avoidance system employing the radar apparatus of the present invention.

Application of the radar apparatus of any one of the above embodiments will be explained. FIG. 79 shows a collision avoidance system for a car, employing the radar apparatus of the present invention. This system has the radar apparatus 100, sensors including a velocity sensor 110a, a rudder angle sensor 110b, and a brake sensor 110c, a relative speed calculator 120, an arithmetic controller 130, and output devices 140. The radar apparatus 100 repeatedly carries out a distance measuring operation. The relative speed calculator 120 temporally differentiates the output of the radar apparatus, to calculate the relative speed of the car with respect to a car running ahead. The arithmetic controller 130 receives the distance data and relative speed data. The arithmetic controller 130 also receives the velocity of the car and a rudder angle from the sensors 110 and calculates the possibility of the car colliding with the car running ahead. If the distance to the car running ahead is short and the relative speed is greater than a predetermined value, the arithmetic controller 130 determines that there is a risk of collision and sends an alarm to the output devices 140 such as a display 140a and a speaker 140b, to let the driver avoid a collision. If the distance to the car running ahead becomes a safety one, the fact will be notified to the driver through the output devices 140.

Figure 80:
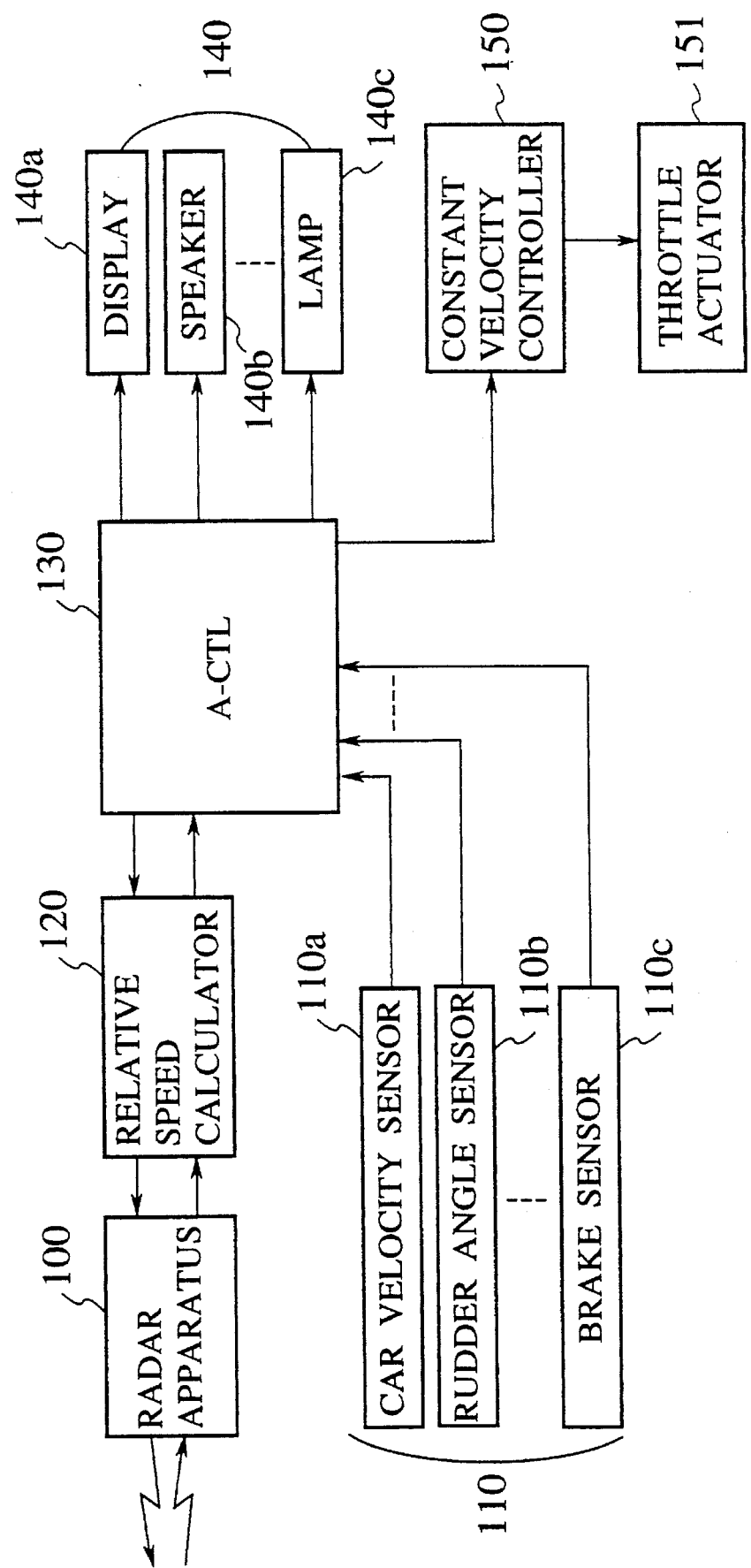
FIG. 80 is a block diagram showing another collision avoidance system employing the radar apparatus of the present invention.

FIG. 80 shows an ON/OFF controller for a constant velocity controller, employing the radar apparatus of the present invention. The arithmetic controller 130 of FIG. 79 is connected to the constant velocity controller 150, which controls a throttle actuator 151. When the driver enters a required speed and turns ON the constant velocity controller 150, the controller 150 adjusts the opening of the throttle actuator 151, to drive the car at the required speed. The arithmetic controller 130 receives relative speed data and distance data from a relative speed calculator 120 and signals from sensors 110 and calculates the proximity of the car with respect to a car running ahead. If the cars are too close to each other, the arithmetic controller 130 notices the matter to the driver through output devices and sends an OFF signal to the constant velocity controller 150 to stop the automatic constant speed driving. The arithmetic controller 130 lets the throttle actuator 151 close a throttle valve to decelerate the car, to thereby secure a safety distance between the cars. If the relative speed is sufficiently decreased and the distance between the cars is sufficiently extended, the arithmetic controller 130 sends an ON signal to the constant velocity controller 150, to activate the automatic constant driving. In this way, this system issues an alarm as soon as the distance to a car running ahead is excessively shortened during the constant speed driving controlled by the constant velocity controller.

Figure 81:
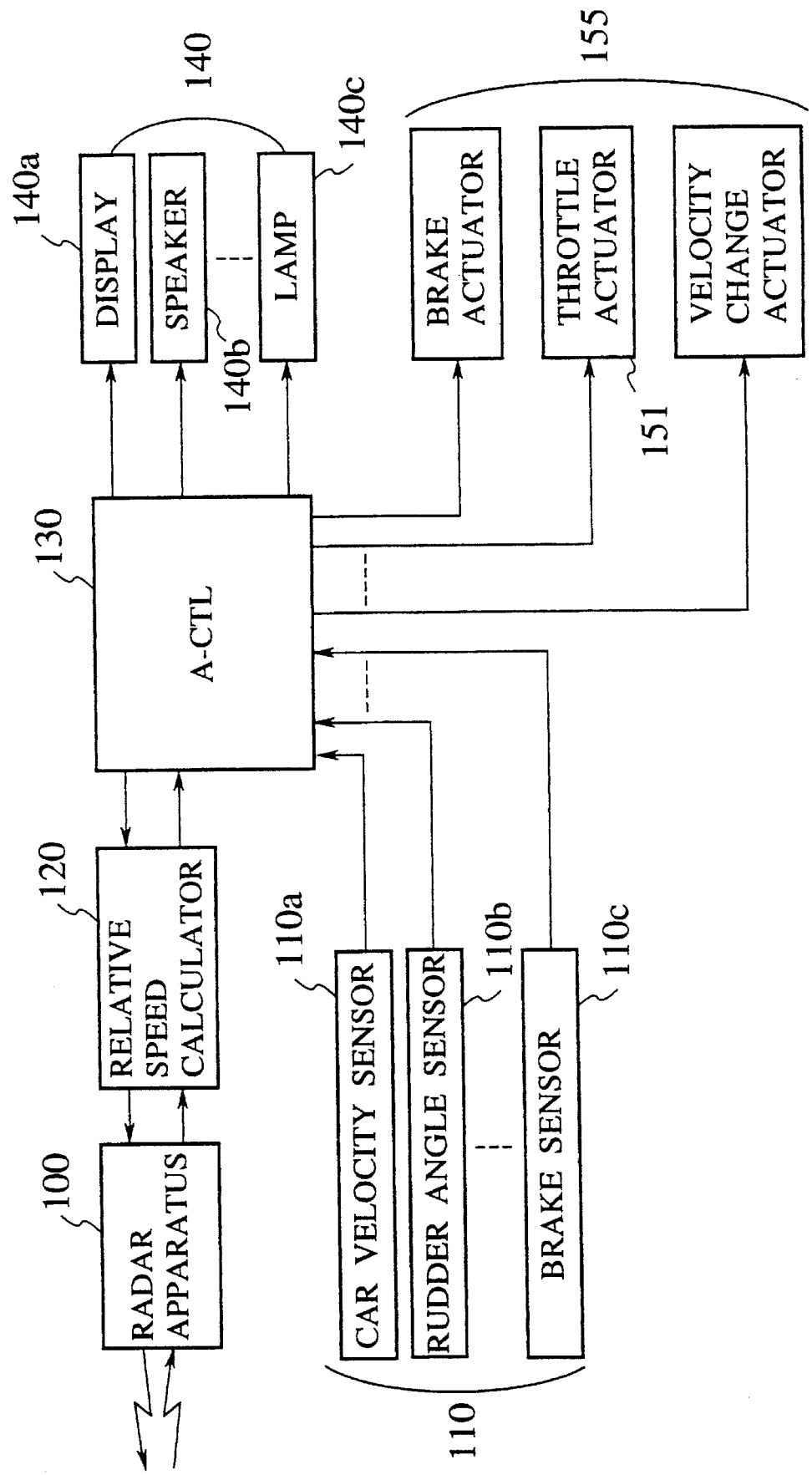
FIG. 81 is a block diagram showing still another collision avoidance system employing the radar apparatus of the present invention.

FIG. 81 shows a collision avoidance system. When an arithmetic controller 130 determines that there is a risk of collision according to the distance to a car running ahead and a relative speed, the collision avoidance system activates actuators 155 to automatically avoid a collision. The actuators 155 include a brake actuator, a throttle actuator, a transmission actuator, etc., which are accessed by the arithmetic controller 130. If the relative speed is large and the distance to the car running ahead is shortening the arithmetic controller 130 automatically accesses a deceleration actuator to activate an engine brake, as well as the brake actuator to brake the car.

Figure 83:
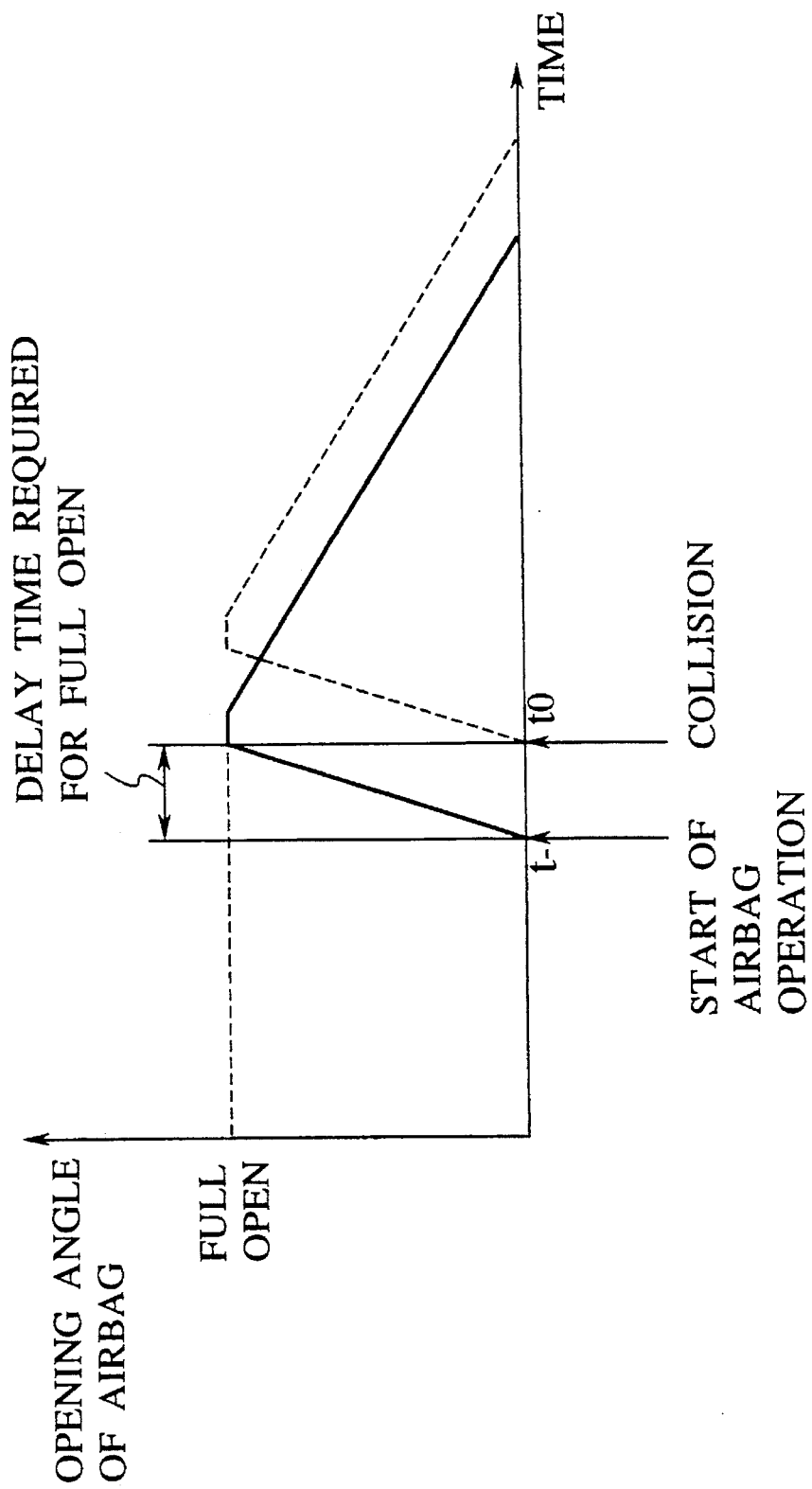
FIG. 83 explains an operation of the precrash air bag system.

FIG. 82 shows a precrash air bag system. This system has a radar apparatus 100 of the present invention, a relative velocity calculator 120, and an arithmetic controller 130. The arithmetic controller 130 accesses the air bag system 160 and inflates an air bag as quickly as possible. A conventional air bag system starts to inflate an air bag at time to of FIG. 83 when a collision occurs. Namely, the driver leans forward due to the shock of the collision, and at the same time, the air bag inflates, as indicated with a curve a. Accordingly, the air bag may hit the face of the driver. According to the precrash air bag system of the present invention, the radar apparatus 100 always measures a distance, and the relative velocity calculator 120 provides the arithmetic controller 130 with the relative speed of and the distance to a car running ahead. The arithmetic controller 130 always monitors the relative speed and distance data. When the speed of the car of its own and the relative speed are each large and the distance between the two cars is shortening, the arithmetic controller 130 issues an activation instruction to the air bag system 160 at time t–. As a result, the air bag is sufficiently inflated by time to when the cars actually collide with each other. In this way, the precrash air bag system according to the present invention secures a rapid operation.

Although the present invention has been explained in connection with the optical radar apparatuses employing LEDs and semiconductor laser diodes, the present invention is also applicable to radio, ultrasonic, and sound wave radar apparatuses employing radio and sonic wave transmitters instead of the light emitting elements. In the case of the radio radar apparatus, a short-wave electromagnetic wave is preferable in terms of directivity and interference with other frequencies. Since the present invention works with a transmission pulsesignal of small output power, it may employ electromagnetic waves in a millimeter band or a sub-millimeter band. Oscillation and amplification elements such as GaAs FET, HEMT, and HBT are employable as radio wave transmitters.

What is claimed is:

1. A radar apparatus comprising:
   (a) means for transmitting an output signal such as one of optical, electromagnetic, and sonic wave signals;
   (b) means for receiving a signal reflected by an external target;
   (c) means for sampling the received signal at predetermined intervals;
   (d) means for accumulating data according to the components of the sampled signal;
   (e) means for storing the accumulated data;
   (f) means for controlling said transmission, sampling, accumulation, and storage means; and
   (g) means for reading the data out of the storage means and determining whether or not the data contain the reflected signal from the target.

2. A radar apparatus as claimed in claim 1, wherein:
   said sampling means is a shift register to successively shift and store the sampled signal;
   said accumulation means accumulates a positive value whenever a sampled component successively transferred from said sampling means is positive; and
   said storage means has memories corresponding to sampling pulses produced in one sampling period, respectively, to store the accumulated data.

3. A radar apparatus as claimed in claim 1, wherein said sampling means repeatedly samples positive and negative phase data of the received signal at predetermined intervals.

4. A radar apparatus as claimed in claim 1, wherein said sampling means repeatedly samples the positive and negative sign data of the received signal at predetermined intervals.

5. A radar apparatus comprising:
   (a) means for transmitting an output signal such as one of optical, electromagnetic, and sonic wave signals;
   (b) means for receiving a signal reflected by an external target;
   (c) means for sampling the received signal at predetermined intervals;
   (d) means for accumulating data according to the components of the sampled signal;
   (e) means for storing the accumulated data;
   (f) means for controlling said transmission, sampling, accumulation, and storage means;
   (g) means for reading the data out of the storage means and determining whether or not the data contain the reflected signal from the target;
   (h) means for detecting an interference signal in the received signal; and
   (i) means for removing the detected interference signal.

6. A radar apparatus as claimed in claim 5, wherein said interference signal detection means has:
   means for calculating the relative speed of the target according to a period for detecting the reflected pulse; and
   means for detecting an abnormality in the relative speed calculated by said relative speed calculation means.

7. A radar apparatus as claimed in claim 5, wherein said interference signal detection means has means for detecting an offset in the data stored in said cumulative storage means, to determine whether or not there is an interference signal.

8. A radar apparatus as claimed in claim 5, wherein the ratio ($\Delta f/fc$) of a frequency error ($\Delta f$) to a reference clock frequency (fc) of a reference clock signal is at least $2 \times 10^{-7}$, the reference clock signal determining the operation timing of said transmission means, reception means, sampling means, accumulation means, storage means, decision means, interference signal detection means, and interference signal removing means.

9. A radar apparatus as claimed in claim 8, wherein said frequency error $\Delta f$ is the frequency difference between the respective reference clock frequency of two opposing radar apparatuses (fc1, fc2), and said value of fc is approximately equal to fc1 and fc2.

10. A radar apparatus as claimed in claim 5, wherein the ratio ($\Delta f/fc$) of a frequency error ($\Delta f$) to a reference clock frequency (fc) of a reference clock signal is at least equal to the ratio of a sampling interval to an accumulation period of the cumulative storage means, the reference clock signal determining the operation timing of said transmission means, reception means, sampling means, accumulation means, storage means, decision means, interference signal detection means, and interference signal removing means.

11. A radar apparatus as claimed in claim 6, wherein said relative speed calculation means has:
    means for calculating an approaching speed according to a difference between a first time point at which a reflected signal has been detected at a first nearest sampling point and a second time point at which the reflected signal has been detected at a second sampling point that is nearer than the first sampling point; and
    means for calculating a separating speed according to a difference between a first time point at which the reflected signal has disappeared at a first farthest sampling point and a second time point at which the reflected signal has disappeared at a second sampling point that is farther than the first sampling point.

12. A radar apparatus comprising:
    (a) means for transmitting an output signal such as one of optical, electromagnetic, and sonic wave signals;
    (b) means for receiving a signal reflected by an external target;
    (c) means for sampling the received signal at predetermined intervals;
    (d) means for accumulating data according to the components of the sampled signal;
    (e) means for storing the accumulated data;
    (f) means for controlling said transmission, sampling, accumulation, and storage means;
    (g) means for reading the data out of the storage means and determining whether or not the data contain the reflected signal from the target;
    (h) means for detecting an interval between sampling points where the received signal is detected;
    (i) means for preventing erroneous detection in detecting the interval between the sampling points; and
    (j) means for calculating the relative speed of the target according to the interval.

13. A radar apparatus as claimed in claim 1, wherein the width of a pulse transmitted from said transmission means is wider than a sampling interval of said sampling means.

14. A radar apparatus comprising:
    (a) means for transmitting an output signal such as one of optical, electromagnetic, and sonic wave signals;
    (b) means for receiving a reflected signal such as one of optical, electromagnetic, and sonic wave signals;
    (c) means for sampling the received signal at predetermined intervals, and thereafter, sampling noise;

(d) means for accumulating data and noise according to the components of the sampled signal and noise;

(e) means for storing the accumulated data and noise;

(f) means for controlling said transmission, sampling, accumulation, and storage means;

(g) means for detecting all levels of the sampled noise and employing the levels as thresholds for determining whether or not the accumulated data contain a reflected pulse from a target; and (h) means for reading the accumulated data and noise and determining whether or not the accumulated data contain the reflected pulse from the target according to the thresholds.

15. A radar apparatus comprising:

(a) a plurality of means for transmitting an output signal such as one of optical, electromagnetic, and sonic wave signals;

(b) means for individually driving said transmission means at predetermined intervals;

(c) means for receiving a reflected signal such as one of an optical, electromagnetic, and sonic wave signals;

(d) means for sampling the received signal at predetermined intervals;

(e) means for accumulating data according to the contents of the sampled signal;

(f) means for storing the accumulated data; and (g) means for reading the accumulated data out of said storage means and determining whether or not the data contain a reflected pulse from an external target.

16. A radar apparatus comprising:

(a) means for periodically transmitting a pulse signal;

(b) means for continuously receiving a signal in a direction in which the pulsesignal is reflected by a target;

(c) means for converting the received signal into a binary signal;

(d) means for sampling the binary signal at one or a plurality of different sampling points after said transmission means transmits the pulsesignal;

(e) one or a plurality of means for accumulating values sampled at the sampling points, respectively, in response to each of a predetermined number of pulses in signals emitted from said transmission means; and (f) means for comparing a normalized value of the accumulated value of each of said accumulation means with a predetermined threshold and determining whether or not there is a reflected signal from the target according to a result of the comparison.

17. A radar apparatus as claimed in claim 16, further comprising:

means for calculating the distance to the target according to a time delay between the timing of said transmission means transmitting the pulsesignal and one of the sampling points that provides an accumulated value whose normalized value is greater than the threshold.

18. A radar apparatus comprising:

(a) means for periodically transmitting a pulse signal;

(b) means for continuously receiving a signal in a direction in which the pulsesignal is reflected by a target;

(c) means for converting the received signal into a binary signal;

(d) means for sampling the binary signal at a sampling point after said transmission means transmits the pulsesignal;

(e) means for accumulating a value sampled at the sampling point in response to each of a predetermined number of pulsesignals emitted from said transmission means;

(f) means for switching the sampling point to another once said accumulation means completes the accumulation of the predetermined number of sampled values at the sampling point, and letting said accumulation means accumulate sampled values at the new sampling point;

(g) means for storing the accumulated values of the sampling points, respectively;

(h) means for comparing a normalized value of each of the accumulated values stored in said storage means with a predetermined threshold and determining whether or not there is a reflected signal from the target according to a result of the comparison; and (i) means for calculating the distance to the target according to a time delay between the timing of said transmission means transmitting the pulsesignal and one of the sampling points that provides an accumulated value whose normalized value is greater than the threshold.

19. A radar apparatus as claimed in claim 16, further comprising:

means for detecting an interference wave contained in a reflected signal received by said reception means; and means for removing the interference wave.

20. A radar apparatus as claimed in claim 16, further comprising:

one or a plurality of means for accumulating a predetermined number of values corresponding to noise sampled at the same sampling points as above, respectively, while said transmission means is not transmitting the pulse signal, the accumulated values of the sampling points being normalized, respectively, and being used as the thresholds of the sampling points, respectively.

21. A radar apparatus as claimed in claim 17, further comprising:

means for plotting an approximation curve by connecting the normalized values of sampling points that exceed each the threshold to one another according to an approximation formula; and means for detecting a peak in the approximation curve, finding a time delay between the peak and the timing of said transmission means transmitting the pulsesignal, and providing said distance calculation means with the time delay.

22. A radar apparatus as claimed in claim 17, further comprising:

means for determining if any one of the normalized values of the sampling points is above a predetermined upper limit;

means for determining if none of the normalized values of the sampling points is above a predetermined lower limit; and means for decreasing the sensitivity of the radar apparatus if any one of the normalized values is above the upper limit, and increasing the sensitivity of the radar apparatus if none of the normalized values is above the lower limit.

23. A radar apparatus as claimed in claim 22, wherein the means for adjusting the sensitivity of the radar apparatus adjusts the output power of said transmission means so that the normalized values may fall between the upper and lower limits.

24. A radar apparatus as claimed in claim 22, wherein the means for adjusting the sensitivity of the radar apparatus adjusts the gain of said reception means so that the normalized values may fall between the upper and lower limits.

25. A radar apparatus as claimed in claim 22, wherein the means for adjusting the sensitivity of the radar apparatus adjusts the number of cumulative operations carried out by said accumulation means.

26. A radar apparatus comprising:
- (a) transmission means for periodically transmitting a pulsesignal;
- (b) reception means for continuously receiving a signal in a direction in which the pulsesignal is reflected by a target;
- (c) means for converting the received signal into a binary signal;
- (d) means for sampling the binary signal in one or a plurality of different sampling periods after said transmission means transmits the pulsesignal;
- (e) one or a plurality of means for integrating the binary signal in the sampling periods, respectively, in response to each of a predetermined number of pulsesignals emitted from said transmission means; and
- (f) means for comparing a normalized value of the integrated value of each of said integration means with a predetermined threshold and determining whether or not there is a reflected signal from the target according to a result of the comparison.

27. A radar apparatus as claimed in claim 26, further comprising:
means for calculating the distance to the target according to a time delay between the timing of said transmission means transmitting the pulsesignal and a sampling period that provides an integrated value whose normalized value is greater than the threshold.

28. A radar apparatus comprising:
- (a) means for periodically transmitting a pulse signal;
- (b) means for continuously receiving a signal in a direction in which the pulsesignal is reflected by a target;
- (c) means for converting the received signal into a binary signal;
- (d) means for sampling the binary signal in a sampling period after said transmission means transmits the pulsesignal;
- (e) means for integrating the binary signal sampled in the sampling period in response to each of a predetermined number of pulsesignals emitted from said transmission means;
- (f) means for switching the sampling period to another once said integration means completes a predetermined number of integral operations of the binary signal in the sampling period, and letting said integration means integrate the binary signal in the new sampling period;
- (g) means for storing the integrated values for the sampling periods, respectively;
- (h) means for comparing a normalized value of each of the integrated values stored in said storage means with a predetermined threshold and determining whether or not there is a reflected signal from the target according to a result of the comparison; and
- (i) means for calculating the distance to the target according to a time delay between the timing of said transmission means transmitting the pulsesignal and a sampling period that provides an integrated value whose normalized value is greater than the threshold.

29. A radar apparatus as claimed in claim 26, further comprising:
means for detecting an interference wave contained in a reflected signal received by said reception means; and
means for removing the interference wave.

30. A radar apparatus as claimed in claim 26, further comprising:
one or a plurality of means for carrying out a predetermined number of integral operations on a binary signal representing noise sampled in the same sampling periods as above, respectively, while said transmission means is not transmitting the pulsesignal, the integrated values of the sampling periods being normalized, respectively, and being used as the thresholds of the sampling periods, respectively.

31. A radar apparatus as claimed in claim 27, further comprising:
means for plotting an approximation curve by connecting the normalized values of sampling periods that exceed each the threshold to one another according to an approximation formula; and
means for detecting a peak in the approximation curve, finding a time delay between the peak and the timing of said transmission means transmitting the pulsesignal, and providing said distance calculation means with the time delay.

32. A radar apparatus as claimed in claim 27, further comprising:
means for determining if any one of the normalized values of the sampling periods is above a predetermined upper limit;
means for determining if none of the normalized values of the sampling periods is above a predetermined lower limit; and
means for decreasing the sensitivity of the radar apparatus if any one of the normalized values is above the upper limit, and increasing the sensitivity of the radar apparatus if none of the normalized values is above the lower limit.

33. A radar apparatus as claimed in claim 32, wherein the means for adjusting the sensitivity of the radar apparatus adjusts the output power of said transmission means so that the normalized values may fall between the upper and lower limits.

34. A radar apparatus as claimed in claim 32, wherein the means for adjusting the sensitivity of the radar apparatus adjusts the gain of said reception means so that the normalized values may fall between the upper and lower limits.

35. A radar apparatus as claimed in claim 32, wherein the means for adjusting the sensitivity of the radar apparatus adjusts the number of integral operations carried out by said integration means.

* * * * *